US012664550B1

(12) United States Patent
Rana et al.

(10) Patent No.: US 12,664,550 B1
(45) Date of Patent: Jun. 23, 2026

(54) CONTACT DATA FOR IDENTITY VERIFICATION

(71) Applicant: Block, Inc., Oakland, CA (US)

(72) Inventors: Sachin Rana, Brampton (CA); Ragavan Thurairatnam, East York (CA); David Puldon, South San Francisco, CA (US); Mitchell Jablonski, Cherry Hill, NJ (US); Kyle De Freitas, Etobicoke (CA)

(73) Assignee: Block, Inc., Oakland, CA (US)

( * ) Notice: Subject to any disclaimer, the term of this patent is extended or adjusted under 35 U.S.C. 154(b) by 9 days.

(21) Appl. No.: 18/164,451

(22) Filed: Feb. 3, 2023

Related U.S. Application Data

(63) Continuation-in-part of application No. 17/687,553, filed on Mar. 4, 2022, now abandoned.

(60) Provisional application No. 63/233,187, filed on Aug. 13, 2021.

(51) Int. Cl.
G06Q 20/40 (2012.01)

(52) U.S. Cl.
CPC ..... G06Q 20/4016 (2013.01); G06Q 20/4014 (2013.01)

(58) Field of Classification Search
CPC ...................... G06Q 20/4016; G06Q 20/4014
See application file for complete search history.

(56) References Cited

U.S. PATENT DOCUMENTS 8,443,049 B1 * 5/2013 Geddes ................. H04L 63/126
709/208
10,482,449 B1 11/2019 Grantert 10,692,060 B2 6/2020 Gardner et al.
10,721,242 B1 * 7/2020 Jones .................... H04L 63/126
11,055,727 B1 * 7/2021 Kumar ................ H04L 63/1408
2003/0028481 A1 2/2003 Flitcroft et al.
(Continued)

FOREIGN PATENT DOCUMENTS

WO 2012/082835 A1 6/2012
WO 2019/142050 A1 7/2019
(Continued)

OTHER PUBLICATIONS

Langley et al., "Approaches to Machine Learning", Carnegie-Mellon University, Feb. 16, 1984, 28 pages.
(Continued)

*Primary Examiner* — Raven E Yono

(74) *Attorney, Agent, or Firm* — Lee & Hayes, P.C.

(57) ABSTRACT

Particular embodiments receive, by a payment service in association with a user account associated with a service provider, an identity verification submission associated with an identifier and a name. The payment service, for the phone number, queries contact records associated with user accounts associated with the service provider. The payment service receives, as a result of the query, several name options associated with the phone number, where each of the name options are stored in individual contact records. The payment service determines a name option of the several name options to associate with the identifier based at least in part on a similarity of individual name options to other name options. The payment service approves or rejects the identity verification submission based at least in part on the determined name option.

20 Claims, 59 Drawing Sheets

(56) References Cited

U.S. PATENT DOCUMENTS

| | | | |
|---|---|---|---|
| 2004/0260653 A1 | 12/2004 | Henry et al. | |
| 2006/0143107 A1 | 6/2006 | Dumas et al. | |
| 2008/0228615 A1 | 9/2008 | Scipioni et al. | |
| 2012/0030109 A1 | 2/2012 | Dooley et al. | |
| 2012/0290420 A1 | 11/2012 | Close | |
| 2013/0041814 A1 | 2/2013 | Ankarath | |
| 2013/0110720 A1 | 5/2013 | Rekhi et al. | |
| 2013/0218657 A1 | 8/2013 | Salmon et al. | |
| 2013/0311467 A1* | 11/2013 | Galle | G06F 40/295 |
| | | | 707/E17.046 |
| 2014/0067671 A1 | 3/2014 | Dehaven et al. | |
| 2014/0081852 A1 | 3/2014 | Blackhurst et al. | |
| 2014/0207612 A1 | 7/2014 | Isaacson et al. | |
| 2014/0278905 A1 | 9/2014 | Denardis | |
| 2017/0048248 A1 | 2/2017 | Janzer | |
| 2018/0089294 A1* | 3/2018 | Dray | G06F 16/25 |
| 2018/0204281 A1* | 7/2018 | Painter | G06Q 30/0641 |
| 2019/0116187 A1 | 4/2019 | Gahnoog et al. | |
| 2019/0392418 A1 | 12/2019 | Butler et al. | |
| 2020/0058012 A1 | 2/2020 | Chandorkar et al. | |
| 2020/0074447 A1 | 3/2020 | Isaacson et al. | |
| 2020/0133955 A1* | 4/2020 | Padmanabhan | H04L 9/3218 |
| 2020/0167861 A1* | 5/2020 | Ramaswamy | H04W 12/06 |
| 2020/0265440 A1 | 8/2020 | Albouyeh et al. | |
| 2020/0294110 A1 | 9/2020 | Sirota et al. | |
| 2020/0327534 A1 | 10/2020 | Swanson et al. | |
| 2021/0019808 A1 | 1/2021 | Erez et al. | |
| 2021/0090147 A1 | 3/2021 | Kochhar et al. | |
| 2021/0142326 A1 | 5/2021 | Butler et al. | |
| 2021/0174338 A1 | 6/2021 | Isaacson et al. | |
| 2021/0256070 A1 | 8/2021 | Tran et al. | |
| 2021/0359991 A1* | 11/2021 | Mumick | H04W 12/06 |
| 2021/0374709 A1 | 12/2021 | Suresh et al. | |
| 2022/0005020 A1 | 1/2022 | Moring et al. | |
| 2022/0366411 A1 | 11/2022 | Bajwa et al. | |
| 2023/0045946 A1 | 2/2023 | Duane et al. | |
| 2023/0046919 A1 | 2/2023 | Dhodapkar | |
| 2023/0047509 A1 | 2/2023 | Dhodapkar | |

FOREIGN PATENT DOCUMENTS

| | | |
|---|---|---|
| WO | 2023/018903 A1 | 2/2023 |
| WO | 2023/018906 A1 | 2/2023 |

OTHER PUBLICATIONS

"Method for point of service 'automatic gift card redemption thank you'", IP.com, May 25, 2012, 3 pages.

"Personalized Cash/Gift Cards", IP.com, Sep. 13, 2007, 8 pages.

Aday M., "Country Store Ledgers Provide an Intimate Look at Lives from the Past", pp. 1-2, May 8, 2018.

Bentz A., "Can I see some ID?", https://www.wellsfargohistory.com/can-i-see-some-id/, pp. 1-11, Year 2022.

International Search Report and Written Opinion for International Application No. PCT/US2022/040114, mailed Nov. 18, 2022.

International Search Report and Written Opinion for International Application No. PCT/US2022/040117, mailed Nov. 22, 2022.

A Framework Based on Distributed Ledger Technologies for Data Management and Services in Intelligent Transportation Systems. IEEE vol. 8, pp. 100384-100402 (Year: 2020).

SMS based Pooled or Collective Monetary Fund, IPCOM000227834D, May 21, 2023, 5 pages.

* cited by examiner

112(A)
Second User Device

200

106
Payment Service System

221
Receive request with user data and initiate an onboarding process for onboarding a primary user

222
Eligible user for primary account?

Yes

No

223
Create a primary account for user

224
Dynamically modify the onboarding process and initialize an alternative onboarding process for onboarding a secondary user

FIG. 2B

112(B)
First User Device

211
Send request to create a user account with payment service

212
Receive notification of creation of user account

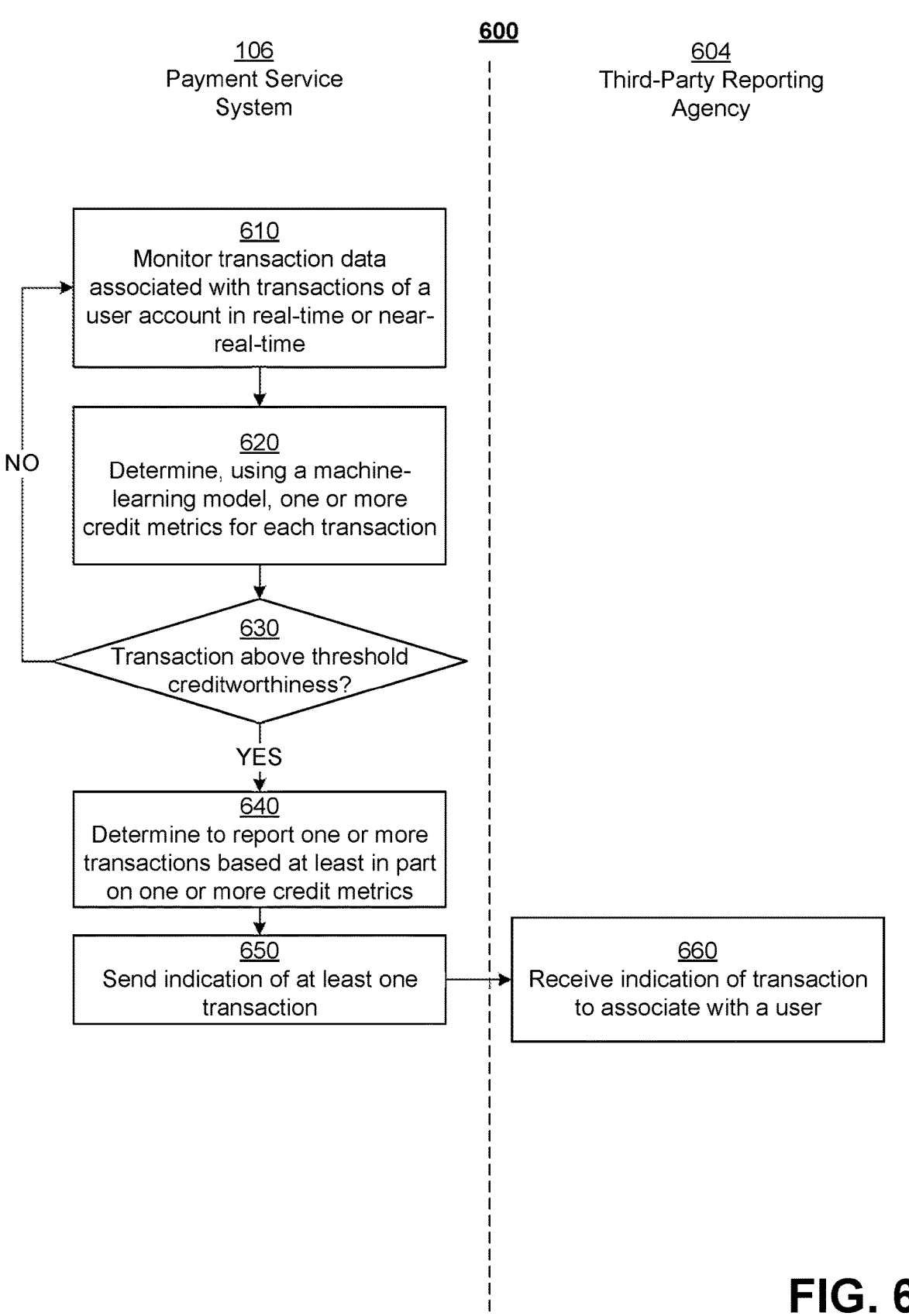

600

106
Payment Service System

604
Third-Party Reporting Agency

610
Monitor transaction data associated with transactions of a user account in real-time or near-real-time 620
Determine, using a machine-learning model, one or more credit metrics for each transaction 630
Transaction above threshold creditworthiness?

NO

YES

640
Determine to report one or more transactions based at least in part on one or more credit metrics 650
Send indication of at least one transaction 660
Receive indication of transaction to associate with a user

FIG. 6

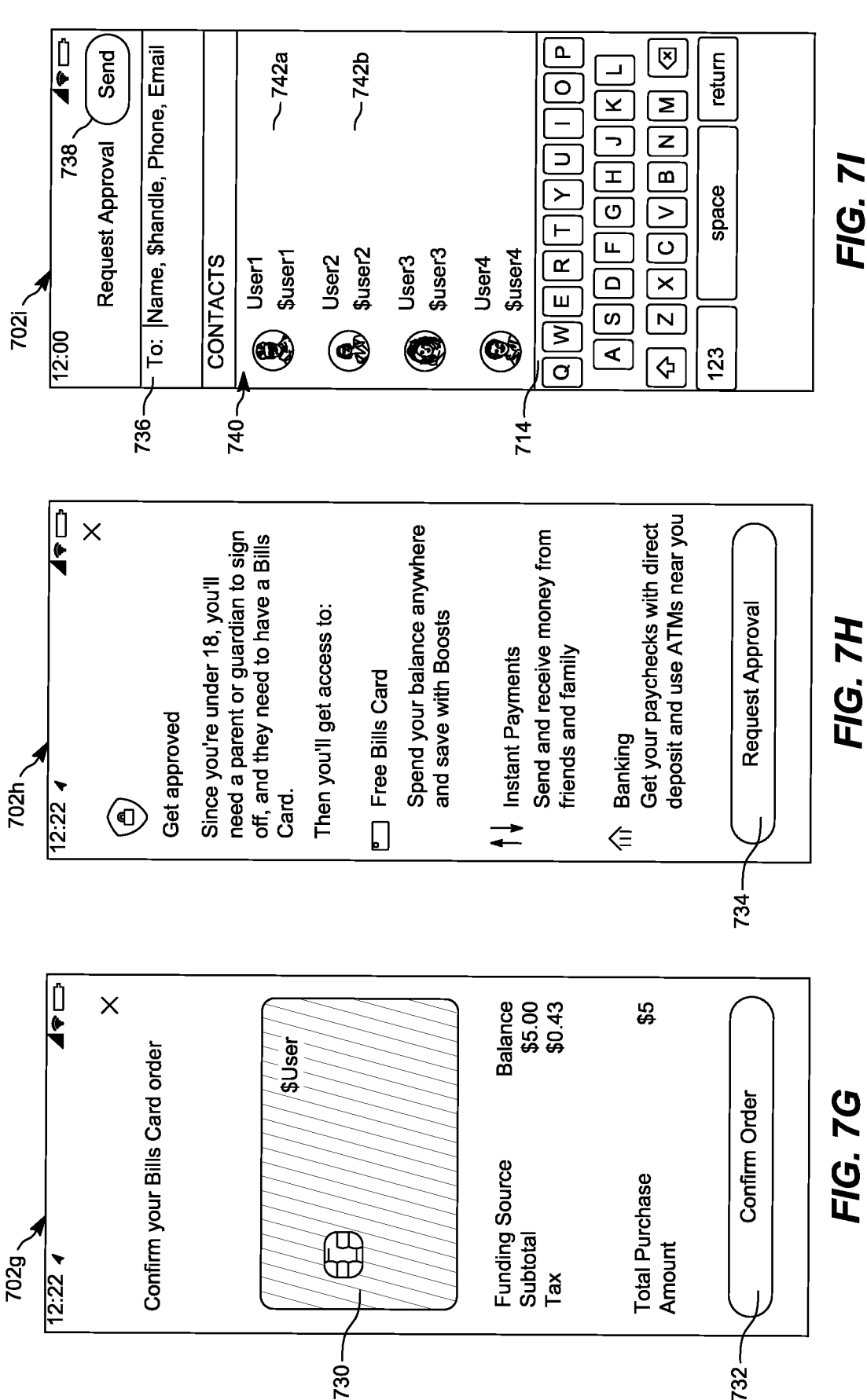

Request Approval
738
Send

To: |Name, $handle, Phone, Email

CONTACTS
740

User1
$user1
~742a

User2
$user2
~742b

User3
$user3

User4
$user4

714

Q W E R T Y U I O P
A S D F G H J K L
⇧ Z X C V B N M ⌫
123  space  return

🛡
Get approved

Since you're under 18, you'll
need a parent or guardian to sign
off, and they need to have a Bills
Card.

Then you'll get access to:

☐ Free Bills Card
Spend your balance anywhere
and save with Boosts

⇄ Instant Payments
Send and receive money from
friends and family

🏦 Banking
Get your paychecks with direct
deposit and use ATMs near you

Request Approval
734

Confirm your Bills Card order $User

730

Funding Source    Balance
Subtotal          $5.00
Tax               $0.43

Total Purchase    $5
Amount

Confirm Order
732

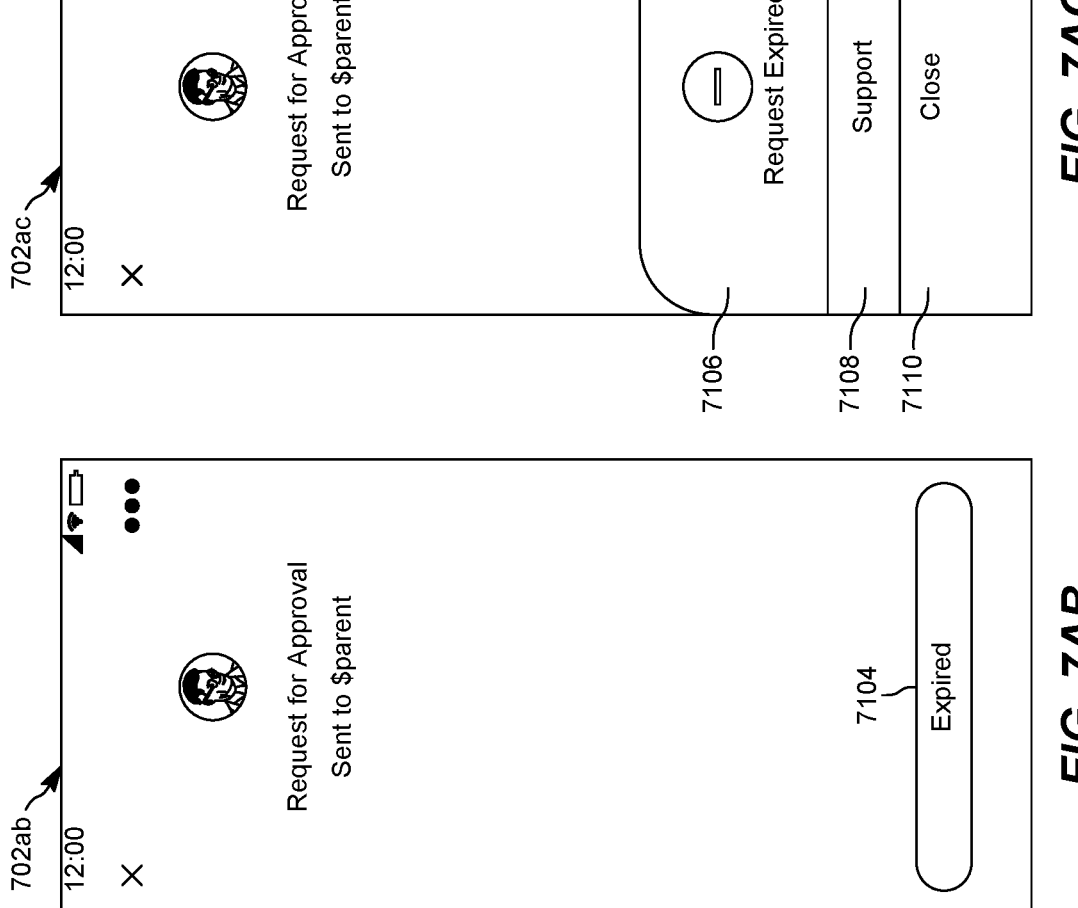
FIG. 7AC
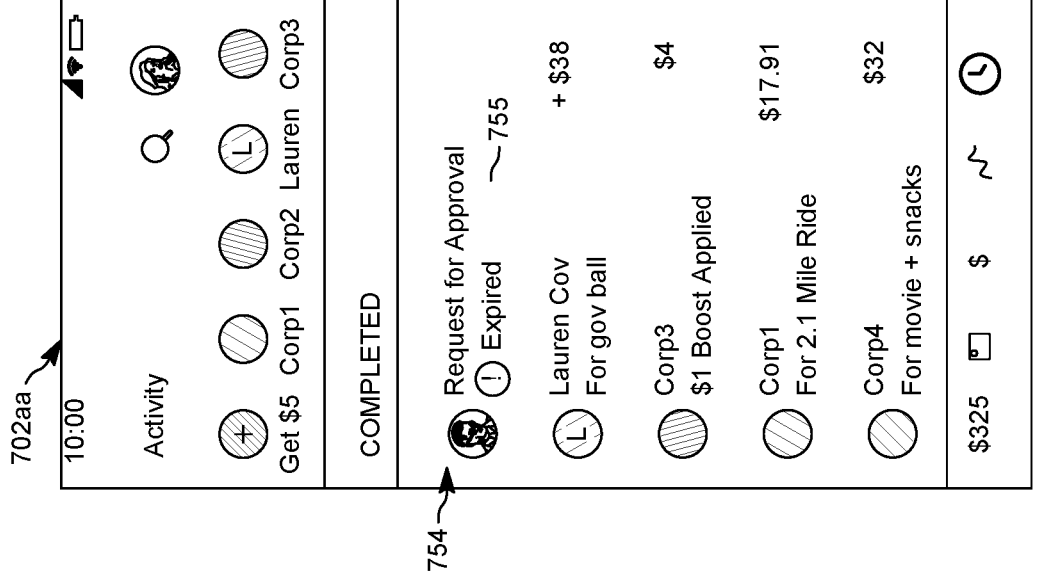
FIG. 7AB
FIG. 7AA

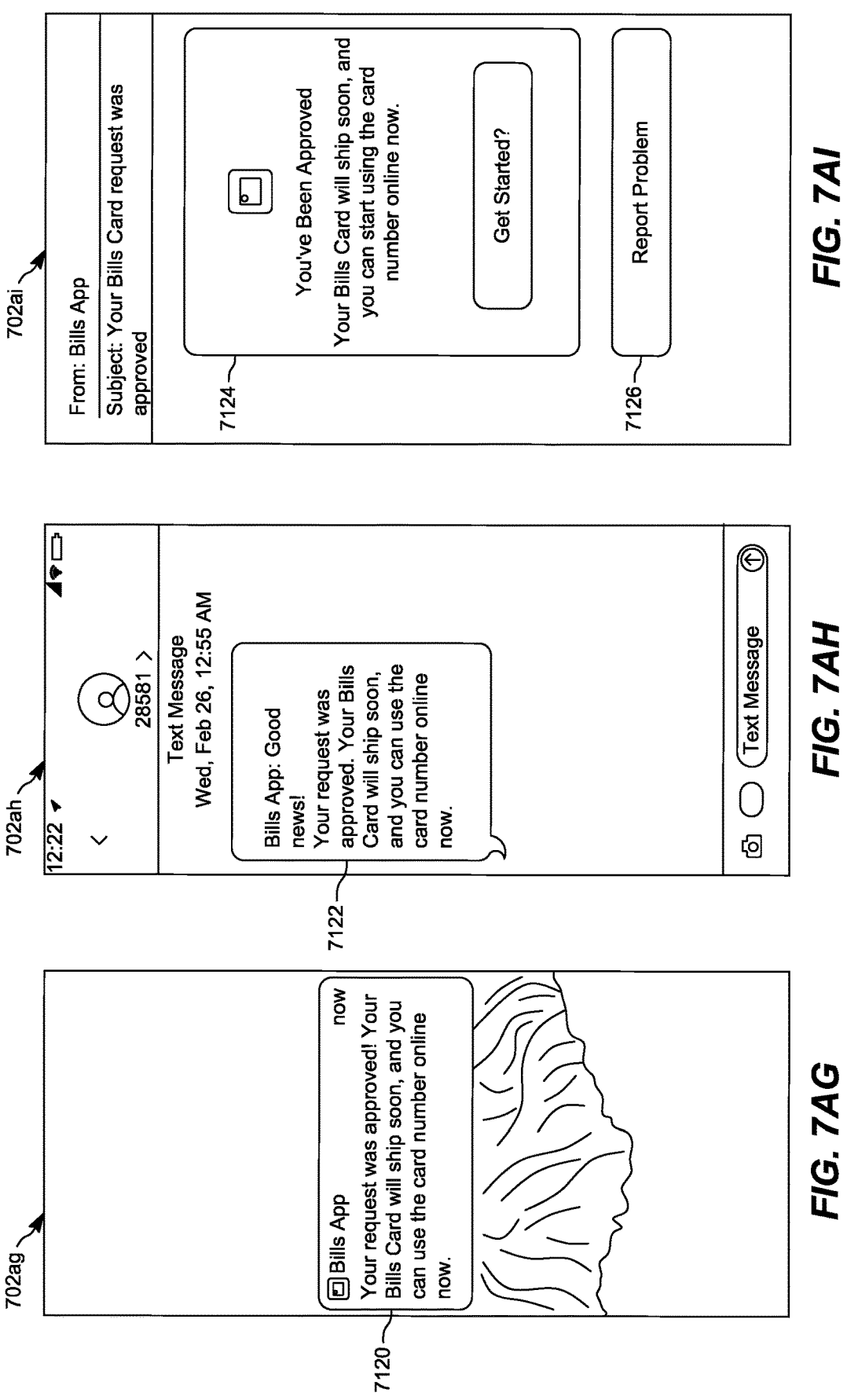

702ai

From: Bills App

Subject: Your Bills Card request was approved

7124

You've Been Approved

Your Bills Card will ship soon, and you can start using the card number online now.

Get Started?

Report Problem

Text Message
Wed, Feb 26, 12:55 AM

Bills App: Good news!
Your request was approved. Your Bills Card will ship soon, and you can use the card number online now.

7122

Text Message

Bills App                                      now
Your request was approved! Your Bills Card will ship soon, and you can use the card number online now.

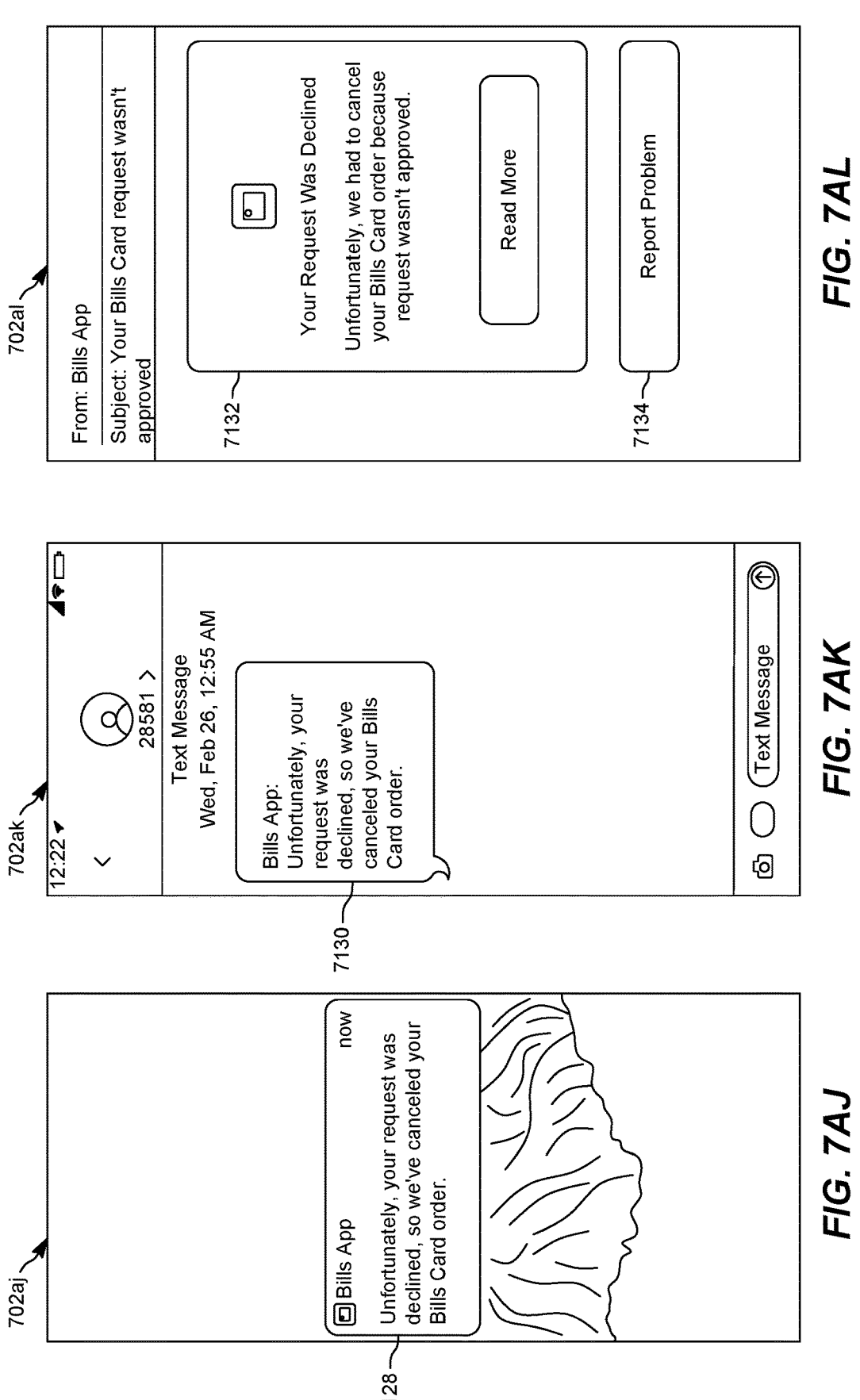

702al

From: Bills App

Subject: Your Bills Card request wasn't approved

7132

Your Request Was Declined

Unfortunately, we had to cancel your Bills Card order because request wasn't approved.

Read More

7134

Report Problem

Text Message
Wed, Feb 26, 12:55 AM

7130

Bills App:
Unfortunately, your request was declined, so we've canceled your Bills Card order.

Text Message

Bills App                now

7128

Unfortunately, your request was declined, so we've canceled your Bills Card order.

FIG. 7AJ

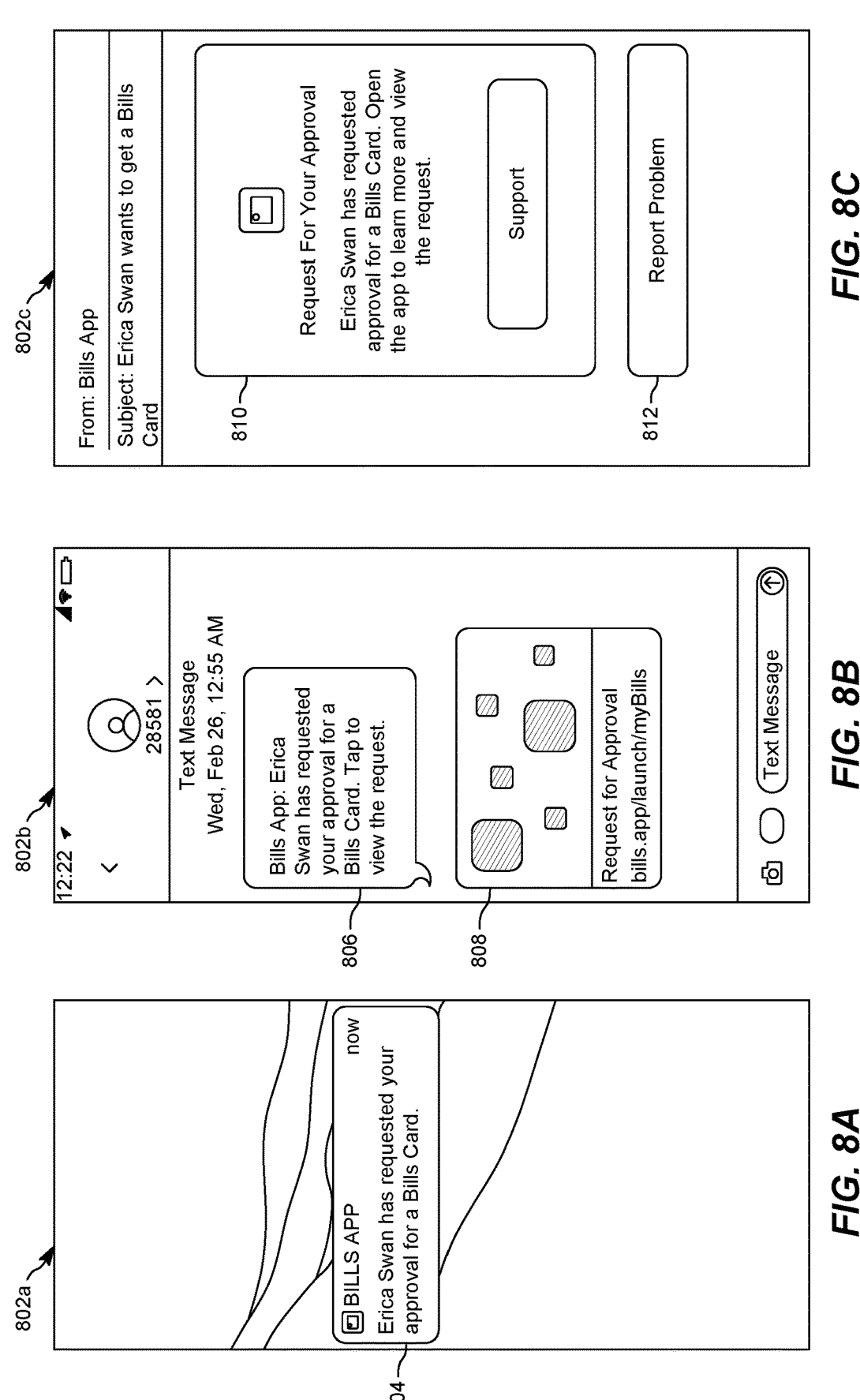

From: Bills App

Subject: Erica Swan wants to get a Bills Card

810

Request For Your Approval

Erica Swan has requested approval for a Bills Card. Open the app to learn more and view the request.

Support

812

Report Problem

Text Message
Wed, Feb 26, 12:55 AM

28581 ›

806

Bills App: Erica Swan has requested your approval for a Bills Card. Tap to view the request.

808

Request for Approval
bills.app/launch/myBills

Text Message

BILLS APP    now

Erica Swan has requested your approval for a Bills Card.

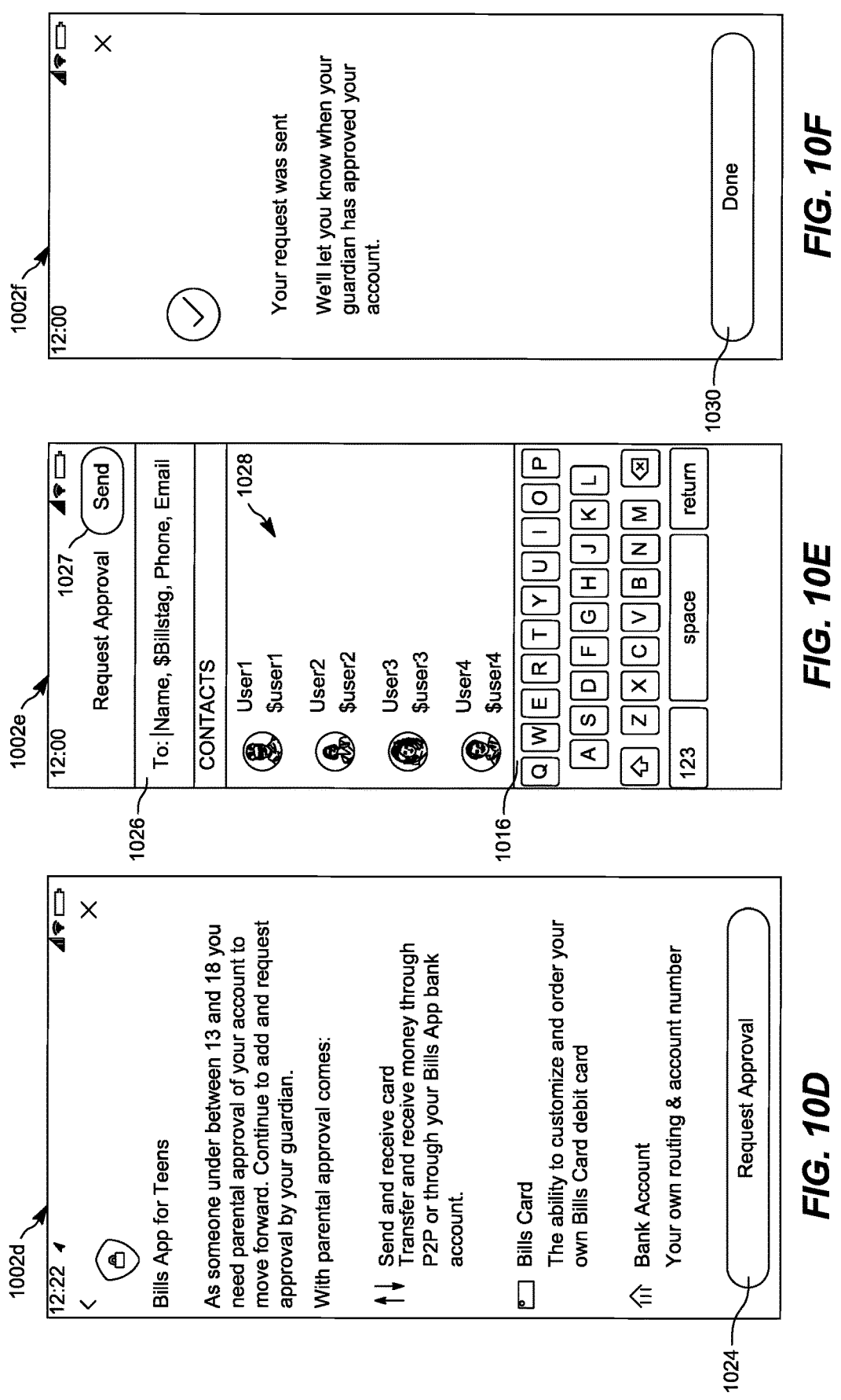

1002d

12:22

Bills App for Teens

As someone under between 13 and 18 you need parental approval of your account to move forward. Continue to add and request approval by your guardian.

With parental approval comes:

↑↓ Send and receive card
Transfer and receive money through P2P or through your Bills App bank account.

☐ Bills Card
The ability to customize and order your own Bills Card debit card

⇪ Bank Account
Your own routing & account number

Request Approval — 1024

12:00 1027 Send

Request Approval

To: |Name, $Billstag, Phone, Email — 1026

CONTACTS — 1028

User1
$user1

User2
$user2

User3
$user3

User4
$user4

Q W E R T Y U I O P
A S D F G H J K L
⇧ Z X C V B N M ⌫
123 space return

Your request was sent

We'll let you know when your guardian has approved your account.

Done — 1030

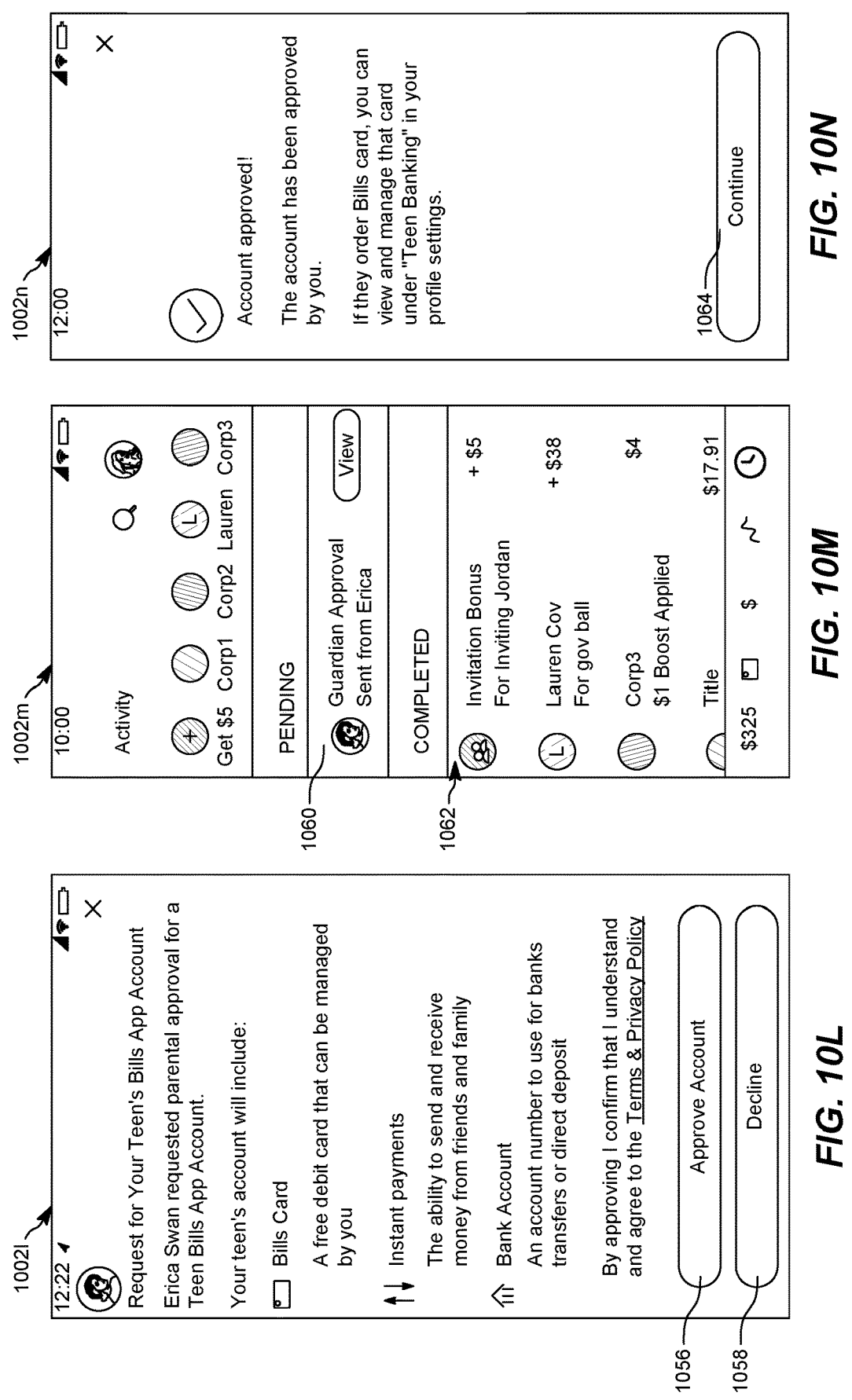

Account approved!

The account has been approved by you.

If they order Bills card, you can view and manage that card under "Teen Banking" in your profile settings.

Activity

Get $5 Corp1 Corp2 Lauren Corp3

PENDING

Guardian Approval View
Sent from Erica

1060

COMPLETED

1062

Invitation Bonus + $5
For Inviting Jordan

Lauren Cov + $38
For gov ball

Corp3 $4
$1 Boost Applied

Title $17.91

Request for Your Teen's Bills App Account

Erica Swan requested parental approval for a Teen Bills App Account.

Your teen's account will include:

□ Bills Card

A free debit card that can be managed by you

Instant payments

The ability to send and receive money from friends and family

Bank Account

An account number to use for banks transfers or direct deposit

By approving I confirm that I understand and agree to the Terms & Privacy Policy Approve Account Decline

1056

1058

1202g

1230

Completed

Completed

Source        Cash App

Identifier        #C4SHA77

$25.00

1232a        Block Person

1232b        Web Receipt

1232c        Support

1232d        Close

1202f

12:00

LINKED FAMILY ACCOUNT VIEW

1222

1224        User2
$user2

1226        $25.00

Aug 14, 2018 at 9:30 PM

1228        ✓ Received

Web Receipt

2000

112(D)
First User Device

2100

106
Payment Service System

FIG. 21A

2124
Compare the determined name option to the name associated with the identity verification submission 2125
Determined name option matches the name?

No →

Yes

2126
Reject the identity verification submission and send an alert

2127
Initiate secondary identity verification

2128
Approve the identity verification submission and send an alert

112(E)
Second User Device

2112
Receive alert notifying the first user the identity verification request was declined 2113
Receive alert notifying the first user the identity verification request was approved

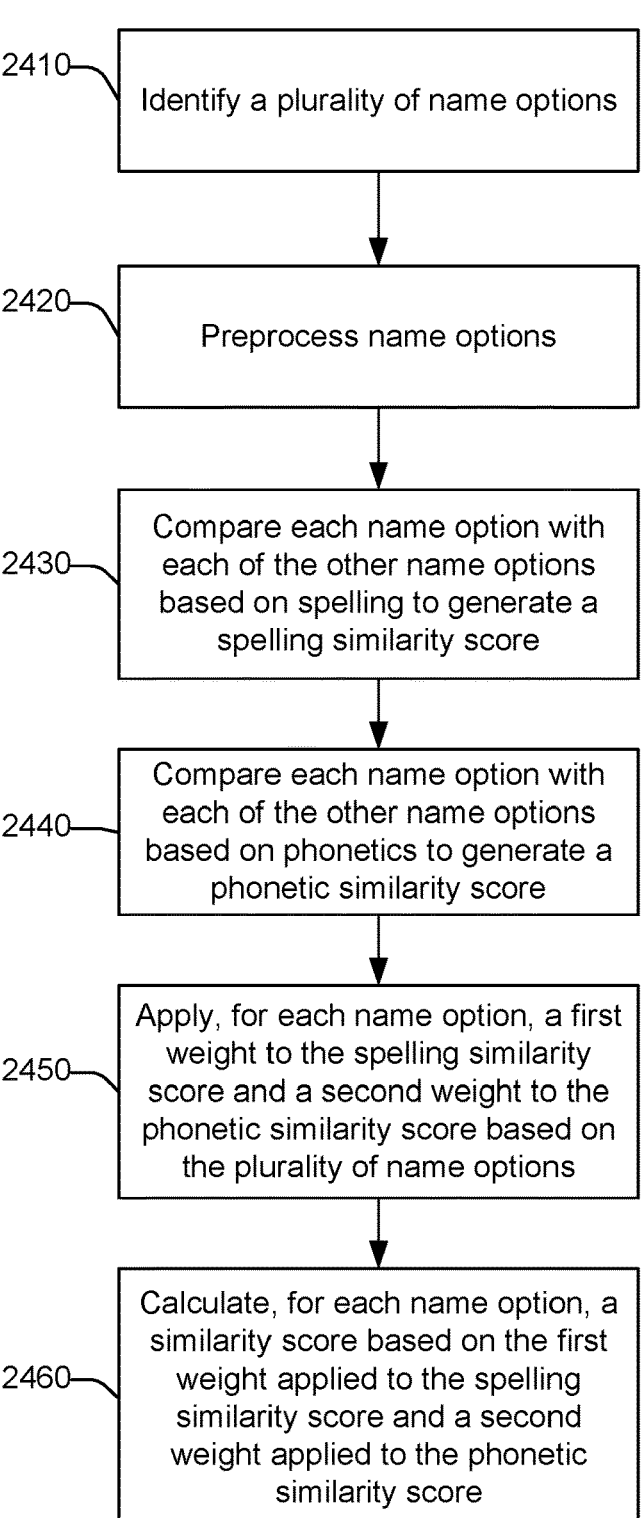

2410 — Identify a plurality of name options

2420 — Preprocess name options

2430 — Compare each name option with each of the other name options based on spelling to generate a spelling similarity score 2440 — Compare each name option with each of the other name options based on phonetics to generate a phonetic similarity score 2450 — Apply, for each name option, a first weight to the spelling similarity score and a second weight to the phonetic similarity score based on the plurality of name options 2460 — Calculate, for each name option, a similarity score based on the first weight applied to the spelling similarity score and a second weight applied to the phonetic similarity score

FIG. 24

CONTACT DATA FOR IDENTITY VERIFICATION

PRIORITY

This application is a continuation-in-part under 35 U.S.C. § 120 of U.S. patent application Ser. No. 17/687,553, filed Mar. 4, 2022, which claims the benefit, under 35 U.S.C. § 119(e), of U.S. Provisional Patent Application No. 63/233,187, filed 13 Aug. 2021, titled "Verification and Approval Controls for Delegate Accounts," the entire contents of which are incorporated herein by reference.

TECHNICAL FIELD

Payment service applications, which are downloadable and executable on user devices, enable users to make contactless payments with other users and merchants. Such payment service applications are provided by a payment service and utilize one or more network connections to transmit data among and between user devices to facilitate such payments between users and merchants.

Users of a payment service often create an account with the payment service in order to engage with many of the functionalities of the payment service. Creating an account typically involves a form of identity verification to enable the payment service to verify that the user creating the account is who they claim to be.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical components or features. Moreover, multiple instances of the same part are designated by a common prefix separated from the instance number by a dash. The figures are not drawn to scale.

FIGS. 2A-2C is a process for an onboarding flow to create an account associated with a payment service according to some embodiments disclosed herein.

FIG. 6 illustrates an example process for sending transactions to a third-party reporting agency according to some embodiments disclosed herein.

FIGS. 8A-8L illustrate various example GUIs for a secondary account creation workflow as displayed on a user device of a primary user who already has an account with the payment service according to some embodiments disclosed herein.

FIGS. 10A-10I illustrate various example GUIs for a workflow for enabling a peer-to-peer payment functionality of a secondary account as provided for display on a user device of a secondary user according to some embodiments disclosed herein.

FIGS. 10J-10N illustrate various example GUIs for a workflow for enabling a peer-to-peer payment functionality of a secondary account as provided for display on a user device of a primary user according to some embodiments disclosed herein.

FIGS. 21A-21B illustrate an example process for an identity verification submission according to some embodiments disclosed herein.

FIG. 24 illustrates an example process for calculating a similarity score for name options according to some embodiments disclosed herein.

DETAILED DESCRIPTION

Figure 1A:
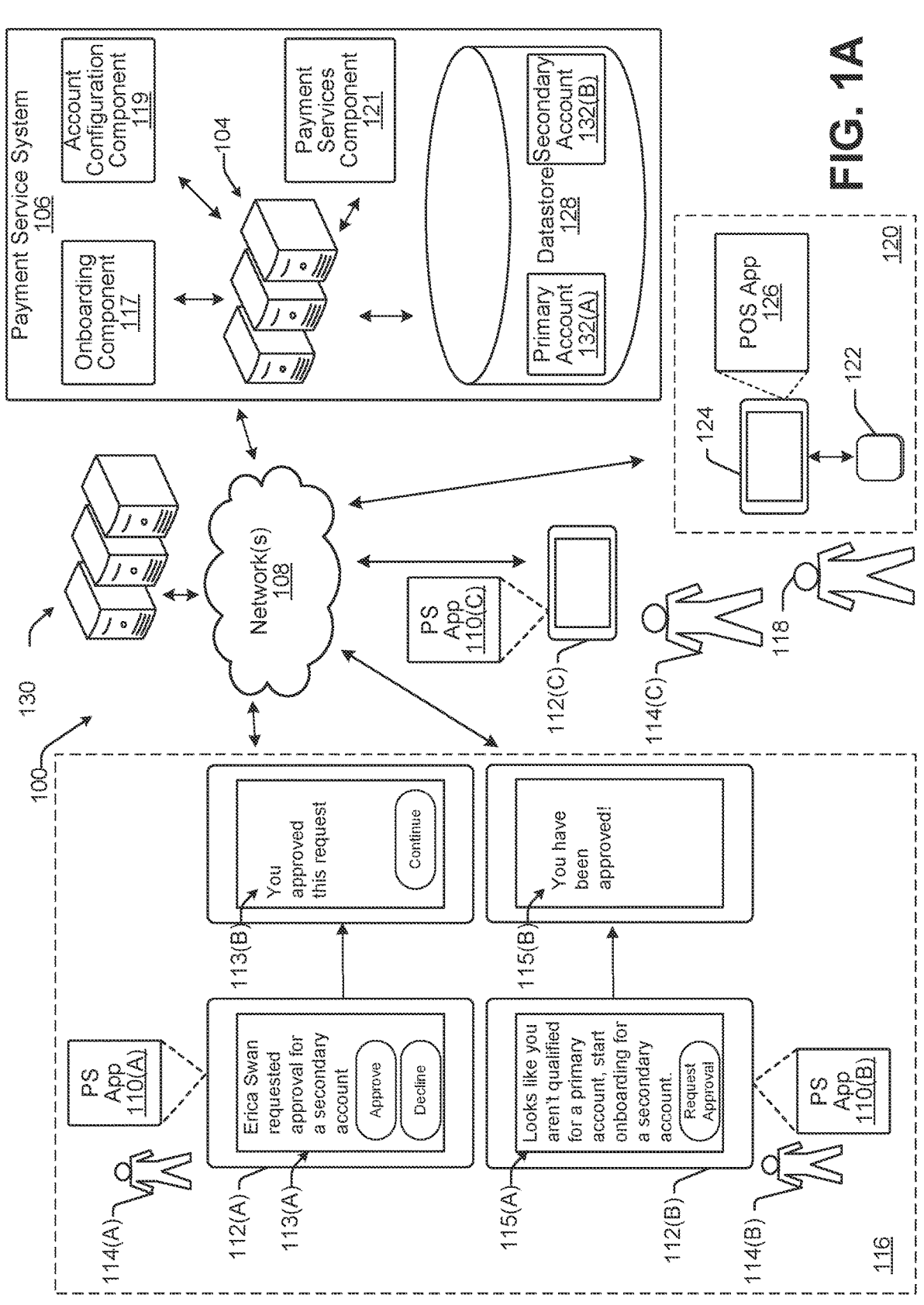
FIG. 1A is an example payment service for providing verification and approval controls for secondary accounts according to some embodiments disclosed herein.

Techniques described herein relate to accessing contact data of users associated with a service provider and using such contact data for identity verification. In an example, users of the service provider can provide the service provider access to contact records that are stored on their user devices and/or otherwise associated with the users. Individual contact records can include, for example, a name, at least one phone number, an image or representation, an address, a birthdate, a significant date, an associated business, a personal website, date added, conversation history and frequency, an email address, other user identifiers (e.g., a usertag for making payments, handles or usernames for social media platforms, etc.), and/or any other information that can be used by a user to recall and/or contact a user associated with the contact record. As an example, the service provider can enable users to share their contact records with the service provider (e.g., for streamlining invitations, referrals, payments, splitting tickets, joining groups, etc.) and/or the users can grant the service provider permission to access the contact records stored by their user device and/or otherwise associated with the users. In an example, an identity verification (IDV) process can be initiated at the request of a user. The request can include identifying data associated with the user, such as a name provided by the user, and can be associated with an identifier such as a phone number, a device identifier of the device sending the request, an email address, a birthdate, or the like. In an example, the service provider can access contact records (e.g., of other users) shared with the service provider and compare data associated with the request (e.g., the name, identifier, etc.) with the contact records. The service provider can verify whether the data associated with the request is legitimate or fraudulent in view of the contact records. That is, the service provider can verify whether the identifier associated with the request is in fact associated with the name provided during the identity verification submission based on the names associated with the identifier in the individual contact records. In some examples, a machine-trained model can analyze the request in view of the contact records to determine a likelihood or confidence score that the name provided is in fact the name that corresponds with the identifier. In this way, the service provider can leverage access to contact records of a plurality of users associated with the service provider (e.g., aggregated contact records) to improve identity verification techniques, for example, by increasing accuracy and decreasing fraud.

In existing techniques, there are standard libraries for calculating similarity, such as fuzzy string similarity, between two or more given strings (e.g., python packages include Fuzzywuzzy, Python-Levenshtein). Also, existing techniques provide off-the-shelf libraries to calculate phonetic representation (i.e., how a given string would be pronounced by humans) of a given string. However, existing techniques lack the ability to determine a most likely string (that represents the entity of interest) given a number of string options. For example, in an effort to determine a most likely name of an individual when a name is sampled from different data sources, (e.g., different phone books, different vendors, different data sources, etc.), existing techniques are inadequate in doing so. For instance, it is common to determine the most likely name based on the mode (e.g., the most occurring name out of all the given options). However, existing techniques (e.g., using the mode) require exact matches of strings (e.g., the same name without variation) and do not utilize similarity, such as fuzzy string similarity. Real-world data from different data sources typically does not include exact matches of strings, but instead, has some variation (e.g., spelling, phonetic, longer or shorter, etc.) despite referencing the same entity. As such, existing techniques are inadequate for determining most likely strings especially when the string options from the source data are inherently noisy. Further, existing techniques are easily susceptible to fraud attacks since existing techniques do not take fuzzy string similarities into account. Hence, any fraudster could take over someone's identity (e.g., name, date of birth, address, etc.) by creating a relatively small number of synthetic or fraudulent contact entries with an exact name and associate them with any phone number. In this scenario, the existing techniques would pick these exact names over the other noisy name options that actually correspond to a given phone number.

Techniques described herein enable a service provider to determine a most likely string given a number of string options where there is variation in the string options given different data sources. As an example, a payment service can attempt to determine a user's real name using their provided phone number, for instance, in association with an identity verification request (e.g., for onboarding/creating a new account, enabling access to a regulated or new service, or the like). As described above, the payment service can perform a look up using a provided phone number in other users' contact data and can identify names that other users associate with that phone number. These names can comprise name options which can be processed, for example using a pairwise matrix of string similarities, to determine which of the given options is most likely to be the correct name of the user. The 'most likely name' can be identified from contact data and can be used to verify the identity of the user. That is, if the name provided corresponds to the 'most likely name' as determined using techniques described herein, the payment service can verify the identity of the user. Such techniques can leverage models and/or machine-learning to improve upon existing techniques by increasing the accuracy with which identity verification can be made and reducing the amount of data needed for performing such identity verification. Additional details are provided below.

The similarity techniques described herein can be useful for a variety of use cases, such as identity verification, as described above. In some examples, such techniques can be useful for verifying the identity of users applying for secondary accounts. Techniques described herein relate to verification and approval controls of secondary accounts of a payment service. A "secondary account" is a user account authorized by a primary user and associated with or mapped to a primary account of the primary user. A "primary user" can be a user who is legally permitted to own a user account, or otherwise satisfies a condition or requirement for having a "primary account." A "primary account" can be a user account associated with a primary user that has access to a set of payment functionalities availed via a payment service application of a payment service. A "secondary user" can be a user that is not legally permitted to own a primary account, or otherwise does not satisfy a condition or requirement to have their own primary account. Therefore, a secondary user is associated with a secondary account. A secondary account can be mapped to, or otherwise associated with, a primary account. A secondary account can be associated with a set of payment functionalities that is different than the set of payment functionalities associated with the primary account.

A primary user, associated with a primary account, can authorize a secondary account for a secondary user such that the secondary user can utilize services of the payment service. The primary user may be the legal owner of the secondary account, and the secondary account may be a sub-account of a primary account of the primary user, or the secondary account may be a separate account mapped to or otherwise associated with the primary account. The secondary account therefore allows the secondary user to access and utilize the services of the payment service with the availability of oversight and accountability of the primary user. As described above, the primary account and the secondary account can each be associated with a set of payment functionalities availed via the payment service. In some examples, the primary account can be associated with a set of payment functionalities that is more comprehensive than the secondary account. That is, in some examples, the secondary account can be associated with a reduced set of the payment functionalities, which can be configured by at least one of the primary account, the secondary account, or the payment service. For example, in some examples, certain payment functionalities associated with the secondary account can be associated with a condition or may require authorization from a primary account. In some examples, the secondary account may have access to micro-financial services, and more specifically micro-transactions, wherein funds associated with the secondary account are withdrawn in small amounts. In some examples, individual payment functionalities may be tiered or otherwise conditioned on activity or other interactions within a payment service application. For instance, saving, investing, and spending payment functionalities may be tiered such that if the secondary user satisfies a saving or investing goal, spending payment functionalities may be modified (e.g., unlocked or afforded greater spending limits or limits with fewer restrictions). Alternatively, if the secondary user does not satisfy a saving or investing goal, spending payment functionalities may be modified (e.g., restricted or redesigned). In some examples, the reduced set of payment functionalities can be utilized to manage or monitor the secondary account to mitigate risk and promote fiscal responsibility.

As described below, the payment service can receive an indication of one or more conditions for performing transactions to associate with the secondary account. The payment service can associate the one or more conditions with the secondary account. When payment requests associated with one or more transactions are received in association with the secondary account, the payment service can approve or reject the transactions based on whether the one or more conditions are met. That is, the payment service can monitor transactions in real-time or near-real-time and can approve or reject transactions of the secondary account based at least in part on whether such transactions satisfy the one or more conditions. In some examples, such monitoring can be used to track progress with respect to goals, milestones, gifts, or the like. Additional details are provided below.

Techniques described herein can leverage specially-configured hardware or software components associated with a payment service to offer technical solutions in accordance with the description herein. Techniques described herein may be performed, at least in part, by a payment service application ("payment service app") provided for download by the payment service. The payment service app (or an instance thereof) may be executing on a user device of the primary user and on a user device of the secondary user, and respective instances of the payment service app may communicate with the payment service to provide functionality described herein. For the purpose of this discussion, operations attributed to the payment service can be performed by a payment service system comprising one or more computing devices and functional components of which are described below.

In some examples, the payment service may provide onboarding flows to onboard new users. "Onboarding," as described herein, can refer to generating new user accounts for enabling access to services (e.g., payment functionalities) availed by the payment service. In some examples, a user can initiate an onboarding flow via a user interface of the payment service app or a portion thereof, a web browser, or the like. In some examples, the payment service can make determinations with regard to types of users that are onboarding and can dynamically modify the onboarding flows based on such determinations. That is, based at least in part on a determination that the user is a primary user, the payment service can execute an onboarding flow for onboarding a primary user. Based at least in part on a determination that the user is a secondary user, the payment service can execute an onboarding flow for onboarding a secondary user. Onboarding flows for onboarding secondary users (e.g., "secondary onboarding flows") can be different than onboarding flows for onboarding primary users (e.g., "primary onboarding flows"). In some examples, onboarding flows for onboarding secondary users can be customized for secondary users, can require less or alternative data than onboarding flows for primary users, and can require authorization by a primary user. Accordingly, in response to a determination that a secondary user is onboarding via an onboarding flow, the onboarding flow may be dynamically modified (e.g., automatically, in real-time or n ear-real-time, etc.) to facilitate onboarding of a secondary user (instead of a primary user). Such dynamic and contextual modification of onboarding flows can improve use of computational resources by modifying steps to the onboarding flow based on the type of user (e.g., primary or secondary) that is onboarding. By making such dynamic adjustments in real-time or near-real-time, techniques described herein can reduce the use of computational resources and improve the relevance of onboarding flows to different user types.

In at least one example, the payment service can determine whether a user is a primary user or a secondary user using one or more requirement(s) or condition(s) for opening a primary account. In at least one example, the requirement(s) or condition(s) can relate to age, legal status, geographic location, or the like. In at least one example, to initiate an onboarding flow, a user can provide user data, such as birthdate, location, email address, phone number, social security number, and the like. In some examples, the payment service can determine, based on the user data, whether the user is a primary user or a secondary user. That is, in some examples, a primary user and a secondary user may initiate an onboarding flow via the same step(s) and, based on a determination, using user data provided, that a user does not satisfy one or more requirement(s) or condition(s) (e.g., age, legal status, geographic location, etc.), the payment service can modify the onboarding flow for onboarding the secondary user. Such a modification can occur automatically and in real-time or near-real-time and can result in customized onboarding flows as described above.

In some examples, the payment service can determine whether a user is a primary user or a secondary user based on additional or alternative types of data. For example, user data, social data, or contact data, which can be stored locally on or accessible via one or more integrations (e.g., via application programming interface(s) (API(s)) or software development kit(s) (SDK(s))) with the payment service, can be used to determine whether a user is a primary user or a secondary user. In some examples, the user data, social data, or contact data can be used to determine a characteristic indicative of whether a user is a primary user or a secondary user. That is, alternative data types or sources can be used to facilitate determinations of which onboarding flows to execute and when. As described above, in an example where a user is determined to be a secondary user, and not a primary user, techniques described herein can trigger an alternative onboarding flow, which can include a customized flow to capture relevant information corresponding to the secondary user and initiate an authorization process for obtaining authorization from a primary user. In some examples, such integrations can be used to enable the payment service to obtain "interaction data" indicative of interactions of users on third-party services, which can be used for monitoring satisfaction of conditions associated with goals, milestones, gifts, or the like.

In some examples, an onboarding flow for onboarding a secondary user can utilize alternative IDV techniques. That is, alternative IDV techniques can be triggered based on a determination that a user is a secondary user and not a primary user. In some examples, as IDV pertains to onboarding secondary users, a conventional IDV process may not be possible. As an example, when a user does not have ready access to identification material used in conventional IDV processes, such as a driver's license, passport, social security number, or tax identification number, conventional IDV processes may not be available for verifying the user's identity. Further, in some examples, users have "thin files" or insufficient data as is required for conventional IDV processes. In some situations, a user may also not be comfortable providing sensitive identification material.

In some examples, alternative IDV processes, as described herein, can analyze third-party data obtained via API or SDK integrations (e.g., with social medial information or the like) to determine whether a user is an actual person, verify their identity (i.e., confirm they are who they say they are), and/or verify that the user is not a fake account or bot. While an alternative IDV process may be used instead of a conventional IDV process, an alternative IDV process can also be used to supplement conventional IDV, such as if an account is flagged as potentially inauthentic using the conventional IDV process. Alternative IDV can use different signals than conventional IDV, including social signals, and may be more difficult to fake. As such, alternative IDV processes described herein can be useful for verifying the identity of users that could not otherwise be verified given the identification materials available to them and can provide more accuracy to existing IDV processes. Additional details associated with alternative IDV processes are provided below.

In some examples, techniques described above can be used for IDV. In some examples, such techniques can be referred to as "alternative" IDV processes in that they are different than conventional techniques (which often require submission of a government-issued identification such as a drivers license or passport). In at least one example, an alternative IDV process can be based on analysis of data supplied by multiple sources, such as from users of the payment service. As an example, an alternative IDV process can attempt to verify that a name provided by the user during an identity verification submission is linked to an identifier, such as a phone number, also provided during the identity verification submission. The alternative IDV process can further attempt to verify that the user has control of or access to that phone number. In at least one example of an alternative IDV process, identity verification components of a service provider, e.g., a payment service, can generate a measure of confidence that the name provided with the identity verification submission is properly associated with the phone number. Users of the service can provide to the service provider the set of contact records stored on their user devices. As an example, the service provider can enable users to share their contact records and/or the users can grant the service provider permission to access the contact records stored by their user device or otherwise associated with the users. For example, the service provider can provide services using the contact records, such as discovering which of a user's contacts use the service provider, and/or enable the user to communicate with users via the service provider, for instance, for making payments, sending invitations, sending referrals, splitting tickets, joining groups, or the like. During an alternative IDV process initiated at the request of the user, the identity verification components can identify contact records shared with the service provider and associated with phone number of the identity verification submission. The identity verification component can verify if the phone number is in fact associated with the name provided during the identity verification submission based on the names associated with the phone number in the individual contact records.

In some examples, verifying that the identifier, such as a phone number, is associated with the name provided with the identity verification submission can include comparing the name provided with the identity verification submission to the names associated with the individual contact records. As used herein, a "name option" is a possible value for the actual name or "true name" that should be associated with the phone number. As used herein, the "true name" is the name option that is determined to be the most likely name of the owner or primary user of the phone number. The set of name options includes each distinct value among the set of names associated with the phone number in the individual contact records and the identity verification submission.

In some examples, in an effort to identify the "true name" associated with a device identifier, such as a phone number, a name option similarity component can determine the most common name option in the set of name options for a given phone number. If the most common name option is not the same as, or otherwise does not correspond to, the name provided with the identity verification submission, then the identity verification component can reject the identity verification submission and use an additional IDV process. If the most common name option is the same as, or otherwise corresponds to, the name provided with the identity verification submission, then the identity verification submission can approve the identity verification submission and verify a user account based on the name and phone number provided in the identity verification submission. However, as described above, using the most common name (e.g., the mode) as the criteria for approving an identity verification submission has shortcomings. For example, identifying a most common name can require that the same name appear more than one time and can fail to consider similar, but different, names in such identifying. This can cause inaccuracies. Further, in another example, using the most common name to determine a true name can be subject to coordinated efforts to defeat or fool the identity verification component. As an example, a network of users could create multiple accounts and create fake contact records that include a fake name to associated with the phone number. With enough fake contact records make available to the service provider, the identity verification component could be fooled into identifying the fake name as the real name given that it is the most commonly used name (albeit fraudulently used). As such, the identity verification component can be fooled into approving a fraudulent identity verification submission.

In some examples, the name option similarity component can use additional measures to assess the name options and name provided with the identity verification submission. As an example, the identity verification component can calculate a confidence or measure of likelihood that a selected name option is the true name associated with the identifier, such as a phone number. Rather than rely on perfect or identical matches, the name option similarity component can use partial matches, or measures of similarity that accounts for granularity or degrees of similarity. The degrees of similarity can be based on phonetic similarity. For example, the name option "Chris Jonson" is not a perfect match for the name "Kris Johnson." However, the name "Kris Johnson" is recognizable from the name option "Chris Jonson" as being very similar phonetically. In some examples, the degrees of similarity can be based on spelling similarity. For example, the name option "Kris Johnso" is recognizable as being very similar to the name "Kris Johnson," just with a typographical error in the partial name "Johnso." The name option similarity component can use various mechanisms, described herein, to evaluate name options using these, and other similarity metrics, to determine the "true name," for example, associated with a phone number. Using these granular measurements of similarity, the name option similarity component can further determine the similarity of each name option of the set of name options to each other. The identity verification component can be configured to select as the "true name" the name option that is most similar to each of the other name options. For example, given the set of name options "Sherry," "Shari," "Cherie," "Sherrie," and "Stephanie," the name option similarity component can compare each of the set of name options to each other and given them a similarity score. The similarity score may be a measure of similarity of individual name options to other name options. The similarity score can be based on a weighted combination of a variety of similarity metrics, including spelling and/or phonetic similarity. The identity verification component can use the similarity score (and other factors to be discussed herein) to select the name "Shery" as most similar to the other names for use in identity verification as part of the alternative IDV process.

Utilizing partial or granular similarity metrics allows the alternative IDV process to use a crowdsourced IDV process that does not require identical names and is resistant to fraudulent or malicious actors. That is, unlike techniques that utilize a most common name (e.g., mode), techniques described herein alleviate the need for identical names and reduce or eliminate fraud induced by fraudulent or malicious actors. For example, several legitimate contact records can be provided that are slightly different from the name provided with the identity verification submission or the true name and the identity verification submission can still be processed and approved. Further, techniques described herein make it very difficult for a user to fake an identity (e.g., a name) across a wide network of different contacts associated with a service provider (e.g., a payment service). The alternative IDV process can further be used as an IDV process to enable users with thin files or insufficient data (e.g., relative to what is required in conventional techniques) to be verified. Moreover, the alternative IDV can require less data than conventional IDV techniques, for example by alleviating the need for users to provide government-issued identifiers, multiple documents, or the like. As a result, the alternative IDV process described herein can provide improvements over conventional techniques. Further, in at least one example, the payment service can dynamically determine which IDV process to recommend to a particular user. For instance, the payment service can recommend more stringent, time-consuming, or computationally expensive IDV processes higher risk users or users that are suspected of being fraudulent while recommending less stringent, time-consuming, or computationally expensive IDV processes (e.g., the alternative IDV processes described herein) to lower risk users or users that are not suspected of being fraudulent. Such risk or suspicion of fraud can be based on one or more models that output predictive metrics based on inputs associated with individual users. This dynamic determination of IDV processes can enable intelligent allocation of computing resources such that computing resources can be reallocated when performing IDV for lower risk users.

In some examples, the name option similarity component can use a first machine-trained model, algorithm, or other machine-learning mechanism ("machine-trained model") to generate the similarity metric. The first machine-trained model can receive, as input, various name options associated with the identifier as determined from a look up of the individual contact records. The input can be preprocessed, for example, by removing common words, phrases, or nicknames that can be expected to be used in a contact record but are not likely to be a contact's actual name (e.g., "Mom," "Boss," "Husband"). The first machine-trained model can be trained on a corpus of similar name options, common names in one or more languages used where the service provider will offer services, rules of grammar of one or more languages used where the service provider will offer services, and other like information. The training and processing performed by the first machine-trained model can be adjusted using one or more hyperparameters. The hyperparameters can include, for example, tuned weightings that prefer one or more types of similarity over others, measures to account for noise in the name options by emphasizing or diminishing the measured effect of noise, and the like. The output of the first machine-trained model can be a similarity score for each of the name options—that is, for a name option, the first machine-trained model can output a measure of similarity indicating the similarity of the name option to each of the other name options.

In some examples, verifying that the identifier is associated with the name provided with the identity verification submission can include assessing other signals associated with the individual contact records. As an example, a contact record processing component can be responsible for storing contact records in an accessible database. Individual contact records can include a variety of information, including, but not limited to, names, phone numbers, email addresses, social media handles, personal websites, affiliated businesses, date added, conversation history and frequency, birthdays or other significant dates, and the like. The contact record processing component can further store metadata associated with the individual contact records. The identity verification component can use the metadata in conjunction with the similarity score produced by the name option similarity component when determining the true name associated with the identifier included with the identity verification submission. As an example, the metadata can include the age of an individual contact record or the length of time that the individual contact record has been stored by the user device or by the service provider, a number of times that an individual contact record has been modified by the user, the number of contact records uploaded in conjunction with the individual contact record, the number of times that the user who uploaded the contact record is found in contact records uploaded by other users, the age of the user account associated with the user device that uploaded the contact record, and the like. The identity verification component can use the contact record data and contact record metadata to determine one or more trustworthiness metrics associated with individual contact records. The trustworthiness metrics can reference, incorporate, or correlate to information such as whether the user account that uploaded an individual contact record has been associated with fraudulent activity, whether the user account that uploaded an individual contact record has previously provided a name option selected as a true name or most likely name during an alternative IDV, evidence that the contact record is or is not associated with a bot account, the history of the user account that uploaded an individual contact record with the service provider, and the like. All of this other information can be used as signals that are weighted and considered by the identity verification component when determining the true name associated with a supplied identifier. By considering a variety of additional signals associated with individual contact records, the alternative IDV process is made more robust and trustworthy, which reduces the amount of manual intervention that may be required to ensure that the alternative IDV process is working as intended. Additionally, the more robust alternative IDV process can improve the operation of the identity verification component by improving the rate at which user account identity verification submissions are approved (and the accuracy of those approvals) which reduces the number of times that an additional IDV process is requested to further verify an identity of a user.

In some examples, the other signals associated with individual contact records are assessed by a second machine-trained model that is trained to interpret the similarity score associated with individual name options and other signals and produce a final prediction of the true name associated with the identifier in the identity verification submission. The input of the second machine-trained model can include some or all of the signals associated with contact records that have been described previously. When processing an identity verification submission, the individual contact records and respective contact record metadata associated with the identifier of the identity verification submission can be retrieved and provided to the second machine-trained model. The second machine-trained model can be trained based on a history of true name options, the set of other name options used to derive the true name options, and the associated data and metadata. The output of the second machine-trained model can include an overall score, degree of confidence, or likelihood that an individual name option is the true name option associated with the identifier. The output of the second machine-trained model can further include a particular name option with the highest score, confidence or likelihood that can be provided as the predicted true name. These outputs can be used for verifying the identities of users.

In some examples, prior to sending an authorization request to a primary user identified by a secondary user, the payment service can determine whether the primary user identified by the secondary user is a suitable or proper primary user to be associated with a requested secondary account. There may be issues when an unsuitable or improper user attempts to act as a primary user of a primary account to be associated with a secondary account. As an example, there may be situations where an 18-year-old attempts to approve of secondary accounts for their 16-year-old friends without parental or guardian approval. This may undermine the assurances that a primary account will ultimately be financially responsible for a secondary account. To ensure the primary user identified is suitable or proper, the payment service may use contacts of a user, one or more existing relationships (e.g., retrieved from a third-party service), geolocation, combinations of the foregoing, or the like to make the determination on whether the primary user is a suitable or proper primary user to authorize a secondary account for a secondary user. For instance, the payment service can use contact data, social networking data, transaction data, interaction data, third-party data, or the like to determine an existing relationship between the primary user identified by the secondary user for authorization and the secondary user of the requested secondary account. By leveraging integrations of contact data, social networking data, transaction data, interaction data, third-party data, or the like, techniques described herein can enable more secure and authentic account creation processes. That is, the determination of whether the secondary user and the primary user are related, or otherwise have an existing relationship, helps prevent improper association of primary accounts to secondary accounts. For instance, by determining there is a proper relation between the secondary user and the primary user, the payment can verify that a primary user is the appropriate user to hold liable to cover any debts associated with the secondary account.

In some examples, a primary user can pre-authorize a secondary account for a secondary user and configure permissions, conditions, controls, or the like associated therewith such that when the secondary user completes the onboarding flow, the secondary user has instant access to the payment service without needing to request authorization or otherwise await configuration of permissions, conditions, or controls. For example, by enabling primary users to pre-authorize secondary users or configure permissions, conditions, or controls associated therewith, techniques described herein can reduce the number of requests or other data transmissions exchanged via instances of the payment service app and the payment service create and configure accounts. As such, techniques described herein offer improvements over one-size-fits-all conventional techniques.

As described above, once a secondary user is onboarded, for example, once a secondary account has been created and authorized by a primary user, techniques described herein enable a secondary user to operate a secondary account such that they are permitted to access services (e.g., payment functionalities) of the payment service. Such services can include, by way of non-limiting example, peer-to-peer payments, point-of-sale transactions, banking, buying, selling, or transferring of assets (e.g., stocks, cryptocurrency, nonfungible tokens, etc.), or the like. As such, a secondary user can be empowered to transact with other users or entities using such services. Additionally, techniques described herein enable primary users to establish permissions, conditions, controls, or the like to mitigate risk or otherwise regulate interactions of secondary users using secondary accounts. In particular embodiments, the payment service may provide a primary user with the ability to enable or disable specific functionalities of a secondary account. In some examples, such disabling or enabling can be implemented in real-time or near-real-time. In some examples, such disabling or enabling can be performed automatically by the payment service based at least in part on monitoring transaction activity of secondary accounts. Such permissions, conditions, controls, or the like can be stored as rules that can be used for monitoring transactions and approving or denying transactions in real-time or near-real-time without input from the primary user (except when an override or approval is requested).

In some examples, the primary user can pre-authorize each payment, transfer, purchase, or sale, involving the secondary account. In some examples, the primary user can pre-authorize some payments, transfers, purchases, or sales and indicate that some payments, transfers, purchases or sales are prohibited or require approval from the primary user. In some examples, primary user approval can be required for a first payment, transfer, purchase, or sale of a particular type and after initial approval is provided, subsequent payments, transfers, purchases, or sales of the same type can be "pre-authorized" such that they may not require subsequent approval. In some examples, indications of such pre-authorization(s) can be stored as rule(s), which can be enforced in real-time or near-real-time without input from the primary users, as described below.

In some examples, primary users can configure one or more conditions or enable (or restrict) certain types of transactions for secondary accounts. That is, in some examples, secondary accounts can be associated with spending conditions, or conditions that can be used to control or otherwise regulate spending of the secondary users. Examples of conditions include, but are not limited to, a transaction amount, a transaction type (e.g., peer-to-peer, purchasing stock or cryptocurrency, point-of-sale, etc.), item(s) associated with the transaction, a geolocation, a time, a particular merchant, a merchant category code, a particular recipient, combinations of the foregoing, or the like. As such, indications of such condition(s) can be stored as rule(s), which can be enforced on transactions without input from primary users, as described below.

In some examples, pre-authorization of particular payments, transfers, purchases, or sales can be tied to condition(s) such that payments, transfers, purchases, or sales satisfying particular condition(s) can be pre-authorized so that the payment service can facilitate the transactions without requesting approval from primary users. However, in some examples, when particular payments, transfers, purchases, or sales do not satisfy a condition such that the payments, transfers, purchases, or sales are not pre-authorized, the payment service can refuse the transactions or request approval from primary users before facilitating the transactions.

In some examples, the payment service can enable the primary user or the secondary user to set up one or more purpose-based accounts or account balances within the primary account or secondary account. In some examples, some such purpose-based accounts or account balances can be automatically created based on predefined events, e.g., birthdays, graduations, etc. on behalf of or by contacts of—or users having an existing relationship with—the secondary user. In some examples, individual of the accounts can be associated with specified conditions on use of the funds associated with the accounts, such as to restrict funds associated with such accounts for purchases with particular merchants, associated with specified merchant category codes, during specified time periods, at specified locations, or of specified types. Determining whether conditions have been satisfied such to enable access to restricted funds may be accomplished by way of any suitable method, such as, for example, location detection (e.g., by GPS-, Wi-Fi hotspot-, IP address-, or Bluetooth beacon-based geolocation), social media signals (e.g., detecting a concurrent or recent social media post tagged with a location or with specific people), app-based check-in (e.g., a check-in at a gym, at a hospital, or at an airport). As such, real-time or near-real-time monitoring of transactions and other data can be used by the payment service to authorize or deny transactions and determine which account or account balance from which funds should be withdrawn.

In at least one example, techniques described herein relate to a credit building functionality. In conventional approaches to building credit, a user establishes credit via various entities reporting credit activities to a credit reporting agency. In many cases, lenders may be unwilling or legally unable to open these accounts in the name of the minor (or non-US resident) alone. This creates a problem where an individual cannot open an account for building credit as they do not have an existing record, and cannot create a record because they do not have an existing account. To address this problem, a payment service, as described herein, can enable generation of an account and can provide security of the account (by making a primary account ultimately responsible for a secondary account), but also can provide the accounting and recording of transactions back to the secondary account which is essential to building a credit record. In some examples, the payment service can provide a mechanism through which a secondary user can build credit with the payment service or one or more credit tracking services using the secondary account. This approach enables a traditionally underbanked individual to build credit even without access to traditional credit cards or credit products. In some examples, the payment service can monitor or otherwise track transactions of the secondary user using the secondary account. The payment service can determine, using one or more machine-trained models or the like, which transactions or interactions are indicative of creditworthiness (i.e., "good" credit behavior indicative of ability and willingness for timely repayment). In some examples, transactions that are indicative of creditworthiness can be reported to credit reporting services. Alternatively, underwriting models associated with the payment service can attribute credit to the primary user until the secondary user "graduates," or otherwise transitions, to a primary account, after which the creditworthiness corresponding to the transactions associated with the secondary user are "transitioned" to the secondary user.

In particular embodiments, the payment service may provide the ability to convert a secondary account to a primary account upon satisfaction of specified requirement(s). As an example, the payment service can automatically convert a secondary account to a standalone primary account and disassociate the secondary account from an associated primary account when requirements or conditions for having a primary account are satisfied. Requirements or conditions can include, but are not limited to, age (e.g., a minor turning 18 years old), behavior (e.g., when a secondary user has demonstrated a sustained pattern of creditworthy behavior), legal status (e.g., once a legal status of the secondary user has changed), or the like. In some examples, the primary user of the primary account that the secondary account is associated with can request the secondary account to be converted to a standalone primary account. In some examples, upon satisfaction of the requirements or conditions, a secondary account can be automatically converted to a standalone primary account. After conversion of a secondary account to a primary account, any ability of the primary user to restrict, monitor, or moderate actions taken by the secondary user with respect to the converted account may be rescinded, and the primary user may be provided with the option to discontinue any automated funding mechanisms, reassign custody of any related accounts to the secondary user, or take any other measures to detach the primary user from the converted account. Further, upon such a conversion, the newly converted primary account can have the same set of functionalities as the original primary account. Such conversion of secondary accounts to primary accounts can offer improvements in that new primary accounts for users already using the payment service may not need to be created and historical data in inactive secondary accounts need not be stored.

Despite the trend towards a cashless economy, certain individuals, such as minors, financially disenfranchised, or differently abled persons, are unable to avail of an infrastructure that meets their needs. In some systems, parents or guardians open joint or custodial accounts, wherein a custodial account is usable by a minor but managed by the guardian until the minor is legally permitted to own their own account. Similarly, a person's accounts may be placed under guardianship or receivership due to illness or legal orders. As described above, with the increased use of cashless payments, minors and other individuals who are not able to legally own and take responsibility for their own financial accounts (e.g., with financial institutions or credit cards) are left without options for participating in payment services. For example, some individuals predominantly transact in cash earned from informal work or received in the form of monthly allowance, lunch money, money for chores, and gifts from relatives. Unlike adults who have access to card- and bank-based payment methods, many others have a need for alternative payment methods in lieu of using physical cash. As such, minors and other users can be "underbanked" in that they have less access to banking services than other users such as adults. To enable traditionally underbanked users to access banking services or other payment services, and in a way that limits liabilities and manages risks for users (of primary accounts and secondary accounts), techniques described herein relate to verification and approval controls for creating or managing secondary accounts, as well as facilitating banking, payment, or other services, via a payment service app provided by and in communication with a payment service. That is, as described above, techniques described herein enable underbanked individuals' access to financial services. Such techniques leverage dynamic onboarding flows, alternative identity verification processes, and alternative account monitoring or authorization processes. Additional or alternative improvements to existing or conventional technology are described below.

While techniques described herein relate to primary and secondary accounts of a payment service, such techniques can be similarly appliable to any user accounts and any service, such as a social networking service, a music streaming service, a cryptocurrency service, a non-fungible token service, or the like. Similarly, while techniques described herein relate to enabling, disabling, or otherwise controlling "payment functionalities," such techniques can be similarly applicable to any functionalities including social networking functionalities, music streaming functionalities, cryptocurrency functionalities, non-fungible token functionalities, or the like. That is, techniques described herein are not limited to "payment" service and functionalities.

FIG. 1A is an example environment 100a for providing electronic communications-based verification and approval tools as discussed herein. The example environment 100a can include a payment service system 106, which can include server(s) 104 and a datastore 128 that are configured to exchange electronic communications through network(s) 108 with one or more other computing devices. For example, the server(s) 104 or datastore 128 may exchange electronic communications with at least one of a user device 112(A) associated with primary user 114(A) by way of a payment service app 110(A) executing on user device 112 (A) or a user device 112(B) associated with secondary user 114(B) by way of a payment service app 110(B) executing on user device 112(B). The payment service app 110(A) and 110(B) (shown as PS App 110(A) and PS App 110(B)) can each be respective instances of the payment service app provided by a payment service. The payment service can be associated with the payment service system 106 such that operations described as being performed by the payment service can be performed by the payment service system 106.

As described above, the primary user 114(A), associated with a primary account 132(A), can authorize a secondary account 132(B) for a secondary user 114(B) such that the secondary user 114(B) can utilize services of the payment service. The primary user 114(A) may be the legal owner of the secondary account 132(B), and the secondary account 132(B) may be a sub-account of the primary account 132 (A), or the secondary account 132(B) may be a separate account that is mapped to or otherwise associated with the primary account 132(A). The secondary account 132(B) therefore allows the secondary user 114(B) to access and utilize the services of the payment service with the availability of oversight and accountability of the primary user 114(A). In some examples, such oversight and accountability can be provided by the payment service for the benefit of the primary user 114(A).

Account group 116 represents a group of two or more users that are associated with a same user profile or group identifier such to establish an association or relationship between the users. In FIG. 1A, the account group 116 includes the primary user 114(A) and the secondary user 114(B). In at least one example, the secondary user 114(B) may be related to, or have a relationship with, the primary user 114(A). For instance, the primary user 114(A) may be a parent or guardian of the secondary user 114(B). In some examples, an account group can have any number of primary users and secondary users. That is, while shown in a one-to-one representation, in additional or alternative examples, an account group can have a primary user associated with multiple secondary users, a secondary user associated with multiple primary users, or multiple primary users associated with multiple secondary users. In some examples, users associated with an account group, such as account group 116, can participate in "family services" offered by the payment service such that services or functionalities described above can be applied in a family setting to enable individual family members to contribute to family goals, such as savings, asset procurement, or the like. In some examples, within an account group, each primary user may have varying levels of functionality to support, enable, restrict, monitor, or moderate actions taken by individual secondary users associated with the account group. In some examples, the account group may also establish a collective fund (e.g., a vacation "piggybank" or communal "rainy day fund") to which all users (both primary and secondary) can contribute or for which automated contributions are set up from all users' accounts.

The server(s) 104 may store one or more functional components that enable the payment service to perform operations as described herein. For example, the server(s) 104 can store an onboarding component 117, an account configuration component 119, and a payment services component 121. Further, the payment service system 106 can access a datastore 128. In at least one example, and as illustrated, the datastore 128 can store one or more user accounts, such as a primary account 132(A), associated with the primary user 114(A), and a secondary account 132(B), associated with the secondary user 114(B). The datastore 128 can store additional or alternative data, as described below. The server(s) 104 can store additional or alternative functional components. Additional details associated with the server(s) 104 and associated functional components are described below.

The onboarding component 117 can facilitate onboarding flows as described herein. "Onboarding," as described herein, can refer to generating new user accounts for enabling access to services (e.g., payment functionalities) availed by the payment service. In some examples, a user can initiate an onboarding flow via a user interface of the payment service app or a portion thereof, a web browser, or the like. In some examples, the onboarding component 117 can make determinations with regard to types of users that are onboarding and can dynamically modify the onboarding flows based on such determinations. That is, based at least in part on a determination that the user is a primary user, the onboarding component 117 can execute an onboarding flow for onboarding a primary user. Based at least in part on a determination that the user is a secondary user, the onboarding component 117 can execute an onboarding flow for onboarding a secondary user. In some examples, a "determination" that a user is a particular user type (e.g., primary or secondary) can be based at least in part on a prediction with a probability or certainty that satisfies a threshold.

An onboarding component 117 can be further configured to manage the onboarding flow for primary users and secondary users alike. The onboarding component 117 can be configured to handle the dynamic modification of the onboarding flow to include additional or alternative steps based on user data. Onboarding flows for onboarding secondary users can be different than onboarding flows for onboarding primary users. In some examples, onboarding flows for onboarding secondary users can be customized for secondary users, can require less or alternative data than onboarding flows for primary users, and can require authorization by a primary user. Accordingly, in response to a determination that a secondary user is onboarding via an onboarding flow, the onboarding flow may be dynamically modified (e.g., automatically, in real-time or near-real-time, etc.) to facilitate onboarding of a secondary user. Such dynamic modification of onboarding flows can improve use of computational resources by adding or removing steps to the onboarding flow based on the type of user (e.g., primary or secondary) that is onboarding. By making such dynamic adjustments in real-time or near-real-time, techniques described herein can reduce the use of computational resources.

In at least one example, the onboarding component 117 can determine whether a user is a primary user or a secondary user using one or more requirement(s) or condition(s) for opening a primary account. In at least, the requirement(s) or condition(s) can relate to age, legal status, geographic location, or the like. In at least one example, to initiate an onboarding flow, a user can provide user data, such as birthdate, location, email address, phone number, social security number, and the like. In some examples, the onboarding component 117 can determine, based on the user data, whether the user is a primary user or a secondary user. That is, in some examples, a primary user and a secondary user may initiate an onboarding flow via the same step(s) and, based on a determination that a user does not satisfy one or more requirement(s) or condition(s) (e.g., age, legal status, geographic location, etc.), the onboarding component 117 can modify the onboarding flow for onboarding the secondary user. Such a modification can occur automatically and in real-time or near-real-time and can result in customized onboarding flows as described above.

In some examples, the onboarding component 117 can determine whether a user is a primary user or a secondary user based on additional or alternative types of data. For example, user data, social data, or contact data, which can be stored locally on or accessible via one or more integrations (e.g., API(s), SDK(s), etc.) with the payment service, can be used to determine whether a user is a primary user or a secondary user. In some examples, the user data, social data, or contact data can be used to determine a characteristic that is indicative of whether a user is a primary user or a secondary user. In some examples, the characteristic can comprise an indication of an association with a government or trusted agency (e.g., a university, a school, etc.). Such an indication can be based on an email address being associated with a top-level domain. An indication of an association with a government or trusted agency can be used to determine that a user is likely a secondary user instead of a primary user. In some examples, such a characteristic can be determined based on contacts or "social graphs." Social graphs, in one example, can indicate relationships between a user and other users having the same or similar characteristics. A social graph can thus represent network(s) of people or groups with whom an individual is connected comprising connections or edges, representing relationships such as work, friendship, interests, locations, behavioral data, or the like. Social graphs can represent relationships derived as a result of semantic relationships, transactional relationships, or the like. Edges of a social graph represent user connections and strength of unique connections. For example, if a user is associated with more than a threshold number of other users (as indicated from contacts or social graphs) that attend a particular high school or are on a particular youth sports team, the onboarding component 117 can determine that a user is a secondary user instead of a primary user. As another example, otherwise disconnected users may be connected for having "liked," subscribed, "upvoted/downvoted," ranked, or otherwise interacted with the same content, such as a post or music. As described above, in an example where a user is determined to be a secondary user, and not a primary user, techniques described herein can trigger an alternative onboarding flow, which can include a customized flow to capture relevant information corresponding to the secondary user and initiate an authorization process for obtaining authorization from a primary user.

In some examples, at least one of the payment service app 110(A) or 110(B), in communication with the payment service system 106, may provide an onboarding flow to create a secondary account for the secondary user 114(B). As described above, in some examples, in response to a determination that a secondary user is onboarding via an onboarding flow, the onboarding flow may be dynamically modified (e.g., automatically, in real-time or near-real-time, etc.) to include additional or alternative steps than those included in an onboarding flow for a primary user. That is, in some examples, a primary user and a secondary user may initiate an onboarding flow via the same step(s) and, based on a determination that a user does not satisfy one or more requirements (e.g., age, legal status, geographic location, etc.), the onboarding component 117 can modify the onboarding flow to include additional or alternative steps for onboarding the secondary user. In at least one example, the onboarding flow may be dynamically modified based on user data of a user. The dynamic modification may therefore provide a unified onboarding experience for all users and streamline the user interface for the users. Using the techniques described herein, users do not need to know in advance what type of account they are eligible to sign up for, but rather the onboarding component 117 can identify and execute the modifications to the onboarding flow based on user data of the onboarding user. The dynamic modifications may improve use of computational resources by modifying steps to the onboarding flow based on the type of user (e.g., primary or secondary) that is onboarding. As such, steps can be presented to a user that are relevant to the user and steps that are not relevant to a user may be omitted from presentation. By making such dynamic adjustments in real-time or near-real-time, techniques described herein can reduce the use of computational resources.

As described above, the onboarding flow can be triggered by the primary user 114(A) or the secondary user 114(B). That is, either a primary user or a secondary user can initiate the process of creating a secondary account. When the primary user 114(A) initiates the request to create the secondary account, the secondary user 114(B) may receive an electronic invitation (e.g., short message service or "SMS" text message, email, or push notification to an instance of the payment service app executing on their user device) to create the secondary account by providing information for association with the secondary account. In some examples, the primary user 114(A) can pre-authorize the secondary account and configure permissions, conditions, or controls such that when the secondary user 114(B) completes the onboarding flow, the secondary user 114(B) has instant access to the payment service without needing to request authorization or otherwise await configuration of permissions, conditions, or controls. For example, by enabling the primary user 114(A) to pre-authorize the secondary user 114(B) or designate permissions, conditions, or controls associated therewith, techniques described herein can reduce the number of requests or other data transmissions exchanged via instances of the payment service app 110(A) and 110(B) and the payment service system 106 to create and configure accounts.

When the secondary user 114(B) initiates the request to create the secondary account, the secondary user 114(B) may first initialize an onboarding flow for creating a new primary account. However, based at least in part on a determination, for example using user data, social data, or other information provided by the payment service through the onboarding flow, that the secondary user 114(B) is not authorized for a primary account, the onboarding component 117 can initialize an alternative onboarding flow to create a secondary account, as described above. For example, as described above, the alternative onboarding flow can involve additional or alternative steps. Further, in some examples, the alternative onboarding flow can request less user data than the primary onboarding flow for creating the new primary accounts. That is, based at least in part on a determination that the user requesting to open a new account is a secondary user and not a primary user, the onboarding component 117 can request less information than what is requested for onboarding primary users and creating primary accounts. As an example, the secondary user 114(B) may not be prompted to provide a social security number or other legal identifier as the secondary user is not legally responsible for the secondary account (i.e., the primary user is). Further, the secondary user 114(B) may be prompted to provide additional or alternative data, such as data used for alternative IDV processes, verifying a relationship between an identified primary user, and facilitating authorization or approval from the identified primary user. As such, by determining data requests based on user type, techniques described herein offer computational resources reducing the amount of data received and thus stored from some user types.

Additional details associated with dynamically determining which onboarding flow to execute for a particular user are described below with reference to FIGS. 2A-2C.

In some examples, the onboarding component 117 can implement an onboarding flow for onboarding secondary users that can utilize alternative IDV techniques. That is, alternative IDV techniques can be triggered based on a determination that a user is a secondary user and not a primary user and/or that a user is associated with risk and/or fraud metrics that satisfy a threshold. In some examples, as IDV pertains to onboarding secondary users, a conventional IDV process may not be possible. As an example, when a user does not have ready access to identification material used in conventional IDV processes, such as a driver's license, passport, social security number, or tax identification number, conventional IDV processes may not be available for verifying the user's identity. In some situations, a user may also not be comfortable providing sensitive identification material to the payment service. While an alternative IDV process may be used instead of a conventional IDV process, an alternative IDV process can also be used to supplement conventional IDV, such as if an account is flagged as potentially inauthentic using the conventional IDV process. Alternative IDV can use different signals (including social signals) and may be more difficult to fake. In some examples, alternative IDV processes can be used to dynamically allocate (or reallocate) computing resources. For example, the dynamic determination of IDV processes can enable intelligent allocation of computing resources such that computing resources can be reallocated when performing IDV for lower risk users. Instead of using the computing resources to perform a more extensive IDV process that requires more computing resources, the identification and performing IDV for a lower risk user can reduce the computing resources used.

An alternative IDV process, implemented by the onboarding component 117, can verify that a user is who they claim to be to prevent intentional or accidental misidentification of users (e.g., a user fraudulently stealing another user's identity) using various sources of data. In some examples, user data provided via onboarding can be used to generate a "user-designated identity." IDV techniques described herein can access records or other data associated with the user seeking to be verified to determine whether such records or other data indicate that the user is who they say they are. That is, the records or other data can be used to verify the user-designated identity. For example, the alternative IDV process can perform, with consent of the secondary user 114(B), analysis of user device contact records, social media information, related bank payment instruments, account records provided by phone number providers, and authenticated or trustworthy accounts (e.g., email addresses associated with a known domain name or top-level domain such as ".edu" or ".gov") to verify the user-designated identity associated with user data provided by the user.

As an example, the alternative IDV process can analyze the contact records of user devices (e.g., 112(A) and 112(B)) and compare the contact records with users that have already been verified to determine a likelihood that a user is an actual person or is the person they claim to be. As an example, when the secondary user 114(B) initiates a request, the alternative IDV process can analyze the contact records of the secondary user 114(B) and one or more other users 114 to determine whether the secondary user 114(B) is an actual person or the person they claim to be. As an example, if the secondary user 114(B) is claiming to be John Smith with a particular identifier, such as a phone number, and is seeking to associate with a primary user 114(A) Jane Smith, the alternative IDV process can analyze contact records of the secondary user 114(B) and the primary user 114(A) and other users 114 to determine whether the secondary user 114(B) is an actual person or is the person they claim to be. The alternative IDV process can analyze contact records of other users to determine whether the particular phone number specified by the secondary user 114(B) is associated with the name John Smith. As an example, if the primary user 114(A), along with other users 114, have the contact information of a John Smith saved with the particular phone number, then it is likely the secondary user 114(B) is who they are claiming to be. However, the primary user 114(A) and other users 114 have the contact information or the particular phone number saved with a name that is inconsistent with John Smith, then the secondary user 114(B) may not be who they claim to be. Additional details associated with using contact information for IDV purposes is described below with reference to FIGS. 21-24.

In some examples, if the secondary user 114(B) initiates a transaction, or other interaction with the primary user 114(A) (e.g., a request for authorization of a secondary account or approval of a transaction), the onboarding component 117 can access contact records with the primary user 114(A) and the secondary user 114(B) to determine if a contact record associated with the primary user 114(A) is among the contact records of the secondary user 114(B). Additionally, the alternative IDV process can analyze the contact records associated with the primary user 114(A) to determine whether a contact record contains information corresponding to identification information provided by the secondary user 114(B). In one example, a secondary user 114(B) has provided a phone number and email address and the name "Beth." The secondary user 114(B) has initiated a request with a primary user 114(A). The alternative IDV process can determine if a contact record corresponding to the provided phone number or email address is located in the primary user's 114(A) contact records. If so, the alternative IDV process can further determine if the name of the contact record corresponding to the provided phone number or email address is associated with the name "Beth." If not, this can be an indicator that the secondary user 114(B) may not be who they have claimed to be. The alternative IDV process may flag the secondary user 114(B) as being an inauthentic account or request additional information to confirm the authenticity or identity of the secondary user 114(B).

As another example, an alternative IDV process, implemented by the onboarding component 117, can verify the identity the secondary user 114(B) if the secondary user 114(B) has multiple payment instruments with the user's name. A user having multiple payment instruments with the same name, especially if they are with multiple different entities, can serve as an indicator that they have verified a consistent identity to independent third-parties with a strong interest in verifying identity. By having the secondary user 114(B) provide the multiple payment instruments for IDV, the alternative IDV process can verify this consistent identity across multiple independent third-parties.

As yet another example, the alternative IDV process, implemented by the onboarding component 117, can analyze third-party data obtained by API or SDK integrations (e.g., social media information associated with a social media service) to determine whether the secondary user 114(B) is an actual person and not a fake account or a bot. Further, such third-party data can be used to determine that the secondary user 114(B) is who they claim to be. For instance, the secondary user 114(B) may sign into a social media account and link the social media account to their user account associated with the payment service or enable the onboarding component 117 access to the social media account to verify the secondary user 114(B) is an actual person. By analyzing the secondary user's 114(B) post history and friends (e.g., "social signals"), the alternative IDV process may determine whether the secondary user 114(B) is an actual person or map that the user has the same or substantially similar connections on the social media account as the payment service. Furthermore, if the secondary user's 114(B) social media account has been verified as associated with an identity, the onboarding component 117 can compare that verified identity to the identity provided by the secondary user 114(B) to the payment service when attempting to establish an account. In another example, the secondary user 114(B) may be friends on the social media service with users of the payment service who have already been verified. If the secondary user 114(B) has a threshold level of activity with verified users who have associated the identity provided by the secondary user 114(B) with the social media account, the alternative IDV process may verify the secondary user 114(B) is an actual person and who they claim to be. Further, if the secondary user 114(B) is in a threshold number of photos posted to a social media service with verified users of the payment service, then the alternative IDV process may verify the secondary user 114(B) is an actual person. As another example, social media account information can be used to verify particular social signals such as which school(s) the secondary user 114(B) attends or has attended, which activities the secondary user 114(B) indicates are of interest, schools, activities, or other characteristics of other users within the secondary user's 114(B) social network (e.g., connections within the social network), or the like. In some examples, images, social media posts, or other interactions on the social media platforms can be analyzed, parsed, or the like to verify information associated with the secondary user 114(B) (e.g., such as relationships between users, locations or topics associated with such content, etc.). By using the secondary user's 114(B) social media account, the alternative IDV process can verify the secondary user 114(B) is who they are claiming to be using the information and data from the secondary user's 114(B) social media account.

In at least one example, an onboarding flow for onboarding a secondary user can require authorization from a primary user. In at least one example, the secondary user 114(B) can provide an identifier of the primary user 114(A) from whom the payment service is to request authorization. In at least one example, using the identifier, the onboarding component 117 can access a user account of the primary user 114(A) in the datastore 128. The onboarding component 117 can query the datastore 128 using the identifier provided by the secondary user 114(B) and retrieve contact information or communication preferences for the primary user 114(A). The onboarding component 117 can send a request for authorization of the secondary account to the primary user 114(A). If the primary user 114(A) does not have an account with the onboarding component 117 (e.g., the identifier provided by the secondary user 114(B) is not associated with an existing primary account in the datastore 128), the onboarding component 117 can initiate another onboarding flow to onboard the primary user 114(A) to the onboarding component 117 by creating a primary account for the primary user 114(A). After the primary account 132(A) is created, the primary user 114(A) can be prompted to approve the request from the secondary user 114(B). Once the onboarding component 117 receives authorization from the primary user 114(A), the onboarding component 117 may create the secondary account 132(B) for the secondary user 114(B). The secondary account can be mapped to, or otherwise associated with, the primary account. As such, the primary account can be legally responsible for the secondary account and can have access control permissions for controlling access of the secondary account to payment functionality of the onboarding component 117.

As described above, in at least one example, to create a secondary account, the secondary user 114(B) may participate in an onboarding flow that can require approval or authorization from the primary user 114(A) to create the secondary account 132(B) for the secondary user 114(B). As described above, in some examples, the secondary user 114(B) can initiate an onboarding flow for creating a new account and the onboarding component 117 can determine that that secondary user 114(B) does not meet one or more requirements to create a primary account. As such, the onboarding component 117 can dynamically modify the onboarding process to facilitate generation of a secondary account (instead of a primary account). As described above, a secondary account, as described herein, can require approval or authorization from a primary account. The user interfaces 113(A), 113(B), 115(A), 115(B) are non-limiting examples of an instance of user interfaces that can be presented by respective instances of the payment service app 110(A) and 110(B) to facilitate the onboarding process, as described herein. Additional or alternative user interfaces can be presented to facilitate the onboarding process, as described below.

As illustrated, the secondary user 114(B) can request authorization for generation of the secondary account 132 (B) from the primary user 114(A), as shown by the user interfaces 113(A), 115(A). A secondary user 114(B) may use the payment service app 110(B) executing on the user device 112(B) to request approval for a secondary account as shown by the user interface 115(A). After the payment service system 106 receives a confirmation of an approval within a user interface 113(A) of the payment service app 110(A) executing on the user device 112(A), the user device 112(A) may display user interface 113(B) showing the primary user 114(A) approved the request to create the secondary account, thereby authorizing the generation of the primary account. The secondary user 114(B) may also be notified after the primary user 114(A) approves the request as shown by user interface 115(B).

In some examples, prior to sending the authorization request to the primary user 114(A), the onboarding component 117 can determine whether the primary user 114(A) identified by the secondary user 114(B) for authorization is a suitable or proper primary user to be associated with a requested secondary account. There may be issues when an unsuitable or improper user attempts to act as a primary user of a primary account to be associated with a secondary account. As an example, there may be situations where an 18-year-old attempts to approve of secondary accounts for their 16-year-old friends without parental or guardian approval. This may undermine the assurances that a primary account will ultimately be financially responsible for a secondary account. To ensure the primary user 114(A) identified by the secondary user 114(B) is suitable or proper, the onboarding component 117 may use contacts of a user, one or more existing relationships (e.g., retrieved from a third-party service hosted by a third-party server 130), geolocation, combinations of the foregoing, or the like to make the determination on whether the primary user 114(A) is a suitable or proper primary user to be associated with a requested secondary account. For instance, the onboarding component 117 can use contact data, social networking data, transaction data, interaction data, third-party data, or the like to determine or confirm an existing relationship between the primary user 114(A) identified by the secondary user 114(B) for authorization and the secondary user 114(B) of the requested secondary account. The determination of whether the secondary user 114(B) and the primary user 114(A) are related, or otherwise have an existing relationship, helps prevent improper association of primary accounts to secondary accounts. For instance, by determining there is a proper relation between the secondary user 114(B) and the primary user 114(A), the payment service system 106 can verify that a primary user 114(A) is the appropriate user to hold liable to cover any debts associated with the secondary account.

In an example, the onboarding component 117 can use contact data, social networking data, transaction data, interaction data, third-party data, or the like to determine an existing relationship between the primary user 114(A) identified by the secondary user 114(B) for authorization of the requested secondary account. In some examples, the onboarding component 117 can compare contact lists of the primary user 114(A) and the secondary user 114(B) to determine whether each contact list has a contact associated with the other user or a number of corresponding contacts in the contact lists of the primary user 114(A) and the secondary user 114(B). In some examples, the number of overlapping contacts or context associated therewith can indicate the strength of the relationship. A strong relationship (e.g., having a strength that satisfies a threshold) can indicate that the identified primary user 114(A) is a suitable or proper user for authorizing the secondary user's 114(B) account.

As another example, social media connections can be used to determine existing relationships and associated strengths thereof. That is, based at least in part on a determination that the primary user 114(A) and 114(B) share more than a threshold number of social media connections, the onboarding component 117 can determine an existing relationship. In some examples, the number of overlapping social media connections or context associated therewith can indicate the strength of the relationship. A strong relationship (e.g., having a strength that satisfies a threshold) can indicate that the identified primary user 114(A) is a suitable or proper user for authorizing the secondary user's 114(B) account. In some examples, social media connections can be utilized by the payment service to provide visibility into interactions between the primary user 114(A) and the secondary user 114(B) and, in some examples, between the secondary user 114(B) and other users. That is, in some examples, social media connections can be used to indicate how users are performing with respect to spending goals, investing goals, saving goals, or the like. In some examples, this information can be presented via a user interface, such as an activity feed, to motivate the secondary user 114(B) to match or beat spending goals, investment goals, savings goals, or the like. Further, in some examples, such information can be used to provide primary users insights on goal setting or to otherwise provide visibility into financial transactions or behavior of other users within their social networks.

As yet another example, the onboarding component 117 may use one or more third-party services to access account data to indicate whether the primary user 114(A) and the secondary user 114(B) share a subscription or service plan. Based at least in part on a determination that the primary user 114(A) and the secondary user 114(B) share a subscription or service plan, the onboarding component 117 can determine an existing relationship between the primary user 114(A) and the secondary user 114(B). As yet another example, the onboarding component 117 can determine whether user devices associated with the primary user 114(A) and the secondary user 114(B) are within a threshold distance of one another. Based at least in part on a determination that the user device 112(A) and 112(B) are within a threshold distance of one another, the onboarding component 117 can determine that the primary user 114(A) and the secondary user 114(B) have an existing relationship. A determination of an existing relationship can indicate that the identified primary user 114(A) is a suitable or proper user for authorizing the secondary user's 114(B) account.

In some examples, while the secondary account is awaiting authorization from the identified primary user 114(A), the onboarding component 117 can generate a provisional account for the secondary user 114(B) and can enable the secondary user 114(B) to use one or more payment functionalities. For example, the onboarding component 117 can generate a provisional account from which the secondary user 114(B) can perform peer-to-peer payments with other users but may not be able to perform additional or alternative payment functionalities. In some examples, the provisional account can remain active until authorization or approval from the primary user 114(A) is received. In such examples, the provisional account can be converted into a secondary account, which can be associated with one or more additional payment functionalities. In some examples, the provisional account can remain active until an event occurs, for example, a period of time lapses, more than a threshold number of transactions are performed, more than a threshold amount of funds have been transferred, or the like.

As described above, once the secondary user 114(B) is onboarded, for example, once the secondary account 132(B) has been created and authorized by the primary user 114(A), techniques described herein enable the secondary user 114 (B) to operate the secondary account 132(B) such that they are permitted to access services (e.g., payment functionalities) of the payment service. Such services can include, by way of non-limiting example, peer-to-peer payments, point-of-sale transactions, banking, buying or selling of assets (e.g., stocks, cryptocurrency, non-fungible tokens, etc.), or the like. As such, a secondary user can be empowered to transact with other users or entities using such services.

In some examples, the onboarding component 117 can enable the primary user 114(A) to fund the secondary account 132(B) via one or more funding mechanisms. In at least one example, the onboarding component 117 can enable the primary user 114(A) to configure recurring payments to be made from the primary account 132(A) to the secondary account 132(B), for example, for allowance or the like. In some examples, the onboarding component 117 can enable the primary user 114(A) to transfer funds from the primary account 132(A) to the secondary account 132(B) in response to an event, for example, as a reward for performance of a task (e.g., a chore), an accomplishment (e.g., a particular grade), a good deed, or the like. Secondary accounts can be funded via additional or alternative mechanisms as described herein.

In some examples, once the secondary account 132(B) has been established, the onboarding component 117 may issue a physical payment instrument, such as a payment card, a fob, or the like, associated with the secondary account 132(B) to secondary user 114(B). In some examples, the datastore 128 may be updated to indicate that the secondary account 132(B) of the secondary user 114(B) has been issued a physical payment instrument. The physical payment instrument may be linked to one or more balances of the secondary account 132(B) such that the secondary user 114(B) can use the physical payment instrument to withdraw or otherwise access funds from any one or more of the balances associated with their secondary account 132 (B).

In some examples, the physical payment instrument can be customized by the secondary user 114(B). For example, the secondary user 114(B) can customize the color, transparency, design on individual surfaces, signature, or the like. In some examples, such customization can be done via the onboarding process, as described above. In some examples, customization of the physical payment instrument can be used to customize or otherwise personalize the user experience of the payment service app 110(A) for the secondary user 114(B). That is, the user interfaces, design, or the like can be customized or personalized based on the customization of the physical payment instrument. For instance, if a user customizes a physical payment instrument by selecting a pink and black physical payment instrument, the user interface design of the payment service app can also be pink and black. Or, if a user customizes a physical payment instrument by selecting a particular style, the user interface design of the payment service app can have the same or similar particular style. In some examples, such a style or "theme" can affect design characteristics of user interface elements (e.g., buttons or other controls), user profile features, other properties associated with the payment service app, etc. In some examples, users can purchase particular styles or user interface designs without having the styles or user interface designs being tied directly to the customization or personalization of the physical payment instrument. In some examples, individual styles or themes can be "locked," or inaccessible, until a condition is satisfied. In some examples, the condition can be configuration of the physical payment instrument. In some examples, the condition can be a purchase. In some examples, the condition can be payment activity, in-app activity, or the like. Satisfaction of such a condition can cause individual styles or themes to be "unlocked" or accessible. In some examples, styles or "themes" can be configured by the payment service, a user, a group of users, or the like.

In some examples, users can share representations of their personalized payment instruments, interactions with the payment service, goals or milestones, or completion thereof, or the like to platforms of third-party service providers, such as gaming platforms, social medial platforms, music streaming platforms, or the like. Such sharing can be via integrations between the payment service system 106 and one or more third-party service providers, for example by one or more APIs or SDKs. Such sharing can be used to drive and streamline acquisitions of new users. In some examples, shared data, such as a representation of a personalized payment instrument, interaction with the payment service, goal or milestone, or the like, can have additional data embedded or encoded therein, or otherwise be associated with a referral code identifying the user who shared the data. The embedded or encoded data can be associated with a referral code, such as via a quick response (QR) code, link or the like, such that an interaction with the shared data, for example via a single interaction ("one touch") can enable a user who shared the shared data to receive a referral reward (e.g., a payment, a gift, a discount, etc.). As such, if a user on a platform of a third-party interacts with something that another user, having an account with the payment service, shares via the platform, the other user, having the account with the payment service, can receive a referral award.

In some examples, the payment service app 110(A) can store payment data associated with a virtual payment instrument. In some examples, the virtual payment instrument can be usable immediately when the secondary account is opened. In some examples, the virtual payment instrument can represent the physical payment instrument associated with the secondary user 114(B). That is, in some examples, the virtual payment instrument can be associated with the same personalization or customization of the physical payment instrument. Virtual payment information associated with the virtual payment instrument can be updated with information associated with the physical payment instrument when it is activated. The physical payment instrument or virtual payment instrument can enable the secondary user 114(B) to withdraw funds or pay for transactions using funds associated with the secondary account 132(B). As such, the physical or virtual payment instruments can enable the secondary user 114(B) to participate in point-of-sale transactions or other merchant transactions.

In some examples, the payment service can configure permissions, conditions, controls, or the like for secondary accounts. In some examples, such permissions, conditions, controls, or the like can be default permissions, conditions, controls, or the like, which can be modified by primary users or secondary users. In at least one example, the account configuration component 119 can enable users or the payment service to configure permissions, conditions, controls, or the like. For example, the account configuration component 119 can enable primary users to establish permissions, conditions, controls, or the like to mitigate risk or otherwise regulate interactions of secondary users using secondary accounts. In some examples, such configuration can be during onboarding. In some examples, such configuration can be after onboarding. In some examples, the permissions, conditions, controls, or the like can be configured or modified in real-time or near-real-time by the account configuration component 119. For example, the account configuration component 119 can monitor transaction activity associated with a secondary account and can enable, disable, or modify individual permissions, conditions, controls, or the like based on such transaction activity.

As described above, the payment service app 110(A) executing on the user device 112(A) of the primary user 114(A) can enable the primary user 114(A) to use a first set of payment functionalities associated with the payment service. The payment service app 110(B) executing on the user device 112(B) of the secondary user 114(B) can enable the secondary user 114(B) to use a second set of payment functionalities. In some examples, the second set of payment functionalities can be a subset of the first set of payment functionalities. That is, the second set of payment functionalities can be a reduced set of payment functionalities when compared to the full set of payment functionalities. In particular embodiments, the payment service may provide the primary user 114(A) with the ability to configure, via the account configuration component 119, specific payment functionalities of the secondary account 132(B) associated with the primary account 132(A) of the primary user 114(A). In some examples, the primary user 114(A) may in real-time or near-real-time adjust or otherwise modify the set of payment functionalities of the secondary account 132(B). As an example, the primary user 114(A) may access the payment service app 110(A) and navigate to a user interface to configure one or more payment functionalities of the secondary account 132(B). Indications of payment functionalities associated with individual user accounts can be stored in the datastore 128.

As described above, the set of payment functionalities associated with the secondary account 132(B) may be the same or different than the set of payment functionalities associated with the primary account 132(A). For example, in some examples, certain payment functionalities associated with the secondary account 132(B) can be associated with a condition or may require authorization from a primary account 132(A). In some examples, the secondary account may have access to micro-financial services, and more specifically micro-transactions, wherein funds associated with the secondary account 132(B) are withdrawn in small amounts. In some examples, individual payment functionalities may be tiered or otherwise conditioned on activity or other interactions within the payment service application. For instance, saving, investing, and spending payment functionalities may be tiered such that if the secondary user satisfies a saving or investing goal, spending payment functionalities may be unlocked or afforded greater spending limits or limits with fewer restrictions. To the contrary, if the secondary user does not satisfy a saving or investing goal, spending payment functionalities may be restricted. Access to tiers of saving, investing, and payment functionalities may be grouped and unlocked in groups or may be unlocked individually based on the secondary user satisfying or not satisfying particular goals. Goals can be set as one-time goals (such as a minimum amount held in a saving account) or goals that are to be met on a recurring basis (such as a minimum amount invested per month) and corresponding tiers of saving, investing, and payment functionalities can be locked and unlocked accordingly. If a secondary user is unable to satisfy a goal within a recurring period, the corresponding tier of saving, investing, and payment functionalities can be locked or reverted back to a reduced or default level. In some examples, as described below, goals can be tied to incentives. This sort of oversight can help with financial literacy and health.

In some examples, the account configuration component 119 can enable primary users to configure pre-authorizations of transactions. In some examples, the primary user 114(A) can pre-authorize each payment, transfer, purchase, or sale, involving the secondary account. In some examples, the primary user 114(A) can pre-authorize some payments, transfers, purchases, or sales and indicate that some payments, transfers, purchases or sales are to be refused or require approval from the primary user 114(A). In some examples, indications of such pre-authorization(s) can be stored in the datastore 128, embodied as rule(s), which can be enforced by the payment services component 121 in real-time or near-real-time without input from the primary users, as described below. As described above, in some examples, the primary user 114(A) can be required to authorize a first payment, transfer, or sale of a particular type and after the authorization for the first payment, transfer, or sale, future payments, transfers, or sales of the particular type can be pre-authorized such that additional authorization is not required. For instance, a first stock or cryptocurrency transaction can require approval from the primary user 114(A), but subsequent stock or cryptocurrency transactions may be pre-authorized and may not require approval from the primary user 114(A). Of course, additional or alternative conditions may necessitate approval or authorization (e.g., transactions above a particular amount, frequency, etc.). Further, in some examples, authorizations can be revoked in response to an occurrence of an event (e.g., lapse of a period of time, spending over a threshold, violation of a condition, etc.) or via input from primary users.

In some examples, the account configuration component 119 can enable primary users to configure one or more conditions or enable (or restrict) certain types of transactions for secondary accounts. That is, in some examples, secondary accounts can be associated with spending conditions, or conditions that can be used to control or otherwise regulate spending of the secondary users. Examples of conditions include, but are not limited to, a transaction amount, a transaction type (e.g., peer-to-peer, purchasing stock or cryptocurrency, point-of-sale, etc.), item(s) associated with the transaction, a geolocation, a time, a particular merchant, a merchant category code, a particular recipient, combinations of the foregoing, or the like. As such, the datastore 128 can store indications of condition(s) as rule(s), and the payment services component 121 can enforce such condition(s) on transactions without input from primary users, as described below.

In some examples, pre-authorization of particular payments, transfers, purchases, or sales can be tied to condition(s) such that payments, transfers, purchases, or sales satisfying particular condition(s) can be pre-authorized so that the payment services component 121 can facilitate the transactions without requesting approval from primary users. However, in some examples, when particular payments, transfers, purchases, or sales do not satisfy a condition such that the payments, transfers, purchases, or sales are not pre-authorized, the payment services component 121 can request approval from primary users before facilitating the transactions or can outright deny the transactions (based on the configuration of associated permissions, conditions, controls, or the like). In at least one example, the account configuration component 119 can enable the primary user 114(A) to configure notification settings, for example, indicating when to notify the primary user 114(A) of transactions involving associated secondary accounts (e.g., per transaction, in batches, etc.) or how notifications are to be presented. In some examples, the notification setting(s) can be stored in the datastore 128 as rule(s) that can be used for determining when to notify primary users of transaction activity of secondary users.

In some examples, the payment services component 121 can enable the primary user 114(A) or the secondary user 114(B) to set up one or more purpose-based accounts or account balances within the primary account 132(A) or secondary account 132(B). These purpose-based accounts or account balances can include, as an example, a spending account, savings account, securities account, cryptocurrency account, or the like. In some examples, the payment service can enable the primary user 114(A) to fund individual of the purpose-based accounts or account balances or to provide incentives for the secondary user 114(B) to fund individual of the purpose-based accounts or account balances. In some examples, the payment service can fund or otherwise associate assets with individual of the purpose-based accounts or account balances associated with the secondary account 132(B) such to mirror or substantially mirror individual of the purpose-based accounts or account balances associated with the primary account 132(A). In some examples, individual of the purpose-based accounts or account balances can be associated with conditions on use of the funds associated with the purpose-based accounts or account balances. As such, use of such funds associated with such purpose-based accounts or account balances can be restricted to purchases that satisfy configured conditions. Indications of purpose-based accounts or account balances, and associated conditions, can be stored in the datastore 128.

In some examples, the primary user 114(A) can gift, or otherwise provide, funds to a secondary account with one or more conditions associated with the funds. Such a gift can be associated with a "purpose-based account" or "purpose-based account balance." That is, the funds can be restricted based on the one or more conditions that relate to the "purpose." A non-limiting example of such includes a condition indicating that gifted funds can only be used for food items at a school (i.e., lunch money). Or, another non-limiting example can indicate that the gifted funds can be used for books but not toys, clothes, or the like. In some examples, such gifted funds can be earmarked or stored in a separate balance from other funds associated with the secondary account. The payment services component 121 can monitor transactions and determine whether the one or more conditions are met to deny or allow individual transactions, and from which accounts or account balance to withdraw funds.

In some examples, the payment services component 121 can be configured to receive payment requests from user devices, such as the user devices 112. In at least one example, a payment request can be associated with data indicating a sender, a recipient, and an amount of a payment. In at least one example, the payment services component 121 can identify relevant sender and recipient accounts and can facilitate a P2P payment. The payment services component 121 can access a ledger to update the balance of the relevant sender and recipient accounts to facilitate the P2P payment. That is, the payment services component 121 can perform peer-to-peer transactions and perform additional or alternative functionality as described above with reference to FIG. 16.

In some examples, the payment services component 121 can be configured to receive transaction data from POS systems, such as the POS system 120 described above with reference to FIG. 15. The payment services component 121 can transmit requests (e.g., authorization, capture, settlement, etc.) to payment service server computing device(s) to facilitate POS transactions between merchants and customers. The payment services component 121 can communicate the successes or failures of the POS transactions to the POS systems. In some examples, the payment services component 121 can receive transaction data from other sources associated with merchants, such as merchant applications or POS applications executing on merchant devices, merchant websites or ecommerce sites, or the like.

In some examples, the payment services component 121 can be configured to train models using machine-learning mechanisms. For example, a machine-learning mechanism can analyze training data to train a data model that generates an output, which can be a recommendation, a score, or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore 128 associated with the user device(s) 112 or the server(s) 104 for use at a time after the data models have been trained (e.g., at runtime).

In some examples, the payment services component 121 can be configured to process transactions to determine whether one or more conditions are met when a secondary user using a secondary account is performing a transaction. The payment services component 121 can be configured to access context data associated with the user device of the secondary user to determine whether the one or more condition(s) are satisfied. For example, the payment services component 121 can access a location of the user device of the secondary user to match a geographic condition for transactions. For instance, if the one or more condition(s) include enabling purchases at a particular merchant and the accessed location of the user device indicates that the user device is located near a particular merchant, then the transaction can be approved.

In some examples, the account configuration component 119 can enable primary users to configure one or more controls to control secondary users use of the payment service. For example, the primary user 114(A) can establish privacy controls over the use of information associated with the secondary account 132(B) of the secondary user 114(B), including for use with discounts, promotions, advertising, or referrals or sharing or selling the information with or to third parties, or the like.

In some examples, primary users, secondary users, the payment service, a merchant, or the like can configure incentive rewarding events. In some examples, an incentive rewarding event may indicate a goal or behavior to achieve as a condition to receiving the incentive. An incentive may indicate an incentive rewarding event to be performed to obtain a particular incentive. An incentive rewarding event can specify one or more metrics to be performed as a condition to receiving a corresponding incentive. That is, an occurrence of an incentive rewarding event can trigger an incentive to be associated with a secondary account. As an example, the incentive rewarding event may include achieving a savings goal (e.g., save $50, add money into savings at a particular frequency, etc.), a bill repayment goal (e.g., paying bills on time), a spending goal (e.g., purchasing first cryptocurrency, purchasing first stock, buying five stocks, etc.); the performance or lack of performance of a particular transaction (e.g., purchasing at sustainable merchants or not purchasing fast food); answering educational questions; sending referrals; and the like. In some examples, incentive rewarding events can be based at least in part on in-application events and engagement (e.g., frequency of engagement, amount of transactions, number of referrals, particular transactions, configuring particular inflows or outflows, or the like). In some examples, incentives can include a gift of an asset (e.g., fiat currency, stock, cryptocurrency, a non-fungible token, or the like), a discount, a promotion, a reward, or the like. In some examples, the incentive can be based on the incentive rewarding event. For example, the payment services component 121 can associate a particular stock with a secondary account based at least in part on the secondary user 114(B) purchasing the stock. Or, as another example, the payment services component 121 can match or contribute an amount of funds to a savings account of the secondary user 114(B) based at least in part on the In at least one example, indications of incentive rewarding events and associated incentives can be stored in the datastore 128. The payment services component 121 can monitor the transactions or other interactions of the secondary account to determine whether an incentive is applicable for the user account. If the payment services component 121 detects an occurrence of an incentive rewarding event, the payment services component 121 can apply the incentive. In some examples, such incentives can be applied automatically, without requiring input from a primary user (e.g., after the incentive is originally configured). Incentives can motivate or otherwise encourage particular behaviors, thereby enabling the payment service to be used for gamification purposes. Additional details are provided below.

The payment services component 121 can facilitate transactions and other payment functionalities of the payment service. In some examples, transactions can include peer-to-peer transactions, for example, between the primary user 114(A) and the secondary user 114(B) or the other user 114(C). The user 114(C) can be associated with a user device 112(C) that is executing payment service app 110(C). In some examples, transactions can include point-of-sale transactions, for example, between the primary user 114(A) or the secondary user 114(B) and a merchant 118. The merchant 118 can interact with a merchant device 124, which can be associated with a reader device 122. The merchant device 124 can have a point-of-sale app 126 (represented as POS app 126) executing thereon to enable the merchant device 124 to exchange data with the server(s) 104. Additional details associated with peer-to-peer and point-of-sale transactions are described below.

In at least one example, the payment services component 121 can receive transaction data associated with transactions to be processed by the payment service. Such transaction data can be received via instances of the payment service app 110, POS app 126, or the like. This enables the payment services component 121 to monitor transactions in real-time or near-real-time. In at least one example, the payment services component 121 can access data stored in the datastore 128 to determine whether any permissions, conditions, controls, or the like are applicable to individual of the transactions. This can enable the payment services component 121 to make real-time or near-real-time decisions whether to approve or deny transactions, or whether to route requests for approval to primary users.

In at least one example, the payment services component 121 can send per-transaction notifications or summary reporting notifications (e.g., for batches of transactions) to primary users. That is, in some examples, the payment services component 121 can send a notification to the primary user 114(A) to notify the primary user 114(A) when the payment services component 121 has approved or denied a transaction or a batch of transactions. In some examples, the payment services component 121 can send notifications to the primary user 114(A) requesting authorization for individual transactions, as needed. As an example, in at least one example, the primary user 114(A) can serve as the custodian of any investment accounts or cryptocurrency wallets or accounts of the secondary user 114(B) and as such, the payment services component 121 can request authorization for each investment- or cryptocurrency-related transaction. In some examples, the primary user 114(A) can enable the secondary user 114(B) to perform investment- or cryptocurrency-related transactions that mirror, or otherwise are substantially similar to, their own portfolio. In some examples, such "mirroring" or "substantial similarity" can enable the secondary user 114(B) to invest a smaller amount of funds in a manner that has the same percentage or allocation as the primary user 114(A). For instance, if the primary user 114(A) has 50% invested in Company A's stock, 30% in Company B's stock, and 20% in Company C's stock, when the secondary user 114(B) invests $10, $5 can be used to buy a portion of Company A's stock, $3 can be used to buy a portion of Company B's stock, and $2 can be used to buy a portion of Company C's stock. In some examples, transactions and other uses of the payment service by the secondary user 114(B) can be presented via an activity feed, presented via a user interface, which can be particular to the secondary user 114(B), and viewable by the primary user 114(A), or can be integrated with transactions or other uses of the payment service by the primary user 114(A). In some examples, the payment services component 121 can send receipts to one or more of the primary account 132(A) or the secondary account 132(B). In some examples, such receipts can be actionable, for example, to dispute a charge, request a refund, re-order, track fulfillment, leave a review, provide gratuity, enable or disable a payment functionality, or the like. In some examples, such receipts can be shared via one or more third-party service systems, such as social media, email, or the like.

In some examples, the primary user 114(A) can configure whether or how individual transactions are presented to the primary user 114(A). That is, as described above, the primary user 114(A) can configure notification settings to indicate when the primary user 114(A) should be notified and how such notifications are to be presented. In some examples, based on such notification settings, the payment services component 121 can monitor transactions and determine in real-time or near-real-time whether to notify the primary user 114(A) about individual transactions and how such notifications should be presented. As a non-limiting example, the payment services component 121 can monitor transactions of a secondary account and identify a large transaction (e.g., transaction over a threshold amount, such as $100). The payment services component 121 can send a notification to a user device 112(A) of the primary user 114(A) to flag the transaction or to request approval for the transaction. The notification may be one or more of a text message, an email, an in-app notification (e.g., via payment service app 110(A)), or the like. In some examples, as described above, transaction notifications or reporting can include differentiated presentations for primary users and secondary users such that additional or alternative information about the transactions can be presented based on the intended recipient. That is, in some examples, the payment services component 121 can determine an intended recipient of a transaction notification and can determine one or more presentation characteristics based at least in part on intended recipient. Such presentation characteristics can indicate which transaction data to include (e.g., recipient or parties to a transaction, item(s) associated with a transaction, amount of a transaction, messaging associated with a transaction, etc.) and how such transaction data is to be presented.

As described above, the datastore 128 can store indications of condition(s) as rule(s) and the payment services component 121 can enforce such condition(s) on transactions, as described below. Transactions that satisfy a condition may be permitted, restricted, or may require authorization from a primary account based on how such conditions are configured. In at least one example, the payment services component 121 can analyze transaction data associated with a transaction of the secondary user 114(B) to determine whether a condition applies. Based at least in part on a determination that a condition applies, the payment services component 121 can determine whether to permit or restrict the transaction, or whether to prompt the primary user 114(A) for approval before facilitating the transaction. In another example, such determination may be performed at regular or predefined intervals such that a previous authorization to the secondary user 114(B) can be revoked if conditions are no longer met. For example, if the secondary user 114(B) attempts to perform transactions with a suspect merchant (e.g., a merchant classification code (MCC) of dubious merchants).

In some examples, the payment services component 121 can enable the primary user 114(A) or the secondary user 114(B) to set up one or more purpose-based accounts or account balances within the primary account or secondary account. These purpose-based accounts or account balances can include, as an example, a spending account or balance, savings account or balance, securities account or balance, cryptocurrency account or balance, or the like, which can be associated with a "purpose." The purpose can be defined based on conditions which can ensure that such purpose-based accounts or account balances are used for the intended purposes. In some examples, the payment services component 121 can enable the primary user to fund individual of the purpose-based accounts or account balances or to provide incentives for the secondary user to fund individual of the purpose-based accounts or account balances. In some examples, the payment service can fund or otherwise associate assets with individual of the purpose-based accounts or account balances associated with the secondary account such to mirror or substantially mirror individual of the accounts associated with the account of the primary user. In some examples, some such purpose-based accounts or account balances can be automatically created based on predefined events, e.g., birthdays, graduations, etc. on behalf of or by contacts of the secondary user.

In some examples, individual of the purpose-based accounts or account balances can be associated with specified conditions on use of the funds associated with the purpose-based accounts or account balances, such as to restrict funds associated with such accounts for purchases with particular merchants, associated with specified merchant category codes, during specified time periods, at specified locations, or of specified types. For example, access to funds in a school purpose-based account can be restricted to purchases for books or during a lunch period at a school cafeteria. As such, the payment services component 121 can monitor transaction data to determine whether individual transactions satisfy the associated condition(s) (e.g., is a transaction related to a book or a time within a lunch period at a school cafeteria?) to determine whether to approve the transaction(s) and which account(s) should be used for withdrawing funds associated with approved transaction(s).

In at least one example, access to funds associated with purpose-based accounts or account balances may be conditioned on locations of secondary users, proximity of users, or the like. The payment services component 121 may be able to detect whether the secondary user is in a familiar or authorized location (e.g., at school, at a sports arena, or at a mass transit station) or proximate the primary user 114(A) or another user (e.g., such as a user known to the primary user 114(A) or designated as trusted parties (e.g., friends, family, nanny, employer, or teacher)). Such detection may be accomplished by way of any suitable method, such as, for example, location detection (e.g., by GPS-, Wi-Fi hotspot-, IP address-, or Bluetooth beacon-based geolocation), social media signals (e.g., detecting a concurrent or recent social media post tagged with a location or with specific people), app-based check-in (e.g., a check-in at a gym, at a hospital, or at an airport). As such, real-time or near-real-time monitoring of transactions and other data can be used by the payment service to authorize or deny transactions. As an example, the secondary user 114(B) may be able to have access to a school purpose-based account when it is determined that the secondary user 114(B) is at school. That is, the payment services component 121 can determine a location of the secondary user device 112(B) corresponds to a location of a school and can enable the secondary user 114(B) to use funds associated with the school purpose-based account.

In some examples, access to funds associated with purpose-based accounts or account balances can be granted when funds are provided to a secondary account. In some examples, such funding can be conditioned on the occurrence of a particular event. As an example, a college purpose-based account can be created by grandparents of the secondary user 114(B). The college purpose-based account can be associated with an event, such as graduation of the secondary user 114(B). When the secondary user 114(B) graduates, the college purpose-based account can be associated with the secondary account of the secondary user 114(B), for example, by transferring funds from the grandparents' account to the secondary account or by "unlocking" or granting access to a previously locked or restricted account or account balance. In some examples, access to the funds can be granted but may be subject to one or more conditions or restrictions. For example, the funds may be associated with one or more conditions or restrictions that the funds be used for college-based purchases. The payment services component 121 can monitor transactions of the secondary user and upon determining funds are being used for college-based purchases (e.g., based on merchant, merchant category code, item(s) in a transaction, geolocation of the transaction, etc.), funds can move from the grandparents' account to the user account or from an access-restricted or earmarked account associated with the secondary account to a primary account of the secondary user.

As described above, some examples, the payment services component 121 may provide the ability to convert a secondary account to a primary account upon satisfaction of specified requirement(s). As an example, the payment services component 121 can automatically convert a secondary account to a standalone primary account when requirement(s) or condition(s) are satisfied. Requirement(s) or conditions can be associated with age (e.g., a minor turning 18 years old), behavior (e.g., when a secondary user has demonstrated a sustained pattern of creditworthy behavior), legal status (e.g., once a legal status of the secondary user has changed), or the like. In some examples, the primary user 114(A) of the primary account 132(A) that the secondary account 132(B) is associated with can request the secondary account 132(B) to be converted to a standalone primary account. In some examples, upon satisfaction of the requirement(s) or condition(s), the secondary account 132(B) can be automatically converted to a standalone primary account. After conversion of the secondary account 132(B) to a primary account, any ability of the primary user 114(A) to restrict, monitor, or moderate actions taken by the secondary user 114(B) with respect to the converted account may be rescinded, and the primary user 114(A) may be provided with the option to discontinue any automated funding mechanisms, reassign custody of any related accounts to the secondary user 114(B), or take any other measures to detach the primary user 114(A) from the converted account. Further, upon such a conversion, the newly converted primary account can have the same set of functionalities as the original primary account. In some examples, such a conversion can cause credit reporting data, as described below, that has been stored in association with the primary account to be reported to a credit reporting agency or associated with the converted primary account.

In at least one example, the payment services component 121 can enable a credit building functionality. In some examples, the payment services component 121 can provide a mechanism through which the secondary user 114(B) can build credit with the payment service or one or more credit tracking services using the secondary account 132(B). For example, a secondary account can be associated with a payment instrument that can draw from funds associated with the secondary account, the secondary account can be used for paying bills, setting up loans or and facilitating repayment, or the like. In some examples, the secondary user 114(B) is limited to spending the amount associated with the secondary account (and not more). In at least one example, spending can be reported to one or more credit tracking services to establish credit for the secondary user 114(B) based on the account activity of the secondary account. In some examples, the payment services component 121 can monitor or otherwise track transactions of the secondary user 114(B) using the secondary account. The payment services component 121 can determine, using one or more machine-trained models or the like, which transactions or interactions are indicative of creditworthiness (e.g., representative of good credit behavior). In some examples, transactions that are indicative of creditworthiness can be reported to credit reporting services. Additionally or alternatively, the underwriting models can attribute credit to the primary user 114(A) until the secondary user 114(B) "graduates" (e.g., transitions) to a primary account, after which the creditworthiness corresponding to the transactions associated with the secondary user 114(B) are "transitioned" to the secondary user 114(B). Additional details associated with credit reporting mechanisms enabled via the payment service system 106 are provided below with reference to FIG. 6.

In some examples, the payment services component 121 can utilize data associated with users of the payment service to make recommendations with respect to interactions to be performed by primary users or secondary users. In some examples, such data can include interaction data, which can include transaction data, payment data, purchasing data, sales data, contacts of users, social network behavior, or the like. In some examples, such recommendations can be associated with users to refer to the payment service, assets to buy or sell, savings accounts to create or fund, financial education tips, incentives, or rewards, or the like. In some examples, such recommendations can be generated or otherwise determined based at least in part on machine learning mechanisms, statistical models, or the like.

The datastore 128 may store data used by the payment service system 106. In at least one example, the datastore 128 can store one or more of user profiles which can store user account data. In some examples, user accounts can include indications of whether a user account is a primary account or a secondary account. As described above, the primary user 114(A), associated with a primary account, can authorize a secondary account for the secondary user 114(B) such that the secondary user 114(B) can utilize services of the payment service. In some examples, the primary user 114(A) may be the legal owner of the secondary account, and the secondary account may be a sub-account of the primary account of the primary user 114(A), or the secondary account may be a separate account that has been approved by the primary user 114(A). In some examples, a secondary account can be mapped to a primary account that has authorized or otherwise approved the secondary account. In some examples, a secondary account can be associated with a primary account that has authorized or otherwise approved the secondary account via association with a same group identifier or the like. In some examples, a single primary account can be mapped to, or otherwise associated with, one or more secondary accounts. In some examples, a secondary account can be mapped to, or otherwise associated with, one or more primary accounts. Such mappings or relationships can represent "account groups" in the datastore 128, as described above. Additional details associated with account configurations and the datastore 128 are described below with reference to FIGS. 15-19.

Figure 1B:
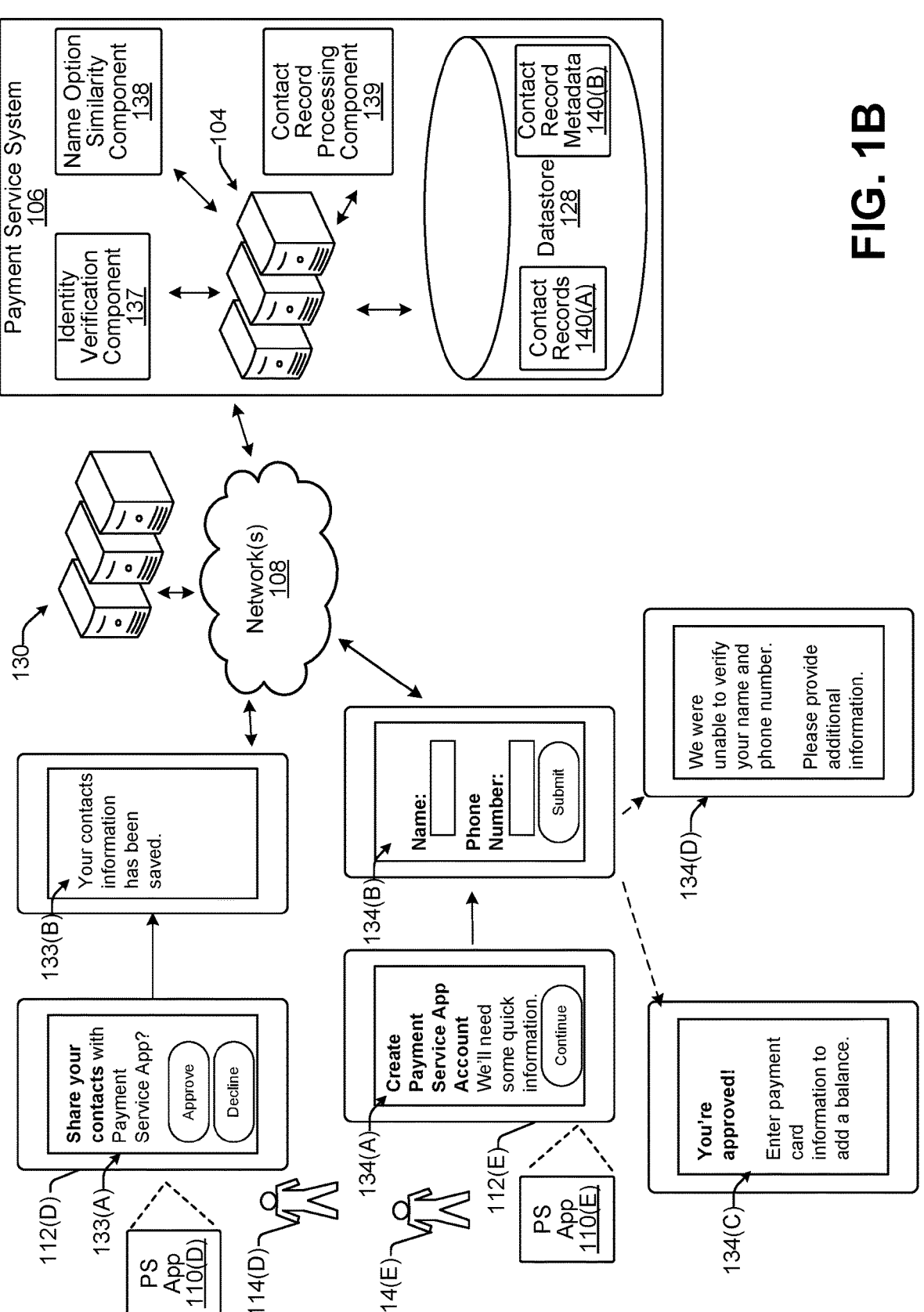
FIG. 1B is an example payment service for providing identity verification through contact record analysis according to some embodiments disclosed herein.

FIG. 1B is an example environment 100b for providing contact records-based alternative identity verification processes as discussed herein. The like numbered components of FIG. 1A and FIG. 1B have a similar functionality between environment 100a and 100b. As such, the example environment 100b can include a payment service system 106, which can include server(s) 104 and a datastore 128 that are configured to exchange electronic communications through network(s) 108 with one or more other computing devices. For example, the server(s) 104 or datastore 128 may exchange electronic communications with at least one of a user device 112(D) associated with a first user 114(D) by way of a payment service app 110(D) executing on user device 112(D) or a user device 112(E) associated with second user 114(E) by way of a payment service app 110(E) executing on user device 112(E). The payment service app 110(D) and 110(E) (shown as PS App 110(D) and PS App 110(E)) can each be respective instances of the payment service app provided by a payment service or another service provider. The payment service can be associated with the payment service system 106 such that operations described as being performed by the payment service can be performed by the payment service system 106.

As illustrated in FIG. 1B, in at least one example the first user 114(D) can allow the PS App 110(D) executing on their user device 112(D) to access and share the contact records stored by the user device 112(D) through one or more user interfaces. In a first example, user interface 133(A) the PS App 110(D) expressly asks the user to approve or decline a request to share contacts with the PS App 110(D). Upon the user approving the request, the contact records stored by the user device 112(D) are accessed by the PS App 110(D) and provided to a contact record processing component 139 of the payment service system 106. The contact record processing component 139 processes the contact records information, applies available metadata as will be described herein, and stores the contact records information as contact records 140(A) and contact record metadata 140(B) in a datastore 128. The user interfaces 133(A) and 133(B) are non-limiting examples of an instance of user interfaces that can be presented by an instance of the PS App 110(D) to facilitate alternative IDV through sharing user 114(D)'s contact records with the payment service system 106. Additional or alternative user interfaces can be presented to facilitate the same.

As further illustrated in FIG. 1B, the second user 114(E) can use the instance of the PS App 100(E) executing on the user device 112(E) to request an account with the payment service through one or more user interfaces. The user interfaces include steps to procure information to be used for a contact records-based identity verification as a preliminary or alternative identity verification. In a first example, a first user interface 134(A) enables the second user 114(E) to initiate an identity verification submission. The IDV submission may be in association with the creation of a new account (e.g., onboarding), configuring a new feature or functionality (e.g., investing, cryptocurrency, etc.), initiating tax preparation (e.g., for federal or state income taxes), or the like. A second user interface 134(B) enter information such as the user's name and an identifier. A listing of identifiers is described above and can be any identifier that is stored in a contact record. For the purpose of FIG. 1B, the identifier is a phone number, but a phone number is used for illustrative purposes and should not be construed as limiting. For example, the identifier could also be an email address, social media username, or another similar identifier. Upon submitting that information, the name and phone number are provided to the identity verification component 137 of the payment service system 106.

As described herein, the identity verification component 137 provides the name to a name option similarity component 138 of the payment service system 106. The identity verification component 137 also provides the phone number to the contact record processing component 139. The contact record processing component 139 queries the datastore 128 to retrieve individual contact records 140(A) associated with the phone number as well as associated contact record metadata 140(B). The names associated with the individual contact records are then provided to the name option similarity component 138. Additional data from the contact records 140(A) and contact record metadata 140(B) are also provided to the identity verification component 137 as additional signals to be used to when determining whether to approve or deny the identify verification request.

The name option similarity component 138 evaluates the name options, including the name provided with the identity verification submission and the name options associated with each of the individual contact records, and provides a similarity score or other measure of similarity for each of the name options to the identity verification component 137. In some examples, the name option similarity component 138 provides a recommended true name associated with the phone number to the identity verification component 137.

The identity verification component 137 evaluates the data from the name option similarity component 138 and the contact record processing component 139 and determines whether the name provided with the identity verification submission from the PS App 110(E) is, or is substantially similar to, the determined true name associated with the phone number provided with the identity verification submission. As used herein, the "true name" is the name option that is determined to be the most likely name of the owner or primary user of the phone number. If the name provided with the identity verification submission matches the determined true name, the identity verification component 137 provides a notification of successful identity verification to other components of the payment service system 106 configured to, for example, continue the onboarding flow for the user (e.g., onboarding component 117). The PS App 110(E) transitions to the user interface 134(C) in which the user is notified that their identity has been verified and the request to initiate account creation has been approved. Other onboarding steps have not been illustrated in this example for brevity.

If, on the other hand, the identity verification component 137 determines that the name provided with the identity verification submission does not match the determined true name or does not match the determined true name above a satisfactory threshold, the identity verification component 137 provides a notification of unsuccessful identity verification to other components of the payment service system 106 configured to facilitate additional identity verification processes. The PS App 110(E) transitions to the user interface 134(D) in which the user is notified that their identity has not been verified and that further information and processes will be needed to continue creating their account. In some examples, additional identity verification can be facilitated with one or more third-party systems 130. Other onboarding steps have not been illustrated in this example for brevity.

In some examples, the identity verification component 137 can be configured to manage the receipt and response to an identity verification submission from the second user 114(E). The identity verification component 137 can receive the request and direct the operations of other components of the payment service system 106 in responding to the identity verification submission. After receiving the identity verification submission from the second user device 112(E), the identity verification component 137 can parse the submission to identify the name associated with the identity verification submission and the phone number associated with the identity verification submission. After identifying the phone number associated with the identity verification submission, the identity verification component 137 can send the phone number to the contact record processing component 139.

The contact record processing component 139 can be configured to manage receipt and handling of contact records from one or more user devices 112. For example, when the first user device 112(D) provides access to the contact records stored therein, the contact record processing component 139 receives the contact records and prepares the contact records for storage in the datastore 128 as contact records 140(A) and contract record metadata 140(B). The contact records 140(A) stored in the datastore can include information provided by the first user 114(D) (e.g., information that they entered into the contact records on the first user device 112(D)) and information associated with the contact records by the contact record processing component 139 which is treated as contact record metadata 140(B). Examples of information provided by the first user 114(D) for each contact record can include: one or more names, one or more phone numbers, one or more email addresses, associated business or groups, social media identifiers or handles, other identifiers for the user (e.g., identifiers for a user on the payment service), a birthday or other significant dates (e.g., anniversary, first hire date), and the like. Examples of information associated with the contact records as metadata by the contact record processing component 139 can include: the name or another identifier for the user that provided the contact record, the age of the contact record as stored by the user device 112(D) (e.g., how long the user stored the contact record), the age of the contact record as stored by the payment service system 106 (e.g., how long the payment service system 106 has had the contact record), the last modified date of the contact record, and the like. Other contact record metadata 140(B) can include information about the user who provided the contact record, including: whether the user has been verified by the payment service system 106 and the mechanisms used to verify the user, how many contact records the user has provided to the payment service system 106 (e.g., contact record "forward links"), how many contact records the user appears in (e.g., contact record "backlinks"), whether the user's contact records have been previously matched to a true name for a contact record and other measures of the user's contact records' trustworthiness, whether the user has been suspected of or flagged for fraudulent activity by the payment service system 106, whether the user has been a victim of fraudulent activity, the user's location, and the like.

Additionally, the contact record processing component 139 manages access to the contact records 140(A) and contact record metadata 140(B) during the identity verification submission process. For example, upon receiving the phone number submitted with the identity verification submission from the identity verification component 137, the contact record processing component 139 queries the contact records 140(A) stored in the datastore 128 to identify individual contact records associated with the phone number. After identifying the individual contact records, the contact record processing component 139 queries the contact record metadata 140(B) to identify the metadata associated with the individual contact records. The contact record processing component 139 sends the individual contact records and metadata to the identity verification component 137.

In some examples, the identity verification component 137 prepares and sends the individual contact records to the name option similarity component 138. As an example, the identity verification component 137 parses the individual contact records and extracts the names associated with the individual contact records as name options. The name options are possible values for the true name associated with the phone number provided with the identity verification submission. In some examples, the identity verification component 137 or name option similarity component 138 preprocesses the name options to facilitate efficient determination of name option similarity. As an example, the identity verification component 137 or name option similarity component 138 may compare the name options extracted from the individual contact records to common nicknames or other terms that are highly unlikely to be the true name associated with the phone number, such as nicknames such as "Mom," "Boss," or "Big Bro." Name options that match to the common nicknames can be excluded from the similarity comparison to ensure that the similarity analysis compares name options that are reflective of real names. Otherwise, the results of the similarity analysis can be flawed through the introduction of the nicknames. Preprocessing the name options can further include excluding or cleaning name options that contain foreign or non-standard characters, such as emojis. Once the name options have been preprocessed, the name options are provided to the name option similarity component 138.

In some examples, the name option similarity component 138 is configured to analyze the name options and assess the similarity of each individual name option to the other name options. The result of the name option similarity component's 138 analysis is or can include a name option that is most similar to the other name options of the set of name options. For each of the name options, the name option similarity component 138 can generate one or more similarity scores, which can indicate measures of similarity.

In some examples, the name option similarity is based on a spelling similarity of the name options of the set of name options. As an example, the name option similarity component 138 may compare each individual name option with each of the other name options based on spelling to generate a spelling similarity score. As an example, the name option similarity component 138 may execute a spelling similarity comparison algorithm to compare the spelling of each name option to other name options. The spelling similarity comparison algorithm may be configured to generate a scaled measure of similarity that assesses how similar two words or names are to each other. For example, the names "Erik" and "Eric" may be given a high similarity score. The names "Erik" and "Doug" may be given a low similarity score. The similarity score may be based on an entire name option (e.g., including given, middle, and family names) or based on individual components of a name options. In some examples, the spelling similarity comparison algorithm may compare the similarity of the entire string "Jack Smith" to "John Smith." In some examples, the spelling similarity comparison algorithm may compare the components of the strings in a pairwise fashion. For example, comparing the name options "Jack Smith" and "John Smith" may include comparing the given names "Jack" and "John" and the family names "Smith" and "Smith."

In some examples, the name option similarity is based on a phonetic similarity of the name options of the set of name options. As an example, the name option similarity component 138 may compare each name option with each of the other name options based on phonetics to generate a phonetic similarity score. As an example, the name option similarity component 138 may execute a phonetic similarity comparison algorithm to compare the pronunciation of each name option to other name options. The phonetic similarity comparison algorithm may be configured to generate a scaled measure of similarity that assesses how similar the pronunciation or phonetic representation of two words or names are to each other. For example, the names "Sherry" and "Cherie" may be given a high similarity score. The names "Erik" and "John" may be given a low similarity score. The phonetic similarity comparison algorithm may be configured to convert each given name option into a standardized phonetic representation prior to performing the comparison. The standardized phonetic representation may ensure that homophones are represented in an identical manner so that a comparison of phonetic representations for similarity is reflective of similar pronunciation. As with the spelling similarity comparison algorithm, the phonetic similarity comparison algorithm may compare the entirety of name options at once and/or may compare individual components of the name options independently.

The representation of the spelling similarity for each of the individual name options and the phonetic spelling for each of the individual name options can be a pairwise similarity matrix, with one entry in the matrix that is a comparison of each name option against the other name options. The pairwise similarity matrix is an efficient compact representation of a dataset in which each value is compared against each other value and the result is stored. The pairwise similarity matrix can be used to easily calculate a total similarity score for each individual name option, the name option similarity component sums or otherwise combines the values in each row (or column) of the similarity matrix. In some examples, the values can be combined by summing the similarity values in the log space that corresponds to multiplying the similarity values in the original space. The summing of the similarity values in the log space may leverage a concept used in maximum likelihood estimation instead of multiplying probabilities, which may be mathematically more stable to take the log of probabilities and sum them. In some embodiments, the entries of the pairwise similarity matrix correspond to a probability that the two compared values are the same. Therefore, the entries can be column- or row-wise combined through multiplication to arrive at a similarity score that is itself a probability that a given name option is the most likely name option to be the true name option.

The name option similarity component 138 may generate for each of the individual name options, a combined and/or weighted similarity score based on the spelling and phonetic similarity of the individual name options. The name option similarity component 138 may apply, for each name option, a first weight to the spelling similarity score and a second weight to the phonetic similarity score based on the plurality of name options. The total similarity score may include a weighted combination of the spelling similarity score and the phonetic similarity score. The weights may be tuned based on common name spellings and misspellings. The weights may be tuned based on a user's stated or inferred primary language or country of origin. The weights may be assigned dynamically based on, for example, a name that is provided with an identity verification submission. In some examples, the weights may be determined by a machine-trained model. The machine-trained model may be configured to determine the appropriate weights to be applied to the similarity scores to accurately assess the similarity of two name options.

In some examples, the name option similarity component 138 may use or comprise a first machine-trained model to produce the similarity scores for the individual name options. As an example, the first machine-trained model may receive, as input, the set of (preprocessed) name options provided by the identity verification component. The first machine-trained model may provide as output, the set of similarity scores. The first machine-trained model may be trained to calculate and use the spelling similarity and phonetic similarity of each of the individual name options to the other name options. The first machine-trained model may use the same similarity comparison algorithms as described above, or may use a learned process for comparing the spelling and phonetic similarities of name options. In particular, the machine-trained model may be trained to react dynamically to the name options that are provided and adjust processing based on the name options. For example, the machine-trained model may be trained to use a higher degree of spelling similarity for certain name options, or to weight phonetic options more heavily when the name options include a large number of uncommon spelling of names.

The identity verification component 137 can receive the similarity scores for each of the name options from the name option similarity component 138. The identity verification component 137 can use the similarity scores in determining the true name associated with the phone number provided with the identity verification submission. As an example, the identity verification component can rank the name options by their similarity score(s) and select as the true name the name option with the highest similarity score(s). In some examples, the name option similarity component 138 provide each of the similarity scores for the individual name options (the spelling similarity score and the phonetic similarity score) separately and the identity verification component 137 can weight or otherwise combine the similarity scores on its own.

In some examples, the identity verification component 137 can further determine the true name associated with the phone based on data in the individual contact records and associated metadata retrieved by the contact record processing component 139 in response to the identity verification submission. As an example, the identity verification component 137 can weight the similarity scores for the individual name options based on a measure of trustworthiness associated with each of contact records associated with the individual name options. For example, an individual name option may have a high similarity score but be associated with a large number of untrustworthy contact records. The identity verification component 137 can determine, based on the measure of trustworthiness, that the individual name option may not be trustworthy and reject the identity verification submission, even in the provided name matches the individual name option. The measure of trustworthiness can be based on any of the above-described contact record data or metadata, such as the age of the contact record, and the number of backlink and forward links, as these may be indicative of efforts to manufacture a fraudulent identity verification submission approval.

In some examples, the identity verification component 137 can make the determination of the true name associated with the phone number based on or using a second machine-trained model. As an example, the second machine-trained model can receive as input the name options, similarity scores, associated contact records and contact record metadata. The second machine-trained model can provide as output a recommendation or prediction of the true name or even a recommendation on whether to approve the identity verification submission. The identity verification component 137 can use the recommendation or can consider the output of the second machine-trained model as another signal when deciding whether to approve the identity verification submission. The second machine-trained model can be trained on a dataset that includes a collection of accepted and rejected identity verification submissions along with constituent name options and contact record data and metadata. For example, the dataset can be manually constructed to improve the accuracy and minimize the error rate, measured as accepting identity verification submissions that should not have been accepted and/or rejecting identity verification submissions that should have been accepted.

After determining the true name associated with the phone number, the identity verification component 137 can compare the name provided with the identity verification submission with the true name. If the name provided with the identity verification submission matches the determined true name, the identity verification component 137 can approve the identity verification submission. If the name does not match or match sufficiently, the identity verification component 137 can reject the identity verification submission. In some examples, the identity verification component 137 can further initiate or recommend an additional identity verification process to be used to complete the verification. The additional identity verification process can include a more rigorous or frictional identity review when compared to the contact record-based approached described herein. In some examples, the name does not need to be a perfect match to the true name. For example, the name can be a partial match or represent a partial name that is equivalent to the true name (e.g., "Matt Abrams" compared to "Matthew Abrams"). The identity verification component can perform an additional similarity comparison between the name provided in the identity verification submission and the determine true name. If the resulting similarity score satisfies a threshold, the identity verification component 137 can approve the identity verification submission or initiate an additional identity verification process that is less onerous than would be used if the result similarity score does not satisfy the threshold.

The identity verification component 137 can use multiple threshold values to increase the precision of the identity verification process. In some examples, the identity verification component 137 can require that a phone number must be associated with a threshold number of contact records 140(A) in order to use the name option similarity or other contact record-based identity verification. As an example, if a phone number is not associated with a significant number of contact records 140(A), then the results of the contact record-based identity verification can be subject to fraudulent use or misrepresentation by actors who have attempted to stuff the datastore 128 with improper names. As another example, in a phone number is not associated with enough contact records 140(A) then the data may not be statistically likely to result in an accurate true name associated with the phone number. In some examples, the identity verification component can require that the similarity score for the determined true name satisfies a threshold level of similarity. If the similarity score for the determined true name is too low, it may indicate disagreement among the contact records about which name should be associated with the phone number. In some examples, the identity verification component 137 can require that a threshold number of contact records match the determined true name. If a small number or percentage of the contact records match the determine true name, it may indicate that potential attempted fraud through attempting to stuff the datastore 128 with invalid values. These and other threshold values may be used to filter and/or improve the results of the identity verification process.

In some examples, when a user fails IDV (e.g., the provided name does not match or match sufficiently to the determined "true" name), the payment service can flag the user as a fraudulent user. In other examples, when a user fails IDV, the payment service can determine that the provided name does not match or sufficiently match the determined true name but that the determined true name is associated with the user in some way (e.g., is a parent, sibling, friend), for example, as determined from transaction data, social media data, or the like, the payment service can notify the user of the mismatch and provide additional information to the user and/or the associated user. In some examples, when a user fails IDV, the payment service can prompt the user for additional or alternate information instead of or prior to flagging the user as a fraudulent user. In some examples, when a user fails IDV, the payment service can analyze the individual contact records stored in the database of the payment service to determine if the user is listed in more than a threshold number of individual contact records. If the user is listed in more than a threshold number of individual contact records, the user can be authorized for certain features or services. In some examples, the partial authorization of the user may enable access to some but not all features or services.

While FIG. 1B describes an IDV process using a name and provided identifier, such as a phone number, as described above, techniques described herein can be used to determine a "true" string or other type of data-whether that be a name, image, or other string of data-based on other strings of data provided from different data sources. For example, a true name of a user can be determined based on a provided phone number, email address, birthdate, or other identifier using techniques described herein. Further, while IDV processes described herein are described as "alternate IDV" processes, in some examples such IDV processes can be used in addition to conventional IDV processes. In some examples, as described above, the payment service can dynamically determine when to use conventional IDV or alternate IDV processes.

FIGS. 2A-6 and 20-24 illustrate example processes associated with techniques described herein. In at least one example, the processes can be performed by functional components described above with reference to FIG. 1A; however, processes are not limited to being performed by such functional components. Further, the processes include steps or operations that can be performed in any order and, in some examples, individual steps may be optional. The processes shown in FIGS. 2A-6 and 20-24 may be performed utilizing one or more processing devices (e.g., first user device 112(B), payment service system 106, merchant device 124) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. The processes shown in FIGS. 2A-6 and 20-24 may be performed utilizing one or more specialized components of the processing devices (e.g., onboarding component 117, account configuration component 119, or payment services component 121 of payment service system 106) consistent with the description here.

Particular embodiments may repeat one or more steps of the process of any of FIGS. 2A-6 and 20-24, where appropriate. Although this disclosure describes and illustrates particular steps of the process of any of FIGS. 2A-6 and 20-24 as occurring in a particular order, this disclosure contemplates any suitable steps of the process of any of FIGS. 2A-6 and 20-24 occurring in any suitable order. Moreover, although this disclosure describes and illustrates an example method as described above, including the particular steps of the process of any of FIGS. 2A-6 and 20-24, this disclosure contemplates any suitable method for performing the respective process, including any suitable steps, which may include all, some, or none of the steps of the process of any of FIGS. 2A-6 and 20-24, where appropriate. Furthermore, although this disclosure describes and illustrates particular components, devices, or systems carrying out particular steps of the process of any of FIGS. 2A-6 and 20-24, this disclosure contemplates any suitable combination of any suitable components, devices, or systems carrying out any suitable steps of the process of any of FIGS. 2A-6 and 20-24.

Figure 2B:
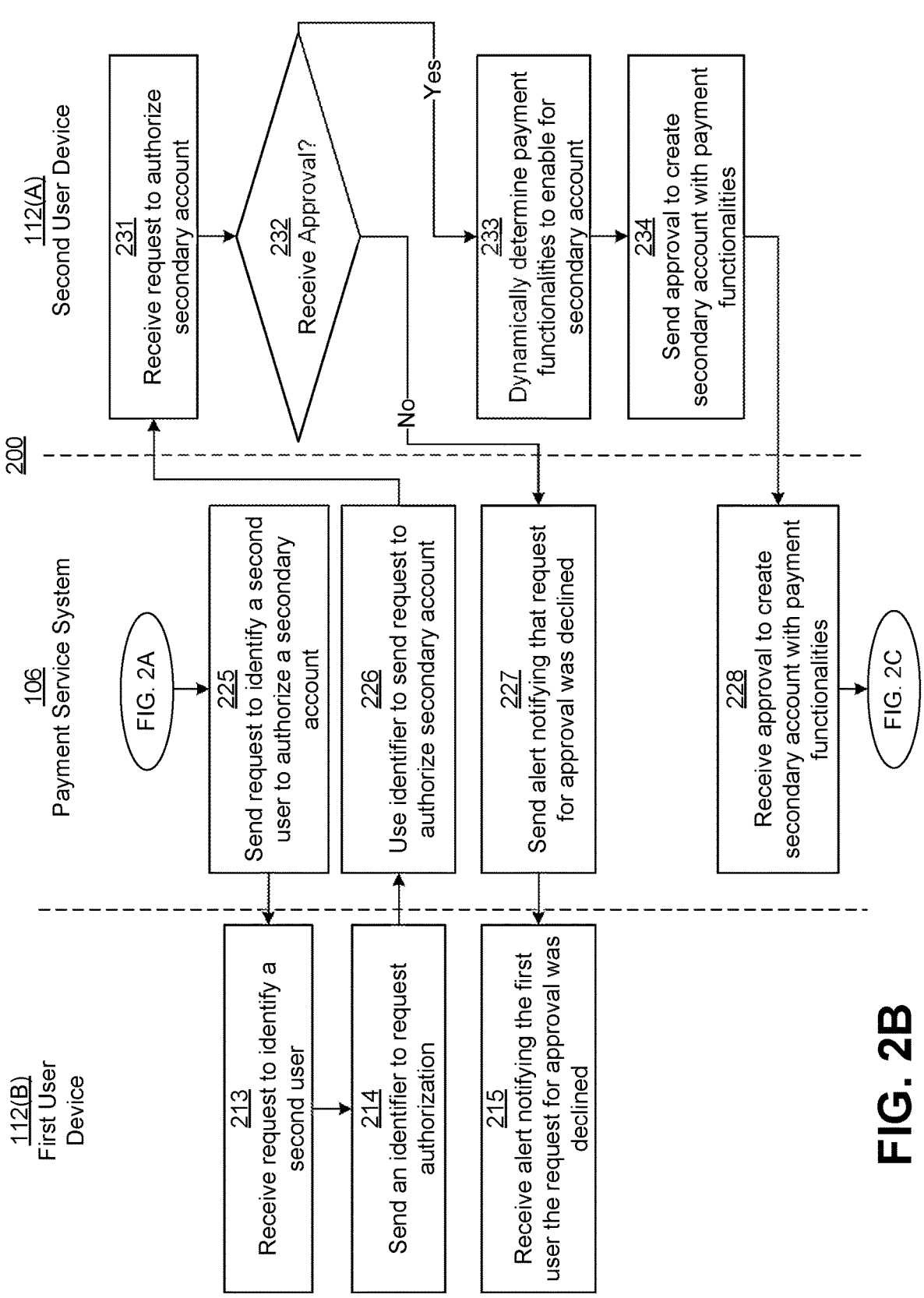
Figure 2C:
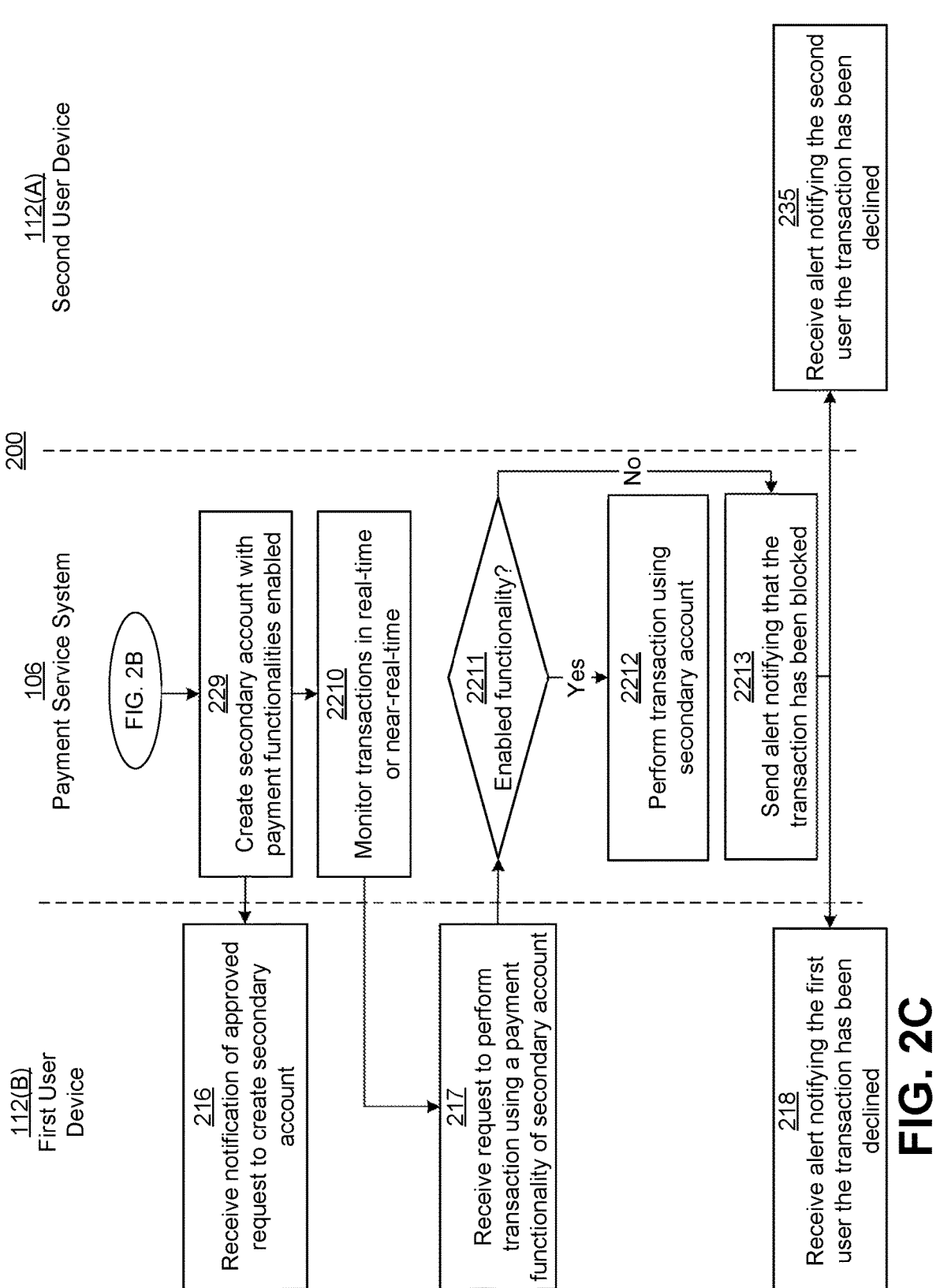

FIGS. 2A-2C are an example process 200 for an onboarding flow to create an account associated with a payment service system 106. Steps are described below as being performed by individual functional components of the payment service system 106; however, additional or alternative functional components can perform the steps in additional or alternative examples.

At step 211, a request to create a user account with a payment service is sent. As an example, a first user can send, via the first user device 112(B), a request to create a user account with a payment service system 106. For example, a first user device 112(B) may execute an application associated with the payment service system 106. The first user may navigate to a user interface requesting to create a user account to perform transactions, or otherwise access services, through the payment service system 106. The first user may therefore initiate an onboarding flow of the payment service to create a user account. The request to create the user account may include user data of the first user. The user data may include information of the first user, such as birthdate, location, email address, phone number, social security number, and the like. In some examples, the user data can be used for IDV purposes, as described above.

As described above, in some examples, the request can be received via an interaction with an interactive element, for example, a QR code, a link, or the like. In some examples, such an interactive element can be presented in association with an application, instant application (e.g., portion of an application), a website, music or video content, a profile of a user, or the like. In some examples, such an interactive element can be presented via platforms of third-party service providers, such as via gaming platforms, social medial platforms, music streaming platforms, or the like. In some examples, the interactive element can be associated with a customized payment instrument, an indication of interactions with the payment service, a goal or milestone, or completion thereof, or the like. As described above, in some examples, the interactive element can have embedded or encoded data that can be associated with a referral code, such that an interaction with the interactive element, for example via a single interaction ("one touch") can enable a user who shared the interactive element to receive a referral reward (e.g., a payment, a gift, a discount, etc.).

At step 221, the request is received with user data and an onboarding processing for onboarding a primary user 114 (A) is initiated. As an example, the onboarding component 117 receives the request to create a user account with user data. For example, the onboarding component 117 may receive information, such as birthdate, location, email address, phone number, social security number, and the like from the first user device 112(B). The onboarding component 117 initiates an onboarding process for onboarding a primary user 114(A) in response to the request to create a user account with the payment service.

At step 222, the onboarding component 117 can determine whether the user is eligible for a primary account (or not). As an example, the onboarding component 117 may determine whether the first user is eligible for a primary account using the user data. For example, the onboarding component 117 may store one or more requirement(s) or condition(s) for having primary accounts. In at least one example, the onboarding component 117 may compare the user data to the requirement(s) or condition(s) to determine whether the first user meets the requirement(s) or condition(s).

At step 223, if the first user is eligible to create a primary account (e.g., the user meets the requirement(s) or condition(s) to create a primary account), the onboarding component 117 may proceed with creating a primary account for the first user. That is, the onboarding component 117 can initialize a primary account onboarding flow for creating a primary account for the user.

At step 212, the first user device 112(B) can receive a notification of creation of a user account. For example, through the onboarding component 117, the payment service system 106 can send a notification of creation of a user account to the first user device 112(B). The first user of the first user device 112(B) can be notified of the creation of a primary account for the first user.

At step 224, if the first user is not eligible to create a primary account, the onboarding component 117 dynamically modifies the onboarding process and initializes an alternative onboarding process for onboarding a secondary user. For example, the onboarding component 117 may determine the user does not satisfy the requirement(s) or condition(s) for creating a primary account. The onboarding component 117 may dynamically modify the onboarding flow to include additional or alternative steps for the user to create a secondary account of the payment service system 106. The onboarding flow may be dynamically modified (e.g., automatically, in real-time or near-real-time, etc.) to include additional or alternative steps than those included in an onboarding flow for a primary user. That is, in some examples, a primary user and a secondary user may initiate an onboarding flow via the same step(s) (e.g., step 211) and, based on a determination that a user does not satisfy one or more requirements (e.g., age, legal status, geographic location, etc.), the onboarding component 117 can modify the onboarding flow to include additional or alternative steps for onboarding the first user. In at least one example, the onboarding flow for onboarding a secondary user can require authorization or approval from a primary user.

At step 225, a request to identify a second user to authorize a secondary account is sent. In this example, the second user can be a primary user. In an example, the onboarding component 117 of the payment service system 106 may send a request to identify a second user to authorize the creation of a secondary account. For example, the onboarding component 117 may request the first user via the first user device 112(B) to identify a second user who owns a primary account (or can own a primary account). Since the user may not meet the requirement(s) to create a primary account, the onboarding component 117 may associate a primary user who owns a primary account with a secondary account. As described above, the primary account is legally responsible for the secondary account. The primary account can be associated with a set of payment functionalities, a reduced subset of which can be associated with the secondary account. As described above, the secondary account can be an independent account mapped to, or otherwise associated with, the primary account, a sub-account of the primary account, or the like.

At step 213, the request to identify a second user is received. As an example, the first user device 112(B) may receive the request to identify a second user to request to authorize a secondary account. For example, the first user device 112(B) may generate a notification to present to the first user and to request the first user to identify a second user to request to authorize a secondary account. The first user may input an identifier to request a second user to authorize a secondary account. The identifier can comprise an email address, a phone number, an identifier having a particular syntax, a combination of the foregoing, or the like.

At step 214, the identifier for the first user is sent to request authorization. As an example, the first user device 112(B) may send the identifier for the second user to request authorization from the second user to approve the secondary account for the first user. For example, the first user may input an identifier into a payment service app 110(B) executing on the first user device 112(B) to send to the payment service system 106. The first user may input the identifier, email address, or phone number into a user interface of a payment service app 110(B) to send the request to the payment service system 106.

At step 226, the identifier is used to send a request to authorize the secondary account. As an example, the onboarding component 117 of the payment service system 106 may receive the identifier to send the request to a second user to authorize the secondary account. For example, the onboarding component 117 may receive the identifier from the first user device 112(B). The onboarding component 117 may additionally or alternatively receive a phone number or an email address. The onboarding component 117 may query a datastore to determine whether there is an account associated with the identifier. The onboarding component 117 may determine whether a primary account is associated with the identifier. If the identifier is associated with a primary account, the onboarding component 117 may proceed to prepare and send a request to a second user device 112(A) associated with the primary account. For example, the onboarding component 117 may send an email to the second user associated with the identifier, send a notification through a payment service app installed on the second user device 112(A), send a text to the phone number associated with the primary account linked to the identifier, or the like.

In some examples, as described above, the onboarding component 117 can determine whether the second user (e.g., primary user 114(A)) is a suitable or proper primary user for authorizing the secondary account. That is, the onboarding component 117 can verify the second user for account authorization, as described above. In some examples, as described above, while the first user is awaiting authorization from the identified second user, the payment service system 106 can generate a provisional account for the first user and can enable the first user to use one or more payment functionalities. In some examples, the provisional account can remain active until authorization or approval from the second user is received or until an event occurs, for example, a period of time lapses, more than a threshold number of transactions are performed, more than a threshold amount of funds have been transferred, or the like.

Although not illustrated, if the identifier is not linked to a primary account, the onboarding component 117 may generate a request to create a primary account and send the request to the second user device 112(A) via electronic message based on the information provided by the first user device 112(B). The second user may then follow their own onboarding flow to create a primary account before returning to the process of authorizing a secondary account. Additional details are provided below.

In some examples, the first user device 112(B) may receive a generated request from the payment service system 106 and may send the generated request to the second user device 112(A) via a text message, email, in-app notification, or the like. That is, in some examples, the first user device 112(B) can send the request to the second user device 112(A) via a different service than the payment service.

At step 231, the request to authorize the secondary account is received. As an example, the second user device 112(A) may receive the request to authorize the secondary account. For example, the second user device 112(A) may receive the request from the onboarding component 117 of the payment service system 106. The second user device 112(A) may receive the request in one or more different forms, including a notification from a payment service app, an email, or a text. The second user may interact with the request in different user interfaces (e.g., in an email, a text, or selectable element within a user interface of a payment service app). In at least one example, the second user can interact with the request such to authorize or otherwise approve creation of the secondary account for the first user. Such approval can cause the secondary account to be mapped to, or otherwise associated with, the primary account of the second user.

At step 232, the second user device 112(A) determines whether an approval is received from a second user. The second user can use a payment service app 110(A) executing on the second user device 112(A) to input a response to the request for approval. As an example, the second user can select to confirm the request for approval or reject the request for approval.

At step 227, if the second user device 112(A) receives a rejection of the request for approval, then the onboarding component 117 of the payment service system 106 can send an alert notifying the first user that a request for approval was declined. For example, the onboarding component 117 of the payment service system 106 can send an alert to a first user device 112(B) notifying the first user that the request for approval was declined.

At step 215, the first user device 112(B) receives an alert notifying the first user the request for approval was declined. For example, the first user device 112(B) can receive one or more of a text, an email, a notification on a payment service app 110(B) notifying the first user that the request for approval of a secondary account was declined by the second user. Although not shown, the first user may be notified to input another identifier of a user to request approval for authorization of a secondary account.

At step 233, which can be optional, payment functionalities to enable for a secondary account are dynamically determined. As an example, the second user may select one or more payment functionalities of the payment service to enable for the secondary account using a user interface of a payment service app executing on the second user device 112(A). As described above, the one or more payment functionalities to enable may be a subset of the payment functionalities enabled for the primary account associated with the second user. As described above, the payment functionalities can be enabled, disabled, or modified at any time by the payment service, the first user, or the second user. In some examples, the payment functionalities associated with the secondary account can be determined by the payment service system 106.

At step 234, approval to create the secondary account, which in some examples can be associated with the payment functionalities, is sent. As an example, the second user device 112(A) may send an approval to create the secondary account with the selected payment functionalities enabled for the secondary account to the account configuration component 119 of the payment service system 106. For example, the second user device 112(A) may identify payment functionalities to enable for the secondary account. While not shown, the second user may also send a rejection to authorize the secondary account, which terminates the process.

At step 228, the approval to create the secondary account with the payment functionalities is received. As an example, the account configuration component 119 of the payment service system 106 may receive the approval to create the secondary account with the selected payment functionalities. For example, the account configuration component 119 may receive the approval to create the secondary account from the second user device 112(A). The process may continue to FIG. 2C At step 229, the secondary account is created with the payment functionalities enabled. As an example, the account configuration component 119 of the payment service system 106 may create the secondary account with the selected payment functionalities enabled. For example, the account configuration component 119 may generate a mapping, or other association, between the primary account of the second user and the secondary account of the first user and store the mapping, or other association, in a datastore of the payment service system 106. In some examples, the mapping can indicate that the primary account is legally responsible for actions of the secondary account. The mapping can be used to determine where to route requests for authorization, notifications related to transaction activity, or other requests associated with the secondary account. In some examples, instead of, or in addition to mapping the secondary account to the primary account, a group identifier or other association mechanism can be used to indicate an association between the primary account and the secondary account.

At step 216, a notification that the request to create the secondary account has been approved is received. As an example, the first user device 112(B) may receive a notification that the secondary account has been approved and the selected payment functionalities that are available associated with the secondary account. The notification may be in the form of an electronic message, such as an in-app or push notification, email, or a text message, to the first user device 112(B).

At step 2210, the payment services component 121 can monitor transaction data associated with transactions of the created secondary account conducted using the payment service system 106. As described above, the payment services component 121 can monitor the transaction data in real-time or near-real-time. The transaction data may include one or more of transactions with merchants, transactions with other users, bill payments, subscription payments, recurring payments, loan repayment, combinations of the foregoing, or the like.

At step 217, a request to perform a transaction using a payment functionality of the secondary account is received. As an example, the first user may attempt to perform a transaction using a payment functionality of the secondary account using the first user device 112(B). For example, the first user may attempt to make a P2P payment, such as sending funds to another user. As another example, the first user may attempt to perform a POS transaction at a merchant using a payment instrument associated with the secondary account. The request to perform the transaction may be sent to the payment services component 121 of the payment service system 106.

At step 2211, it is determined whether the payment functionality associated with the transaction is enabled for the secondary account. As an example, the payment services component 121 may receive the request to perform the transaction. For example, the payment service 204 may receive the request to perform the transaction from the first user device 112(B). The payment services component 121 may determine whether the secondary account is permitted to perform the requested transaction based on the enabled payment functionalities associated with the secondary account. If the payment services component 121 determines that the secondary account is allowed to perform the transaction because the payment functionality is enabled, then the process continues to step 2212. In some examples, the payment services component 121 can determine whether one or more conditions apply to the transaction or one or more approvals or authorizations are required before continuing to step 2212.

At step 2212, the transaction is performed. As an example, based on the determination at step 2211, where the payment services component 121 determines that the primary account is allowed to perform the requested transaction, and initiates the requested transaction on behalf of the first user using the secondary account. As an example, the payment services component 121 may adjust a balance of the secondary account and an account of another user of the payment service according to the transaction details. The payment services component 121 may record the transaction for later review by the first user or the second user.

If, at step 2211, the payment services component 121 determines that the functionality is not enabled for the secondary account, then the process continues to step 2213. At step 2213, the transaction is blocked (e.g., denied or declined) and an alert notifying that the transaction has been blocked is sent. As an example, the payment service system 106 may notify the first user associated with the secondary account that the transaction has been blocked. For example, the payment service system 106 may send an alert to the first user device 112(B) to notify the first user that the transaction has been blocked. As another example, the payment service system 106 may notify the second user associated with the primary account that first user has attempted a transaction that has been blocked as using a functionality not enabled by the second user. For example, the payment service system 106 may send an alert to the second user device 112(A) to notify the second user that the transaction has been blocked.

At step 218, the alert notifying the first user that the transaction has been declined is received. As an example, the first user device 112(B) may receive the alert notifying the first user the transaction has been blocked. For example, the first user device 112(B) may receive the alert from the payment service system 106. The notification may be sent via one or more of a payment service app, an email, or text. The notification to the first user may include instructions to request the second user to enable the payment functionality or otherwise approve the transaction via a user interface element. The user interface element can send a request to the second user associated with the primary account linked to the first user's secondary account.

At step 235, the alert notifying the second user that the first user has attempted a transaction that has been declined is received. As an example, the second user device 112(A) may receive the alert notifying the second user that the first user has attempted a transaction which has been blocked as using or requiring permissions to use a payment functionality that is not enabled. The notification may be sent via one or more of a payment service app, an email, or text. The notification to the second user may include instructions to request the second user to enable the payment functionality via the payment service app or approve the transaction.

Figure 3:
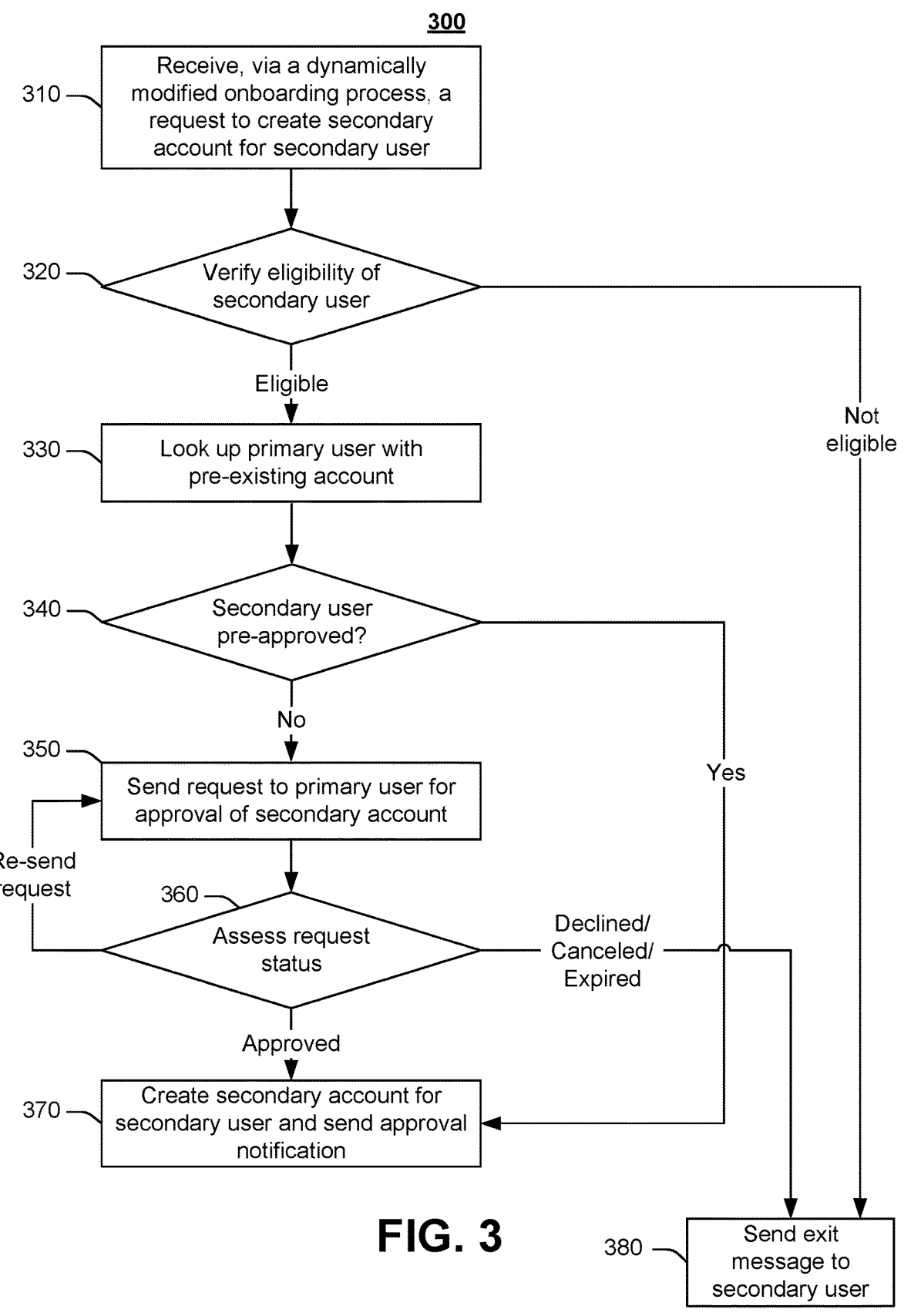
FIG. 3 illustrates an example process for controlling creation of a secondary account for a secondary user by requiring approval by a primary user who already has an account with the payment service according to some embodiments disclosed herein.
Figures 7A, 7B, 7C:
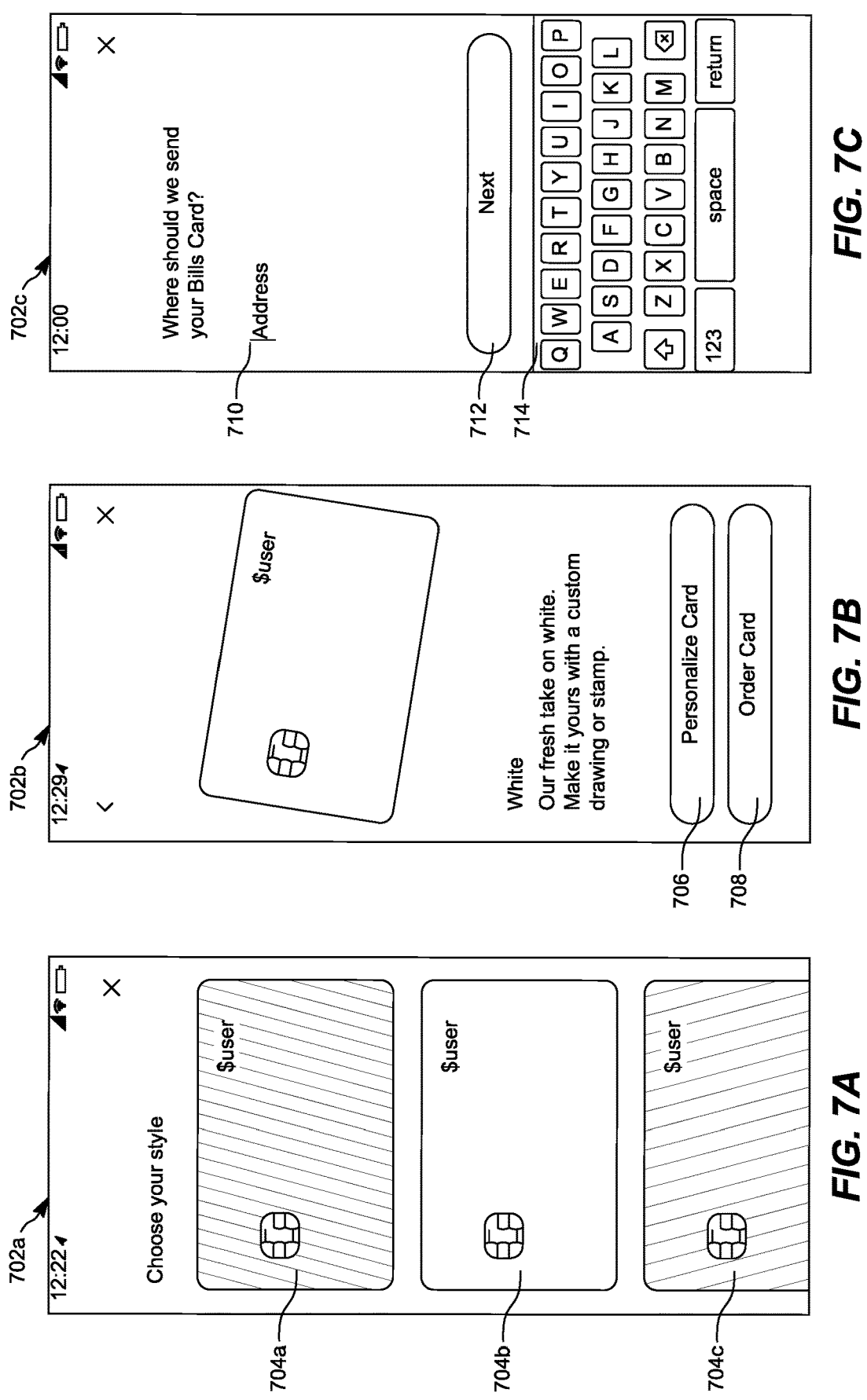
FIGS. 7A-7AL illustrate various example graphical user interfaces (GUIs) for a secondary account creation workflow as displayed on a user device of a secondary user according to some embodiments disclosed herein.

FIG. 3 illustrates an example process 300 for controlling creation of a secondary account for a secondary user by requiring approval by a primary user who already has a primary account with the payment service system 106. Example graphical user interfaces corresponding to steps depicted in FIG. 3 are illustrated in FIGS. 7A-7AL and FIGS. 8A-8L. Steps illustrated may be optional or combined in additional or alternative examples.

At step 310, a request to create a secondary account for a secondary user is received via a dynamically modified onboarding process. For example, the onboarding component 117 receives a request to create a secondary account for a secondary user. In some examples, the request can be initiated by a secondary user 114(B) who sends a request to the onboarding component 117 to create the secondary account for the secondary user 114(B). In at least one example, the request can be initiated by a secondary user 114(B) from an application. For example, the secondary user 114(B) can download an instance of payment service app 110(B), or a portion thereof, provided by payment service system 106 and initiate the request from within the instance of payment service app 110(B), or a portion thereof. In some examples, an instance of payment service app 110(B) can be downloaded onto the user device 112(B) from an app store or the like. In some examples, an instance of payment service app 110(B) can be downloaded on the user device 112(B) based on an interaction with an interactive element, such as a quick response (QR) code, barcode, etc. In some examples, an instance of payment service app 110(B) can be downloaded on the user device 112(B) based on a request to redeem a gift of fiat currency, cryptocurrency, stock, a gift card, or the like (e.g., to claim the gift). In some examples, the request can be initiated from a web browser.

In some examples, the request can be associated with user data. In some examples, the onboarding component 117 may request the secondary user 114(B) to provide certain information (see, e.g., FIGS. 7A-7E) in order to set up the secondary account. In some examples, such information can be user data, which can include birthdate, location, email address, phone number, social security number, and the like of the secondary user 114(B). In some examples, the user data can be used for IDV purposes. In some examples, the secondary user 114(B) may not have user data that can be used for conventional IDV processes. As such, in some examples, the payment service system 106 can initiate an alternative IDV process, as described above.

At step 320, the eligibility of the secondary user 114(B) to create an account is verified. For example, the onboarding component 117 determines the eligibility of the secondary user 114(B) to create a secondary account based on user data, as described above. That is, as described above, certain accounts can be associated with requirement(s) or condition(s) indicating eligibility of users to open such accounts. For example, primary account eligibility can be conditioned on a user being 18 years old or older. In some examples, secondary account eligibility can be conditioned on a user being 13-17 years old (inclusive) and a student. The onboarding component 117 can verify the eligibility of the secondary user for a secondary account based at least in part on a determination of an age of the secondary user 114(B), as determined from the birthdate information provided. As such, the onboarding component 117 can verify the eligibility of the second user using this information.

Figures 7D, 7E, 7F:
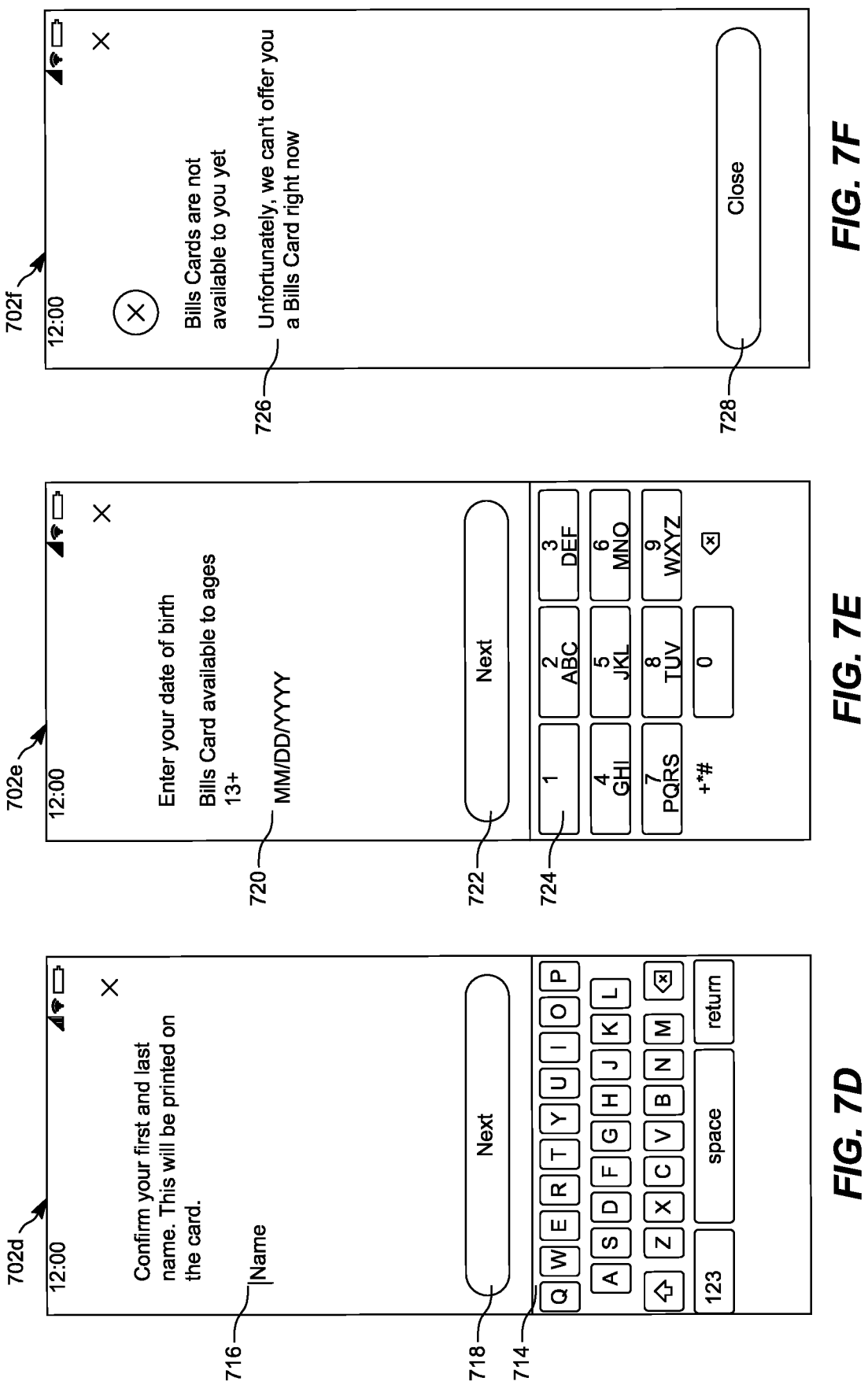
Figures 7J, 7K, 7L:
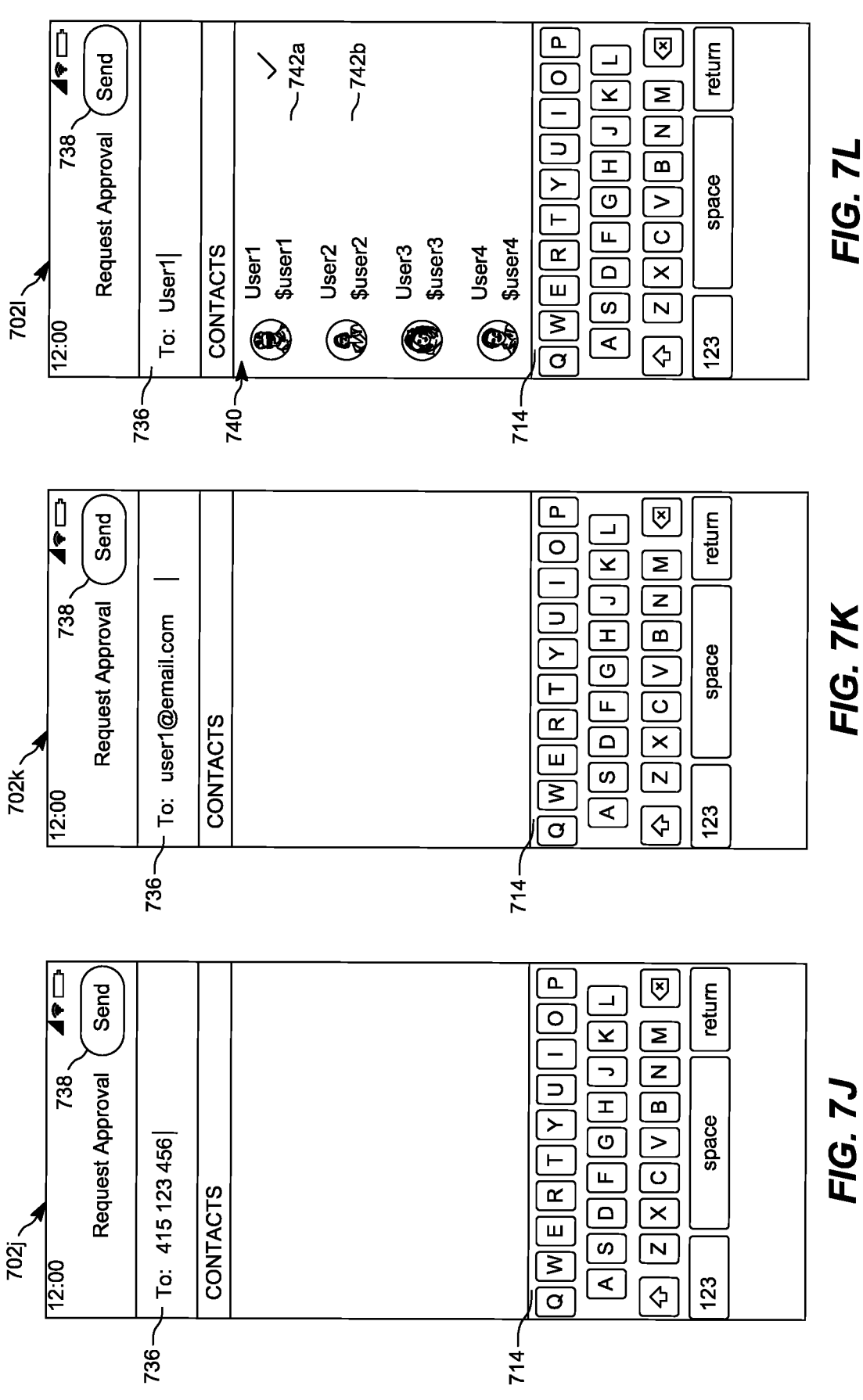

If the secondary user 114(B) is determined not to be eligible, the payment service system 106 may display an error message (e.g., FIG. 7F).

If the secondary user's 114(B) eligibility is verified, the onboarding component 117 may confirm the request (e.g., FIG. 7G). In at least one example, a determination of eligibility for a secondary account can cause the onboarding component 117 to modify the onboarding flow from an onboarding flow for onboarding a primary user 114(A) to an onboarding flow for onboarding a secondary user 114(B). In at least one example, such a modification can introduce the requirement of an authorization from a primary user 114(A). As such, the onboarding component 117 can request an identifier for a primary user 114(A) (e.g., FIGS. 7H-7L), which can be used to look up the primary user 114(A) in the datastore 128 associated with the payment service system 106. An example of an identifier includes one or more of an email address, phone number, an identifier having a particular syntax, or the like.

At step 330, the onboarding component 117 may look up a primary user 114(A) with pre-existing account. For example, after receiving the identifier for the primary user 114(A), the onboarding component 117 can query the datastore 128 of the payment service system 106 to determine whether the identifier for the primary user 114(A) is associated with an account record of a primary account. If an account for the primary user 114(A) does not exist, based on the provided identifier, the onboarding component 117 may display an error message (e.g., FIG. 7M). Here, because this example refers to a primary user that has an account with the payment service, the onboarding component 117 can look up and identify the primary user associated with a pre-existing account.

In some examples, the onboarding component 117 can determine whether the primary user identified by the identifier is a suitable or proper primary user 114(A) to be associated with a requested secondary account. That is, the payment service system 106 can determine whether the primary user 114(A) identified and the secondary user 114(B) have an existing relationship. To do so, the payment service system 106 may use contacts of the primary user 114(A) and the secondary user 114(B), social network connections of the primary user 114(A) and the secondary user 114(B), one or more existing relationships (e.g., retrieved from a third-party service), geolocation, combinations of the foregoing, or the like. Additional details are provided above.

At step 340, it is determined if the secondary user 114(B) is pre-approved to create a secondary account. For example, the onboarding component 117 can review the account record of the primary account of the primary user 114(A) to determine whether the primary user 114(A) has indicated a secondary user 114(B) is authorized to create a secondary account. If the primary user 114(A) has pre-approved the secondary user 114(B), the onboarding component 117 may proceed directly to step 370, where the secondary account for the secondary user 114(B) is created. As such, such pre-approval or authorization can expedite the onboarding flow for the secondary user 114(B).

Figures 7M, 7N, 7O:
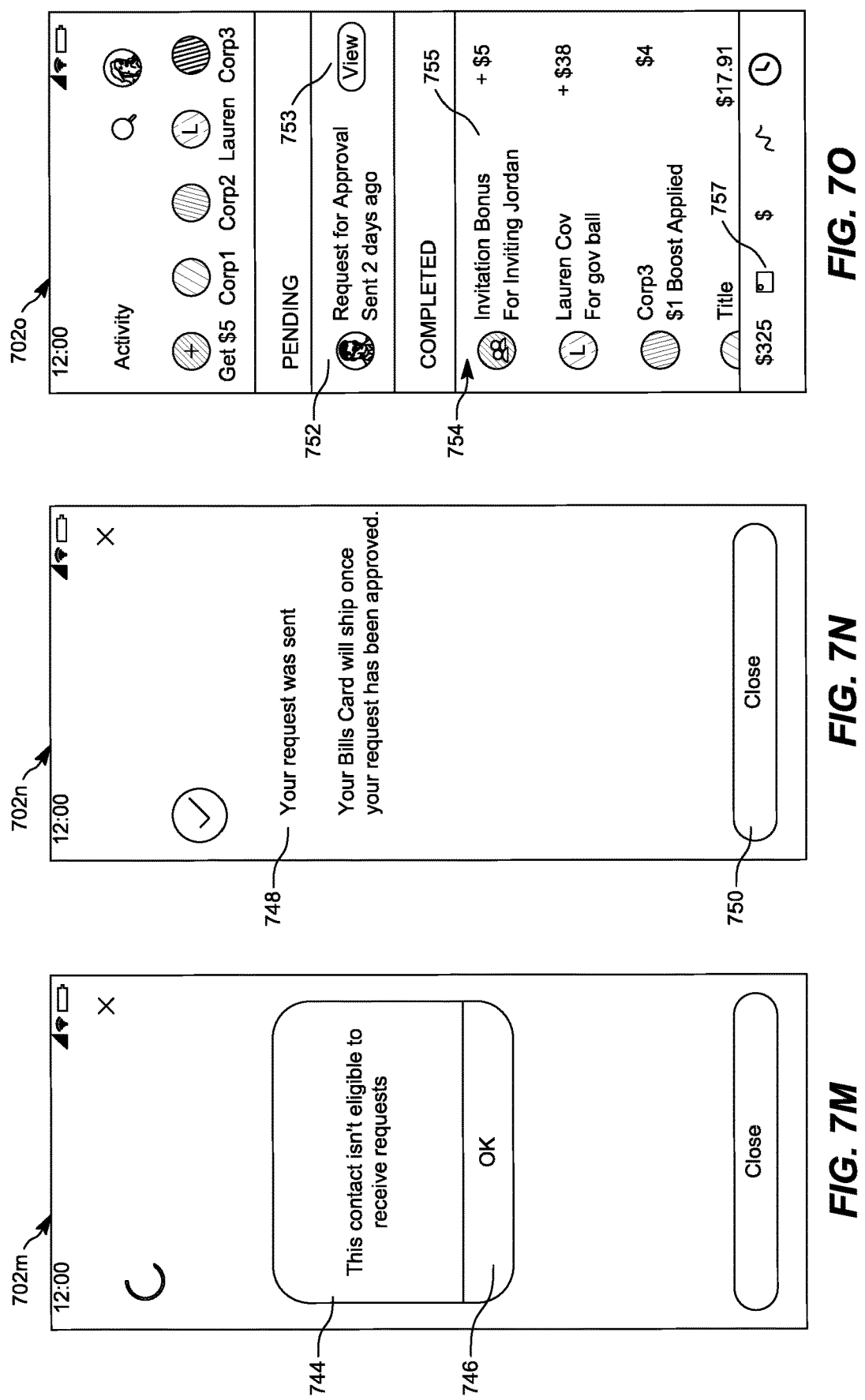

Otherwise, at step 350 the onboarding component 117 sends a request to the primary user 114(A) to request approval to create the secondary account (e.g., FIGS. 8A-8E) and displays a confirmation that the request was sent (e.g., FIG. 7N). For example, the onboarding component 117 may send a notification to the user device 112(A) of the primary user 114(A) requesting the primary user 114(A) to approve the secondary account of the secondary user 114 (B). The notification may appear as a user interface element within a payment service app 110(A) executing on the user device 112(A) of the primary user 114(A). When the primary user 114(A) reviews the request, the primary user 114(A) may configure payment functionalities for the secondary account, as described above. In some examples, the payment functionalities associated with the secondary account can be a reduced set of payment functionalities compared to the payment functionalities associated with the primary account. In some examples, the primary user 114(A) can additionally or alternatively establish one or more condition(s) associated with how the secondary user can transact using the secondary account. Examples of configuring payment functionalities, conditions, and the like are described above with reference to FIG. 1A. The primary user 114(A) may have access to modify payment functionalities, rules, conditions, or the like with the secondary account at any time. Once the request has been sent to the primary user 114(A), the secondary user 114(B) may be able to check the status of the pending request in the payment service app 110(B) (e.g., FIGS. 7O-7Q), re-send the request if needed (e.g., FIGS. 7R-7S, 7U-7W), and initiate cancellation the request if desired (e.g., FIG. 7T).

At step 360, the onboarding component 117 assesses the status of the request. For example, if the request status has progressed from a pending status to, for example, an approved status, expired status, declined status, etc., the secondary user 114(B) may be able to view the state of their request in the payment service app 110(B) (e.g., 7X-7AF), whether approved, expired, or declined. If the onboarding component 117 determines that the request was approved by the primary user (e.g., FIG. 8G), then the process 300 may continue to step 370, where the onboarding component 117 may create the secondary account and send an electronic notification to the secondary user 114(B) (e.g., FIGS. 7AG-7AI). For example, the onboarding component 117 may create a secondary account for the secondary user 114(B) and send an approval notification to the user device 112(B) of the secondary user 114(B). The user device 112(B) may present the notification to the secondary user 114(B) through the payment service app 110(B) executing on the user device 112(B). The onboarding component 117 may update the view of the state of the request (e.g., FIGS. 7X-7Z). The onboarding component 117 may create a mapping, or other association, between the secondary account and the primary account after the secondary account is created. The onboarding component 117 may store the mapping, or other association, in the datastore 128 for reference and future use.

If the request was declined by the primary user 114(A) (e.g., FIG. 8F), the onboarding component 117 of the payment service system 106 may update the view of the state of the request (e.g., FIGS. 7AD-7AF). At step 380, the onboarding component 117 may send an exit message to the secondary user 114(B) to let them know that the primary user 114(A) has declined the request to authorize a secondary account (e.g., FIGS. 7AJ-7AL). For example, the onboarding component 117 may send an exit message to the user device 112(B) of the secondary user 114(B). The user device 112(B) may present the exit message to the secondary user 114(B) through the payment service app 110(B) executing on the user device 112(B). The exit message may terminate the onboarding flow.

Figure 4:
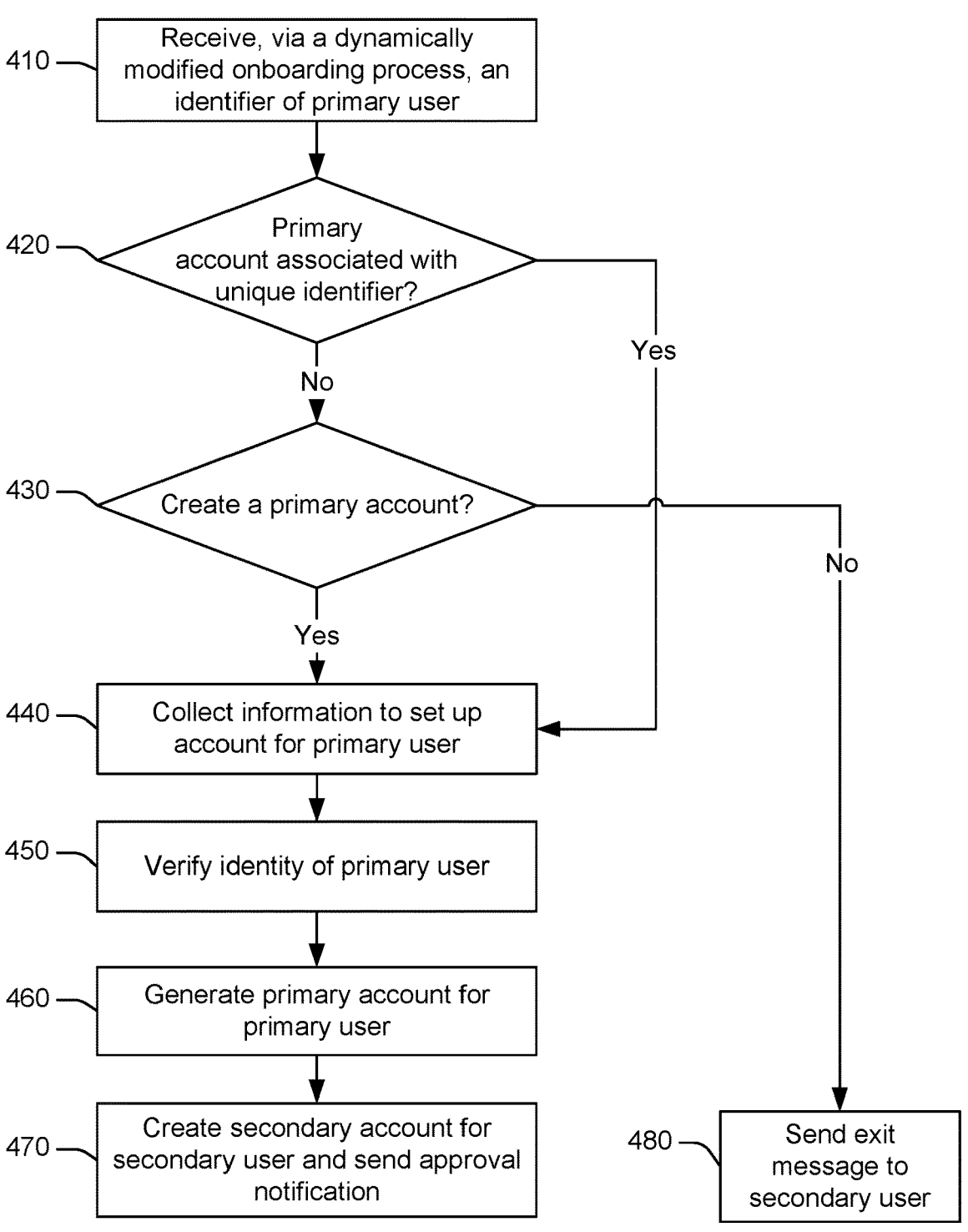
FIG. 4 illustrates an example process for controlling creation of a secondary account for a secondary user by requiring approval by a primary user who does not yet have an account with the payment service according to some embodiments disclosed herein.
Figures 9A, 9B, 9C:
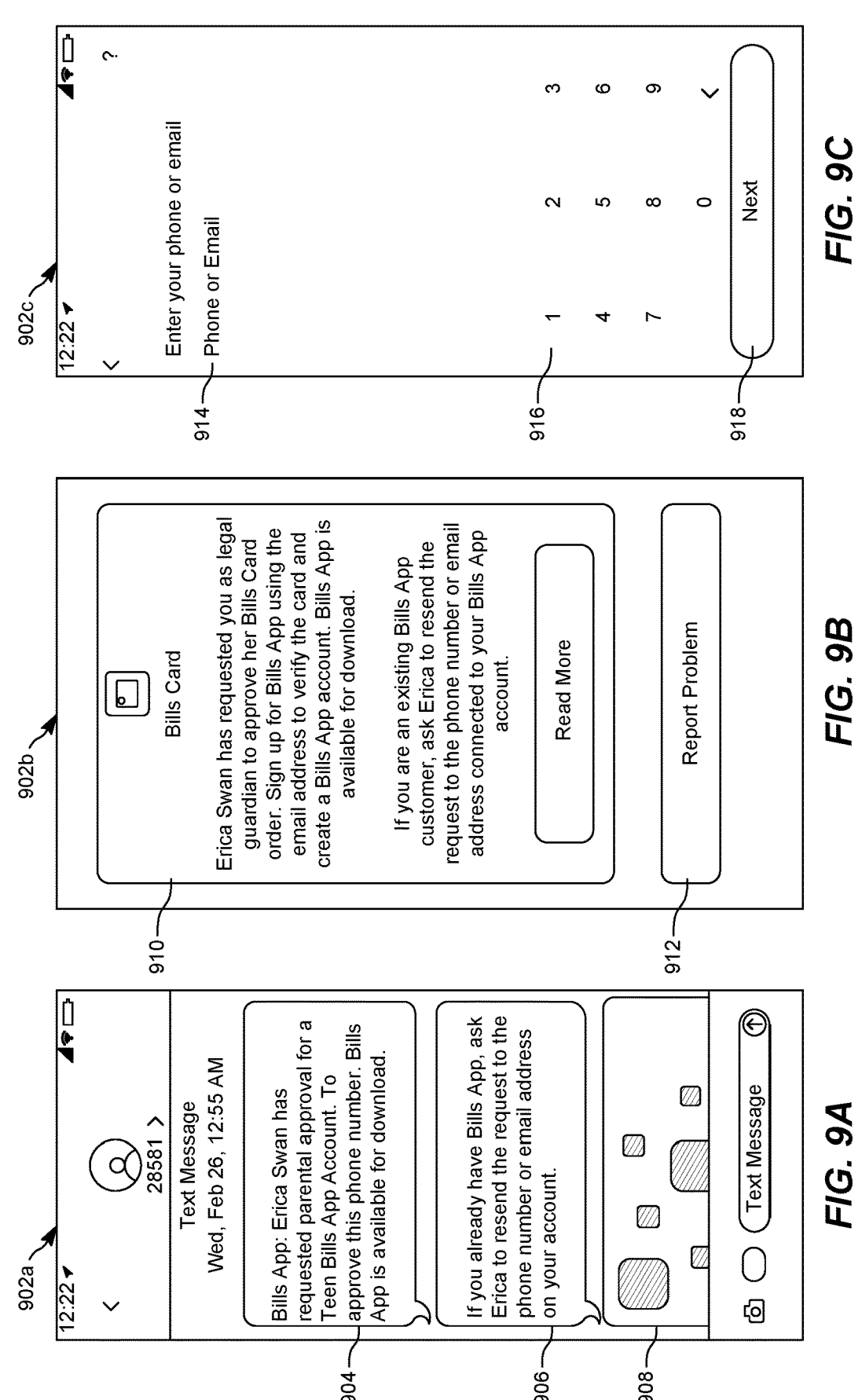
FIGS. 9A-9O illustrate various example GUIs for a secondary account creation workflow as displayed on a user device of a primary user who does not yet have an account with the payment service according to some embodiments disclosed herein.

FIG. 4 illustrates an example process 400 for controlling creation of a secondary account for a secondary user 114(B) by requiring approval by a primary user 114(A) who does not yet have an account with the payment service system 106. Example graphical user interfaces corresponding to steps depicted in FIG. 4 are illustrated in FIGS. 9A-9O. This process 400 begins similarly to the process 300 of FIG. 3, where the process 400 may initially start with steps 310 and 320. The process 400 may continue to step 410 if the eligibility of the secondary user is verified, where the onboarding component 117 may receive, via a dynamically modified onboarding process, an identifier intended to identify a primary user 114(A) from the secondary user 114(B) via user device 112(B). The identifier can be received in association with a request for authorization or approval of the primary user 114(A) to create the secondary account.

At step 420, the onboarding component 117 may determine whether there is a primary account associated with the identifier received from the user device 112(B). For example, the onboarding component 117 may access one or more datastores 128 to perform a look up or other query to determine whether the identifier is associated with a primary account. If there is a primary account associated with the identifier, then the process 400 continues to step 440. However, if there is no primary account associated with the identifier based on the provided identifier, then the process 400 proceeds to step 430, where the onboarding component 117 may send an electronic notification to the primary user 114(A) using the provided identifier (e.g., FIGS. 9A, 9B). The electronic notification can prompt the primary user 114(A) to create a primary account. In an example, the primary user 114(A) can choose to enter the information required to establish an account with the onboarding component 117 for the primary user 114(A) (e.g., FIGS. 9C-9H). If the primary user 114(A) decides to create a primary account, then the process 400 may proceed to step 440. However, if the primary user 114(A) does not want to create a primary account, then the process 400 may continue to step 480, where the onboarding component 117 sends the exit message to the secondary user 114(B). For example, the onboarding component 117 may send a message to the user device 112(B) of the secondary user 114(B) to notify the user the primary user 114(A) does not own a primary account. The exit message may terminate the onboarding flow.

At step 440, the onboarding component 117 collects the information to set up an account for the primary user 114(A). For example, the onboarding component 117 may send a request to collect information to the user device 112(A) of the primary user 114(A) (e.g., FIGS. 9K-9N). The primary user 114(A) may input information through a payment service app 110(A) executing on the user device 112(A). In some examples, the primary user 114(A) may first need to download the payment service app 110(A) or a portion thereof to input such information. In at least one example, the information provided can correspond to user data, which can include birthdate, location, email address, phone number, social security number, and the like of the secondary user 114(B). In some examples, in response to determining, based on user data received, that the primary user 114(A) is eligible for a primary account (instead of a secondary account), then the onboarding flow may continue to request further information for creation of the primary account (e.g., FIGS. 9C-9H). That is, the onboarding component 117 can determine, based on the user data and requirement(s) or condition(s) for creating a primary account, that the primary user 114(A) is eligible for a primary account. As such, the onboarding component 117 can execute an onboarding flow for a primary user account, which as noted above, can be different than the onboarding flow for the secondary user account. In some examples, the primary account onboarding flow may request additional or alternative information than the secondary account onboarding flow. Notably, however, the primary account onboarding flow may not include the requirement for primary account authorization or approval as is required for secondary account creation.

At step 450, the onboarding component 117 verifies the identity of the primary user 114(A). For example, the onboarding component 117 may use an IDV flow to verify the identity of the primary user 114(A). The IDV flow may use information such as name, date of birth, social security number, biometric information, entry of a code sent to a communications identifier, information stored locally on a user device 112(A) of the primary user 114(A), third-party data, etc.

At step 460, the onboarding component 117 generates a primary account for the primary user 114(A). In at least one example, based at least in part on generating the primary account for the primary user 114(A), the onboarding component 117 can obtain an authorization for generation of the secondary account for the secondary user 114(B). In some examples, the generation of the primary account triggers the authorization of the secondary account without further input from the primary user 114(A). In some examples, a user interface can be presented to the primary user 114(A) to request authorization for the secondary account. In some examples, the primary user 114(A) can configure payment functionality(s), condition(s), rule(s), or other restriction(s) in association with the authorization to create the secondary account.

At step 470, the onboarding component 117 creates the secondary account for the secondary user 114(B) and sends an approval notification to the secondary user 114(B) (e.g., FIG. 9O). For example, the payment service system 106 may send a confirmation message to the user device 112(B) of the secondary user 114(B) indicating that the primary user 114(A) authorized the secondary account.

Figure 5:
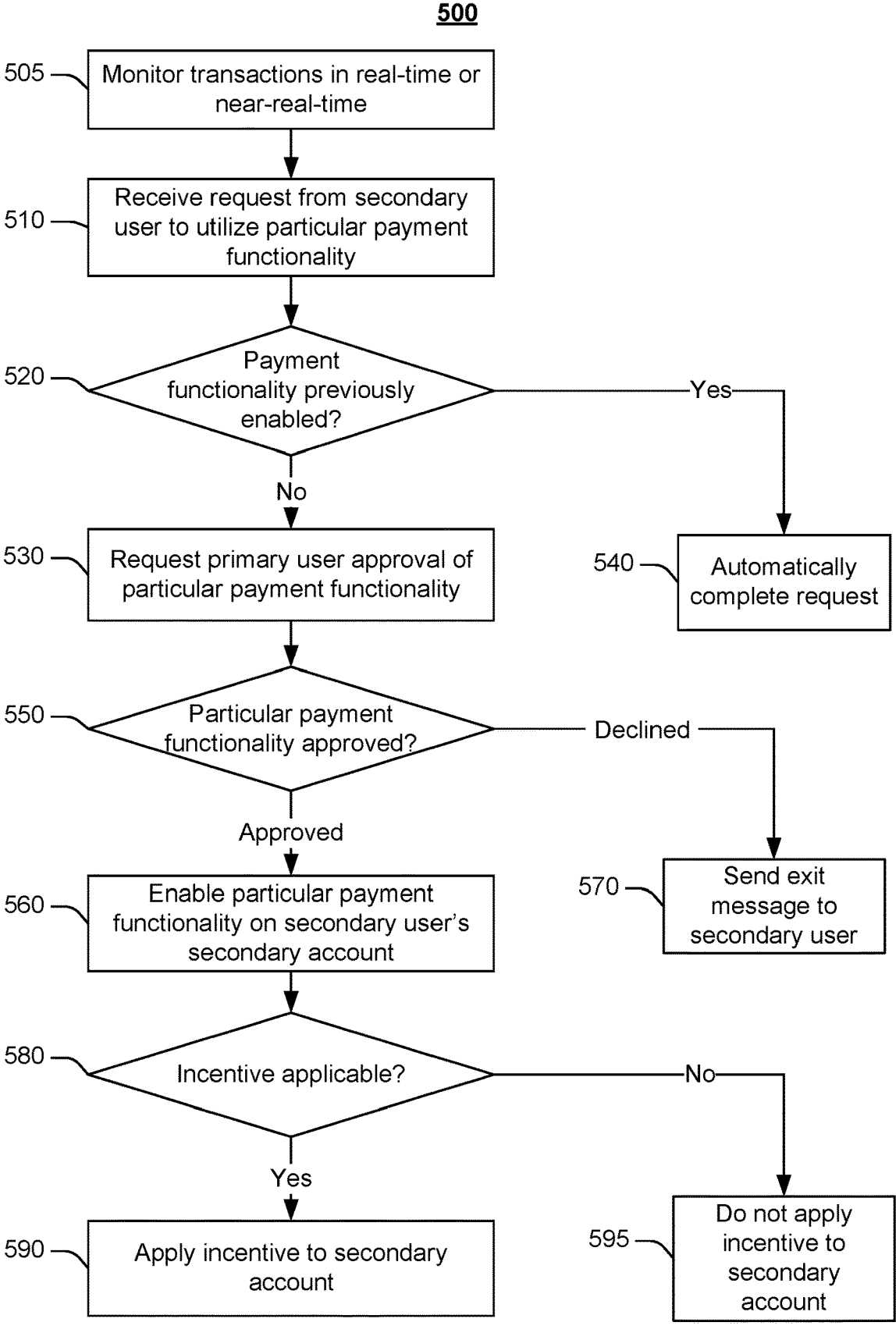
FIG. 5 illustrates an example process for controlling enablement of a specific functionality of a secondary account for a secondary user by requiring approval by a primary user according to some embodiments disclosed herein.
Figures 10A, 10B, 10C:
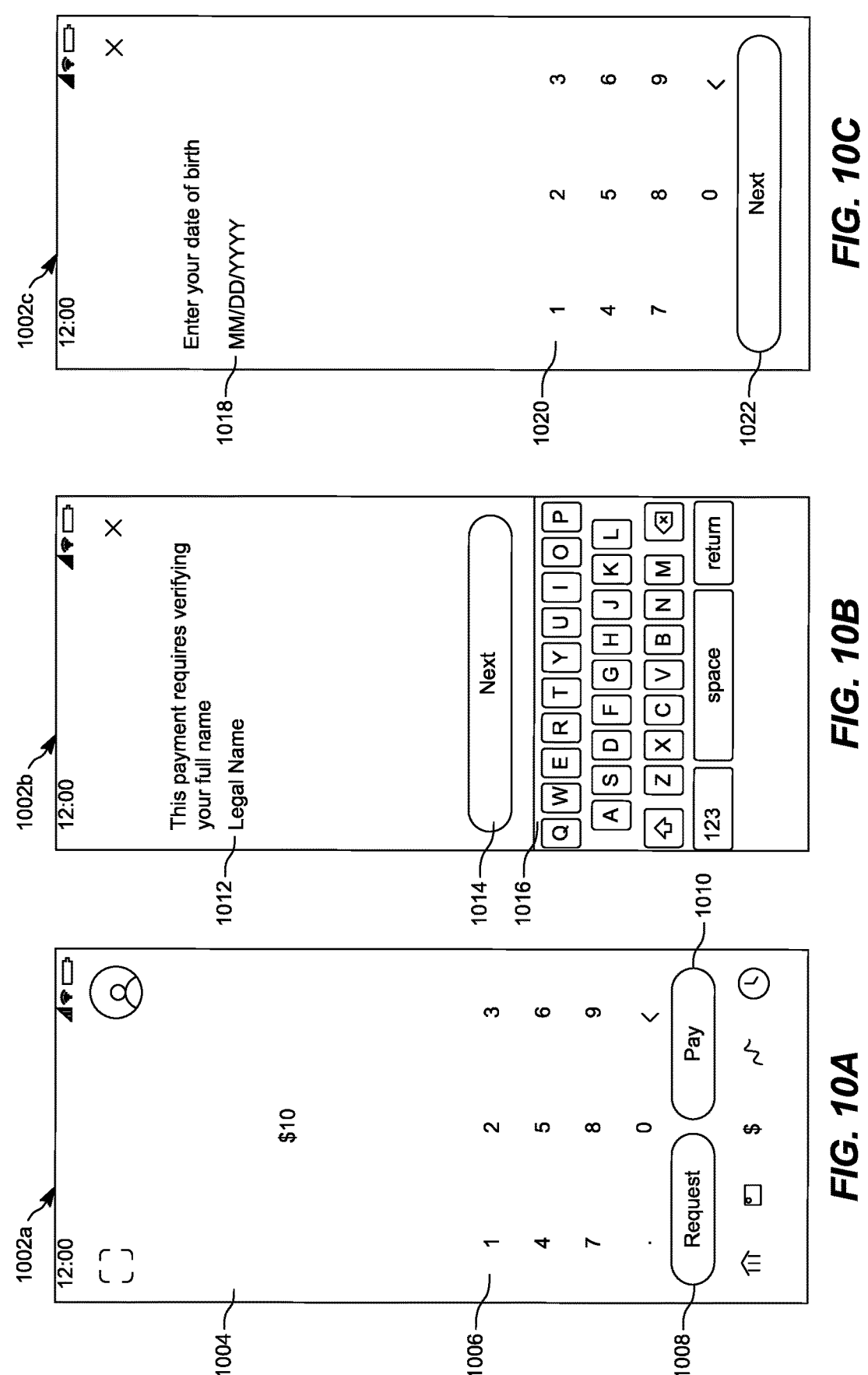

FIG. 5 illustrates an example process 500 for controlling enablement of a specific functionality of a secondary account for a secondary user 114(B) by requiring approval by a primary user 114(A). Example graphical user interfaces corresponding to steps depicted in FIG. 5 are illustrated in FIGS. 10A-10N. The process 500 may begin at step 505, where the payment services component 121 can monitor transaction data associated with transactions of the created secondary account conducted using the payment service system 106. As described above, the payment services component 121 can monitor the transaction data in real-time or near-real-time. The transaction data may include one or more of transactions with merchants, transactions with other users, bill payments, subscription payments, recurring payments, loan repayment, combinations of the foregoing, or the like.

At step 510, the secondary user 114(B) may request to utilize a payment functionality of the secondary account (e.g., FIG. 10A). The payment services component 121 can receive the request, for example, from an instance of the payment service app 110(B) executing on the secondary user device 112(B). While example graphical user interfaces reference authorizing a payment functionality (e.g., peer-to-peer payments), in some examples, a similar process can be executed for individual transactions or authorizations. For examples, each time a secondary user initiates a transaction or interaction, a request can be received by the payment service system 106.

At step 520, the payment services component 121 may determine whether the payment functionality was previously enabled. The payment services component 121 may determine whether the user is approved to use the specific functionality. For example, the payment services component 121 may determine whether the request to perform the functionality requires authorization from a primary user. As an example, the payment services component 121 may access data stored in the datastore 128 to determine whether the requested functionality has been previously approved and enabled for the secondary account. That is, as described above, in some examples, the payment services component 121 can utilize one or more rules, which can be stored in the datastore 128, to determine whether a particular transaction or payment functionality is enabled, disabled, approved, denied, or requires input from the primary user 114(A). If the requested functionality has been previously enabled for the secondary account, then the process 500 may continue to step 540, where the request is automatically completed. As an example, if the secondary user 114(B) attempts to perform a P2P transaction, then the payment services component 121 can automatically facilitate the P2P transaction (e.g., based on a determination that the P2P functionality is enabled).

If the request is not approved, the process 500 continues to step 530, where the secondary user 114(B) requests approval from a primary user 114(A) to use the requested functionality. For example, the account configuration component 119 communicates with the payment service app 110(B) to display the approval request workflow (e.g., FIGS. 10D-10F) so that the secondary user 114(B) can request approval. Once the secondary user 114(B) has requested approval, in addition to displaying the status of the request (e.g., FIG. 10G), the payment service app 110(B) may enable the secondary user 114(B) to re-send the request (e.g., FIGS. 10H-10I). In particular embodiments, the ability to request or re-send requests for a functionality may be restricted. For example, the account configuration component 119 may limit the rate or frequency at which the secondary user 114(B) can send requests to prevent abuse. Rate-limiting may be rules-based, threshold-based, or intelligence based. For example, a secondary user 114(B) may re-send the request five times. The account configuration component 119 may send a message to the primary user 114(A) (e.g., FIGS. 10J-10K) to notify them that their approval is requested to enable the functionality. In some examples, the transaction may be denied without an option to request approval.

At step 550, the payment services component 121 determines whether the primary user 114(A) has approved enablement of the functionality. If the primary user 114(A) has approved enablement of the functionality (e.g., FIGS. 10L-10N), then the process 500 continues to step 560, where the account configuration component 119 may enable the functionality on the secondary account, after which the secondary user 114(B) may be able to access the enabled functionality. If the payment services component 121 determines that the primary user 114(A) has declined enablement of the functionality, then the process 500 continues to step 570, where the payment services component 121 sends an exit message to the secondary user 114(B) indicating that the functionality was not approved for the secondary user 114 (B). For example, the payment services component 121 may send an exit message to the user device 112(B) of the secondary user 114(B). The user device 112(B) may present the exit message to the secondary user 114(B) through the payment service app 110(B) executing on the user device 112(B). In particular embodiments, the payment services component 121 may notify the primary user 114(A) about other significant actions taken by the secondary user 114(B) and provide the primary user 114(A) with the ability to restrict, moderate, or configure settings accordingly.

At step 580, the payment services component 121 may determine whether an incentive is applicable to the secondary account. For example, the payment services component 121 may review a transaction history of the secondary account to determine whether the secondary account qualifies for an incentive. In an example, an incentive can be associated with an incentive rewarding event. In some examples, based at least in part on a determination that the secondary account has an applicable incentive (e.g., based at least in part on a determination of an occurrence of an incentive rewarding event or otherwise), then the process 500 may continue to step 590, where the payment services component 121 may apply the incentive to the secondary account. If the payment services component 121 determines that the secondary account does not have an applicable incentive, then the process 500 may continue to step 595, where the payment services component 121 may not apply an incentive to the secondary account.

As described above with reference to FIG. 5, in particular embodiments, authorization by the primary user 114(A) can be utilized to enable a specific functionality, to facilitate transaction moderation by the primary user 114(A), to participate in a particular interaction (e.g., a peer-to-peer transaction, a purchase or sale of securities or cryptocurrency, etc.), or the like. In some examples, the payment service system 106 may enable additional or alternative information to be used for authorizing interactions. For example, the secondary user 114(B) can provide verification information (either actively or passively) to aid the primary user 114(A) in making the decision regarding whether to approve a specific transaction. For example, the payment service app 110(B) on the secondary user's 114(B) user device 112(B) may enable the secondary user 114(B) to send the primary user 114(A) a designated authorization signal (e.g., a code word or a picture, taken in the current moment, of the secondary user's 114(B) face), an explanation for the desired transaction (e.g., a photo of a flat tire on a car or a short video or audio clip explaining that the secondary user 114(B) needs to reimburse a friend for a meal), an indication that the secondary user 114(B) urgently needs the primary user's 114(A) approval, or the like.

As described above, the payment service system 106, e.g., through the account configuration component 119, can enable various functionalities for primary and secondary accounts. One example of a functionality that may be available for secondary users is a credit building functionality. As described above, described herein are techniques for credit building. In conventional approaches of building credit, a user establishes credit via various entities reporting credit activities to a credit reporting agency. In many cases, lenders may be unwilling or legally unable to open these accounts in the name of the minor (or non-US resident) alone. This creates a problem where the individual cannot open an account for building credit as they do not have an existing record, and cannot create a record because they do not have an existing account. To address this problem, the payment service system 106, as described herein, can enable generation of an account and can provide security of the account (by making a primary account ultimately responsible for a secondary account), but also can provide the accounting and recording of transactions back to the secondary account which is essential to building a credit record.

FIG. 6 illustrates an example process 600 for sending transactions to a third-party reporting agency, for example to enable a secondary user to build a credit report with the third-party reporting agency. The described example may refer to process 600 including a payment service system 106, or one or more components thereof, interacting with a third-party reporting agency 604, the secondary user can build their own credit score independent of primary user's financial behavior At step 610, the payment services component 121 of the payment service system 106 may monitor transaction data associated with transactions of a user account conducted using the payment service system 106 in real-time or near-real-time. For example, the payment services component 121 may monitor the transactions of primary users, secondary users, and the like. The transaction data may include one or more of transactions with merchants, transactions with other users, bill payments, subscription payments, recurring payments, loan repayment, combinations of the foregoing, or the like. In some examples, spending insights can be determined based at least in part on the transaction data monitoring. For instance, overspending, timely repayment, inflow vs. outflow ratios, etc. can be determined based on the transaction data monitoring.

At step 620, the payment services component 121 may analyze individual transactions associated with the transaction data to determine credit metrics associated with the individual transactions. In some examples, the payment services component 121 can use one or more machine-learning or machine-trained models to determine the credit metrics. The machine-learning model(s) may be trained based at least in part on previous transaction data associated with users of the payment service and credit metrics. Such credit metrics can indicate whether a transaction indicates good credit behavior indicating an ability and willingness to repay funds advanced, loaned, or credited to a user (e.g., underspending, inflows exceeding outflows, timely repayment, etc.) or bad credit behavior (e.g., overspending, outflows exceeding inflows, untimely repayment, unpaid bills, etc.). The resulting machine-learning model(s) can output credit metrics for new transactions. As applied, the machine-learning model may identify transactions that positively affect creditworthiness or negatively affect creditworthiness.

At step 630, the payment services component 121 may determine whether each transaction analyzed is associated with a credit metric that satisfies a threshold. The payment services component 121 may determine, based at least in part on the one or more credit metrics, to report at least one transaction to one or more third-party reporting agencies 604. For example, the payment services component 121 may compare the credit metrics of each transaction to a threshold indicative of creditworthiness (i.e., a threshold credit metric indicative that a user is likely to exhibit good credit behavior, as described above). In some examples, credit metrics can be associated with metadata and stored with transaction data.

At step 640, the payment services component 121 may determine to report one or more transactions based at least in part on one or more credit metrics. For example, the payment services component 121 can determine the one or more credit metrics for each transaction and use corresponding credit metrics to determine whether the respective transaction should be reported to one or more third-party reporting agencies 604. The payment services component 121 can determine to send transaction data corresponding to one or more transactions that have credit metrics above a threshold creditworthiness.

At step 650, the payment services component 121 may send data corresponding to one or more transactions associated with credit metrics that satisfy the threshold to a third-party reporting agency 604. For example, the payment services component 121 may send transaction details corresponding to a transaction associated with a credit metric above a threshold to one or more third-party reporting agencies 604. In some examples, the payment service 602 can send an indication of such a transaction in real-time or in near-real-time. In some examples, the payment services component 121 may send batches of indications of such transactions. In some examples, a batch of indications of transactions associated with credit metrics that satisfy a threshold can be sent in response to an occurrence of an event. In at least one example, such an event can correspond to a user obtaining a certain age, a user moving into a new jurisdiction or country, or the like. In some examples, transactions associated with credit metrics that do not satisfy the threshold may not be reported to third-party reporting agencies. However, in some examples, all transactions, regardless of associated credit metrics, can be reported.

At step 660, the third-party reporting agency 604 may receive the data corresponding to an indication of at least one transaction to associate with a user. For example, the third-party reporting agency 604 may receive further user data corresponding to the user (e.g., social security number, user identification, and other forms of identification) to identify a particular user to associate with the data corresponding to the one or more transactions. The third-party reporting agency 604 may generate a credit history for the respective user based on the at least one transaction that have been sent to the third-party reporting agency 604. As an example, if the at least one transaction contains several bill payments and a loan repayment, then the third-party reporting agency 604 may generate a credit history for the user based on the at least one transaction. This generation of credit history may help the user who may not have previously had a credit history due to no availability to apply for credit (as a result of age restrictions and other conditions).

In some examples, the payment services component 121 can determine credit metrics for all transactions processed by the payment service system 106. In such examples, the payment service system 106 can determine which user(s) each transaction is associated with and the transaction and credit metric corresponding there to can be stored in association with account(s) of such user(s). In some examples, the payment services component 121 can selectively determine credit metrics for transactions processed by the payment service system 106. For example, the payment services component 121 can determine which user(s) each transaction is associated with and the transaction and the payment services component 121 can determine credit metrics for some users and not other users. For example, the payment services component 121 can determine credit metrics for transactions associated with secondary users but not primary users. In some examples, the payment services component 121 can use transaction data associated with each transaction to determine the user associated with the transaction. For instance, a particular payment number or payment instrument can be indicative of which user is associated with the transaction. In other examples, the payment services component 121 can use one or more machine-learning or machine-trained models to analyze transaction data to determine which user(s) are associated with which transactions. In some examples, such machine-learning model(s) can be trained based at least in part on historical transaction data which can indicate user preferences or trends.

In an additional or alternative example, a user may interact with a user interface of an instance of a payment service app that may present a transaction history to the user. The user interface may provide functionality to allow a user to check the transaction history to determine whether the one or more transactions in the transaction history are above the threshold indicative of creditworthiness. The user interface may present an indication (e.g., a tag) on the transactions that are above the threshold indicative of creditworthiness. The user interface may present an activatable element that the user may select to instruct the user interface to present a help user interface element, where the help box identifies one or more actions the user may perform to build or improve a credit history. As an example, the user interface may present a help box that indicates certain transactions (e.g., bills, loan repayments, and the like) and conditions (e.g., timely payments) that help build a credit history. This particular credit history may be maintained by the payment service system 106 or the third-party reporting agency 604 until the user is applicable to have a credit history (e.g., the user reaches an age requirement).

In some examples, the payment services component 121 may generate incentives for a user to perform certain transactions or perform certain behaviors. The payment services component 121 may send instructions to a user device executing a payment service app to present one or more incentives in response to performing one or more transactions or behaviors. As an example, the payment service app can present an obtainable discount that the user may receive if the user pays off a bill for the month. The payment services component 121 may gamify a credit building aspect to incentivize users to perform good credit building transactions or behaviors. As an example, the payment service. Examples of good credit building transactions or behaviors can include one or more of taking out loans that are proportional to current balance or projected earnings (e.g., calculated from paychecks or regular deposits), making payments on loans or regular services (e.g., streaming services, utilities, car payment) on time or in advance of the due date. As an example of gamifying the credit building aspect, the payment services component may assign points to users who perform good credit building transactions (e.g., paying off bills on time) and allow users to view the point totals of friends. These points may be converted to rewards for the users to apply to one or more transactions. As an example, the rewards may include a discount on particular transactions (e.g., based on category, merchant, and other conditions). In some examples, data generated via the gamification described above can be associated with user accounts and can be used in building credit history or making credit decisions.

In any event, transactions and associated credit metrics, or other indications of credit as described herein, can be stored by the payment service system 106. In some examples, such credit metrics or credit data can be used for making internal lending decisions (e.g., lending facilitated by the payment service). In some examples, transactions and associated credit metrics, or other indications of credit as described herein, can be provided to third parties, as described above.

Techniques described here enable users, such as secondary users, to establish a credit history at a much earlier time than when users typically are able to establish a credit history. That is, by leveraging the payment services component 121 to determine credit metrics and store or track such metrics over time, techniques described herein enable secondary users to accumulate credit history that can be reported to third-party reporting agency(s) 604. By enabling users to accumulate a credit history, such users are able to transition into a next stage in life with a base credit history. The base credit history may enable a user to conduct purchases and request various credit vehicles that may not be available to the user's peers.

While FIG. 6 refers to reporting transactions based on credit metrics that are above a threshold, in some examples, the payment services component 121 can report all transactions regardless of their relationship to the creditworthiness threshold. Further, to the extent reporting regulations or other regulations apply to credit reporting, techniques described herein are to be performed in compliance with such regulations.

In some examples, the payment services component 121 can generate an internal metric representative of creditworthiness, or risk associated therewith, of a user. In some examples, the internal metric can be representative of cash flow into and out of a user account, which can be based on direct deposits, P2P payments, POS transactions, recurring payments, subscriptions, donations, assets (e.g., stocks, cryptocurrency, etc.), loans or other lending products, and the like. In some examples, the internal metric can be more accurate than external metrics that are not able to access cash flow data. In some examples, the internal metric can be determined based at least in part on a machine learning model trained using transaction and interaction data associated with users of the payment service system. In some examples, the internal metric can be used by the payment service component 121 to determine whether to offer a user a lending product from the payment service and/or determine repayment terms associated therewith, such as for a buy now, pay later loan, a short-term consumer loan, a longer-term consumer loan, a business loan, a car loan, a mortgage, or the like. In some examples, this internal metric can be used by users of the payment service system to access a variety of services without having to leave the payment service app or payment service system.

In some examples, the internal metric can be reported to third parties or other lending entities. That is, in some examples, the internal metric can be used externally by third parties to make lending decisions or otherwise modify credit metrics, such as credit scores. In some examples, such metrics can be reported at a particular frequency, date, time, in response to a request for such information, or when a user account transitions to a primary account, or the like. In some examples, third parties can report data to the payment service system and such external data can be used to modify internal metrics.

In some examples, the internal metric can be presented via a user interface of the payment application. In some examples, the payment services component 121 can offer incentives, education, or feedback to motivate users to increase their internal metrics. In some examples, if users apply for particular lending products and are denied, the payment services component 121 can output reasons or explanations as to why they were denied. These reasons or explanations can be actionable to enable users to improve their internal metrics.

Referring to FIGS. 7A-7AL, example graphical user interfaces 702a-702a1 for a secondary account creation workflow, which is referred to herein as an "onboarding flow," are shown. In particular embodiments, the example graphical user interfaces 702a-702a1 may be displayed within a payment service app executing on a user device or any user interface of the user device (e.g., user device 112(A) of a primary user 114(A) or a user device 112(B) of a secondary user 114(B)).

The onboarding flow can be initiated from a variety of entry points provided by the payment service. In some examples, the payment service may not know what type of user (e.g., primary user or secondary user) is initiating the onboarding flow. Example entry points include, but are not limited to a link, a download of an application (e.g., payment service app), claiming a P2P gift (e.g., a P2P payment, stock, cryptocurrency, etc.). As one example, the onboarding flow can be initiated from a payment instrument selection or customization user interface. As another example, a primary user 114(A) can send via a user device 112(A) a link to a user device 112(B) associated with a secondary user 114(B). As another example, a secondary user 114(B) may initiate an onboarding flow after downloading a payment service app 110(B) on a user device 112(B). As another example, a secondary user 114(B) may initiate an onboarding flow from receiving a gift (e.g., a payment, stock, cryptocurrency, gift card, etc.) within an email, text message, or the like. For instance, the secondary user 114(B) may use a user device 112(B) to select an activatable user interface element to initiate an onboarding flow.

FIG. 7A illustrates a user interface 702*a* including different possible payment instruments 704*a*-704*c* to choose from. A secondary user 114(B) attempting to set up a secondary user account with a payment service may initially be presented with the user interface 702*a*. User interface 702*a* may be a standard user interface shown to all users who are creating an account as part of a standard onboarding flow. After the secondary user 114(B) selects a payment instrument 704 (e.g., payment instrument 704*b*), the user interface 702*a* can transition to user interface 702*b* shown in FIG. 7B. The user interface 702*b* may include an activatable user interface element 706 to personalize the payment instrument and an activatable user interface element 708 to order the payment instrument. As described above, in some examples, the selected payment instrument or customization thereof can determine how user interfaces described below are further presented. That is, in some examples, the design of the payment instrument selected or customized for the secondary user 114(B) can be used to determine user interface elements, designs, and the like so that the user experience in the payment service app coordinates with the design features of the payment instrument of the secondary user 114(B).

The secondary user 114(B) may select the activatable user interface element 708 to order the payment instrument 704. In response to selecting the activatable user interface element, the user interface 702*b* can transition to user interface 702*c* shown in FIG. 7C. The user interface 702*c* includes an address field 710 to specify where to send the payment instrument 704, an activatable user interface element 712, and a digital keyboard 714. The secondary user 114(B) may select the activatable user interface element 712 after inputting the address into the address field 710 using the digital keyboard 714.

In response to selecting the activatable user interface element 712, the user interface 702*c* can transition to user interface 702*d* as shown in FIG. 7D. User interface 702*d* includes a name entry 716 to associate with the payment instrument 704, a digital keyboard 714, and an activatable user interface element 718. The secondary user 114(B) may select the activatable user interface element 718 after inputting the name into the name entry 716 using the digital keyboard 714. In response to selecting the activatable user interface element 718, the user interface 702*d* can transition to user interface 702*e* as shown in FIG. 7E. User interface 702*e* includes a date field 720, an activatable user interface element 722, and a digital number pad 724. The secondary user 114(B) may select the activatable user interface element 722 after inputting the secondary user 114(B)'s date of birth into the date field 720 using the digital number pad 724. In response to selecting the activatable user interface element 722, the payment service may determine the eligibility of the secondary user 114(B) to create a primary account. If, for example, the payment service determines that the secondary user 114(B) cannot create a primary account or secondary account or be issued a payment instrument, for example based on a date of birth input into the date field 720, the user interface 702*e* can transition to user interface 702*f* as shown in FIG. 7F. User interface 702*f* includes a notification 726 that the secondary user 114(B) is not eligible to receive a payment instrument 704 and an activatable user interface element 728. The reason the 114(B) may not be eligible may be provided in user interface 702*f*, such as due to the secondary user 114(B) not meeting an age requirement to create a secondary user account and receive a payment instrument 704.

In response to selecting the activatable user interface element 722 after inputting a date of birth of a user who may be eligible to create a secondary account into the date field 720, the user interface 702*e* can transition to user interface 702*g* as shown in FIG. 7G. The user interface 702*g* includes a payment instrument 730 customized with the secondary user 114(B)'s name and an activatable user interface element 732. In response to selecting the activatable user interface element 732, the user interface 702*g* can transition to user interface 702*h* as shown in FIG. 7H. User interface 702*h* can provide information to the secondary user 114(B) about their account, for example, payment functionalities available to the user and what authorization is required to create their account. The user interface 702*h* includes an activatable user interface element 734 to enable the secondary user 114(B) to send a request for authorization to a primary user 114(A). In response to selecting the activatable user interface element 734, the user interface 702*h* can transition to one of user interfaces 702*i*-702*l* as shown in FIGS. 7I-7L. In FIGS. 7I-7L, the secondary user 114(B) can identify which primary user(s) 114(A) to send an authorization request. In some examples, a secondary user 114(B) can search a contact list, which can be generated based on local contacts stored on the user device (e.g., user device 112(B)). The secondary user 114(B) can provide an input to select a user from the contact list to whom an authorization request is to be sent. FIG. 7I illustrates an example of a user interface 702*i* to enable such. The user interface 702*i* includes an identifier field 736, an activatable user interface element 738, a contact list 740 containing a list of contacts 742, and a digital keyboard 714.

In some examples, the secondary user 114(B) can input an identifier of another user to whom an authorization request should be sent. Examples of such identifiers include a phone number, email address, identifier having a particular syntax (e.g., alphanumeric identifier), or the like. The user interface 702*j* includes an identifier field 736, activatable user interface element 738, and digital keyboard 714. The user interface 702*k* includes an identifier field 736, activatable user interface element 738, and digital keyboard 714. The payment service can use the provided identifier to send the request for authorization.

The user interface 702*l* includes an identifier field 736, an activatable user interface element 738, a contact list 740 containing a list of contacts 742, such as contacts 742*a*, 742*b*, and a digital keyboard 714. The user interface 702*l* may include a selection of contact 742*a*, which is inputted into the identifier field 736. The secondary user 114(B) may scroll through the contact list 740 to select a contact 742 to input into the identifier field 736. The secondary user 114(B) may type in an input into the identifier field 736. The secondary user 114(B) may select the activatable user interface element 738 after the secondary user 114(B) inputs an input to send the request for approval. The payment service system 106 may determine whether the identified user has confirmed it is ok to receive requests. The payment service system 106 may identify a relationship between the secondary user 114(B) and the identified user to determine whether to send the request to the identified user, as described above.

In response to selecting the activatable user interface element 738 after providing an input into the identifier field 736, the user interface 702*l* can transition to either user interface 702*m* or user interface 702*n* based on whether the identified user is eligible to receive requests. If the identified user is determined not to be eligible to receive requests, then the user interface 702*l* can transition to user interface 702*m* as shown in FIG. 7M. The user interface 702*m* includes a message 744 and an activatable user interface element 746.

If the identified user is determined to be eligible to receive requests, then the user interface 702*l* can transition to user interface 702*n* as shown in FIG. 7N. The user interface 702*n* includes a message 748 notifying the secondary user 114(B) that the request has been sent and an activatable user interface element 750. In some examples, based at least in part on a selection of the activatable user interface element 750, the user interface 702*n* can transition to user interface 702*o* as shown in FIG. 7O.

The user interface 702*o* can be an activity user interface, which can include indications of user activity with the payment service. In some examples, the user interface 702*o* can be presented via an interaction with the activatable user interface element 750. In some examples, the user interface 702*o* can be accessible via additional or alternative inputs (i.e., other than via an interaction with the activatable user interface element 750). In some examples, the transaction history 754 shown in user interface 702*o* may have limited functionality compared to a full transaction history. As illustrated, the user interface 702*o* includes a request for approval 752, an activatable user interface element 753, and transaction history 754 including one or more transactions 755, and an activatable user interface element 757.

In some examples, the activity user interface, such as the user interface 702*o*, can include one or more activatable user interface elements to enable the user to navigate to other user interfaces associated with the payment service app. Examples of such additional or alternative user interfaces include a user interface to facilitate P2P payments or gifts of assets (e.g., stocks, cryptocurrency, non-fungible tokens (NFTs), etc.), a user interface to access a virtual payment instrument, check the status of a physical payment instrument, etc., a user interface to transfer or configure the transfer of funds into and out of their account, a user interface to monitor performance of assets such as stocks, cryptocurrency, or the like, etc.

Figures 7P, 7Q:
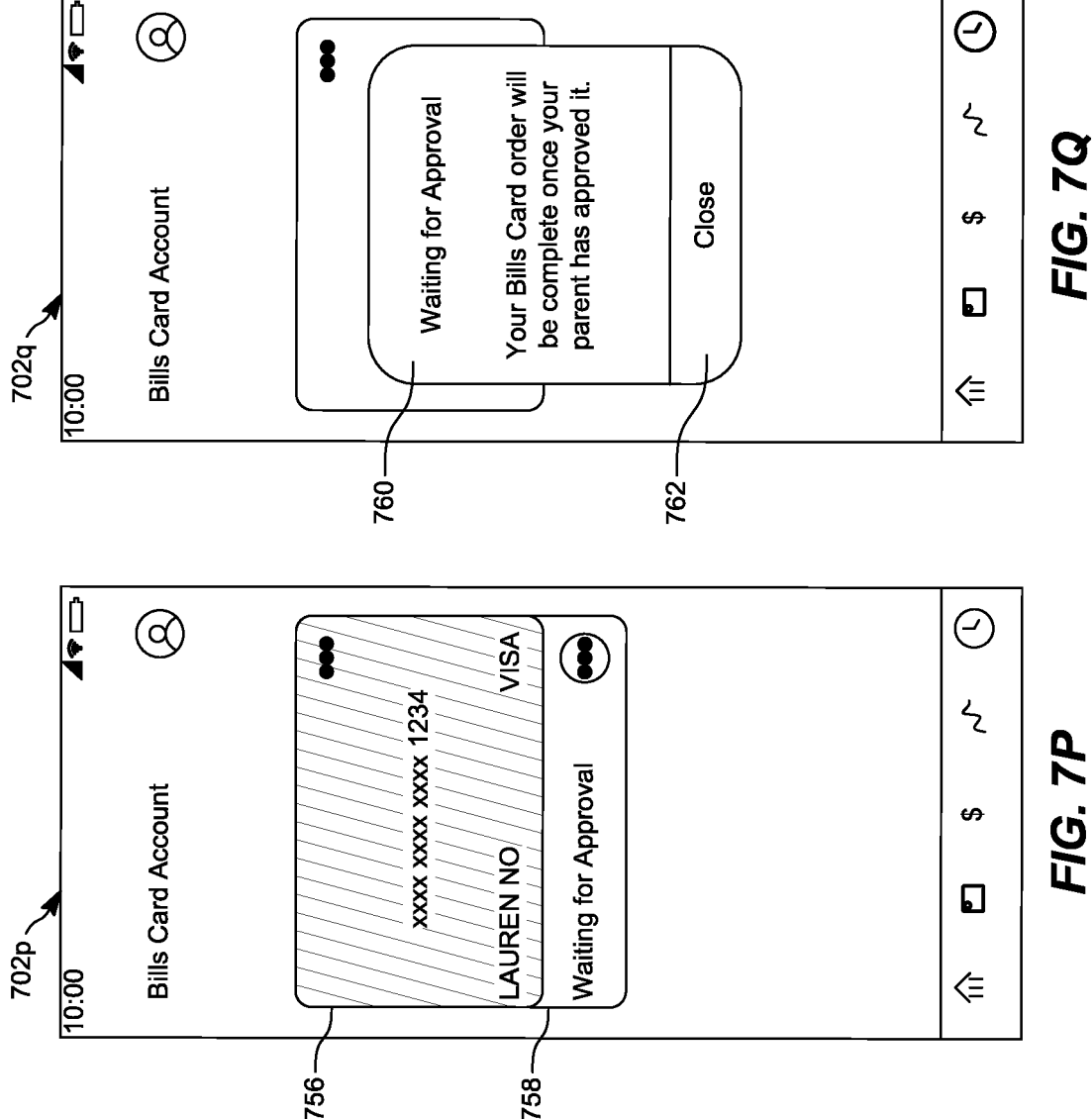

In response to selecting the activatable user interface element 757, the user interface 702*o* can transition to user interface 702*p* as shown in FIG. 7P. The user interface 702*p* includes a virtual representation of a payment instrument 756 and an activatable user interface element 758 indicating that the payment instrument 756 is waiting for approval. In some examples, the design of the virtual representation of the payment instrument can match the design of the physical payment instrument (e.g., as ordered via FIG. 7B). In response to selecting payment instrument 756, the user interface 702*p* can transition to user interface 702*q* as shown in FIG. 7Q. The user interface 702*q* includes a message 760 and an activatable user interface element 762.

Figures 7R, 7S, 7T:
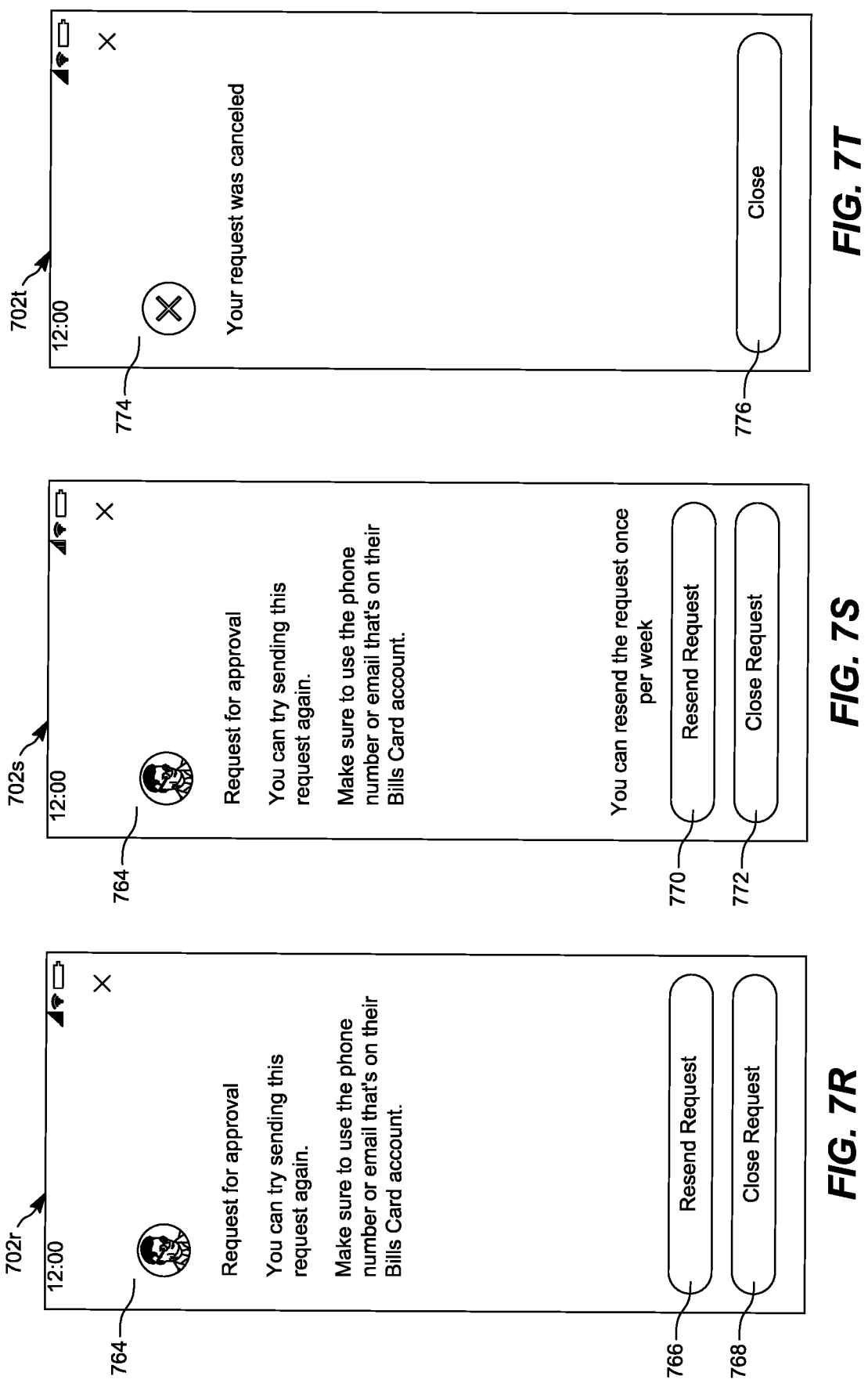

In response to selecting the activatable user interface element 758, the user interface 702*p* can transition to user interface 702*r* shown in FIG. 7R. The user interface 702*r* includes a message 764, an activatable user interface element 766, and an activatable user interface element 768. The message 764 indicates that the user may resend the request for approval, which would create a new notification for the primary user. In response to selecting the activation user interface element 766, the user interface 702*r* can transition to user interface 702*s* as shown in FIG. 7S. The user interface 702*s* includes the message 764, a greyed-out user interface element 770, and an activatable user interface element 772. The user interface 702*s* may indicate that the secondary user 114(B) is unable to resend a request to the primary user 114(A) as a result of reaching a limit created by the payment service for resending requests. In response to selecting the activation user interface element 768, the user interface 702*r* can transition to user interface 702*t* as shown in FIG. 7T. The user interface 702*t* may include a message 774 and an activatable user interface element 776. In response to the request being declined as shown in FIG. 7T, the payment service may save the payment instrument that is in process of being created and the current account activity in the instance that the user selects to send the request to another user. Alternatively, the payment service may delete the payment instrument that is in process of being created and delete the current account activity and request the user to start the process over to request a secondary account.

Figures 7U, 7V, 7W:
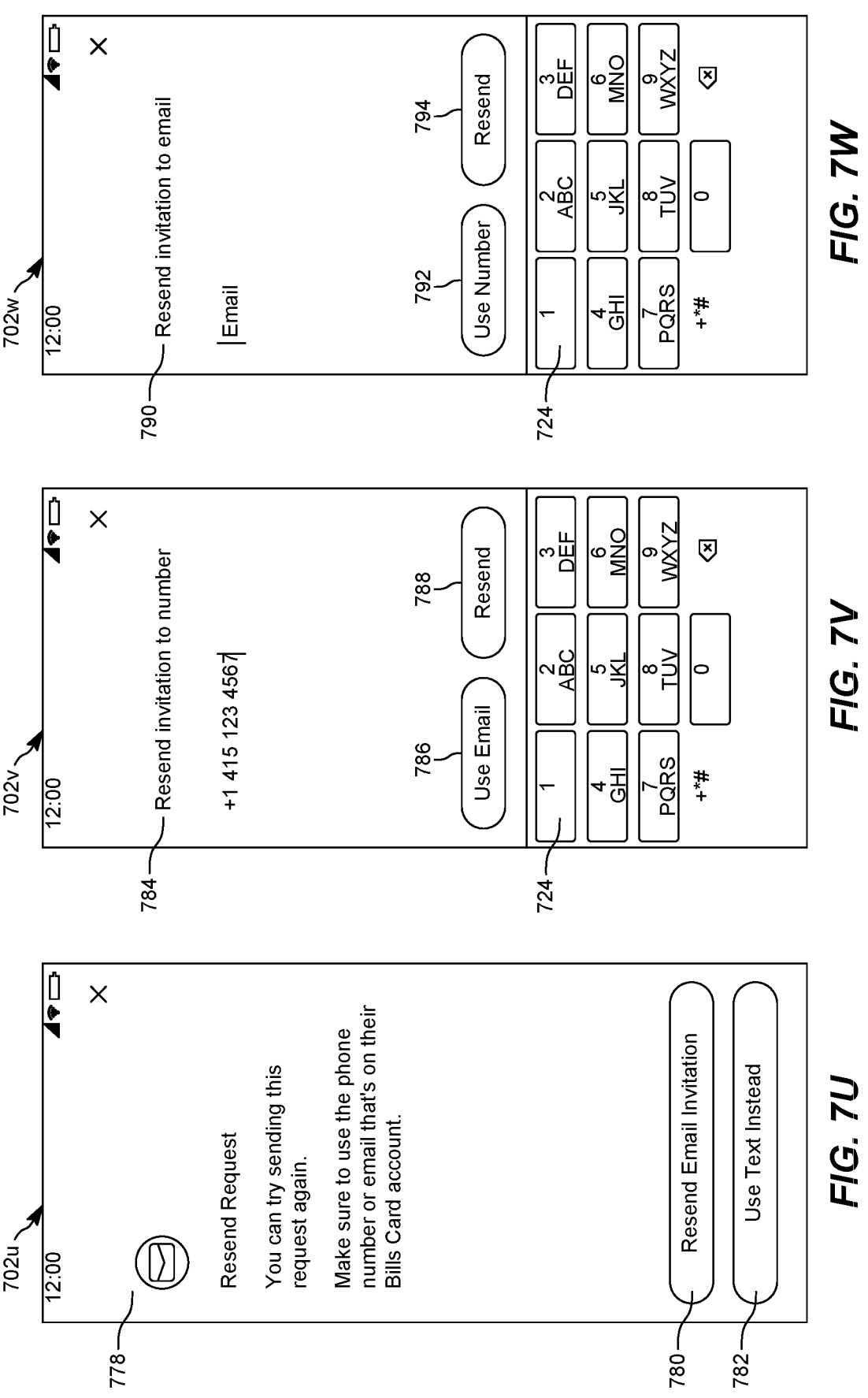

User interfaces 702*u*, 702*v* may be alternative user interfaces that are shown instead of user interface 702*r*. Instead of resending the request within a payment service, the request may be resent via email or text. As shown in FIG. 7U, user interface 702*u* includes message 778, activatable user interface element 780, and activatable user interface element 782. In response to selecting activatable user interface element 782, the user interface 702*u* can transition to user interface 702*v* as shown in FIG. 7V. The user interface 702*v* includes a number field 784, an activatable user interface element 786, an activatable user interface element 788, and a digital number pad 724. In response to a user selecting activatable user interface element 786, the user interface 702*v* can transition to user interface 702*w* as shown in FIG. 7W. The user interface 702*w* includes an email address field 790, an activatable user interface element 792, an activatable 794, and a digital number pad 724.

Figures 7X, 7Y, 7Z:
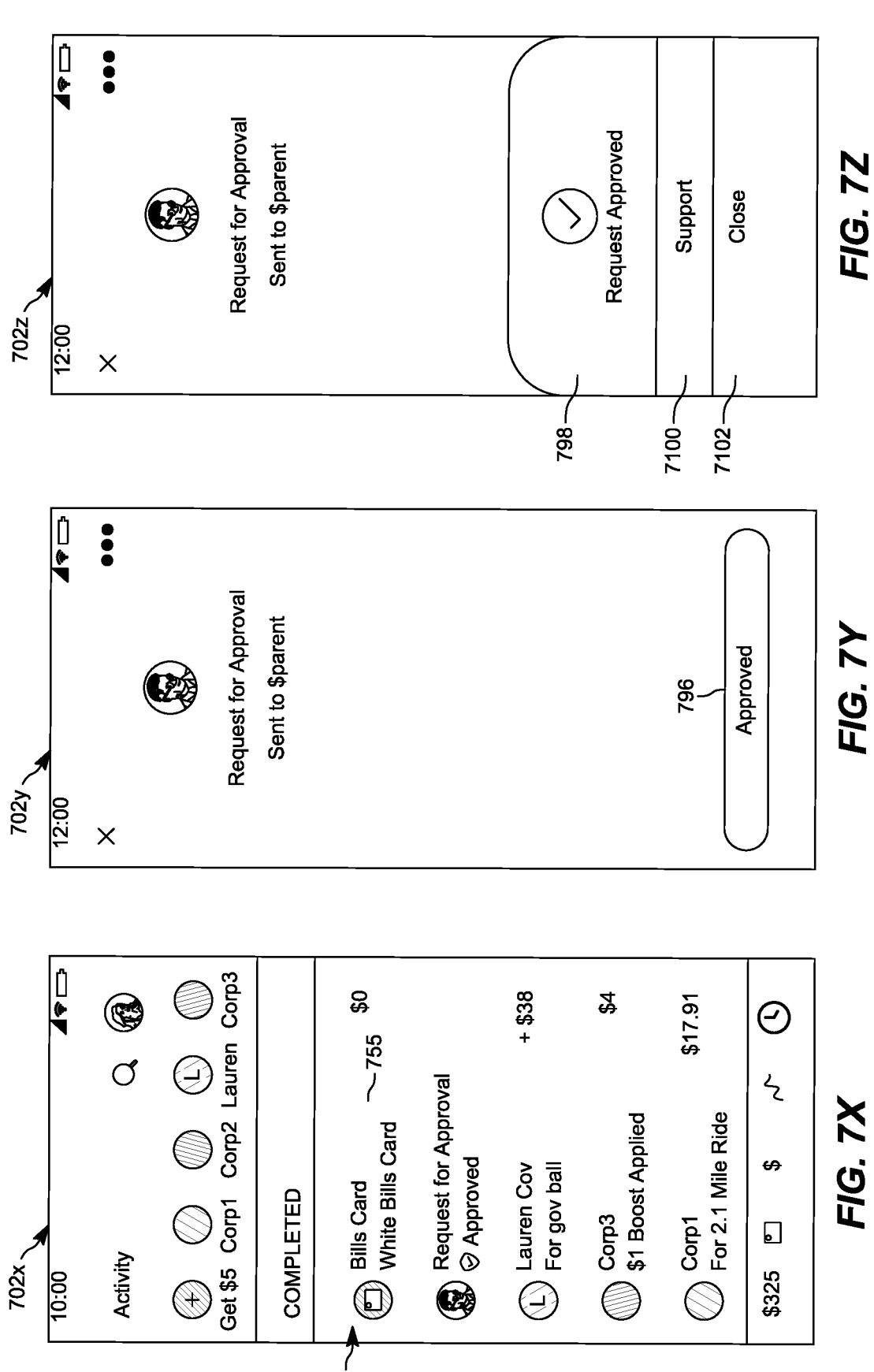
Figure 7A:
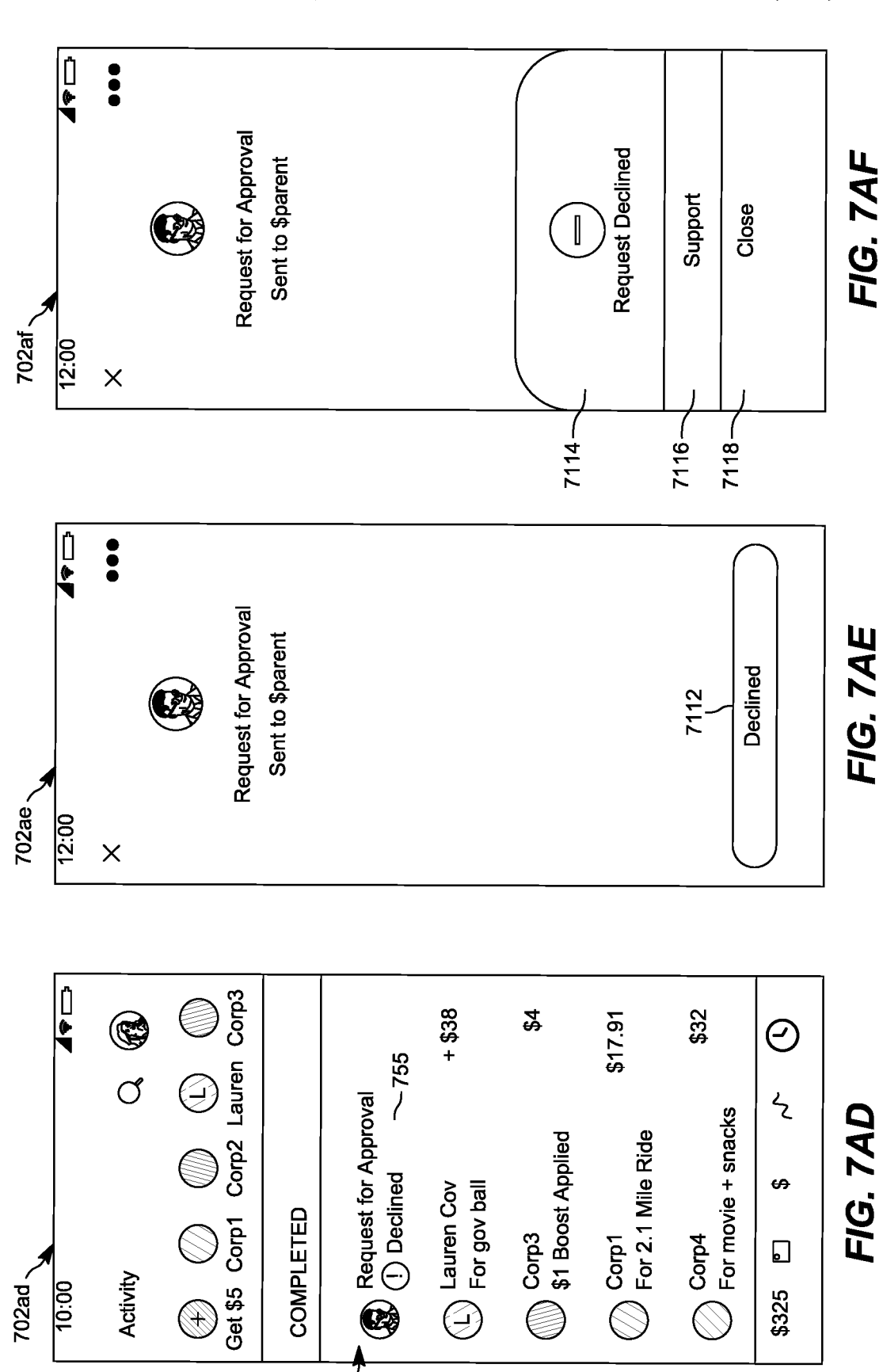

As shown in FIG. 7X, a user interface 702*x* includes a transaction history 754 including one or more transactions 755. The user interface 702*x* can be an activity user interface similar to the user interface 702*o* described above. Each of the one or more transactions may be represented by activatable user interface elements that can bring further details corresponding to the transactions. The one or more transactions 755 can include a request for approval, automatic transactions from a payment service, P2P transactions, incentives from one or more entities, merchant transactions, stock transactions, dividends, cryptocurrency transactions, and the like. In response to the user receiving approval of the secondary account, the user can receive a payment instrument transaction corresponding to the payment instrument associated with the secondary account. The user interface 702*x* includes an activity history that represents one or more recent entities that the user has interacted. The activity history may be determined based on the number of transactions the user performs with the respective entity. As an example, if the user performs 10 transactions with Corp 1 and the user performs 5 transactions with Corp 2, then Corp 1 may be prioritized ahead of Corp 2. The user may select an activatable user interface element corresponding to the icons of the entities in the activity history to transition to a profile corresponding to the respective entity. The profile can include one or more transactions between the user and the respective entity.

The user interface 702*x* may include one or more activatable user interface elements to navigate through different user interfaces of the payment service app. For instance, the one or more activatable user interface elements can be selected to navigate to a balance of the user account user interface, a payment instrument user interface, a payment user interface, an investment user interface, and a transaction history user interface. The user interface 702*x* shows an approved request in the activity feed. In response to the user selecting the transaction 755 corresponding to the request for approval, the user interface 702*x* transitions to user interface 702*y* as shown in FIG. 7Y. The user interface 702*y* includes an activatable user interface element 796 indicating that the request for a secondary account has been approved. In response to selecting the activatable user interface element 796, the user interface 702y can transition to user interface 702z as shown in FIG. 7Z. The user interface 702z includes a message 798, an activatable user interface element 7100, and an activatable user interface element 7102.

As shown in FIG. 7AA, a user interface 702aa includes a transaction history 754 including one or more transactions 755. The user interface 702aa can represent an activity user interface similar to those described above. Each of the one or more transactions 755 may be activatable user interface elements that can bring further details corresponding to the transactions. The user interface 702aa may show what it may look like to receive an expired request to create a secondary account. As an example, requests to create a secondary account may be associated with a time limit or period of time during which the request is to be approved by the primary account. A request that exceeds the time limit can be an expired request. In response to the user selecting the transaction 755 corresponding to the request for approval, the user interface 702aa can transition to user interface 702ab as shown in FIG. 7AB. The user interface 702ab includes an activatable user interface element 7104 indicating that the request for a secondary account has expired. In response to selecting the activatable user interface element 7104, the user interface 702ab can transition to user interface 702ac as shown in FIG. 7AC. The user interface 702ac includes a message 7106, an activatable user interface element 7108, and an activatable user interface element 7110.

As shown in FIG. 7AD, a user interface 702ad includes a transaction history 754 including one or more transactions 755. Each of the one or more transactions 755 may be activatable user interface elements that can bring further details corresponding to the transactions. The user interface 702ad may show what it may look like to receive a declined request to create a secondary account. In response to the user selecting the transaction 755 corresponding to the request for approval, the user interface 702ad can transition to user interface 702ae as shown in FIG. 7AE. The user interface 702ae includes an activatable user interface element 7112 indicating that the request for a secondary account has been declined. In response to selecting the activatable user interface element 7112, the user interface 702ae can transition to user interface 702af as shown in FIG. 7AF. The user interface 702af includes a message 7114, an activatable user interface element 7116, and an activatable user interface element 7118.

As shown in FIG. 7AG, a user interface 702ag includes a notification 7120 indicating that the request to create the secondary account has been approved. The user interface 702ag may be a home screen or lock screen of a user device of a secondary user 114(B). The user device may have a payment service app installed and the payment service app may send a notification 7120 indicating that the secondary user 114(B)'s request for a secondary account has been approved. In response to selecting the notification 7120, the user interface 702ag can transition to user interface 702ah as shown in FIG. 7AH. The user interface 702ah includes a text message 7122 indicating that the secondary user 114(B)'s request has been approved. Alternatively, in response to selecting the notification 7120, the user interface 702ag can transition to user interface 702ai as shown in FIG. 7AI. The user interface 702ai includes a message 7124 and an activatable user interface element 7126.

As shown in FIG. 7AJ, a user interface 702aj includes a notification 7128 indicating that the request to create the secondary account has been declined. The user interface 702aj may be a home screen or lock screen of a user device of a secondary user 114(B). The user device may have a payment service app installed and the payment service app may send a notification 7128 indicating that the secondary user 114(B)'s request for a secondary account has been declined. In response to selecting the notification 7128, the user interface 702aj can transition to user interface 702ak as shown in FIG. 7AK. The user interface 702ak includes a text message 7130 indicating that the secondary user 114(B)'s request has been declined. Alternatively, in response to selecting the notification 7128, the user interface 702aj can transition to user interface 702al as shown in FIG. 7AL. The user interface 702al includes a message 7132 and an activatable user interface element 7134.

Referring to FIGS. 8A-8L, example graphical user interfaces 802a-802l for a secondary account creation workflow as displayed on a user device of a primary user 114(A) who already has an account with the payment service are shown. In particular embodiments, the example graphical user interfaces 802a-802l may be displayed within a payment service app executing on a user device or any user interface of the user device (e.g., user device 112(A) of a primary user 114(A) or a user device 112(B) of a secondary user 114(B)).

FIG. 8A illustrates a user interface 802a that includes a notification 804 indicating that approval to create a secondary account associated with the primary user 114(A)'s primary account has been requested. In response to selecting the notification 804, the user interface 802a can transition to user interface 802b as shown in FIG. 8B. The user interface 802b includes text 806 and an activatable element 808. Alternatively, in response to selecting the notification 804, the user interface 802a can transition to user interface 802c as shown in FIG. 8C. The user interface 802c includes message 810 and an activatable element 812. Although not shown in FIGS. 8A-8C, each of the user interfaces 802a-802c may include an additional element to approve of the request to a secondary account. As an example, the user interfaces 802a-802c may include a one-click approval user interface element to automatically approve of the request for creating a secondary account.

Figures 8D, 8E:
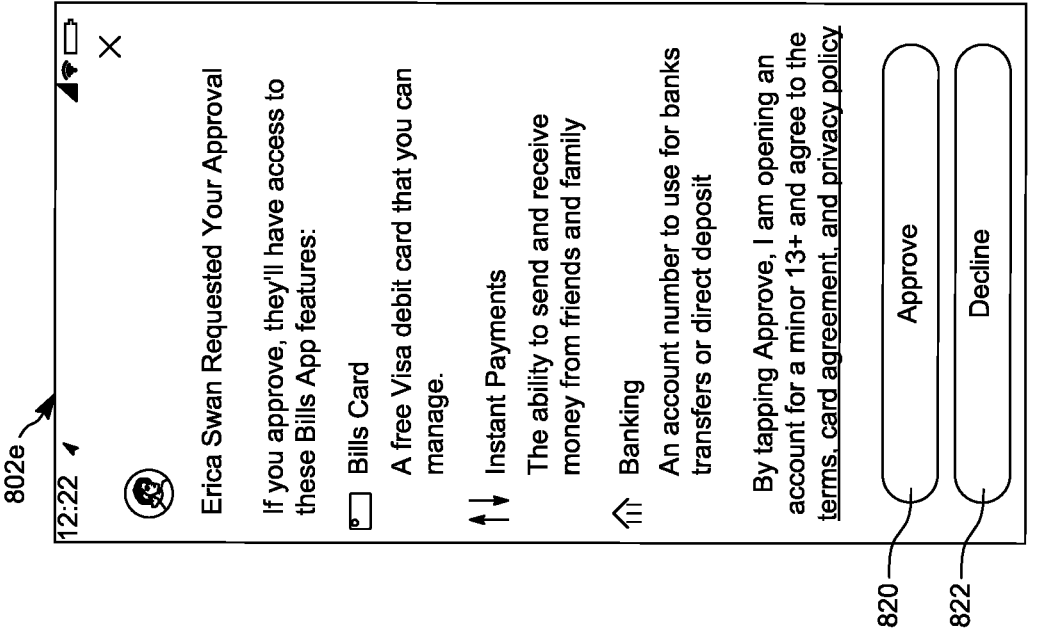

In response to the primary user 114(A) selecting either activatable element 808 or the message 810, the user interfaces 802b, 802c can transition to user interface 802d as shown in FIG. 8D. Alternatively, the primary user 114(A) may access user interface 802d by selecting a payment service app installed on the user device 112(A) of the primary user 114(A). The user interface 802d includes a request for approval 814, a transaction history 816 including one or more transactions 818. The transaction history 816 presented for a primary account may be different for a transaction history presented to a secondary account (e.g., transaction history 754). The user interface 802d includes a pending section corresponding to any pending tasks, such as request for approval 814. A primary account may receive requests that appear within a pending section of a transaction history 816. The one or more transactions 818 can include automatic transactions from a payment service, P2P transactions, incentives from one or more entities, merchant transactions, stock transactions, dividends, cryptocurrency transactions, and the like. The user interface 702x includes an activity history that represents one or more recent entities that the user has interacted. The activity history may be determined based on the number of transactions the user (e.g., primary user 114(A)) performs with the respective entity. As an example, if the user performs 10 transactions with Corp 1 and the user performs 5 transactions with Corp 2, then Corp 1 may be prioritized ahead of Corp 2. The user may select an activatable user interface element corresponding to the icons of the entities in the activity history to transition to a profile corresponding to the respective entity. The profile can include one or more transactions between the user and the respective entity. The user interface 802d may include one or more activatable user interface elements to navigate through different user interfaces of the payment service app. For instance, the one or more activatable user interface elements can be selected to navigate to a balance of the user account user interface, a payment instrument user interface, a payment user interface, an investment user interface, and a transaction history user interface. In response to the primary user 114(A) selecting the request for approval 814, the user interface 802d can transition to user interface 802e as shown in FIG. 8E. The user interface 802e includes an activatable user interface element 820 and an activatable user interface element 822.

Figures 8F, 8G, 8H:
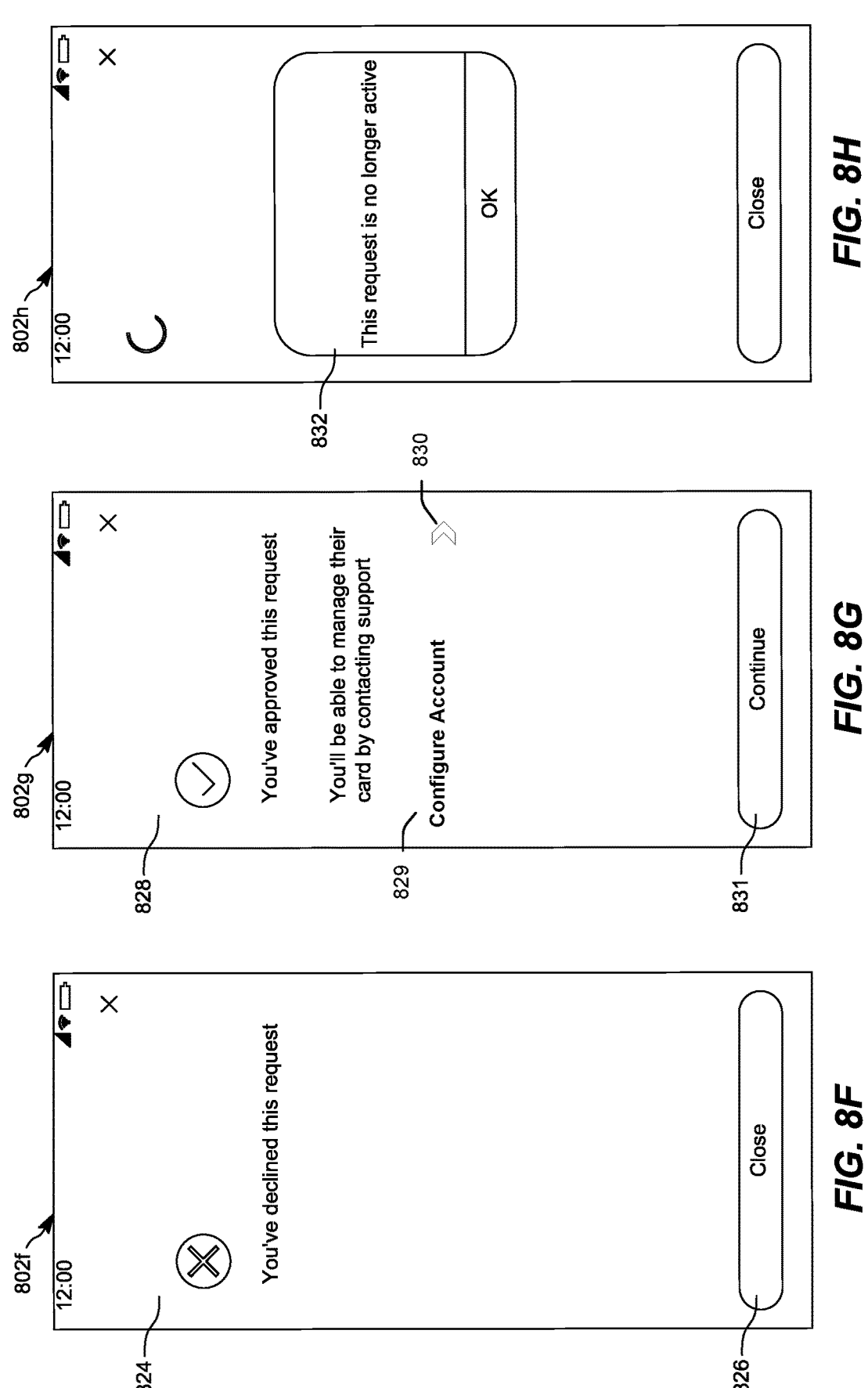

In response to the primary user 114(A) selecting activatable user interface element 822, the user interface 802e can transition to user interface 802f as shown in FIG. 8F. The user interface 802f includes a message 824 indicating that the primary user 114(A) declined the request and an activatable user interface element 826. In response to the primary user 114(A) selecting activatable user interface element 820, the user interface 802e can transition to user interface 802g as shown in FIG. 8G. The user interface 802g includes a message 828 indicating that the primary user 114(A) approved the request, a configure account element 829, a corresponding activatable user interface element 830 to configure an account (e.g., configure payment functionality(s), condition(s), rule(s), restriction(s), or the like), and an activatable user interface element 831. Alternatively, in response to selecting either activatable user interface element 820 or activatable user interface element 822, the user interface 802e can transition to user interface 802h as shown in FIG. 8H. The user interface 802h includes a message 832 indicating that the request is no longer active, e.g., that the request has expired.

Figure 8J:
Figure 8I:
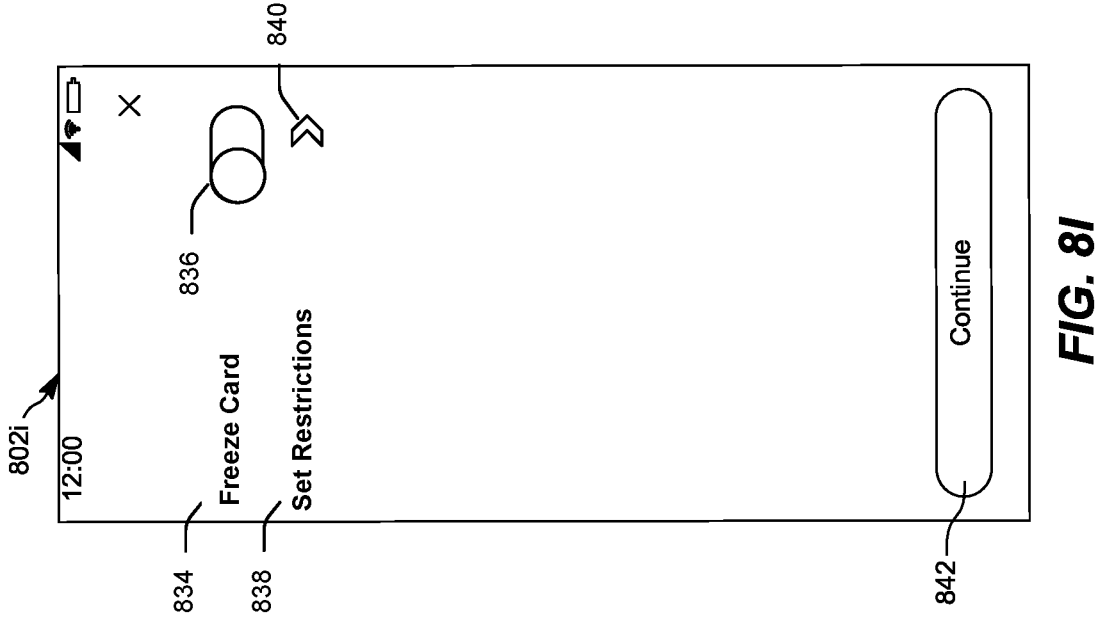

In response to the primary user 114(A) selecting the activatable user interface element 830, the user interface 802g can transition to user interface 802i as shown in FIG. 8I. The user interface 802i includes a freeze card element 834, a corresponding activatable user interface element 836 to enable the freeze card functionality for the user account, a set restrictions element 838, a corresponding activatable user interface element 840 to set restrictions for the user account, and an activatable user interface element 842. In response to the primary user 114(A) selecting activatable user interface element 842, the user interface 802i may return to user interface 802g. In response to the primary user 114(A) selecting activatable user interface element 840, the user interface 802i can transition to user interface 802j as shown in FIG. 8J. The user interface 802j includes several payment functionalities 844a-844e with respective activatable user interface elements 846a-846e and activatable user interface element 848. In response to the primary user 114(A) selecting activatable user interface element 848, the user interface 802j may return to user interface 802g. The primary user 114(A) may select one or more of the activatable user interface elements 846a-846e to turn on or turn off the respective payment functionalities 844a-844e. As an example, the primary user 114(A) may turn on the peer-to-peer payments functionality 844a by selecting the activatable user interface element 846a to place the activatable user interface element 846a in an "on" position.

Figures 8K, 8L:
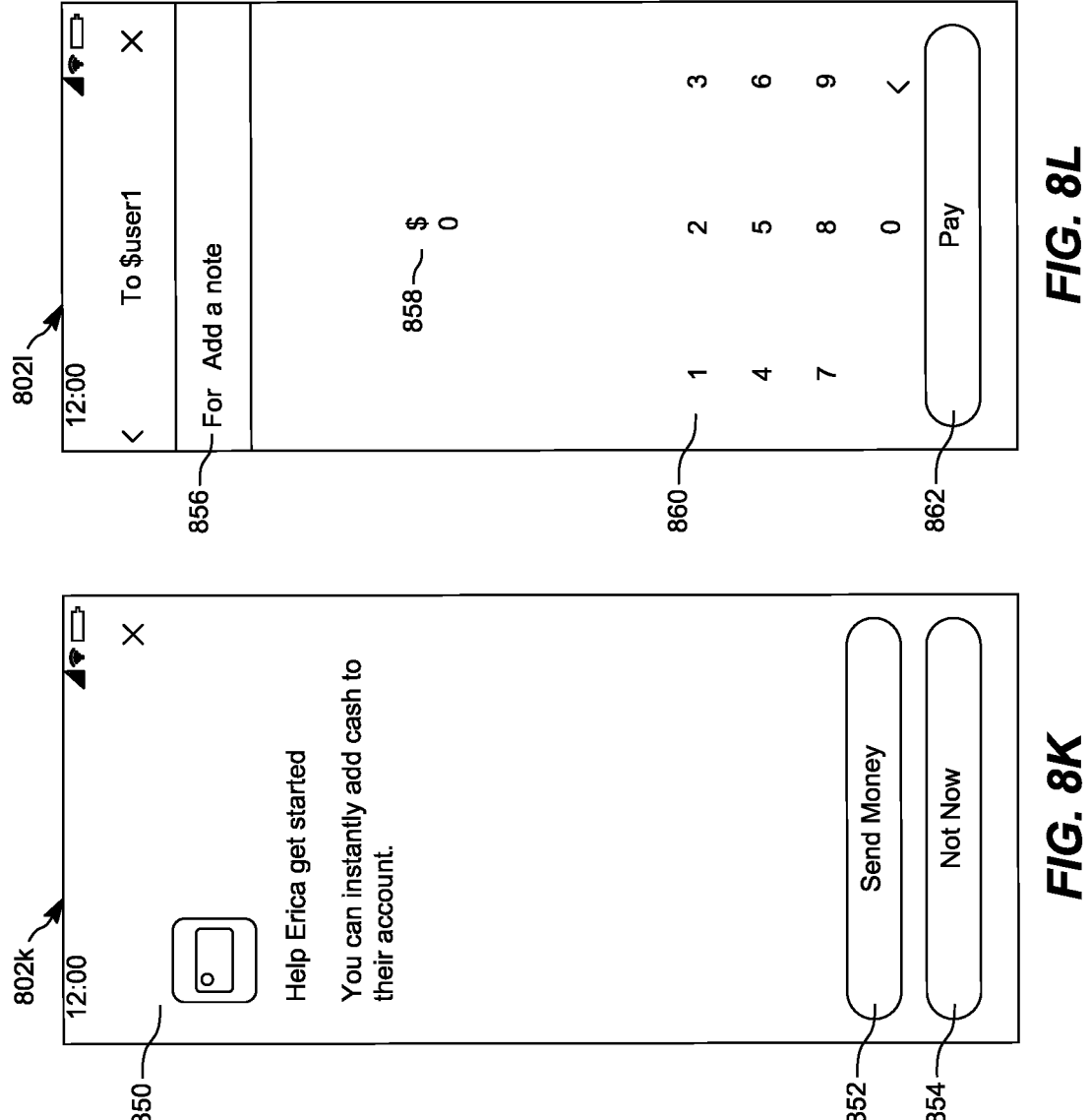

In response to the primary user 114(A) selecting the activatable user interface element 831 in FIG. 8G, the user interface 802g can transition to user interface 802k as shown in FIG. 8K. The user interface 802k includes a message 850, an activatable user interface element 852, and an activatable user interface element 854. In response to the primary user 114(A) selecting activatable user interface element 854, the user interface 802k can transition to user interface 802l as shown in FIG. 8L. The user interface 802l includes a note field 856, an amount 858, a digital number pad 860, and an activatable user interface element 862. While user interface 802l shows a primary user sending cash to a secondary user for an initial funding, the user interface 802l can illustrate a primary user 114(A) sending other gifts, such as cryptocurrency, one or more stocks, incentives, and the like. As an example, the user interface 802l may illustrate a stock purchasing menu to send one or more stocks to the secondary user.

Referring to FIGS. 9A-9O, example graphical user interfaces 902a-902o for a secondary account creation workflow as displayed on a user device 112(A) of a primary user 114(A) who does not yet have an account with a payment service are shown. The payment service may default to an initial onboarding flow effectuated through the onboarding component 117. The payment service may determine that since the request is being sent to request a primary account for approval, an onboarding flow for a primary account is needed. Given the determination, the payment service may initially request different information from the primary user 114(A) as compared to if the payment service did not know the onboarding flow is for a primary account. As an example, the payment service may initially request date of birth information from a user going through the onboarding flow. In particular embodiments, the example graphical user interfaces 902a-902o may be displayed within a payment service app executing on a user device or any user interface of the user device (e.g., user device 112(A) of a primary user 114(A) or a user device 112(B) of a secondary user 114(B)).

FIG. 9A illustrates a user interface 902a that includes text message 904, text message 906, and an activatable element 908. FIG. 9B illustrates a user interface 902b that includes an email message 910 and an activatable user interface element 912. The text message 904 and email message 910 may indicate that a secondary user 114(B) is requesting the primary user 114(A) to sign up for an account associated with a payment service. In response to selecting the activatable element 908 or the email message 910, the user interface 902a or user interface 902b can transition to user interface 902c as shown in FIG. 9C. The user interface 902c includes a phone or email field 914, a digital number pad 916, and an activatable user interface element 918.

Figures 9D, 9E, 9F:
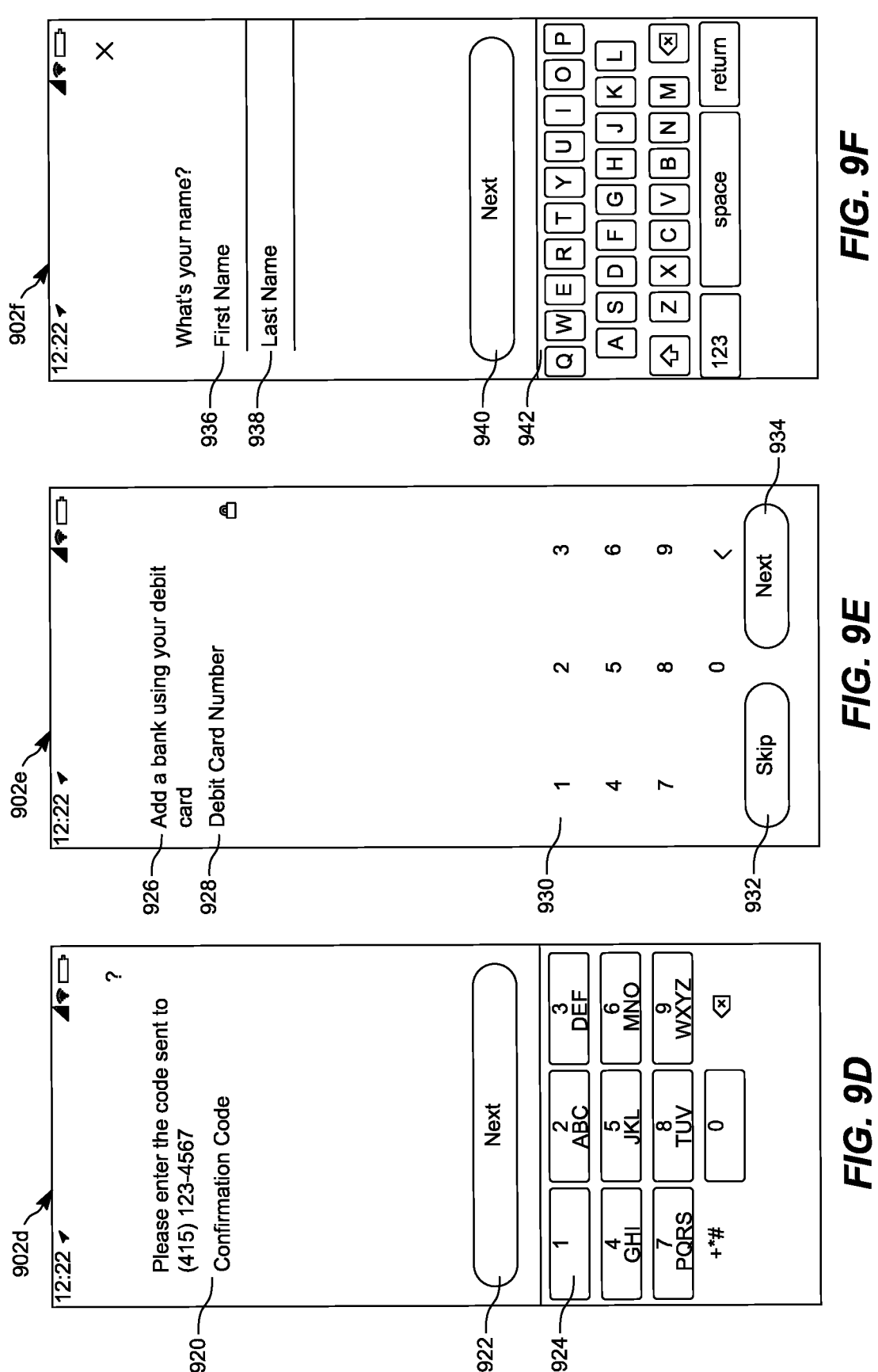

In response to the primary user 114(A) inputting a phone number into the field 914 using the digital number pad 916 and selecting the activatable user interface element 918, the user interface 902c can transition to user interface 902d as shown in FIG. 9D. The user interface 902d includes a confirmation code field 920, an activatable user interface element 922, and a digital number pad 924. In response to the primary user 114(A) inputting the correct confirmation code into the confirmation code field 920 using the digital number pad 924 and selecting the activatable user interface element 922, the user interface 902d can transition to user interface 902e as shown in FIG. 9E. The user interface 902e includes a request 926, a debit card field 928, a digital number pad 930, an activatable user interface element 932, and an activatable user interface element 934. In response to inputting debit card details into debit card field 928 using the digital number pad 930 and selecting the activatable user interface element 934, the user interface 902e can transition to user interface 902f as shown in FIG. 9F. Alternatively, in response to the primary user 114(A) selecting activatable user interface element 932, the user interface 902e can transition to user interface 902f as shown in FIG. 9F. The user interface 902f includes a first name field 936, a last name field 938, an activatable user interface element 940, and a digital keyboard 942.

Figures 9G, 9H, 9I:
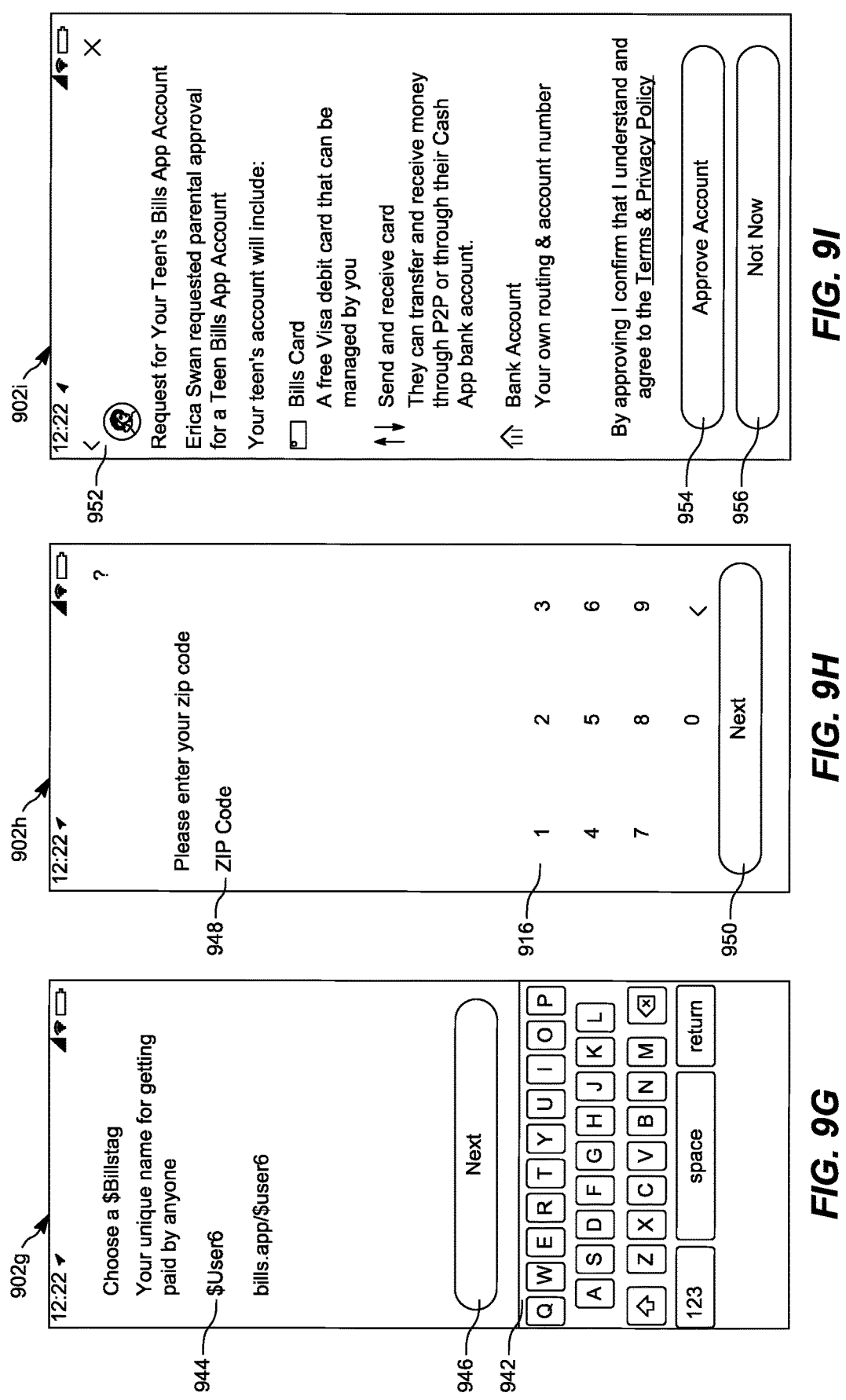

In response to the primary user 114(A) inputting their information using the digital keyboard 942 into the fields 936, 938 and selecting activatable user interface element 940, the user interface 902f can transition to user interface 902g as shown in FIG. 9G. The user interface 902g includes an identifier field 944, an activatable user interface element 946, and a digital keyboard 942. In response to the primary user 114(A) inputting an identifier into the identifier field 944 using the digital keyboard 942 and selecting the activatable user interface element 946, the user interface 902g can transition to user interface 902h as shown in FIG. 9H. The user interface 902h includes a zip code field 948, a digital number pad 916, and an activatable user interface element 950. In response to the primary user 114(A) inputting their zip code into the zip code field 948 using the digital number pad 916 and selecting the activatable user interface element 950, the user interface 902h can transition to user interface 902i as shown in FIG. 9I. The user interface 902i includes a message 952, activatable user interface element 954, and activatable user interface element 956.

Figures 9J, 9K, 9L:
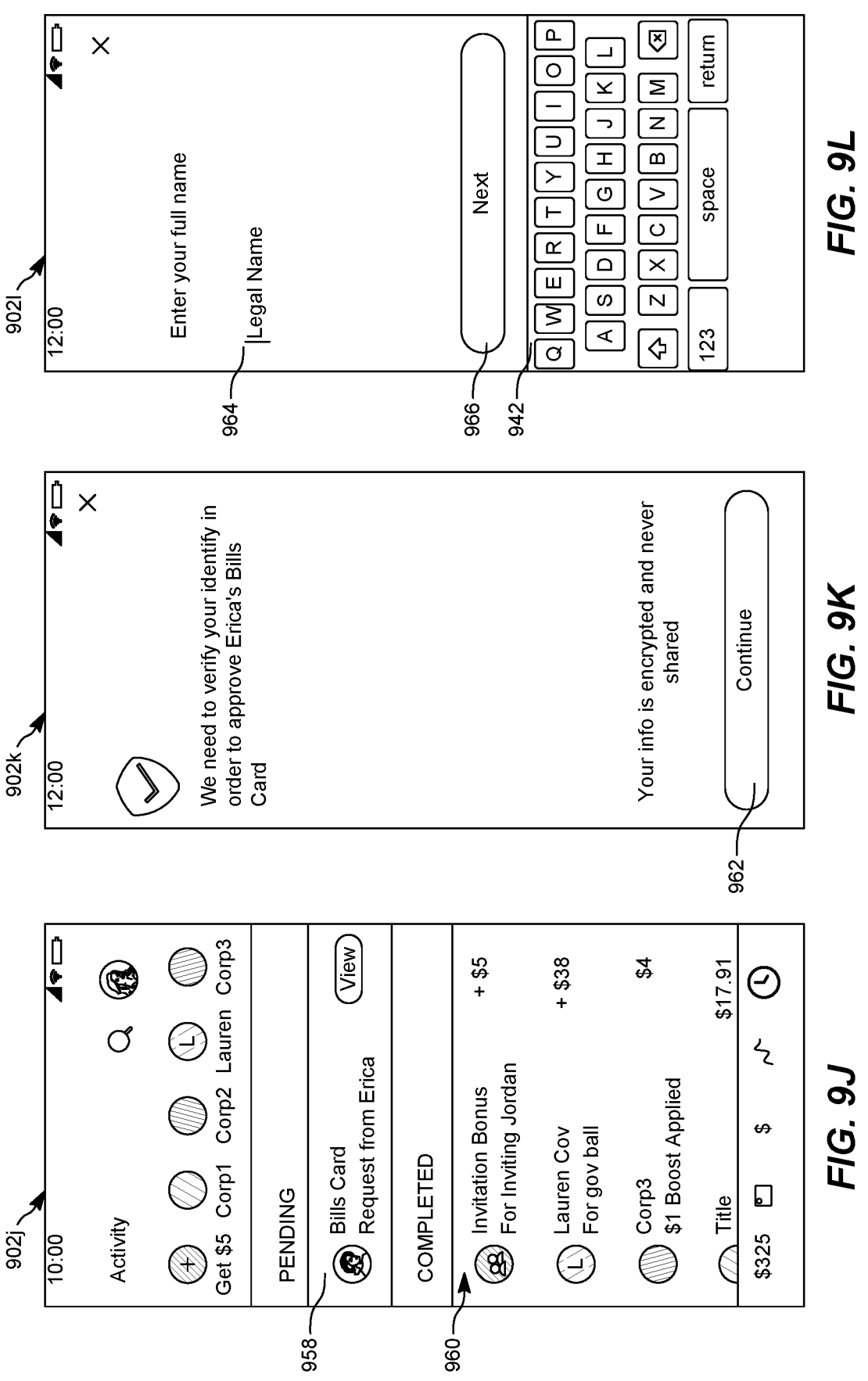
Figures 9M, 9N, 9O:
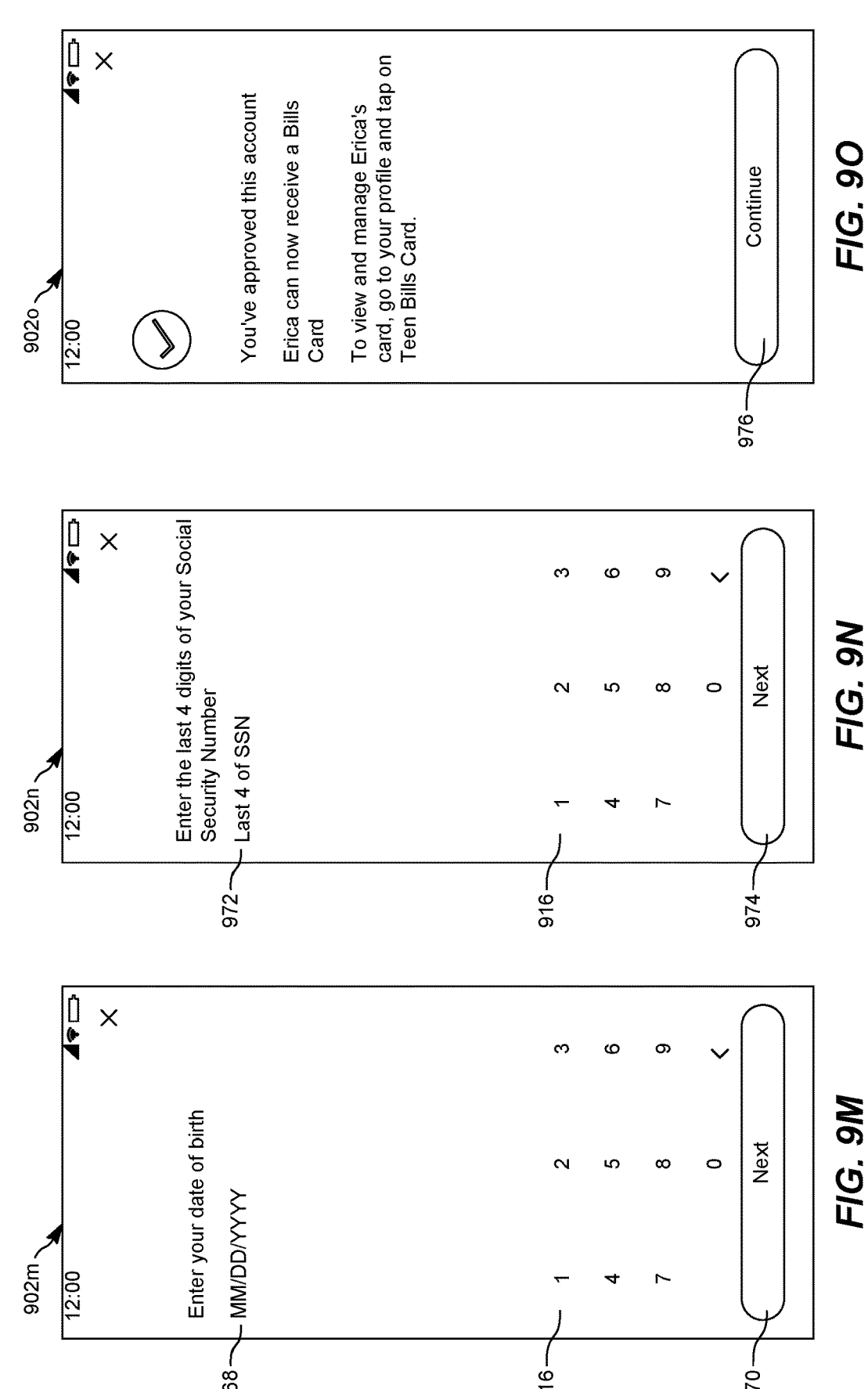

In response to selecting activatable user interface element 954, the user interface 902i can transition to user interface 902j as shown in FIG. 9J. The user interface 902j includes a request for approval 958 and a transaction history 960. In response to the primary user selecting the request for approval 958, the user interface 902j can transition to user interface 902k as shown in FIG. 9K. The user interface 902k includes a request to verify identity of the primary user 114(A) and an activatable user interface element 962. In response to the primary user 114(A) selecting the activatable user interface element 962, the user interface 902k can transition to user interface 902l as shown in FIG. 9L. The user interface 902l includes a full name field 964, an activatable user interface element 966, and a digital keyboard 942.

In response to the primary user 114(A) inputting their full name into the full name field 964 using the digital keyboard 942 and selecting the activatable user interface element 966, the user interface 902l can transition to user interface 902m as shown in FIG. 9M. The user interface 902m includes a date of birth field 968, a digital number pad 916, and an activatable user interface element 970. In response to the primary user 114(A) inputting their date of birth into the date of birth field 968 using the digital number pad 916 and selecting the activatable user interface element 970, the user interface 902m can transition to user interface 902n as shown in FIG. 9N. The user interface 902n includes a social security field 972, a digital number pad 916, and an activatable user interface element 974. In response to the primary user 114(A) inputting their social security number into the social security field 972 using the digital number pad 916 and selecting the activatable user interface element 974, the user interface 902n can transition to user interface 902o as shown in FIG. 9O. The user interface 902o includes a message that the primary user approved of the secondary account of the secondary user and an activatable user interface element 976.

Referring to FIGS. 10A-10I, example graphical user interfaces 1002a-1002i for a secondary account creation workflow for enabling a peer-to-peer payment functionality of a secondary account as provided for display on a user device of a secondary user 114(B) are shown. In particular embodiments, the example graphical user interfaces 1002a-1002i may be displayed within a payment service app executing on a user device or any user interface of the user device (e.g., user device 112(A) of a primary user 114(A) or a user device 112(B) of a secondary user 114(B)). As an example, the secondary user 114(B) may have an existing account with a payment service, but the existing account may not have the peer-to-peer payment functionality enabled because the secondary user 114(B) has not completed an identity verification process or a primary user 114(A), associated with a primary account to which the secondary account of the secondary user 114(B) is mapped, has not enabled the peer-to-peer payment functionality for the secondary account.

FIG. 10A illustrates a user interface 1002a that includes an amount 1004, a digital number pad 1006, an activatable user interface element 1008, and an activatable user interface element 1010. In response to the secondary user 114(B) selecting activatable user interface element 1010, the user interface 1002a can transition to user interface 1002b as shown in FIG. 10B. The user interface 1002b includes a full name field 1012, an activatable user interface element 1014, and a digital keyboard 1016. In response to the secondary user 114(B) inputting their full name using the digital keyboard 1016 and selecting the activatable user interface element 1014, the user interface 1002b can transition to user interface 1002c as shown in FIG. 10C. The user interface 1002c includes an input field 1018, a digital number pad 1020, and an activatable user interface element 1022. As an example, the input field 1018 may be for a date of birth.

In response to the secondary user 114(B) inputting their information into the input field 1018 using the digital number pad 1020 and selecting the activatable user interface element 1022, the user interface 1002c can transition to user interface 1002d as shown in FIG. 10D. As an example, the secondary user 114(B) can input their date of birth into the input field 1018. The user interface 1002d includes an activatable user interface element 1024 to request approval to enable a functionality for the secondary account and a message indicating that the secondary user 114(B) needs approval to enable the functionality for the secondary account. In response to the secondary user 114(B) selecting the activatable user interface element 1024, the user interface 1002d can transition to user interface 1002e as shown in FIG. 10E. The user interface 1002e includes an identifier field 1026, an activatable user interface element 1027, a contact list 1028, and a digital keyboard 1016. In response to the secondary user 114(B) inputting an identifier (e.g., a name) of the primary user 114(A) associated with the secondary account into the identifier field 1026 using the digital keyboard 1016 and selecting the activatable user interface element 1027, the user interface 1002e can transition to user interface 1002f as shown in FIG. 10F. The user interface 1002f includes an activatable user interface element 1030 and a message indicating that the request has been sent.

Figures 10G, 10H, 10I:
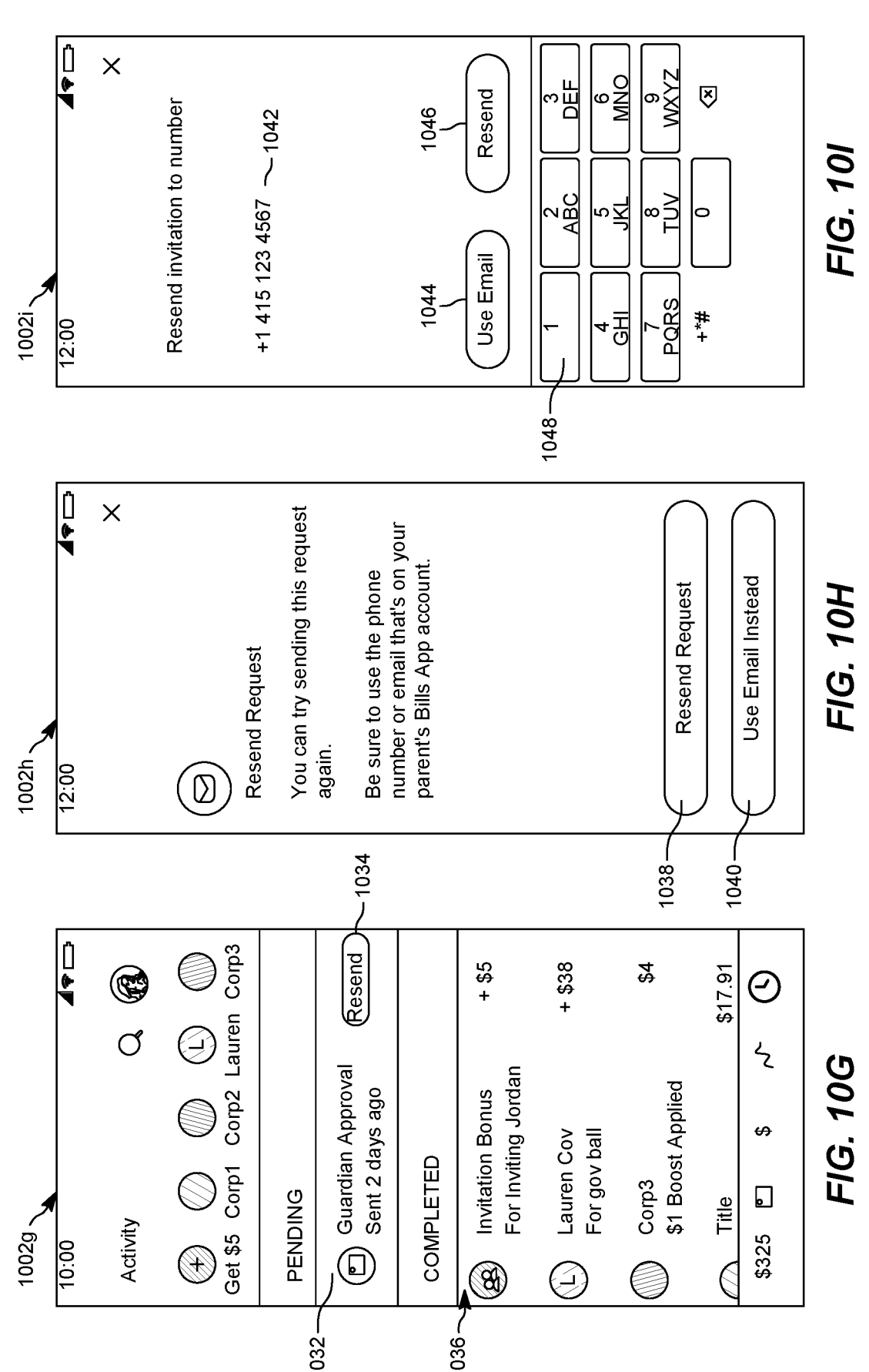

In response to the secondary user 114(B) selecting activatable user interface element 1030, the user interface 1002f can transition to user interface 1002g as shown in FIG. 10G. The user interface 1002g includes a request for approval 1032, an activatable user interface element 1034, and a transaction history 1036. In response to the secondary user 114(B) selecting activatable user interface element 1034, the user interface 1002g can transition to user interface 1002h as shown in FIG. 10H. The user interface 1002h includes an activatable user interface element 1038, an activatable user interface element 1040, and a message indicating the secondary user 114(B) can resend the request. In response to the secondary user 114(B) selecting the activatable user interface element 1038, the user interface 1002h can transition to user interface 1002i as shown in FIG. 10I. The user interface 1002i includes an identifier field 1042, an activatable user interface element 1044, an activatable user interface element 1046, and a digital number pad 1048. The secondary user 114(B) may select the activatable user interface element 1046 to resend the request, which would generate a notification for the primary user 114(A) at the primary user's device to respond to the request.

Referring to FIGS. 10J-10N, example graphical user interfaces 1002j-1002n for a secondary account creation workflow for enabling a peer-to-peer payment functionality of a secondary account as provided for display on a user device 112(A) of a primary user 114(A) are shown. In particular embodiments, the example graphical user interfaces 1002j-1002n may be displayed within a payment service app executing on a user device or any user interface of the user device (e.g., user device 112(A) of a primary user 114(A) or a user device 112(B) of a secondary user 114(B)). user device 112(A) of a primary user 114(A) or a user device 112(B) of a secondary user 114(B)). Although, FIGS. 10J-10N and graphical user interfaces 1002j-1002n are directed to enabling a peer-to-peer payment functionality, other functionalities may be enabled, such as an investing functionality, cryptocurrency transaction functionality, transactions with certain merchants functionality, and other functionalities. When a secondary user 114(B) is attempting to use a payment functionality, the payment service may use a mapping to determine whether the secondary account of the secondary user 114(B) is enabled to perform the respective functionality.

Figure 10K:
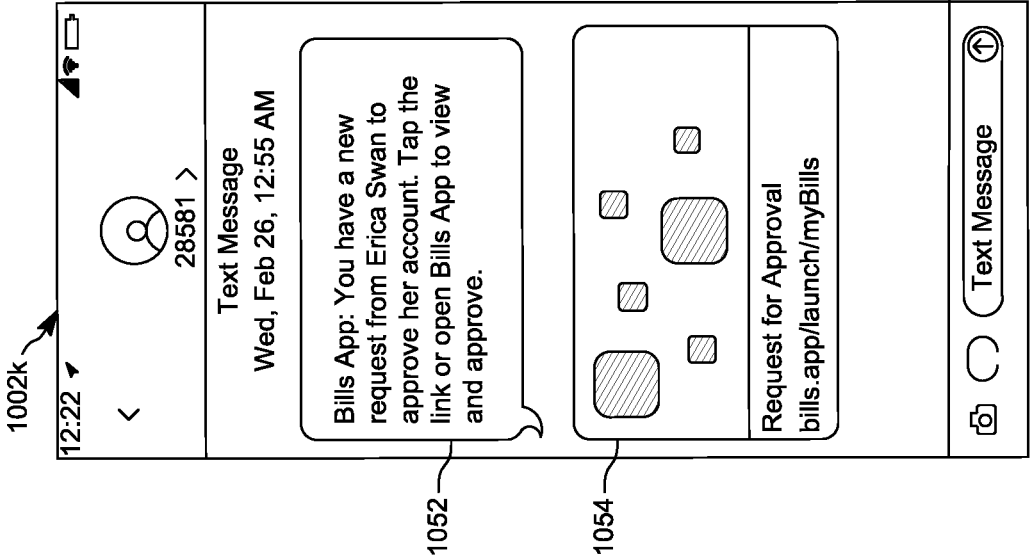
Figure 10J:
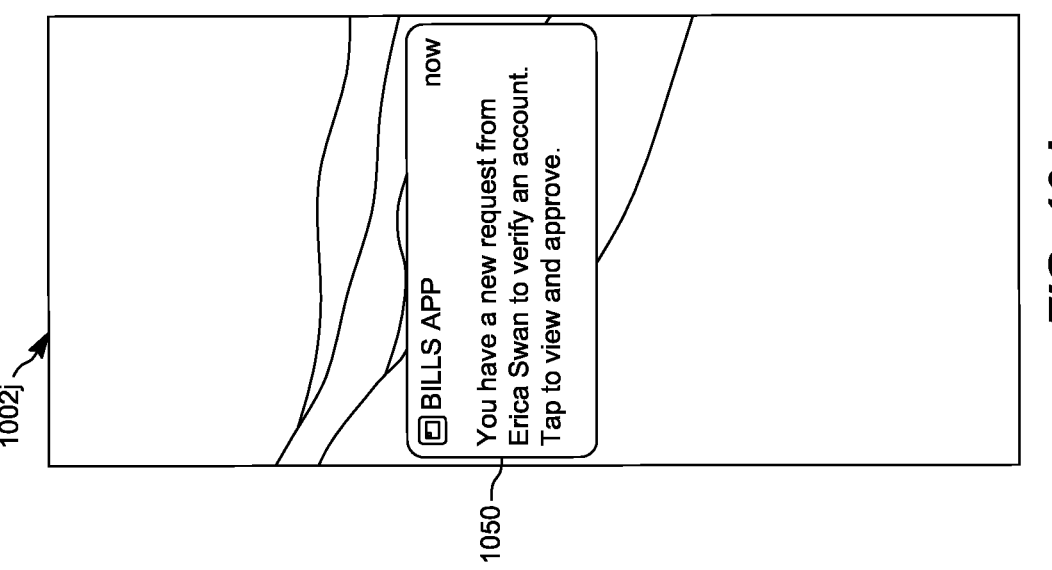

FIG. 10J illustrates a user interface 1002j that includes a notification 1050. The notification 1050 may indicate that the primary user 114(A) has a new request from a secondary user 114(B) to approve or enable a payment functionality. In response to the primary user 114(A) selecting the notification 1050, the user interface 1002j can transition to user interface 1002k as shown in FIG. 10K. The user interface 1002k includes a text message 1052 and an activatable element 1054.

In response to the primary user 114(A) selecting the activatable element 1054, the user interface 1002k can transition to user interface 1002l as shown in FIG. 10L. The user interface 1002l includes an activatable user interface element 1056, an activatable user interface element 1058, and a message indicating the secondary user 114(B)'s request to enable a payment functionality for the secondary account. Alternatively, in response to the primary user 114(A) selecting the activatable element 1054, the user interface 1002k can transition to user interface 1002m as shown in FIG. 10M. The user interface 1002m includes a pending request 1060 and a transaction history 1062. In response to the primary user 114(A) selecting the activatable user interface element 1056, the user interface 1002l can transition to user interface 1002n as shown in FIG. 10N. The user interface 1002n includes an activatable user interface element 1064 and a message indicating the primary user 114(A) approved of the payment functionality for the secondary account.

In particular embodiments, the payment service system 106 may support creation and management of dedicated-purpose funds as shown in FIGS. 11A-11G. A primary user 114(A) or a secondary user 114(B) belonging to an account group may create a dedicated-purpose fund for which the creator or a contributor of the fund may place restrictions on how money contributed to the fund is spent. The stored balance of a fund may be limited to use with one or more of a designation of one or more categories of products or services on which the money may or may not be spent, a designation of one or more users in the account group who are or are not authorized to spend the money, date(s) or time(s) or days of the week or month before, during, or after which the money may or may not be spent, specific merchants or categories of merchants at which the money may or may not be spent, hourly/daily/weekly/monthly/yearly caps on how much money may be spent, specific other users to whom peer-to-peer payments may or may not be made, or specific other users who may or may not contribute to the fund.

In particular embodiments, the creator of the fund, or possibly one or more other users associated with the fund, may be able to name the fund, send out invitations to contribute to the fund, create a special group of users who may participate in the fund, add or remove restrictions on the fund, view contributions to the fund, send out thank you notes to contributing users, and view reports on expenditures made using money from the fund.

In particular embodiments, the payment service system 106 may enable merchants to provide special incentives, discounts, or promotions in connection with a dedicated-purpose fund, based on, for example: designated spending categories included in the fund; profile information, group affiliation (e.g., for students at a particular school), location, transaction history information for one or more users associated with the fund; or a name, description, or affiliation of the fund with an organization or institution.

Primary users 114(A) or secondary users 114(B) can invite other users 114 to the payment service by sending text messages, emails, push notifications, or the like to other users. In some examples, users can be associated with personalized links that can be included in such text messages, emails, push notifications, or the like, or can be included in social media posts. In some examples, such "referrals" can be associated with incentives for the referring user (e.g., a primary user 114(A) or secondary user 114(B)) or a referred user 114 (e.g., a new user who opens an account with the payment service). Incentives can be offered by the payment service in additional or alternative examples, for instance, to incentivize fiscal responsibility (e.g., saving vs. spending vs investing goals, making a payment on a bill or a loan, etc.), charity (e.g., donating to a charity, providing service, etc.), sustainable shopping (e.g., making a purchase from a B corporation, making a purchase from a business that meets particular environmental conditions, etc.), or the like. That is, when the payment service determines an applicable action associated with an incentive, the payment service can associate the incentive with the associated account. Examples of incentives can be fiat currency, stocks, cryptocurrency, a non-fungible token, a discount, a reward, or the like. In some examples, incentives offered by the payment service can be based on a date, holiday, event, time, etc. In some examples, such incentives can be time or location based and can therefore expire after a period of time or a determination that a user 114 has left a geolocation with which the incentive is associated.

In some examples, the payment service can offer a physical or digital asset as an incentive for application activity. In some examples, an asset, such as a point, a ticket, or the like, can be awarded for maintaining a stored balance above a threshold for a period of time, for adding new or continuing one or more inflows (e.g., direct deposit), making particular purchases (e.g., stocks, cryptocurrency, non-fungible tokens, etc.), using particular functionalities, referring additional users, playing games or participating in other activities offered by the payment service in the payment service app, or the like. In some examples, such assets can be redeemed for prizes or other value. In some examples, such prizes can include physical assets (e.g., cars, clothing, devices, etc.), funds (e.g., fiat currency, cryptocurrency, stocks, etc.), digital assets (e.g., non-fungible tokens, etc.), promotions, or the like. In some examples, the PSS can select individuals users and award them prizes or other value based on the application activity.

In some examples, primary users 114(A) can configure incentives for secondary accounts 132(B) associated therewith. For example, a primary user 114(A) can provide one or more of a savings matching, reward based on achieving a goal, matching based on other assets, rewards for donations or for eco-friendly spending, capital advance or loan, and the like, to the secondary account 132(B). As an example, the primary user 114(A) can provide a fractional matching from 0-100% of a savings contribution made by a secondary account. As an example, the primary user 114(A) can provide incentives when a secondary account has hit a milestone, such as saving a threshold amount of money. As an example, the primary user 114(A) can provide matching based on an asset purchase, such as stocks. In some examples, such matching can enable contributions made by the secondary user 114(B) to mirror or substantially mirror investment portfolio(s) of the primary user 114(A). The payment service may label certain transactions as eco-friendly, and the primary user 114(A) can configure rewards when the secondary account performs transactions corresponding to eco-friendly transactions.

As another example, the primary user 114(A) can set goals or milestones, for example, based on past transaction behavior of the secondary user 114(B), or incentives that the primary user 114(A) wishes to enforce on the secondary user 114(B). In some examples, such goals or milestones can be recommended to the primary user 114(A) by the payment service or generated by the payment service based on recommendations. In such examples, such recommendations can be determined based at least in part on transaction data or interaction data associated with other users of the payment service or integrated third-party services, or goals or milestones of other users. In some examples, such recommendations can be output from a machine-learning mechanism trained on historical data (e.g., transaction and/or interaction data) associated with users of the payment service. In some examples, the secondary user 114(B) or the payment service can set goals or milestones for the secondary user 114(B). In some examples, such goals or milestones can be recommended by the payment service based at least in part on transaction data or interaction data of other users, or goals or milestones of other users. That is, in some examples, goals or milestones can be generated predictively based on transaction data, interaction data, goals or milestones of other users associated with the payment service.

In some examples, integrations can enable users with visibility into what other users, such as their friends, are doing on other platforms. Such information can be used by primary users, secondary users, or the like to set or recommend goals or milestones.

In some examples, each goal or milestone can be associated with one or more conditions, satisfaction of which can cause an incentive, or a portion thereof, to be associated with the secondary account 132(B). In some examples, the payment service can track completion of a goal or milestone (e.g., satisfaction of condition(s) associated therewith) and can award portions of an incentive or individual incentives for completion of a portion of a goal or milestone.

Incentives can include the transfer of funds from a stored balance of the primary user 114(A) to a stored balance of the secondary user 114(B), a micropayment to the secondary account 132(B), a donation to a fundraiser or other cause, a purchase or allocation of stock, cryptocurrency, or other asset, a discount, a reward, a non-fungible token (NFT), or the like. In some examples, an incentive can be a pre-funded stored balance that, upon satisfaction of a condition, can be associated with the secondary account 132(B) and/or access can be granted thereto. In some examples, the pre-funded stored balance can be associated with the secondary account 132(B) prior to satisfaction of the condition and funds associated therewith can be inaccessible until the condition is satisfied. In some examples, the pre-funded stored balance can be associated with another account prior to satisfaction of the condition and can be transferred and availed to the secondary account 132(B) upon satisfaction of the condition. In some examples, such stored balances may not be pre-funded but can be created on-the-fly.

In some examples, incentives can be determined based at least in part on context associated with the goal or milestone. For example, if a goal or milestone is associated with chores related to a pet, the incentive can be a donation to a pet-related non-profit, stock related to a pet store, cryptocurrency related to a pet, or the like. As another example, if a goal relates to gaming, the incentive can be associated with stock related to a game, cryptocurrency that can be used in the game, an NFT used in the game, or the like. That is, the payment service can determine context associated with the goal or milestone and can provide an incentive based thereon. In some examples, the payment service can recommend incentives based on context, which can be accepted (or not) by the primary user 114(A). In some examples, primary users can configure incentives.

In some examples, goals or milestones can be associated with a data object, that can be stored in the datastore, and can be used for tracking completion of the goal. Such goals or milestones can either be tracked by the primary user 114(A), secondary user 114(B), or by the payment service. In some examples, the payment service can monitor transaction data and/or interaction data in real-time or near-real-time to determine whether condition(s) associated with goal(s) or milestone(s) have been satisfied. For example, the payment service can receive transaction data and/or interaction data associated with users of the payment service and can compare the transaction data to stored conditions(s). Based at least in part on a determination that a condition associated with a goal or milestone has been satisfied, as determined from the transaction data and/or interaction data, the payment service can associate an incentive with the secondary account 132(B). In some examples, the payment service can be integrated with one or more third-party service providers, such as those offering social networking, e-commerce, content (e.g., movies, music, books, podcasts, etc.), gaming, e-learning, or the like. Such integrations can be facilitated by APIs, SDKs, or the like. As such, the payment service can have access to interaction data associated with such third-party service providers. Such interaction data can include social networking actions (e.g., comments, new friend connections, new professional connections, posting content, not posting content, etc.), ecommerce transactions, movies or songs downloaded, streamed, shared, or posted, games played, learning modules completed, or the like. That is, the payment service can receive, with permission from at least one of the primary user 114(A) or the secondary user 114(B), interaction data associated with the secondary user's 114(B) interactions on the third-party service providers in real-time or near-real-time. In at least one example, the payment service can receive interaction data associated with users of the payment service from the third-party service provider(s) and can compare the interaction data to stored conditions(s). Based at least in part on a determination that a condition associated with a goal or milestone has been satisfied, as determined from the interaction data, the payment service can associate an incentive with the secondary account 132 (B).

For example, the primary user 114(A) can create a goal for reading and the payment service can track that the secondary user 114(B) has purchased book on a third-party application that meets the criteria of the reading goal. That is, the purchase of the book can be determined to be helpful for enabling the secondary user 114(B) to meet the reading goal set by the primary user 114(A). In some examples, the payment service can credit the account of the secondary user 114(B) with funds corresponding to cost of the books. In some examples, the secondary account 132(B) can be associated with a "purpose-based" account related to reading and the payment service can determine that the transaction involving the books is associated with such a purpose. As such, funds associated with the "purpose-based" account can be unlocked or otherwise availed for the purchase of the book. In yet another example, the payment instrument (e.g., a payment identifier) corresponding to the secondary user 114(B) can be activated to enable purchase of books via the payment service or via a third-party application such that the secondary user's account is credited at the time of purchase, thus speeding up the transaction. The primary user 114(A) may receive alerts to indicate whether or not the reading goals are met.

As another example, the primary user 114(A) can send gifts to the secondary user 114(B). For example, the primary user(s) can create a gift that can be redeemed on specific platforms, e.g., gaming devices or platforms. That is, the "gift" can be associated with a "purpose-based account" or a goal, wherein the funds are conditioned for use or based on performance on the gaming platform. The payment service can track interactions of the secondary user 114(B) and the gaming platform. For this, the payment service can integrate via APIs and/or SDKs with the gaming platforms of devices to, with permission, obtain the gaming profile(s) of the secondary user 114(B). Accordingly, the payment service can credit the account of the secondary user 114(B) with funds for use in microtransactions on the gaming platform. Alternatively, a payment instrument (e.g., a payment identifier) corresponding to the secondary user 114(B) can be activated to enable purchase of items on the gaming platform via the payment service or via a third-party application such that the secondary user's account is credited at the time of purchase, thus speeding up the transaction. The primary user 114(A) may receive alerts to indicate spending on the gaming platform.

In some examples, goals, milestones, gifts or the like can be presented via user interfaces, such as activity user interfaces, via respective instances of the payment service app 110. In some examples, the primary user 114(A), secondary user 114(B), or the payment service can track completion of goals or milestones. In some examples, such completion can be updated in real-time or near-real-time and such updates can be presented via the user interfaces. In some examples, the primary user 114(A) or the secondary user 114(B) can interact with the user interface to update or otherwise track progress or completion of the goal or milestone. In some examples, goals can be tiered or otherwise interconnected, such that satisfaction of one goal can cause another goal to be associated with the secondary account 132(B). In some examples, satisfaction of a goal (or not) can cause other goals to be modified.

As described above, in some examples, users can share representations of their personalized payment instruments, interactions with the payment service, goals or milestones, or completion thereof, or the like to platforms of third-party service providers, such as gaming platforms, social medial platforms, music streaming platforms, or the like. Such sharing can be via integrations between the payment service system 106 and one or more third-party service providers, for example by one or more APIs or SDKs. Such sharing can be used to drive and streamline acquisitions of new users. In some examples, shared data, such as a representation of a personalized payment instrument, interaction with the payment service, goal or milestone, or the like, can have additional data embedded or encoded therein, or otherwise be associated with a referral code identifying the user who shared the data. The embedded or encoded data can be associated with a referral code, such as via a quick response (QR) code, link or the like, such that an interaction with the shared data, for example via a single interaction ("one touch") can enable a user who shared the shared data to receive a referral reward (e.g., a payment, a gift, a discount, etc.). As such, if a user on a platform of a third-party interacts with something that another user, having an account with the payment service, shares via the platform, the other user, having the account with the payment service, can receive a referral award.

FIGS. 11A-11G illustrate various example GUIs for receiving and recognizing contributions made to a dedicated-purpose fund created by a secondary user 114(B) in connection with a secondary account, as well as reporting on expenditures made using the dedicated-purpose fund. For example, the secondary account can receive a notification, e.g., in the form of a deposit in the account's balance, a credit offering, an extended reality object, an e-gift card (e.g., which could resemble a physical gift card, a package, a present, an envelope, or the like), a physical gift card, which may be tied to financial offering (such as stocks, cryptocurrency, fiat currency, credit, debit, etc.), etc.

In some examples, the financial offering may be contextual such that when a specific condition or restriction is met (e.g., goals/chores are completed, timing, location etc.), the financial offering is associated with the secondary account. That is, the payment service can monitor transactions of the secondary user 114(B) using the secondary account and based on a determination that a particular transaction satisfies a condition or restriction associated with the financial offering, can apply the financial offering or otherwise associate the financial offering with the secondary account. The payment service may send out notifications of progress on financial offerings that are contextual (e.g., goals/chores are completed). In one example, a notification can take the form of alert functions that may appear on user's home page to indicate that the user has failed to complete chores or fund is in jeopardy or is being withheld based on the progress made. Additionally, a help function may be provided so that custodians (e.g., parent, guardian, etc.) or minors may access customized multimedia tutorials on certain aspects of money management and banking or have frequently asked questions answered in an easy and informative format. A chat function may be made available to users, so that a user may have near real-time feedback to assist with meeting their goals.

In some examples, the financial offering may be conditional. In some examples, the payment service can monitor transactions or other interactions of users associated with the fund to ensure that such transactions or other interactions are compliant with the one or more conditions associated with the fund. The payment service may determine whether the transactions are compliant with the one or more conditions to allow transactions to proceed when the transaction satisfies the one or more conditions. As an example, a transaction for a purchase of an allowed category may be allowed to be processed. In some examples, the payment service can identify a particular transaction that satisfies one or more conditions placed on the fund and can prompt a user associated with the fund (e.g., a secondary user 114(B)) to generate or send a notification to a contributor to the fund about the purchase. As an example, such a notification can be a "thank you note." In some examples, a user can capture or associate an image or other content associated with an item purchased using at least a portion of the fund, provide text or other data to be associated with the notification, or the like to customize or personalize the notification based on the transaction or the recipient.

Figures 11A, 11B:
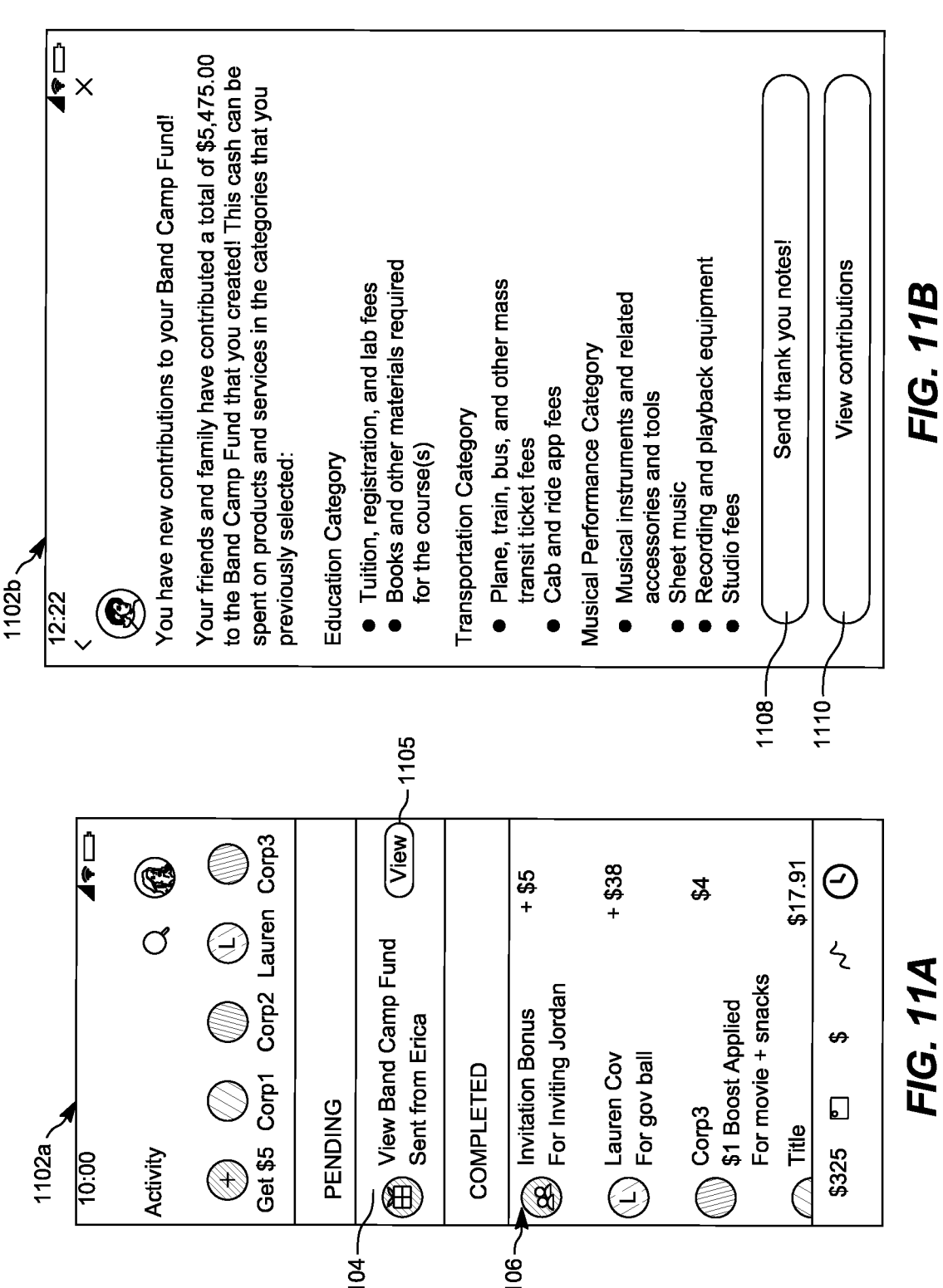
FIGS. 11A-11G illustrate various example GUIs for receiving and recognizing contributions made to a dedicated-purpose fund created by a secondary user in connection with a secondary account, as well as reporting on expenditures made using the fund according to some embodiments disclosed herein.

Referring to FIGS. 11A-11G, example graphical user interfaces 1102a-1102g for receiving and recognizing contributions made to a dedicated-purpose fund created by a secondary user in connection with a secondary account, as well as reporting on expenditures made using the fund are shown. In particular embodiments, the example graphical user interfaces 1102a-1102g may be displayed within a payment service app executing on a user device or any user interface of the user device (e.g., user device 112(A) of a primary user 114(A) or a user device 112(B) of a secondary user 114(B)). FIG. 11A illustrates a user interface 1102a that includes a dedicated-purpose fund 1104, an activatable user interface element 1105, and a transaction history 1106. In response to the user selecting activatable user interface element 1105, the user interface 1102a can transition to user interface 1102b as shown in FIG. 11B. The user interface 1102b includes details corresponding to the dedicated-purpose fund, an activatable user interface element 1108, and an activatable user interface element 1110. The details corresponding to the dedicated-purpose fund can include details of categories of transactions that the fund is allowed to be used for. For example, the details can specify that an education category, transportation category, and musical performance category have been enabled for transactions using the dedicated-purpose fund. Additionally, the details can specify particular items that are allowed within each category, such as books and other materials required for the course(s) for transactions.

Figures 11C, 11D, 11E:
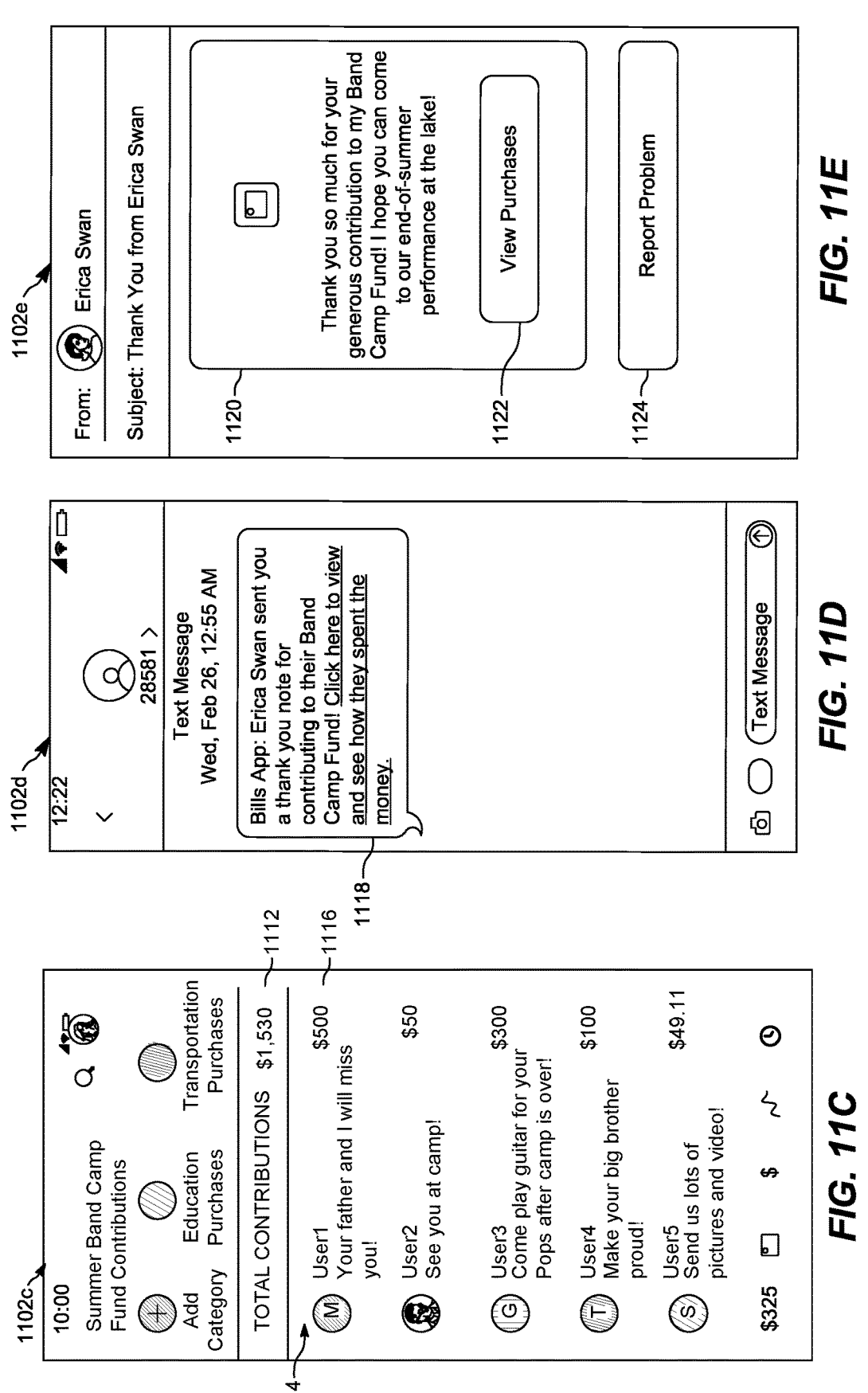

In particular embodiments, the payment services component 121 can monitor transactions within the payment service app 110(B). The payment services component 121 can access the transaction data of the transactions performed using the payment service system 106. The payment services component 121 can check to verify if one or more condition(s) are met for the transactions. As an example, the payment services component 121 can check to see whether a transaction falls within one of the approved categories (e.g., education category, transportation category, and musical performance category) and if the transaction is directed to an approved item. In particular embodiments, the payment services component 121 can access third-party sources to determine whether transactions using the dedicated-purpose fund are allowed to be processed. As an example, a secondary user 114(B) can attempt to perform a transaction through a third-party application using the dedicated-purpose fund, where the payment services component 121 can retrieve transaction data from the third-party application and determine whether the transaction satisfies the condition(s) to use the dedicated-purpose fund. In response to the user selecting activatable user interface element 1110, the user interface 1102b can transition to user interface 1102c as shown in FIG. 11C. The user interface 1102c includes a total amount of contributions 1112, a list of contributions 1114 with one or more contributions 1116.

Figures 11F, 11G:
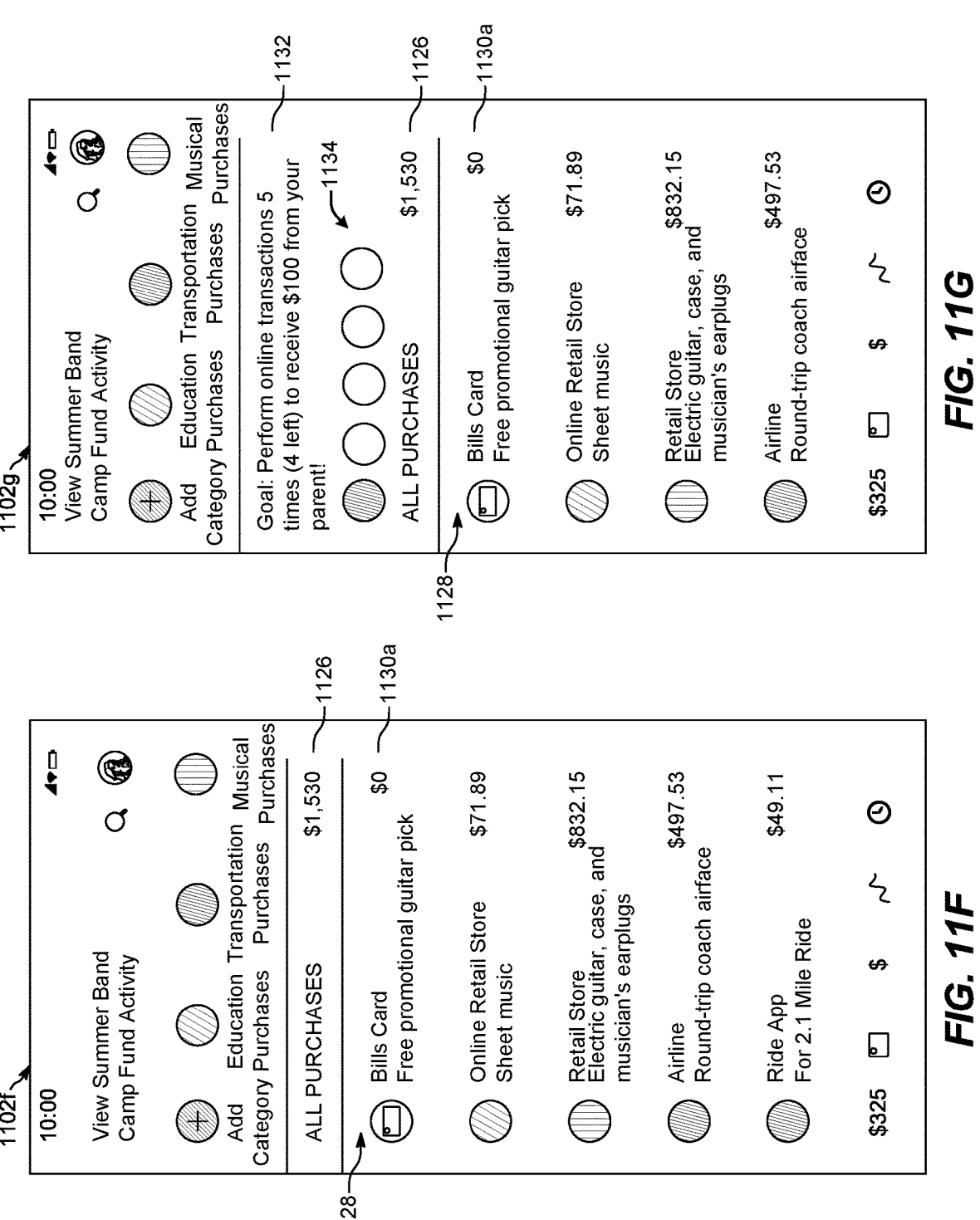

FIG. 11D illustrates a user interface 1102d that includes a text message 1118 that indicates a thank you message for contributing to the dedicated-purpose fund 1104. The text message 1118 may have an activatable element to view the purchase history of the dedicated-purpose fund. FIG. 11E illustrates a user interface 1102e that includes a message 1120 that indicates a thank you message for contributing to the dedicated-purpose fund 1104, an activatable user interface element 1122, and an activatable user interface element 1124. In response to the user selecting either the text message 1118 or the activatable element 1122, the user interfaces 1102d, 1102e transition to user interface 1102f as shown in FIG. 11F or alternatively to user interface 1102g as shown in FIG. 11G. The user interface 1102f includes a total amount of purchases 1126, a transaction history 1128 including one or more transactions 1130, such as transaction 1130a. The one or more transactions can be performed using an identifier or payment instrument associated with the fund. As an example, the fund may provide a useable payment instrument that authorized users of the fund may use to spend the balance of the fund. In some examples, a user may use the payment service app for performing the one or more transactions. In any event, transaction data associated with such transactions can be monitored in real-time or near-real-time to track compliance with condition(s) associated with accounts and, when a condition is satisfied, funds can be withdrawn from the account. Similarly to user interface 1102f, user interface 1102g as shown in FIG. 11G includes a total amount of purchases 1126 and a transaction history 1128 including one or more transactions 1130. User interface 1102g also includes an incentive 1132 with a goal for the secondary user 114(B) to perform in order to receive an incentive. The user interface 1102g also includes a progress indicator 1134 indicating the progress the secondary user 114(B) has made to accomplishing the goal. The progress indicator 1134 is shown as circles, but may be displayed as any kind of indicator, such as a fraction of the progress to completion.

Figures 12A, 12B, 12C:
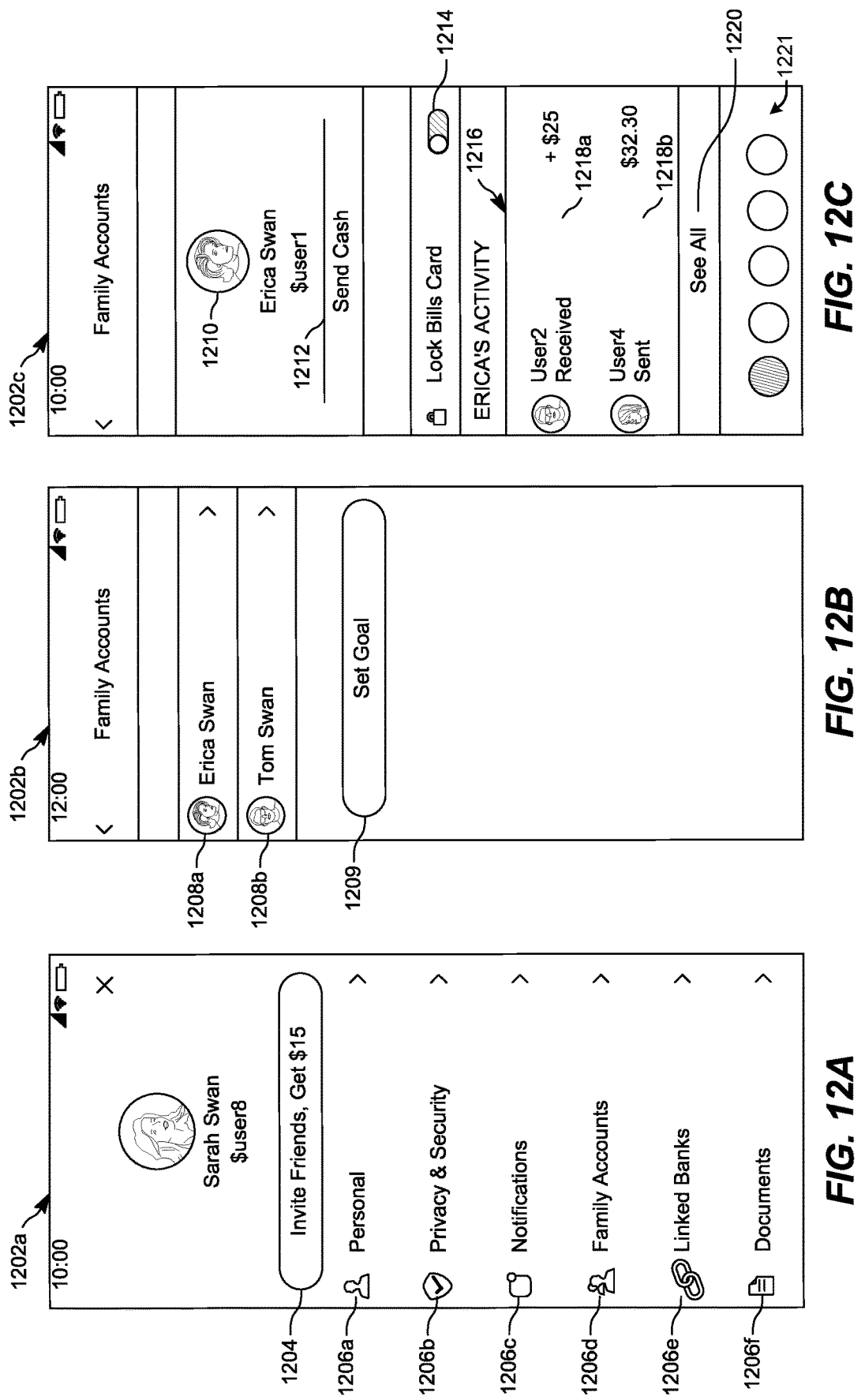
FIGS. 12A-12G illustrate various example GUIs for presenting a transaction history of a secondary account as provided for display on a user device of a primary user according to some embodiments disclosed herein.

Referring to FIGS. 12A-12G, example graphical user interfaces 1202a-1202g for presenting a transaction history of a secondary account are shown. In particular embodiments, the example graphical user interfaces 1202a-1202g may be displayed within a payment service app executing on a user device or any user interface of the user device (e.g., user device 112(A) of a primary user 114(A) or a user device 112(B) of a secondary user 114(B)). FIG. 12A illustrates a user interface 1202a that may present a home screen of a primary account. In particular embodiments, a primary user 114(A) may be interfacing the user interfaces 1202a-1202g.

The user interface 1202a can include an activatable user interface element 1204 and several activatable user interface elements 1206a-1206f. The activatable user interface element 1204 may correspond to a referral link to invite friends to use the payment service app. The activatable user interface elements 1206a-1206f can correspond to different user interfaces to navigate the payment service app.

In response to the primary user 114(A) selecting activatable user interface element 1206d, the user interface 1202a can transition to user interface 1202b as shown in FIG. 12B. The user interface 1202b can include activatable user interface elements 1208a-1208b and activatable user interface element 1209. The activatable user interface elements 1208a-1208b can correspond to different secondary accounts mapped to, or otherwise associated with, the primary account. The activatable user interface element 1209 can be selected to set a goal for one or more of the secondary accounts mapped to, or otherwise associated with, the primary account. As an example, the primary user 114(A) can set an incentive for one or more secondary users 114(B). The incentive may have a goal to accomplish in order to receive a reward. When an incentive is generated, the payment service system 106 can generate a data object to track completion of the goal. The data object can be stored in a data store 128 managed by the payment service system 106. The payment service system 106 can monitor transactions performed by the one or more secondary users 114(B) with an incentive associated with their respective secondary account in real-time or near-real-time. The payment service system 106 can also monitor interaction data associated with the one or more secondary users 114(B). Upon detection of completion of the goal associated with an incentive the payment service system 106 can automatically send the reward to the secondary user 114(B) that accomplished the goal.

In response to the primary user 114(A) selecting activatable user interface element 1208a, the user interface 1202b can transition to user interface 1202c as shown in FIG. 12C. The user interface 1202c can include a profile icon 1210, an activatable user interface element 1212, an activatable user interface element 1214, a transaction history 1216, one or more transactions 1218, such as transactions 1218a-1218e, an activatable user interface element 1220, and incentive progress indicator 1221. The activatable user interface element 1212 can be selected to send funds to a secondary account associated with the secondary user 114(B) identified by profile icon 1210. The activatable user interface element 1214 can be selected to disable a payment instrument associated with the secondary account. The transaction history 1216 can present one or more recent transactions 1218 that are associated with the secondary account. The activatable user interface element 1220 can be selected to see all of the transactions 1218 associated with the secondary account. The incentive progress indicator 1221 can indicate a progress that a user has made to accomplishing a goal to receive an incentive. As an example, the incentive progress indicator 1221 can indicate that the secondary user 114(B) has completed one task out of five to accomplish the goal to receive the incentive.

Figures 12D, 12E:
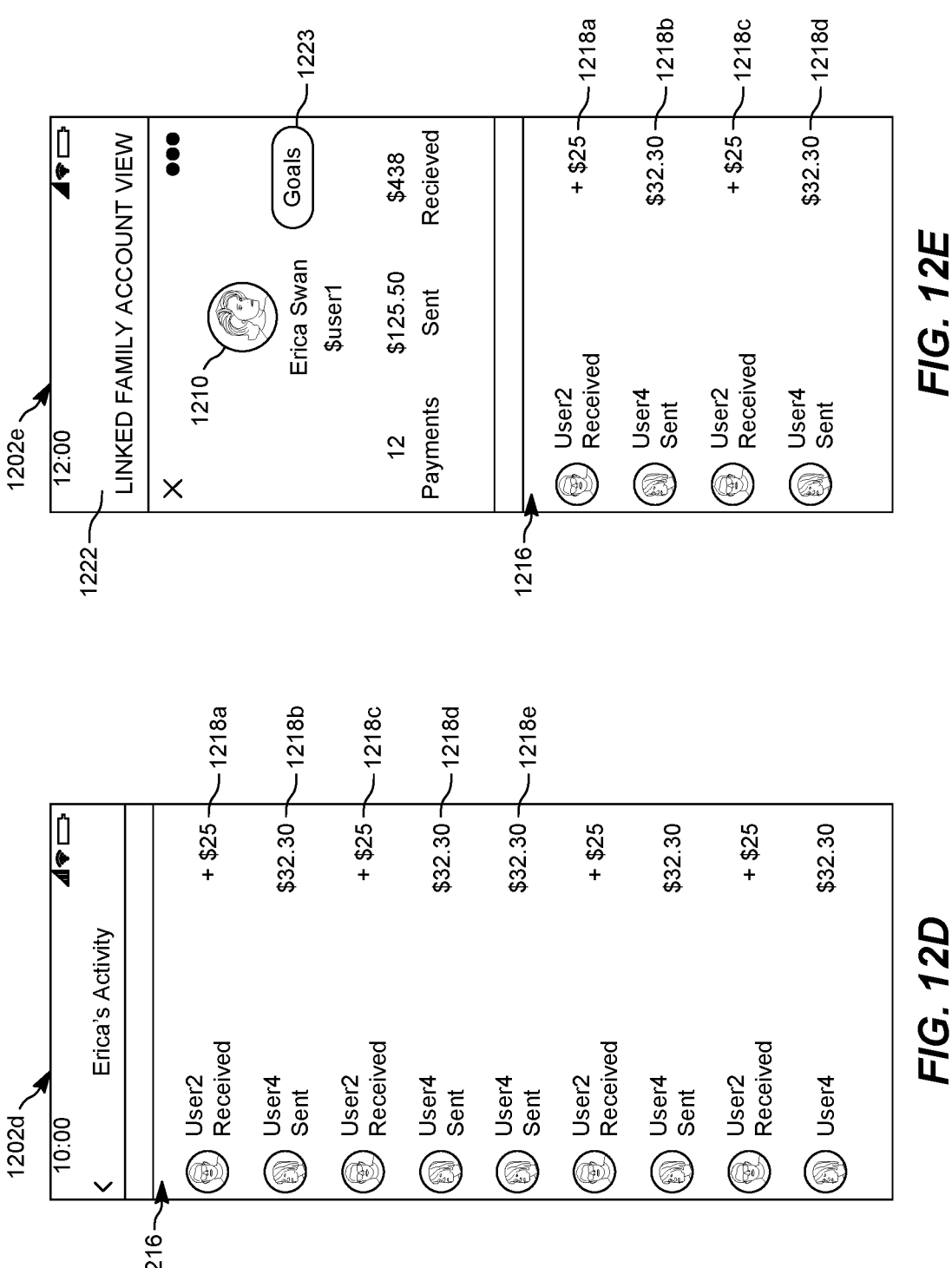

In response to the primary user 114(A) selecting the activatable user interface element 1220, the user interface 1202c can transition to user interface 1202d as shown in FIG. 12D. The user interface 1202d can include a transaction history 1216 and one or more transactions 1218. Each of the transactions 1218 can be a transaction conducted with the secondary account. The transactions 1218 can correspond to transactions performed using enabled functionalities of the secondary account. As an example, the secondary account can only perform transactions corresponding to enabled functionalities.

Figure 12G:
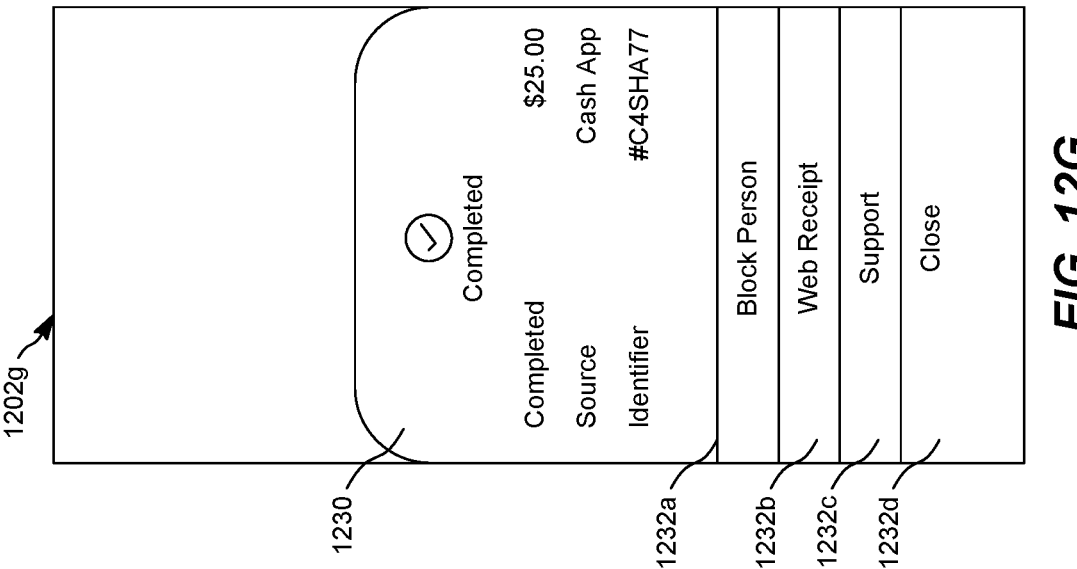
Figure 12F:
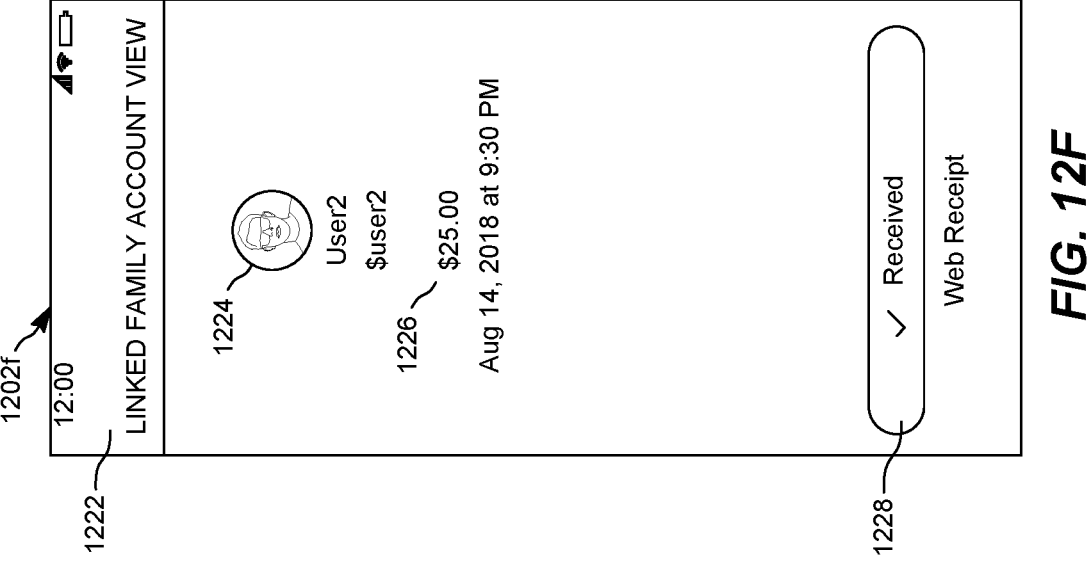

Alternatively, in response to the primary user 114(A) selecting activatable user interface element 1208a, the user interface 1202b can transition to user interface 1202e as shown in FIG. 12E. The user interface 1202e can include an indicator 1222, an activatable user interface element 1223, a profile icon 1210, a transaction history 1216, and one or more transactions 1218. The transaction history 1216 can include one or more recent transactions 1218a-1218d. The indicator 1222 can indicate that a primary user 114(A) is viewing a secondary account 114(B) associated with the primary account. The user interface 1202e can include secondary account information, such as number of payments made using the secondary account, amount of money sent/spent, and amount of money received. The primary user 114(A) can select activatable user interface element 1223 to view the incentives associated with the secondary account, the goals to accomplish to receive the incentives, and the progress the secondary user 114(B) associated with the secondary account has made to accomplish the goals. In response to the primary user 114(A) selecting an activatable user interface element associated with a transaction 1218a, the user interface 1202e can transition to user interface 1202f as shown in FIG. 12F. The user interface 1202f can include an indicator 1222, a profile icon 1224, transaction details 1226, and an activatable user interface element 1228. The transaction details 1226 can include information corresponding to an amount associated with the transaction and a date associated with the transaction. In response to the primary user 114(A) selecting activatable user interface element 1228, the user interface 1202f can transition to user interface 1202g as shown in FIG. 12G. The user interface 1202g can include a transaction interface 1230 and activatable user interface elements 1232a-1232d. Each of the activatable user interface elements 1232a-1232d can correspond to functionalities the primary user 114(A) can perform corresponding to the transaction or the secondary account.

Figure 13B:
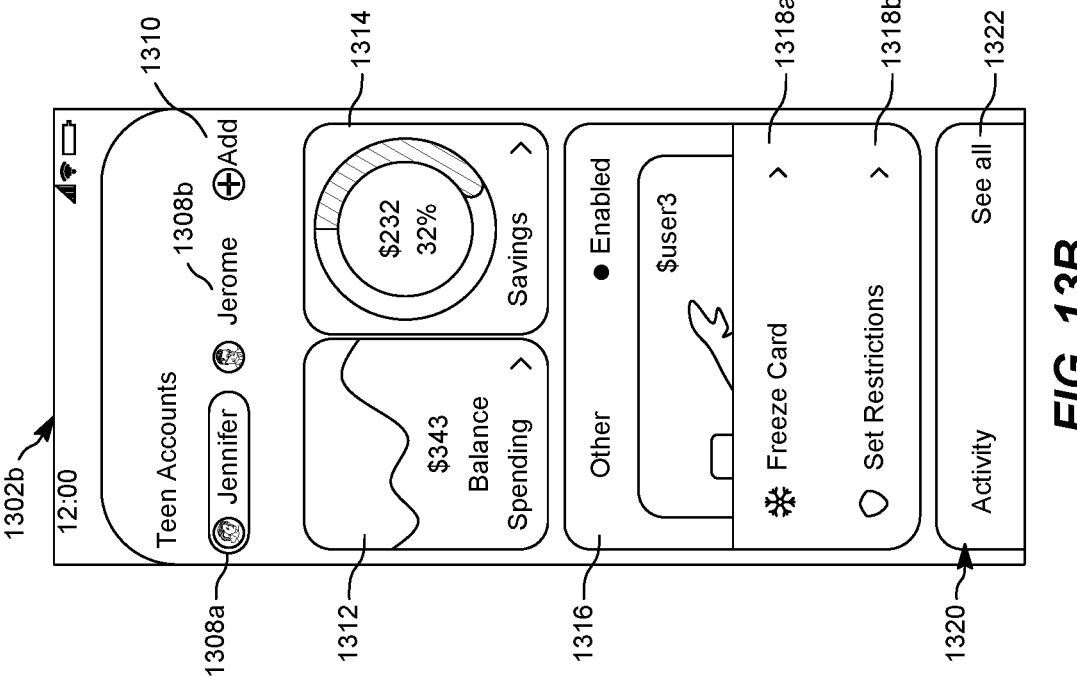
FIGS. 13A-13B illustrate various example GUIs for presenting an account summary of a secondary account as provided for display on a user device of a primary user according to some embodiments disclosed herein.
Figure 13A:
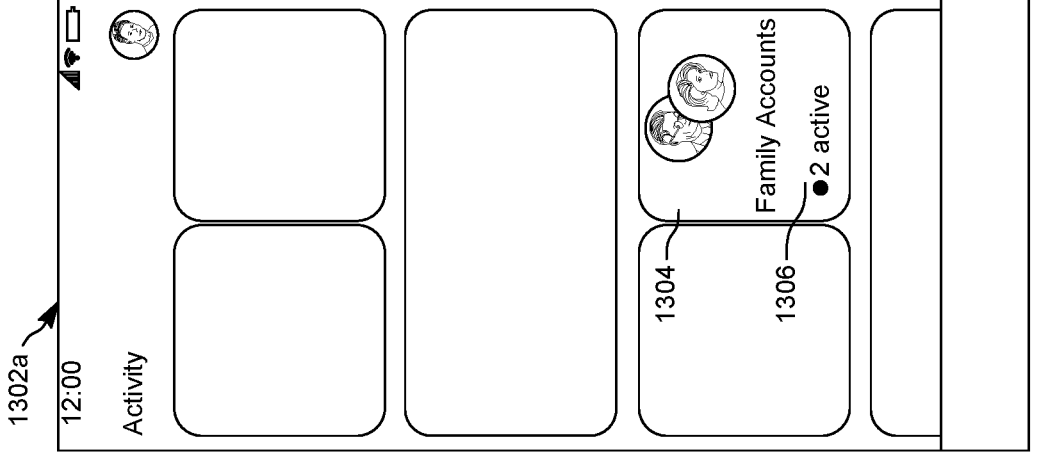

Referring to FIGS. 13A-13B, example graphical user interfaces 1302a-1302b for presenting an account summary of a secondary account are shown. In particular embodiments, the example graphical user interfaces 1302a-1302b may be displayed within a payment service app executing on a user device or any user interface of the user device (e.g., user device 112(A) of a primary user 114(A) or a user device 112(B) of a secondary user 114(B)). FIG. 13A illustrates a user interface 1302a that includes a widget 1304, an indicator 1306, and activatable user interface elements to navigate through a payment service app. A primary user 114(A) may select one or more widgets to include within the user interface 1302a. Each of the widgets may have different functionalities. The widget 1304 can correspond to a family account associated with a primary account. The widget 1304 can have an indicator 1306 of how many of the users associated with the family account are online. The family account can include one or more secondary accounts associated with the primary account.

In response to the primary user 114(A) selecting widget 1304, the user interface 1302a can transition to user interface 1302b as shown in FIG. 13B. User interface 1302b can be an overview of a family account. User interface 1302b can include one or more associated secondary accounts 1308a, 1308b, an activatable user interface element 1310, spending widget 1312, a savings widget 1314, a payment instrument widget 1316, and an activity widget 1320. The primary user 114(A) can select the activatable user interface element 1310 to add an additional secondary account to the family account associated with the primary account. The spending widget 1312 can be selected to present a historical change of the balance associated with the selected secondary account. The savings widget 1314 can be selected to present the amount of money or assets that the user has saved. The savings widget 1314 can be configured to include a goal amount to save. The payment instrument widget 1316 can include activatable user interface elements 1318*a*, 1318*b* to configure the payment instrument widget. The activatable user interface element 1318*a* can be selected to temporarily disable the payment instrument associated with the secondary account. The activatable user interface element 1318*b* can be selected to customize one or more conditions or restrictions associated with the secondary account or the payment instrument associated with the secondary account. The activity widget 1320 can include an activatable user interface element 1322. The activatable user interface element 1322 can be selected to view all the recent activity associated with the secondary account. The activity can include one or more transactions performed associated with the secondary account.

Figures 14A, 14B, 14C:
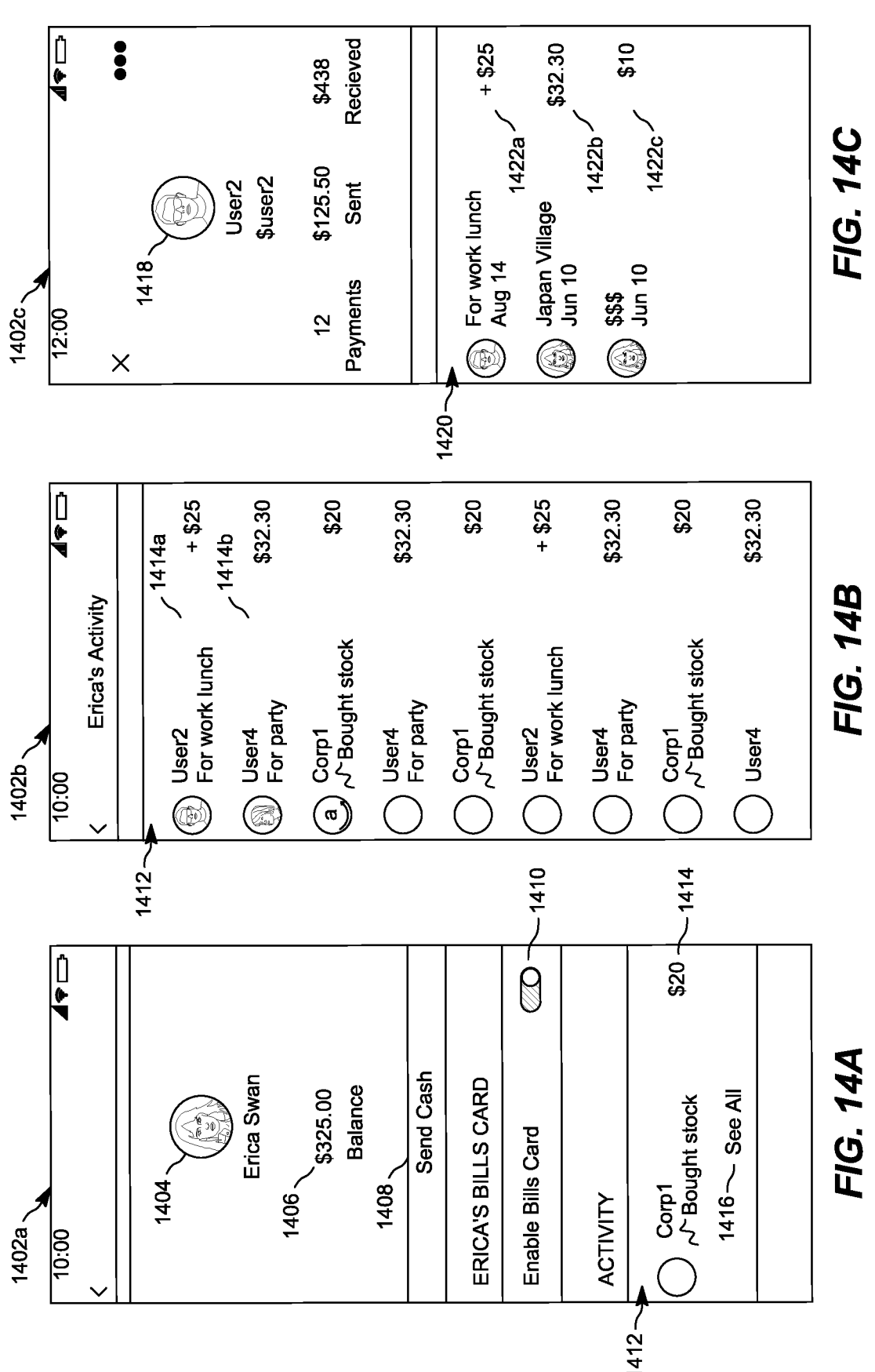
FIGS. 14A-14E illustrate various example GUIs for presenting a transaction history of a secondary account as provided for display on a user device of a secondary user according to some embodiments disclosed herein.

Referring to FIGS. 14A-14E, example graphical user interfaces 1402*a*-1402*e* for presenting a transaction history of a secondary account are shown. In particular embodiments, the example graphical user interfaces 1402*a*-1402*e* may be displayed within a payment service app executing on a user device or any user interface of the user device (e.g., user device 112(A) of a primary user 114(A) or a user device 112(B) of a secondary user 114(B)). FIG. 14A illustrates a user interface 1402*a* that includes a profile icon 1404, a balance 1406 associated with a secondary account, an activatable user interface element 1408, an activatable user interface element 1410, an activity history 1412 including one or more transactions 1414, such as transactions 1414*a*, 1414*b*, and an activatable user interface element 1416. The profile icon 1404 can include details of the secondary user 114(B) associated with the secondary account. The activatable user interface element 1408 can be selected to perform a P2P transaction. The secondary account can be previously enabled for P2P transactions. The activatable user interface element 1410 can be selected to enable or disable a payment instrument associated with the secondary account.

In response to the secondary user 114(B) selecting activatable user interface element 1416, the user interface 1402*a* can transition to user interface 1402*b* as shown in FIG. 14B. The user interface 1402*b* can include an activity history 1412 including one or more transactions 1414 associated with the secondary account. Each of the transactions 1414 can be selected to view details associated with a corresponding entity. In comparison to the view of a primary user viewing a transaction history of the secondary account, the secondary user 114(B) can view notes associated with each transaction 1414. The primary view may be prevented from seeing notes associated with each transaction 1414 associated with the secondary account. In response to the secondary user 114(B) selecting transaction 1414*a*, the user interface 1402*b* can transition to user interface 1402*c* as shown in FIG. 14C. The user interface 1402*c* includes a profile icon 1418, a transaction history 1420, and one or more transactions 1422*a*-1422*c*. The profile icon 1418 can include details associated with the corresponding user. The transaction history 1420 can correspond to specific transactions 1422 between the particular user (e.g., the user identified by profile icon 1418) and the secondary account.

In response to the secondary user 114(B) selecting activatable user interface element 1422*a*, the user interface

84

Figure 14E:
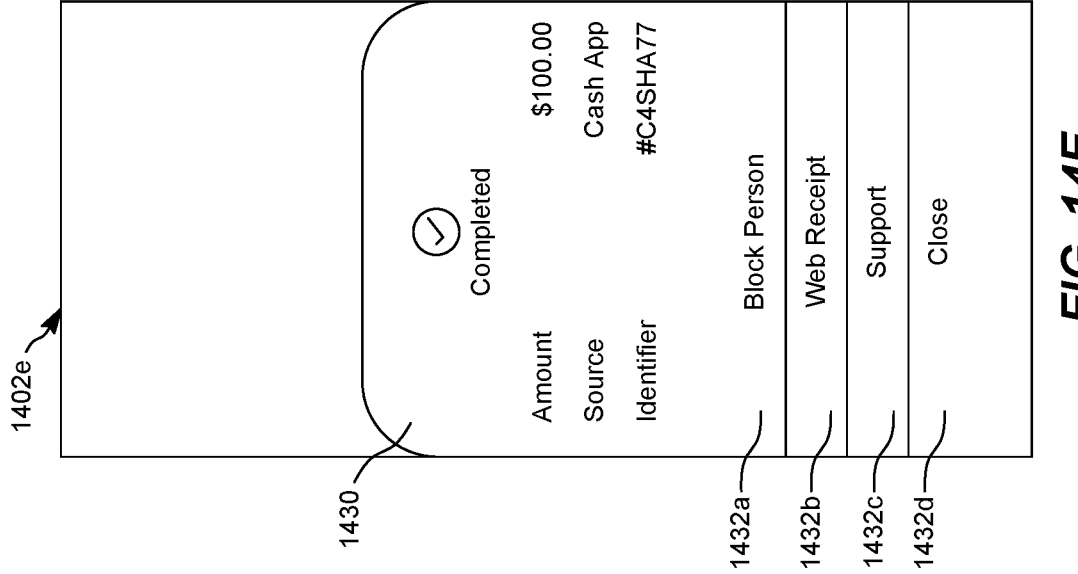
Figure 14D:
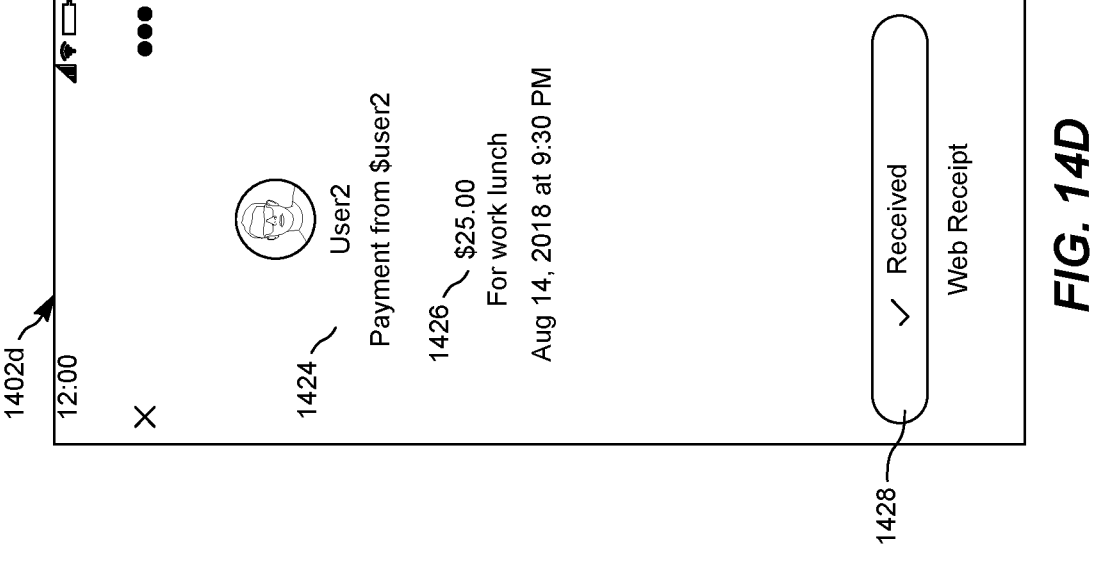

1402*c* can transition to user interface 1402*d* as shown in FIG. 14D. The user interface 1402*d* can include user details 1424, transaction details 1426, and an activatable user interface element 1428. The user details 1424 can include a profile icon, a username, and an identifier. The transaction details 1426 can include a transaction amount and a date of the transaction. In response to the secondary user 114(B) selecting activatable user interface element 1428, the user interface 1402*d* can transition to user interface 1402*e* as shown in FIG. 14E. The user interface 1402*e* can include a transaction interface 1430 and activatable user interface elements 1432*a*-1432*d*. Each of the activatable user interface elements 1432*a*-1432*d* can correspond to functionalities the secondary user can perform corresponding to the transaction or the secondary account.

Figure 20:
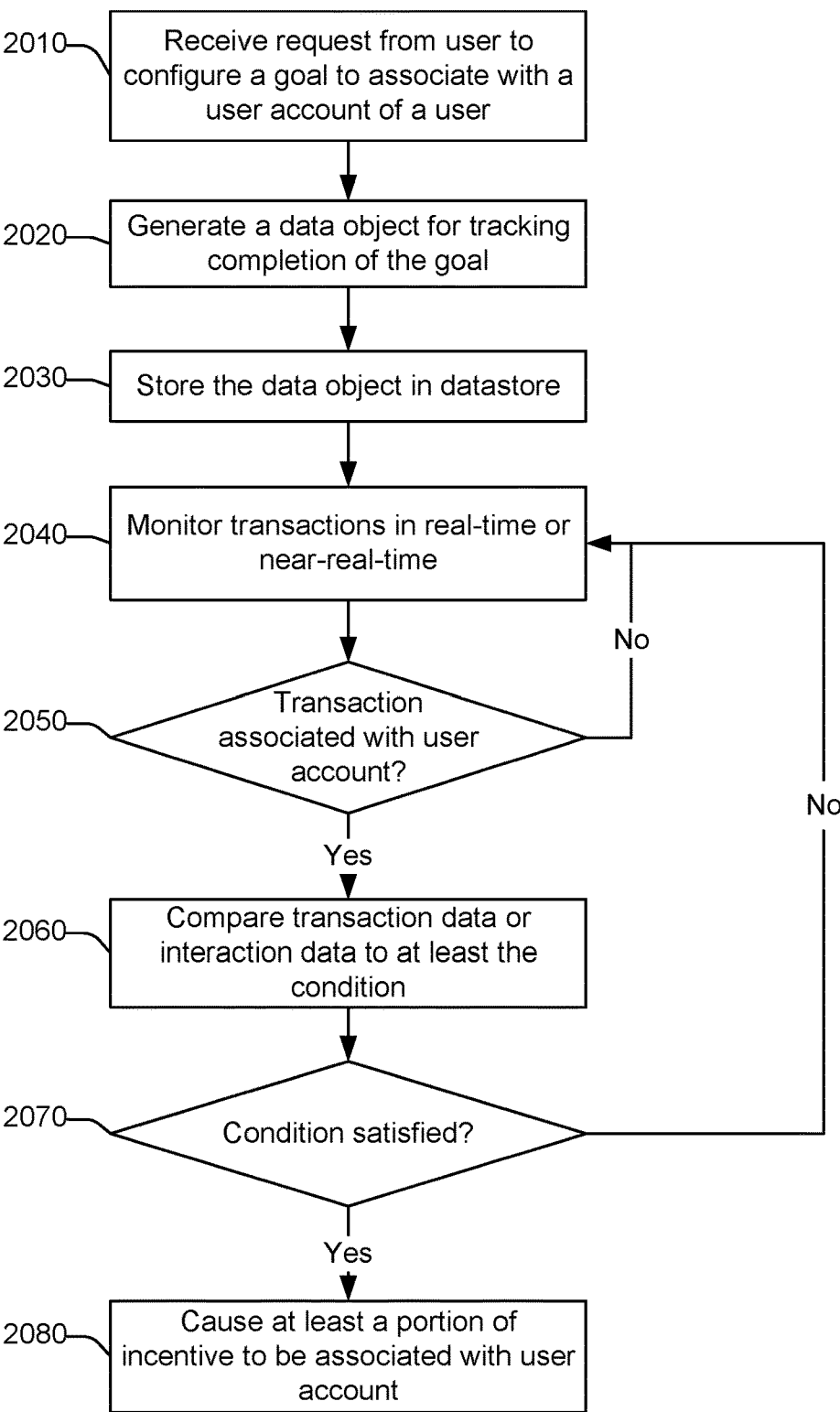
FIG. 20 illustrates an example process for configuring a goal including an incentive and condition to associate with a user account according to some embodiments disclosed herein.

FIG. 20 illustrates an example process 2000 for configuring a goal including an incentive and condition to associate with a user account. The user account can be either a primary account 132(A) or a secondary account 132(B). The process may begin at step 2010, where an account configuration component 119 payment service system 106 can receive a request to configure a goal to associate with a user account of a user. The request to configure a goal can originate from a primary user 114(A), a secondary user 114(B), or the payment service. In some examples, the user account with which the goal is to be associated can be a secondary account 132(B).

In some examples, the goals or milestones can be set by the primary user 114(A). As an example, the goals or milestones, for example, can be set based on past transaction behavior of the secondary user 114(B), or incentives that the primary user 114(A) wishes to enforce on the secondary user 114(B). In some examples, such goals or milestones can be recommended to the primary user 114(A) by the payment service or generated by the payment service based on recommendations. In such examples, such recommendations can be determined based at least in part on transaction data or interaction data associated with other users of the payment service, or goals or milestones of other users. In some examples, such recommendations can be output from a machine-learning mechanism trained on historical data (e.g., transaction and/or interaction data) associated with users of the payment service.

In some examples, the secondary user 114(B) or the payment service can set goals or milestones for the secondary user 114(B). In some examples, such goals or milestones can be recommended by the payment service based at least in part on transaction data or interaction data of other users, or goals or milestones of other users. That is, in some examples, goals or milestones can be generated predictively based on transaction data, interaction data, goals or milestones of other users associated with the payment service. In some examples, each goal or milestone can be associated with one or more conditions.

Satisfying a condition of the one or more conditions can cause an incentive, or a portion thereof, to be associated with the secondary account 132(B). That is, the goal can be associated with a condition that, when satisfied can cause an incentive to be associated with the user account. Incremental progress can be made towards satisfying the goal. As an example, a goal may be to purchase five books from a bookstore. A user can purchase all five books at once, one at a time, etc.

In particular embodiments, incentives can include the transfer of funds from a stored balance of the primary user 114(A) to a stored balance of the secondary user 114(B), a micropayment to the secondary account 132(B), a donation to a fundraiser or other cause, a purchase or allocation of stock, cryptocurrency, or other asset, a discount, a reward, a non-fungible token (NFT), or the like. In some examples, an incentive can be a pre-funded stored balance that, upon satisfaction of a condition, can be associated with the secondary account 132(B) and/or access can be granted thereto. In some examples, the pre-funded stored balance can be associated with the secondary account 132(B) prior to satisfaction of the condition and funds associated therewith can be inaccessible until the condition is satisfied. In some examples, the pre-funded stored balance can be associated with another account prior to satisfaction of the condition and can be transferred and availed to the secondary account 132(B) upon satisfaction of the condition. In some examples, such stored balances may not be pre-funded but can be created on-the-fly.

In some examples, incentives can be determined based at least in part on context associated with the goal or milestone. For example, if a goal or milestone is associated with chores related to a pet, the incentive can be a donation to a pet-related non-profit, stock related to a pet store, cryptocurrency related to a pet, or the like. As another example, if a goal relates to gaming, the incentive can be associated with stock related to a game, cryptocurrency that can be used in the game, an NFT used in the game, or the like. That is, the payment service can determine context associated with the goal or milestone and can provide an incentive based thereon. In some examples, the payment service can recommend incentives based on context, which can be accepted (or not) by the primary user 114(A). In some examples, primary users can configure incentives.

Returning to FIG. 20, at step 2020, the account configuration component 119 of the payment service system 106 can generate a data object for tracking completion of the goal. The data object can be presented on a user interface 110 of a user device 112 (e.g., a user interface 110(A) of a user device 112(A)). In some examples, the payment service can track completion of a goal or milestone (e.g., satisfaction of condition(s) associated therewith) and can award portions of an incentive or individual incentives for completion of a portion of a goal or milestone.

At step 2030, the account configuration component 119 of the payment service system 106 can store the data object in a datastore 128. The payment service system 106 can associate the data object with a user account. As an example, the payment service system 106 can associate the data object with a secondary account 132(B) stored on the datastore 128.

At step 2040, the payment services component 121 of the payment service system 106 can monitor transaction data in real-time or near-real-time. The transaction data may include one or more of transactions with merchants, transactions with other users, bill payments, subscription payments, recurring payments, loan repayment, combinations of the foregoing, or the like. The payment services component 121 can analyze the transaction data to identify a transaction associated with the user account that is associated with a data object. As an example, the payment services component 121 can identify a transaction that is associated with a secondary account 132(B) that is associated with a data object.

At step 2050, it is determined if a transaction associated with a user account that is associated with a data object is found through the real-time or near real-time monitoring. If a transaction associated with a user account that is associated with a data object is not found, then the process 2000 returns to step 2040, where the payment services component

121 continues to monitor transactions. If a transaction associated with a user account that is associated with a data object is found, then the process 2000 continues to step 2060, where the payment services component 121 compares the transaction data or the interaction data to at least the condition associated with the goal.

As described above, the payment service can monitor transaction data and/or interaction data in real-time or near-real-time to determine whether condition(s) associated with goal(s) or milestone(s) have been satisfied. For example, the payment service can receive transaction data and/or interaction data associated with users of the payment service and can compare the transaction data to stored conditions(s). Based at least in part on a determination that a condition associated with a goal or milestone has been satisfied, as determined from the transaction data and/or interaction data, the payment service can associate an incentive with the secondary account 132(B).

In some examples, the payment service can receive transaction data associated with transactions performed using the payment service. As described above, such transactions can include one or more of transactions with merchants, transactions with other users, bill payments, subscription payments, recurring payments, loan repayment, combinations of the foregoing, or the like. Transaction data associated therewith can be compared to condition(s) to determine whether such condition(s) have been satisfied in whole or in part.

In some examples, the payment service can be integrated with one or more third-party service providers, such as those offering social networking, e-commerce, content (e.g., movies, music, books, podcasts, etc.), gaming, e-learning, or the like. Such integrations can be facilitated by APIs, SDKs, or the like. As such, the payment service can have access to interaction data associated with such third-party service providers. Such interaction data can include social networking actions (e.g., comments, new friend connections, new professional connections, posting content, not posting content, etc.), ecommerce transactions, movies or songs downloaded, streamed, shared, or posted, games played, learning modules completed, or the like. That is, the payment service can receive, with permission from at least one of the primary user 114(A) or the secondary user 114(B), interaction data associated with the secondary user's 114(B) interactions on the third-party service providers in real-time or near-real-time. In at least one example, the payment service can receive interaction data associated with users of the payment service from the third-party service provider(s) and can compare the interaction data to stored conditions(s) to determine whether such condition(s) have been satisfied in whole or in part.

At step 2070, if the condition is not satisfied, then the process 2000 returns to step 2040, where the payment services component 121 continues to monitor transactions. If the condition is satisfied, then the process 2000 continues to step 2080, where the payment services component 121 can cause at least a portion of the incentive to be associated with the user account. Incentives, as described above, can include the transfer of funds from a stored balance of the primary user 114(A) to a stored balance of the secondary user 114(B), a micropayment to the secondary account 132(B), a donation to a fundraiser or other cause, a purchase or allocation of stock, cryptocurrency, or other asset, a discount, a reward, a non-fungible token (NFT), or the like. In some examples, an incentive can be a pre-funded stored balance that, upon satisfaction of a condition, can be associated with the secondary account 132(B) and/or access can be granted thereto. In some examples, the pre-funded stored balance can be associated with the secondary account 132(B) prior to satisfaction of the condition and funds associated therewith can be inaccessible until the condition is satisfied. In some examples, the pre-funded stored balance can be associated with another account prior to satisfaction of the condition and can be transferred and availed to the secondary account 132(B) upon satisfaction of the condition. In some examples, such stored balances may not be pre-funded but can be created on-the-fly.

In some examples, incentives can be determined based at least in part on context associated with the goal or milestone. For example, if a goal or milestone is associated with chores related to a pet, the incentive can be a donation to a pet-related non-profit, stock related to a pet store, cryptocurrency related to a pet, or the like. As another example, if a goal relates to gaming, the incentive can be associated with stock related to a game, cryptocurrency that can be used in the game, an NFT used in the game, or the like. That is, the payment service can determine context associated with the goal or milestone and can provide an incentive based thereon. In some examples, the payment service can recommend incentives based on context, which can be accepted (or not) by the primary user 114(A). In some examples, primary users can configure incentives.

As an example, the payment service system 106 can update a progress of a goal based on the transaction data or interaction data. In some examples, the payment service system 106 can associate a portion of an incentive with the user account based on completion of a portion of a goal (e.g., rewarding progress).

For example, the primary user 114(A) can create a goal for reading and the payment service can track that the secondary user 114(B) has purchased book on a third-party application that meets the criteria of the reading goal. That is, the purchase of the book can be determined to be helpful for enabling the secondary user 114(B) to meet the reading goal set by the primary user 114(A). In some examples, the payment service can credit the account of the secondary user 114(B) with funds corresponding to cost of the books. In some examples, the secondary account 132(B) can be associated with a "purpose-based" account related to reading and the payment service can determine that the transaction involving the books is associated with such a purpose. As such, funds associated with the "purpose-based" account can be unlocked or otherwise availed for the purchase of the book. In yet another example, the payment instrument (e.g., a payment identifier) corresponding to the secondary user 114(B) can be activated to enable purchase of books via the payment service or via a third-party application such that the secondary user's account is credited at the time of purchase, thus speeding up the transaction. The primary user 114(A) may receive alerts to indicate whether or not the reading goals are met.

As another example, the primary user 114(A) can send gifts to the secondary user 114(B). For example, the primary user(s) can create a gift that can be redeemed on specific platforms, e.g., gaming devices or platforms. That is, the "gift" can be associated with a "purpose-based account" or a goal, wherein the funds are conditioned for use or based on performance on the gaming platform. The payment service can track interactions of the secondary user 114(B) and the gaming platform. For this, the payment service can integrate via APIs and/or SDKs with the gaming platforms of devices to, with permission, obtain the gaming profile(s) of the secondary user 114(B). Accordingly, the payment service can credit the account of the secondary user 114(B) with funds for use in microtransactions on the gaming platform.

Alternatively, a payment instrument (e.g., a payment identifier) corresponding to the secondary user 114(B) can be activated to enable purchase of items on the gaming platform via the payment service or via a third-party application such that the secondary user's account is credited at the time of purchase, thus speeding up the transaction. The primary user 114(A) may receive alerts to indicate spending on the gaming platform.

In some examples, goals, milestones, gifts or the like can be presented via user interfaces, such as activity user interfaces, via respective instances of the payment service app 110. In some examples, the primary user 114(A), secondary user 114(B), or the payment service can track completion of goals or milestones. In some examples, such completion can be updated in real-time or near-real-time and such updates can be presented via the user interfaces. In some examples, the primary user 114(A) or the secondary user 114(B) can interact with the user interface to update or otherwise track progress or completion of the goal or milestone. In some examples, goals can be tiered or otherwise interconnected, such that satisfaction of one goal can cause another goal to be associated with the secondary account 132(B). In some examples, satisfaction of a goal (or not) can cause other goals to be modified.

Figure 21A:
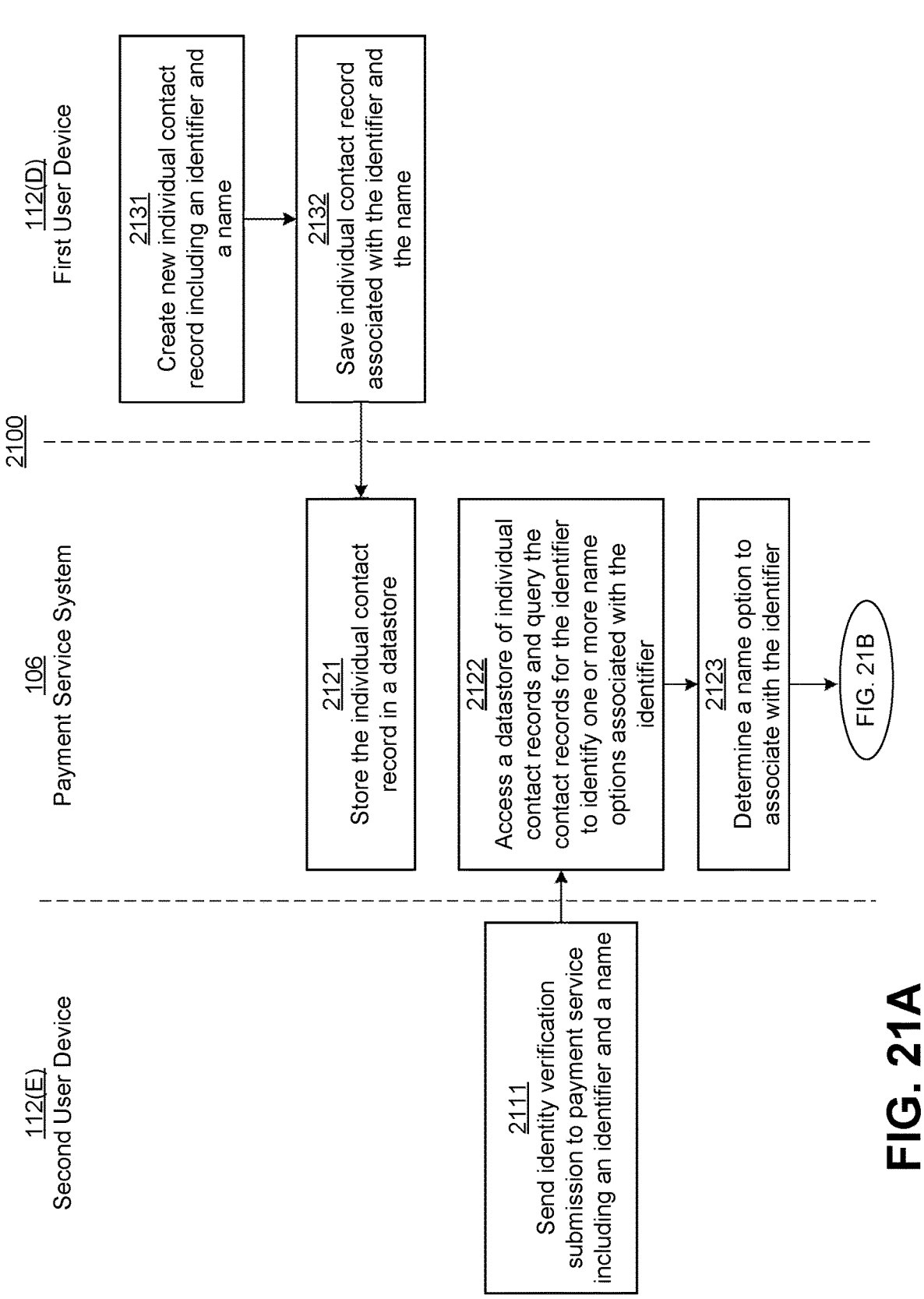

FIGS. 21A-21B are an example process 2100 for an identity verification submission. Steps are described below as being performed by individual functional components of the payment service system 106; however, additional or alternative functional components can perform the steps in additional or alternative examples. Although this disclosure shows one or more of a first user device 112(D), second user device 112(E), and payment service system 106 as performing one or more steps, the first user 114(D) may use the first user device 112(D), the second user 114(E) may use the second user device 112(E), or the payment service system 106, or functional components thereof, may perform one or more other steps. Although this disclosure describes the process 2100 being performed by one or more of the first user device 112(D), the second user device 112(E), and the payment service system 106, this disclosure contemplates new users using their respective user devices to perform one or more steps of the process 2100.

At step 2131, a first user 114(D) may use a first user device 112(D) to create a new individual contact record including at least an identifier (e.g., a phone number) and a name. As an example, the first user 114(D) may create a new individual contact record within an instance a payment service app 110(D) including the identifier and the name associated with the identifier. As another example, the first user 114(D) may create a new individual contact record within a contacts application of the first user device 112(D). The first user 114(D) may proceed to give permission to a payment service system 106 or the payment service app 110(D) to access the contacts stored in the contacts application of the first user device 112(D). As an example, the payment service system 106 may request access permission to the contacts stored in the contacts application of the first user device 112(D) through the payment service app 110(D).

At step 2132, after creating the new individual contact record, the first user 114(D) may save the individual contact record associated with the identifier and the name on the first user device 112(D). The first user 114(D) may save the individual contact record either on the payment service app 110(D), contacts application of the first user device 112(D), or another storage location on the first user device 112(D). As an example, a contact record processing component 139 of the payment service system 106 may receive a plurality of new individual contact records from a plurality of user devices 112 of different users 114 that each have the same identifier and various names saved associated with the identifier. As an example, for the number 123-555-4567 the contact records processing component 139 may receive saved individual contact records from a plurality of user devices 112 that include a list of names associated with the identifier, such as "John Smith", "Johnny Smith", "Brother", "Dad", "Husband", "John S.", "J. Smith", and the like.

At step 2121, the contact records processing component 139 may store the individual contact record in a datastore 128 of the payment service system 106. The contact record processing component 139 may receive the individual contact record from the first user device 112(D) to store in the datastore 128. As an example, the contact record processing component 139 may receive a plurality of individual contact records from a plurality of user devices 112 of different users 114. The contact record processing component 139 may store each of the plurality of individual contact records from the plurality of user devices 112 of different users 114.

At step 2111 a second user 114(E) may attempt to perform an identity verification submission using the payment service app 110(E) on the second user device 114(E). As an example, the second user 114(E) may request to create a new user account with the payment service system 106. The second user 114(E) may request to create a new user account with the payment service system 106 through a weblink, a payment service app 110(E) running on the second user device 114(E), or the like. The identity verification component 137 of the payment service system 106 may request information from the second user 114(E) to initiate the identity verification submission process. As an example, the second user 114(E) may input the user's name and user's identifier to the payment service app 110(E) through the second user device 114(E). The second user device 114(E) may send the identity verification submission to the payment service system 106 including the identifier and the name inputted by the second user 114(E). The identity verification component 137 may receive the identifier and name.

At step 2122, the contact record processing component 139 of the payment service system 106 may access a datastore 128 of individual contact records 140(A) and query the contact records 140(A) using the identifier received in the identity verification submission to identify name options associated with the identifier. The identity verification component 137 may pass the identifier received with the identity verification submission to the contact record processing component 139 in a request for name options. The contact record processing component may query the contact records 140(A) in the datastore 128 for individual contact records that contain the identifier. The contact records processing component 139 may identify one or more name options associated with the identifier based on the contact records 140(A) that are identified as containing the identifier.

At step 2123, a name option similarity component 138 of the payment service system 106 may determine a true name option for the identifier based on the one or more name options that are identified to be associated with the identifier. As an example, the name option similarity component 138 may use a machine-trained model to generate a score for each of name options received from the contact record processing component based at least in part on a similarity of individual name options to the other name options. The similarity may include one or more of a spelling similarity (e.g., whether the spelling of one name option is similar to the spelling of another name option) or a phonetic similarity (e.g., whether the pronunciation of the name option sounds similar to the pronunciation of another name option). As an example, the name "John Smith" may be spelled similarly to the name "Jon Smith" and be phonetically similar. As another example, the name "Sherry Lo" may be spelled differently from, but be phonetically similar to, the name "Cherie Lough." The machine-trained model can be trained to determine a similarity score for individual name options in comparison to the other name options. The machine-trained model may be trained using a historical dataset that includes various name options with a true name.

As another example, the name option similarity component 138 may generate a similarity matrix the comprises a measure of similarity of individual name options to other name options. The similarity matrix may include the spelling similarity of individual name options to other name options, the phonetic similarity of individual name options to other name options, or a weighted combination of the similarities. The weighted combination may be based on different weights applied to the spelling similarity and the phonetic similarity for a similarity score based on the name options. As an example, in certain operating environments, phonetic similarity may be given more weight in calculating the overall similarity score if a primary language used by users of the payment service allows for many different variations of how a name option is spelled. As another example, the weighting can be adjusted for individual name options, for example based on the name provided with the identity verification submission. As an example, for certain name options the spelling similarity may be given more weight in calculating the overall similarity score if there are many different pronunciations of a name option. The name option similarity component 138 may use a threshold similarity score to determine a name option to associate with the identifier. In some examples, the name option similarity component 138 may use the name option that has the highest similarity score to each of the other options to associate with the identifier. In some examples, the name option similarity component 138 may only associate a name option with the identifier if the similarity score satisfies a threshold similarity. If no similarity consensus or agreement arises between the name options, then the name option similarity component 138 may reach inconclusive results. In some examples, the name option similarity component 138 may only consider name options that satisfy a threshold similarity, filtering out name options that are considered low quality or unlikely to be the true name for the identifier.

Continuing on to FIG. 21B, at step 2124, the identity verification component 137 of the payment service system 106 may compare the determined name option to the name associated with the identity verification submission. In addition to comparing the determined name option to the name associated with the identity verification submission, the identity verification component 137 may consider other information, including additional contact record signals. The contact record signals may be the same metadata of the contact records 140(A). The additional contact record signals may include additional data from the contact records 140(A) retrieved by the contact record processing component 139 as well as contact record metadata 140(B) associated with, and retrieved with, the contact records 140(A).

At step 2125, the identity verification component 137 may determine whether the second user 114(E) has verified their identity or not based on the comparison. The identity verification component 137 may determine whether the determined name option matches the name submitted by the second user 114(E) through the identity verification submission. In some examples, the identity verification component 137 may require that the determined name option be a perfect match to the name submitted by the second user 114(E). In some examples, the identity verification component 137 may require that the determined name option match the name submitted by the second user 114(E) to a threshold degree of similarity. In some examples, the identity verification component 137 may use additional contact record signals, as discussed herein, in evaluating whether the identity verification submission should be approved. In some examples, the identity verification component 137 may use a second machine-trained model to determine whether the identity verification submission should be approved. The second machine-trained model can receive as input the name options and similarity scores provided by the name option similarity component 138, the contact records 140(A) and contact record metadata 140(B) retrieved by the contact record processing component, and other contact record signals. The output of the second machine-trained model can be score, such as a likelihood that the name provided with the identity verification submission is the true name associated with the identifier provided with the identity verification submission, a prediction of the true name, a recommendation whether to approved or reject the identity verification submission, or the like.

If the determined name option does not match the name provided with the identity verification submission, the process 2100 may continue to step 2126, where the identity verification component 137 may reject the identity verification. The payment service system 106 may send an alert to the second user device 114(E) of the rejected identity verification. As an example, the payment service system 106 may send instructions to the second user device 114(E) to present a notification hat the identity verification submission was rejected.

At step 2127, the payment service system 106 may initiate a secondary identity verification process. As an example, an onboarding component 117 of the payment service system 106 may initiate a backup or secondary identity verification process as described herein. In some examples, the second user 114(E) may be requested to input additional information or documentation associated with their identity for verification. In some examples, the second user 114(E) may be requested to input credentials to sign into a social media account associated with the second user 114(E) through a weblink or through payment service app 110(E) running on the second user device 114(E).

At step 2112, the second user device 114(E) may receive an alert notifying the second user 114(E) that the identity verification submission was declined. The second user device 112(E) may present the notification to the second user 114(E) through a user interface of the payment service app 110(E) executing on the second user device 114(E). As an example, a notification may be display from the payment service app 110(E) that the identity verification submission was declined. The second user device 112(E) may further display user interfaces to continue the onboarding process, supported by the onboarding component 117, and to request additional identity verification information.

If the determined name option does match the name provided with the identity verification submission, the process 2100 may instead continue to step 2128 where the identity verification component 137 may approve the identity verification submission and send an alert to the second user device 114(E). The payment service system 106 may send instructions to the second user device 114(E) to present a notification to the second user 112(E) that the identity verification submission was approved.

At step 2113, the second user device 114(E) may receive an alert notifying the second user 112(E) that the identity verification submission was approved. The second user device 114(E) may present the notification to the second user 114(E) through a user interface of the second user device 114(E). As an example, a notification may be displayed from the payment service app 110(E) that the identity verification submission was approved. The payment service app 110(E)) may proceed with an onboarding and account creation process after the identity verification submission has been approved.

Figure 22:
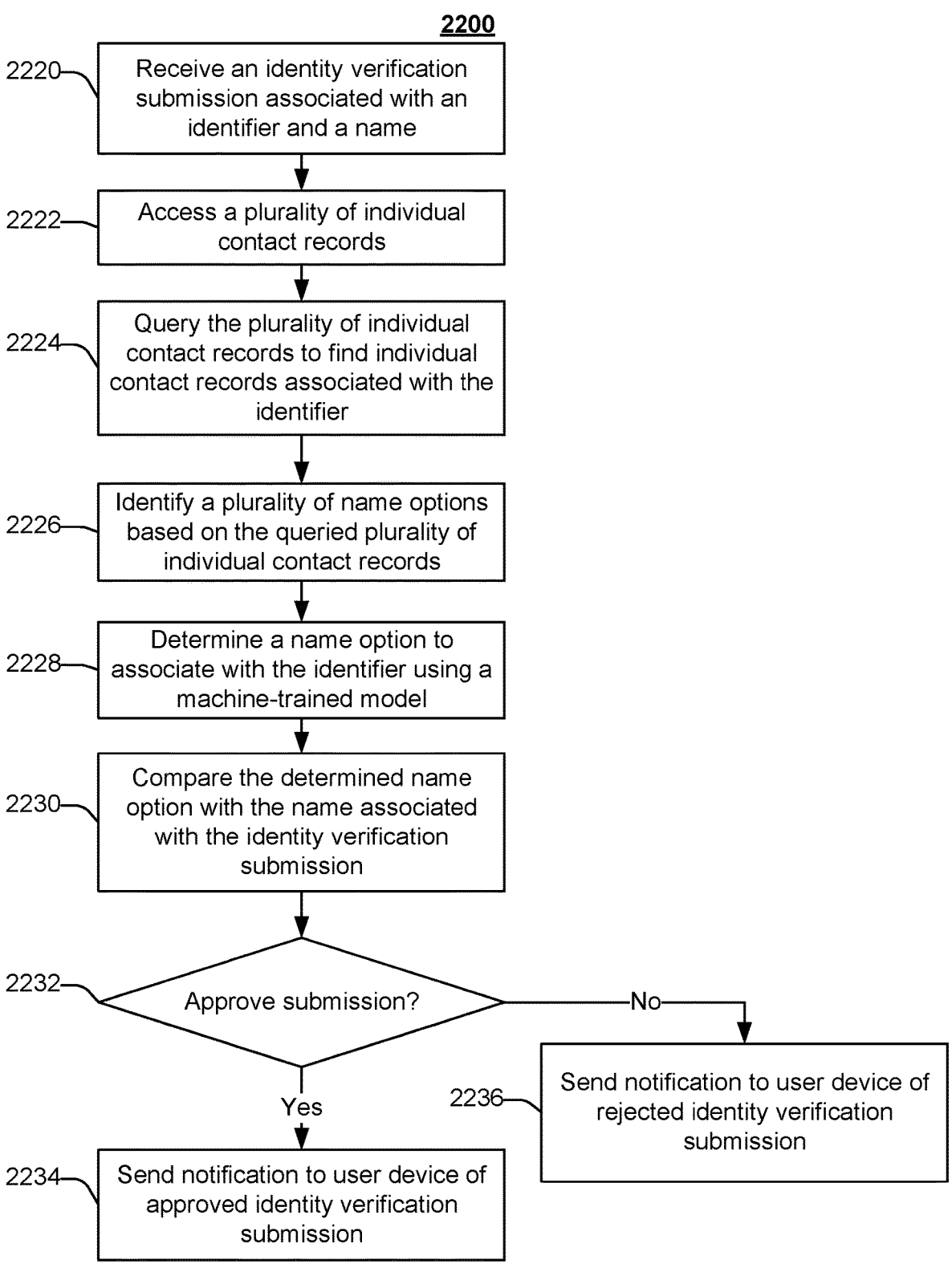
FIG. 22 illustrates an example process for managing an identity verification submission according to some embodiments disclosed herein.

FIG. 22 illustrates an example process 2200 for managing an identity verification submission with payment service system 106. Example graphical user interfaces corresponding to one or more steps depicted in FIG. 22 are illustrated in FIGS. 25A-25F. The process 2200 may be performed by one or more components of the payment service system 106. As an example, the payment service system 106 may use one or more of an identity verification component 137, a name option similarity component 138, or a contact record processing component 139. The process 2200 may begin at step 2220, where the payment service system 106 may use an identity verification component 137 to receive an identity verification submission associated with an identifier and a name. The identity verification submission may be received from a user device 112(E) of a second user 114(E). The identity verification submission may also be received from a user device 112 of any user 114. Because the identity verification submission may be a step in creating a user account, the user 114 may not have an account with the payment service yet. The identity verification submission may include an identifier and a name to be verified. The identifier and the name to be verified may be inputted by a user 114.

At step 2222, the payment service system 106 may use a contact record processing component 139 to access a plurality of individual contact records 140(A) that may be stored in a datastore 128. At step 2224, the contact record processing component 139 may query the plurality of individual contact records in the datastore 128 to find individual contact records associated with the identifier received in the identity verification submission. The contact record processing component 139 may send the individual contact records that are associated with the identifier to the identity verification component 137. The contact record processing component 139 may use one or more contact record signals, including contact record metadata 140(B) to filter out one or more individual contact records. As an example, the contact record signals may indicate one or more of an age of the individual contact record, a number of individual contact records associated with the name option, trustworthiness of the individual contact record, trustworthiness of a user account associated with the individual contact record, a number of forward links from the user that provided the individual contact record, a number of backlinks to the user that provided the individual contact record, and the like. In some examples, the contact record processing component 139 may calculate a score for each of the individual contact records based on the contact record signals and filter any individual contact records that fall below a threshold score.

At step 2226, the identity verification component 137 may identify a plurality of name options based on the individual contact records received from the contact record processing component 139 that are associated with the identifier. The identity verification component 137 may access a list or set of name options that are included with each of the individual contact records that are associated with the identifier.

At step 2228, the identity verification component 137 may determine a name option to associate with the identifier using a machine-trained model. The identity verification component 137 may send the name options to the name option similarity component 138. The name option similarity component 138 may assess the similarity of the individual name options to the other name options of the set. The name option similarity component 138 may determine a similarity score for each of the name options in the received list of name options, where the similarity score can include a spelling similarity score, a phonetic similarity score, other similarity scores, and/or a combination of the similarity scores. The name option similarity component 138 may apply weights to each of several component similarity scores, such as the spelling similarity score and the phonetic similarity score. In some examples, the name option similarity component 138 may also use a similarity matrix populated by one or more similarity determination algorithms to determine the similarity scores of the name options as described herein. In some examples, the name option similarity component 138 may use a first machine-trained model to generate the similarity scores of the name options as described herein. The name option similarity component 138 may output a similarity score for each of the name options and provide the similarity scores for each of the name options to the identity verification component 137. The identity verification component 137 may select a name option to associate with the identifier provided in the identity verification submission based on the similarity scores of the name options. As an example, the identity verification component 137 may select the name option with the highest similarity score (i.e., the name option that is most similar to the other name options). In some examples, the identity verification component 137 may further select the name option to associated with the identifier based on the other contact record signals retrieved by the contact record processing component. The identity verification component 137 may use a second machine-trained model to analyze the similarity scores and contact record signals associated with the name options. The second machine-trained model may receive the name options, the similarity scores, and the associated contact record signals, and provide a prediction or recommendation for the true name associated with the identifier provided with the identity verification submission. The second machine-trained model may further provide a measure of confidence or likelihood that the predicted or recommend name option is in fact the true name.

At step 2230, the identity verification component 137 may compare the determined name option with the name associated with the identity verification submission to determine if there is a match or whether the comparison exceeds a threshold comparison or similarity score. As an example, the identity verification component 137 may compare the similarity between the determined name option with the name associated with the identity verification submission.

At step 2232, the identity verification component 137 may determine whether to approve the identity verification submission based on the comparison of the similarity of the determined name option with the name associated with the identity verification submission. If the submission is approved, the identity verification component 137 has determined that the user's identity can be verified. At step 2234, the identity verification component 137 may send a notification to the user device 112 that the identity verification submission has been approved as described herein. If the submission is not approved, the identity verification component 137 has determined that the identity cannot be verified. At step 2236, the identity verification component 137 may send a notification to the user device 112 that the identity verification submission has been rejected.

Figure 23:
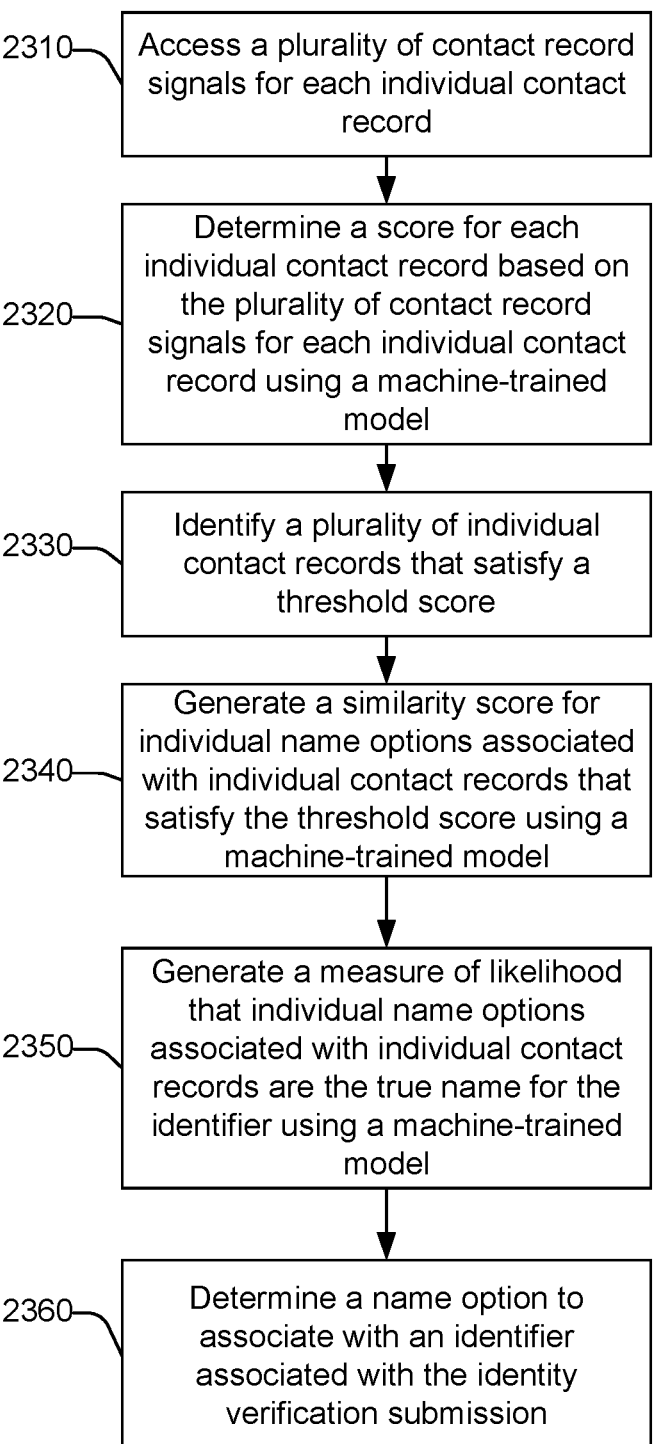
FIG. 23 illustrates an example process for determining a name option to associate with a phone number according to some embodiments disclosed herein.

FIG. 23 illustrates an example process 2300 for determining a name option to associate with an identifier. The process 2300 may be performed by one or more components of the payment service system 106. As an example, the payment service system 106 may use one or more of an identity verification component 137, a name option similarity component 138, or a contact record processing component 139. The process 2300 may begin at step 2310, where a contact record processing component 139 may access a plurality of contact record signals for each of several individual contact records. The step 2310 may be performed after the payment service system 106 accesses and queries a plurality of individual contact records to identify individual contact records that are associated with an identifier received from an identity verification submission.

At step 2320, the contact record processing component 139 may determine a score for each individual contact record based on the plurality of contact record signals for each individual contact record, for example, using a machine-trained model. As an example, the score may be based on, or correlate to a trustworthiness of the individual contact record. The trustworthiness may be reflective of whether the user that provided the individual contact record has reliably contributed accurate contact records in the past or whether the user that provided the individual contact record is suspected of being part of a coordinated operation to mislead the identity verification process. The score may be determined, as described herein, by or with a machine-trained model. In some examples, the machine-trained model may be trained on previous data identifying trustworthy individual contact records and individual contact records associated with untrustworthy users (e.g., a user suspected of fraudulent behavior).

At step 2330, the contact record processing component 139 may identify a plurality of individual contact records that satisfy a threshold score. The contact record processing component 139 may send the identified plurality of individual contact records that satisfy the threshold score to the identity verification component 137.

At step 2340, the identity verification component 137 may send the identified plurality of individual contact records to the name option similarity component 138. The name option similarity component 138 may generate a similarity score for individual name options associated with the individual contact records that satisfied the threshold score, for example, using a machine-trained model as described herein. In some examples, the name option similarity component 138 may generate a similarity score for all of the name options.

At step 2350, the identity verification component 137 may generate a measure of a likelihood that individual name options associated with individual contact records are the true name for the identifier, for example, using a machine-trained model. As an example the identity verification component 137 may generate the measure of the likelihood for the identified name options that exceed the threshold similarity score. The measure of likelihood may be based on the similarity score for each of the name options. The measure of likelihood may be further based on additional contact record signals, as discussed herein. The measure of likelihood may be generated by or using a second machine-trained model.

At step 2360, the identity verification component 137 may determine a name option of the identified name options to associate with the identifier provided with the identity verification submission. The identify verification component 137 may use the measure of likelihood and the similarity scores of each name option to determine which individual name option to associate with the identifier. As an example, the identify verification component 137 may identify the name option with the highest measure of likelihood and the highest similarity score.

FIG. 24 illustrates an example process 2400 for calculating a similarity score for name options. The process 2400 may be performed by one or more components of the payment service system 106. As an example, the payment service system 106 may use one or more of an identity verification component 137, a name option similarity component 138, or a contact record processing component 139. The process 2400 may begin at step 2410, where the identity verification component 137 may identify a plurality of name options. The plurality of name options may be based on a query for contact records associated with an identifier of individual contact records as described herein. The identity verification component 137 may send the name options to the name option similarity component 138.

At step 2420, the name option similarity component 138 may preprocess the name options received from the identity verification component 137. As an example, the name option similarity component 138 may compare the set of name options to common nicknames or other terms that are highly unlikely to be the true name associated with the identifier. For example, nicknames such as "Mom," "Boss," or "Big Bro." The name option similarity component 138 may exclude name options that match to the common nicknames to ensure that the similarity analysis compares only name options that are reflective of real names. The name option similarity component 138 may exclude or clean name options that contain foreign or non-standard characters, such as emojis.

At step 2430, the name option similarity component 138 may compare each name option with each of the other name options based on spelling to generate a spelling similarity score. As an example, the name option similarity component may execute a spelling similarity comparison algorithm to compare the spelling of each name option to other name options. The spelling similarity comparison algorithm may be configured to generate a scaled measure of similarity that assesses how similar two words or names are to each other. For example, the names "Erik" and "Eric" may be given a high similarity score. The names "Erik" and "Doug" may be given a low similarity score. The similarity score may be based on an entire name option (e.g., including given, middle, and family names) or based on individual components of a name options. In some examples, the spelling similarity comparison algorithm may compare the similarity of the entire string "Jack Smith" to "John Smith." In some examples, the spelling similarity comparison algorithm may compare the components of the strings in a pairwise fashion. For example, comparing the name options "Jack Smith" and "John Smith" may include comparing the given names "Jack" and "John" and the family names "Smith" and "Smith."

At step 2440, the name option similarity component 138 may compare each name option with each of the other name options based on phonetics to generate a phonetic similarity score. As an example, the name option similarity component 138 may execute a phonetic similarity comparison algorithm to compare the pronunciation of each name option to other name options. The phonetic similarity comparison algorithm may be configured to generate a scaled measure of similarity that assesses how similar the pronunciation or phonetic representation of two words or names are to each other. For example, the names "Sherry" and "Cherie" may be given a high similarity score. The names "Erik" and "John" may be given a low similarity score. The phonetic similarity comparison algorithm may be configured to convert each given name option into a standardized phonetic representation prior to performing the comparison. The standardized phonetic representation may ensure that homophones are represented in an identical manner so that a comparison of phonetic representations for similarity is reflective of similar pronunciation. As with the spelling similarity comparison algorithm, the phonetic similarity comparison algorithm may compare the entirety of name options at once and/or may compare individual components of the name options independently.

At step 2450, the name option similarity component 138 may apply, for each name option, a first weight to the spelling similarity score and a second weight to the phonetic similarity score based on the plurality of name options. The total similarity score may include a weighted combination of the spelling similarity score and the phonetic similarity score. The weights may be tuned based on common name spellings and misspellings. The weights may be tuned based on a user's stated or inferred primary language or country of origin. The weights may be assigned dynamically based on, for example, a name that is provided with an identity verification submission. In some examples, the weights may be determined by a machine-trained model. The machine-trained model may be configured to determine the appropriate weights to be applied to the similarity scores to accurately assess the similarity of two name options.

At step 2460, the name option similarity component 138 may calculate, for each name option, a similarity score based on the first weight applied to the spelling similarity score and a second weight applied to the phonetic similarity score. The name option similarity component 138 may send the similarity scores for the name options to the identity verification component 137 to determine the name option to associate with the identifier.

Referring to FIGS. 25A-25F, example graphical user interfaces 2502a-2502f for an identity verification submission process are shown. In particular embodiments, the example graphical user interfaces 2502a-2502f may be displayed within a payment service app executing on a user device or any user interface of the user device (e.g., user device 112(D) of a first user 114(D) or a user device 112(E) of a second user 114(E)).

Figures 25A, 25B, 25C:
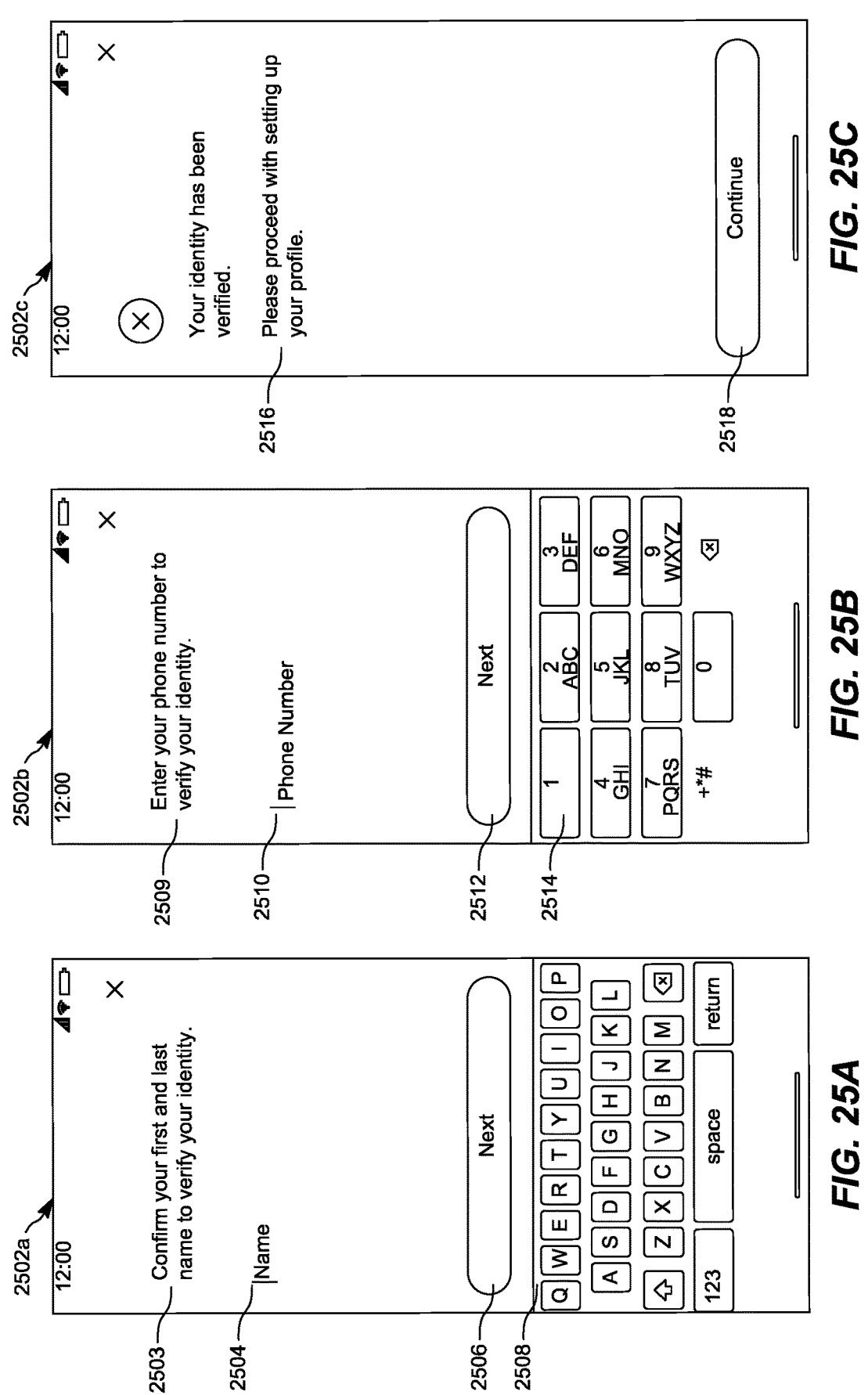
FIGS. 25A-25F illustrate various example GUIs for an identity verification submission process as provided for display on a user device of a user according to some embodiments disclosed herein.

FIG. 25A illustrates a user interface 2502a including instructions 2503, an input field 2504, an activatable user interface element 2506, and a digital keyboard 2508. A second user 114(E) attempting to verify their identity through a payment service may initially be presented with the user interface 2502a. Although this disclosure describes the identity verification submission process being performed by a second user 114(E), the process may be performed by one or more other users 114 using their respective user devices 112. The user interface 2502a may be a standard user interface shown to all users to verify their identity. As an example, a second user 114(E) may access a weblink or through a payment service app 110(E) running on the user device 112(E) a request to create a user account with a payment service. The payment service may initially request the second user 114(E) to input their name to initiate an identity verification submission request. The instructions 2503 may request the second user 114(E) to confirm their first and last name to verify their identity. The second user 114(E) may select an input field 2504 to initiate input of their name. The digital keyboard 2508 may be used to input characters to represent the name of the second user 114(E). After the second user 114(E) has inputted their name, the second user 114(E) may select the activatable user interface element 2506 to continue the identity verification submission process.

In response to selecting the activatable user interface element 2506, the user interface 2502a can transition to user interface 2502b as shown in FIG. 25B. User interface 2502b includes instructions 2509, input field 2510, activatable user interface element 2512, and a digital keypad 2514. The instructions 2509 may instruct the second user 114(E) to input their phone number into the input field 2510. While this disclosure describes a user interface that instructs the second user 114(E) to input their phone number into the input field 2510, the user interface may instruct the second user 114(E) to input any kind of identifier as described herein. The digital keypad 2514 may be another user interface element to allow the second user 114(E) to input the requested identifier. The second user 114(E) may select the input field 2510 to input their phone number using the digital keypad 2514. After inputting their phone number, the second user 114(E) may select the activatable user interface element 2512 to proceed with the identity verification submission request.

In response to selecting the activatable user interface element 2512, the payment service system 106 may perform an identity verification process as described herein. Where the payment service system 106 may have previously requested access from a plurality of users 114. The payment service system 106 may store individual contact records from user devices 112 of the users 114. The payment service system 106 may query the datastore 128 to access individual contact records that are associated with the phone number inputted into the input field 2510. If the payment service system 106 determines that the identity has been verified, the user interface 2502b can transition to user interface 2502c as shown in FIG. 25C. User interface 2502c includes instructions 2516 and an activatable user interface element 2518. The instructions 2516 may instruct the second user 114(E) to proceed with profile set up. The second user 114(E) may select the activatable user interface element 2518 to proceed with the profile set up process.

Figures 25D, 25E, 25F:
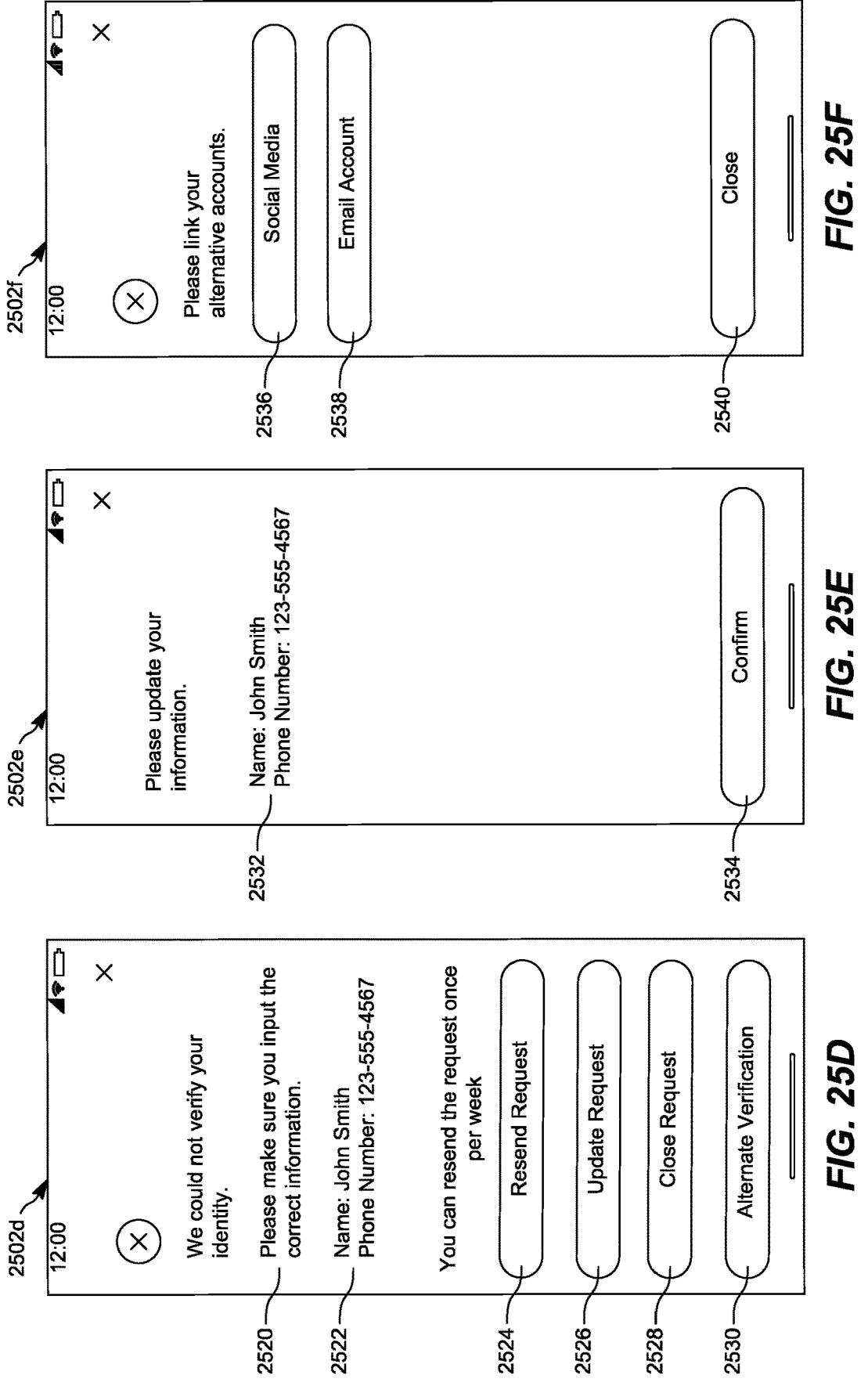

If the payment service system 106 determines that the identity has not been verified, the user interface 2502b can transition to user interface 2502d as shown in FIG. 25D. User interface 2502d may include a notification 2520, previously entered details 2522, and activatable user interface elements 2524-2530. The notification 2520 may indicate that the secondary user's 114(B) identity could not be verified and instructions to ensure the correct information has been inputted. The previously entered details 2522 are included for the second user 114(E) to review the information inputted into the identity verification submission request. The activatable user interface element 2524 may be selected by the second user 114(E) to resend the request. The use of the resend request may restricted, e.g., only permitted once per week, to prevent extraneous and/or spam requests that can overwhelm the payment service system 106. The activatable user interface element 2526 may be selected by the second user 114(E) to update the previous identity verification submission request. As an example, the second user 114(E) may have accidentally input the incorrect information and need to update the name or the phone number.

The activatable user interface element 2528 may be selected by the second user 114(E) to close the request and end the identity verification submission process. The activatable user interface element 2530 may be selected by the second user 114(E) to perform an alternate verification as described herein.

In response to the second user 114(E) selecting the activatable user interface element 2526, the user interface 2502d can transition to user interface 2502e as shown in FIG. 25E. User interface 2502e includes an input field 2532 that is prepopulated with the previously entered details 2522 and activatable user interface element 2534. Once the second user 114(E) selects the input field 2532, the user interface 2502e may display a digital keypad or digital keyboard based on what input the second user 114(E) is performing (e.g., phone number or name). The activatable user interface element 2534 may be selected to confirm the updated details. The activatable user interface element 2534 may be not activatable until the second user 114(E) changes the previously entered details 2522 so that the input field 2532 does not match the previously entered details 2522.

In response to the second user 114(E) selecting the activatable user interface element 2530, the user interface 2502d can transition to user interface 2502f as shown in FIG. 25F. User interface 2502f includes activatable user interface elements 2536-2540. The activatable user interface element 2536 may be selected by the second user 114(E) to input credentials to log into a social media account to verify the identity of the second user 114(E). The activatable user interface element 2538 may be selected by the second user 114(E) to input credentials to log into an email account to verify the identity of the second user 114(E). The activatable user interface element 2540 may be selected to close out of the identity verification submission request.

In particular embodiments, while FIGS. 7A-14E and 25A-25F show certain configurations of elements represented by the user interfaces, this disclosure contemplates other configurations of the elements represented by the user interfaces shown in FIGS. 7A-14E and 25A-25F. As an example, a user interface may include additional elements or may remove several elements. The examples shown in FIGS. 7A-14E and 25A-25F are merely example flows and one or more user interfaces may be optional, can be accessed from different access points (e.g., from a different selection of an activatable user interface element), can have more or less elements, same or different layouts, and the like. While this disclosure describes interacting with the user interfaces through a selection (e.g., via a touch input), this disclosure contemplates using alternative inputs, such as a speech input.

Figure 15:
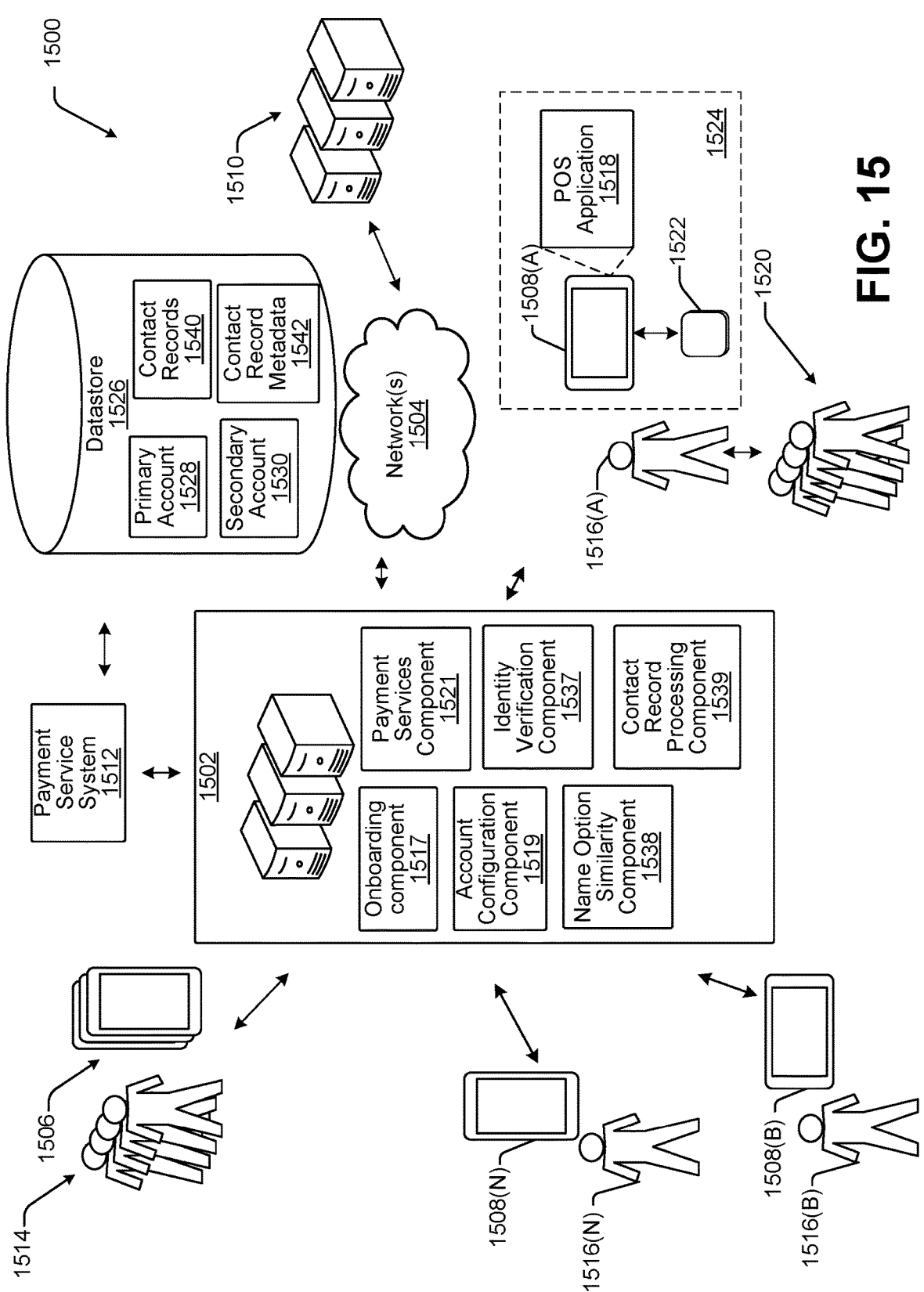
FIG. 15 illustrates an example environment for providing embodiments described herein.

FIG. 15 illustrates an example environment 1500. The environment 1500 includes server(s) 1502 that can communicate over a network 1504 with user devices 1506 (which, in some examples can be merchant devices 1508 (individually, 1508(A)-1508(N))) or server(s) 1510 associated with third-party service provider(s). The server(s) 1502 can be associated with a payment service 1512 that can provide one or more services for the benefit of users 1514, as described below. Actions attributed to the payment service 1512 can be performed by the server(s) 1502. The server(s) 1510 can be associated with a credit service provider or other third-party entity.

Certain elements of the environments 100a and 100b described with respect to FIGS. 1A and 1B correspond to similar elements described herein with respect to FIG. 15. For example, the server(s) 1502 can correspond to the server(s) 104, the network(s) 1504 can correspond to the network(s) 108, the user device(s) 1506 can correspond to any of the user device(s) 112, the servers 1510 associated with the third-party service provider(s) can correspond to third-party servers 130, the user(s) 1514 can correspond to user(s) 114, merchant(s) 1516 can correspond to merchant(s) 118, merchant device(s) 1508 can correspond to merchant device 124, reader device 1522 can correspond to reader device 122, etc.

Similar to server(s) 104, servers 1502 can store one or more functional components that enable the payment service to perform operations as described herein. For example, the server(s) 104 can store an onboarding component 1517 that can correspond to onboarding component 117, an account configuration component 1519 that can correspond to account configuration component 119, a payment services component 1521 that can correspond to payment services component 121, an identity verification component that can correspond to identity verification component 137, a name option similarity component 1538 that can correspond to name option similarity component 138, and a contact record processing component 1539 that can correspond to a contact record processing component 139. Each component can function similarly to the respective components described in FIGS. 1A-1B.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the payment service 1512 or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations or can have franchise/franchisee relationships. In additional or alternative examples, the merchants 1516 can be different merchants. That is, in at least one example, the merchant 1516(A) is a different merchant than the merchant 1516(B) or the merchant 1516(N).

For the purpose of this discussion, "different merchants" can refer to two or more unrelated merchants. "Different merchants" therefore can refer to two or more merchants that are different legal entities (e.g., natural persons or corporate persons) that do not share accounting, employees, branding, etc. "Different merchants," as used herein, have different names, employer identification numbers (EIN) s, lines of business (in some examples), inventories (or at least portions thereof), or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations or different commerce channels.

Each merchant device 1508 can have an instance of a POS application 1518 stored thereon. The POS application 1518 can configure the merchant device(s) 1508 as a POS terminal, which enables the merchant 1516(A) to interact with one or more customers 1520. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server(s) 1502 such that the server(s) 1502 can track transactions of the customers 1520, merchants 1516, or any of the users 1514 over time. Furthermore, the POS application 1518 can present a UI to enable the merchant 1516(A) to interact with the POS application 1518 or the payment service 1512 via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. Additional details are described below with reference to FIG. 18. In some examples, the reader device 1522 can read information from alternative payment instruments including, but not limited to, wristbands and the like.

In some examples, the reader device 1522 may physically interact with payment instruments such as magnetic stripe payment cards, EMV payment cards, or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server(s) 1502, which can provide, among other services, a payment processing service. The server(s) 1502 associated with the payment service 1512 can communicate with server(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server(s) 1510 (which can be associated with third-party service providers that provide payment services, including but not limited to, an acquirer bank, an issuer, or a card payment network) to be matched with an identical one-time code. A tap is a card-present transaction where a customer 1520 may tap or hover his or her payment instrument (e.g., card, user device such as a smart phone running a payment service app, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file datastore, to complete the transaction.

The POS system 1524, the server(s) 1502, or the server(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may determine whether user accounts of users involved in the transaction are authorized to perform the transaction. As an example, the servers 1502 may determine whether the account of a user is a primary account 1528 or a secondary account 1530. If the account is a secondary account 1530, the servers 1502 may determine if functionalities associated with the transaction (e.g., the ability to conduct transactions with merchants, the ability to use a physical or virtual payment instrument) are enabled for the secondary account 1530. The server(s) 1502 may send the transaction data to the server(s) 1510. As described above, in at least one example, the server(s) 1510 can be associated with third-party service providers that provide payment services, including but not limited to, an acquirer bank, an issuer, or a card payment network.

For the purpose of this discussion, the "payment services" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association, and can be part of a card payment network. The acquirer (e.g., the server(s) 1510 associated therewith) can send a fund transfer request to a server computing device of a card payment network to determine whether the transaction is authorized or deficient. In at least one example, the payment service 1512 can serve as an acquirer and connect directly with the card payment network.

The card payment network (e.g., the server(s) 1510 associated therewith) can forward the fund transfer request to an issuing bank (e.g., "issuer"). The issuer is a bank or financial institution that offers a financial account (e.g., credit or debit card account) to a user. An issuer can issue payment instruments to users and can pay acquirers for purchases made by cardholders to which the issuing bank has issued a payment instrument. The issuer (e.g., the server(s) 1510 associated therewith) can determine whether the customer has the capacity to absorb the relevant charge associated with the payment transaction. In at least one example, the payment service 1512 can serve as an issuer or can partner with an issuer. The transaction is either approved or rejected by the issuer or the card payment network (e.g., the server(s) 1510 associated therewith), and a payment authorization message is communicated from the issuer to the POS device via a path opposite of that described above, or via an alternate path.

The payment service 1512 can access a datastore 1526 (e.g., datastore 128) to retrieve one or more of user profiles (e.g., user identifiers, mapping between primary accounts 1528 and secondary accounts 1530), conditions associated with transactions of secondary accounts 1530, models, allowed payment functionalities associated with primary accounts 1528 and secondary accounts 1530, blocked payment functionalities associated with primary accounts 1528 and secondary accounts 1530, and the like as described herein. One of the users 1514 can be a primary user associated with a primary account 1528 and another one of the users 1514 can be a secondary user associated with a secondary account 1530. In some examples, the payment service 1512 can access the datastore 1526 to retrieve contact records 1540 and contract record metadata 1542 in association with an identity verification submission.

As described above, the server(s) 1510, which can be associated with payment service provider(s), may determine whether the transaction is authorized based on the transaction data, as well as information relating to parties to the transaction (e.g., the customer 1520 or the merchant 1516 (A)). The server(s) 1510 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application or other functional components for communicating with the POS system 1524 or the server(s) 1510 to authorize or decline transactions.

Based on the authentication notification that is received by the POS system 1524 from server(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the payment service 1512 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1514 can access all of the services of the payment service 1512. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The payment service 1512 can offer payment processing services for processing payments on behalf of the merchants 1516, as described above. For example, the payment service 1512 can provision payment processing software, payment processing hardware or payment processing services to merchants 1516, as described above, to enable the merchants 1516 to receive payments from the customers 1520 when conducting POS transactions with the customers 1520. For instance, the payment service 1512 can enable the merchants 1516 to receive cash payments, payment instrument payments, or electronic payments from customers 1520 for POS transactions and the payment service 1512 can process transactions on behalf of the merchants 1516.

As the payment service 1512 processes transactions on behalf of the merchants 1516, the payment service 1512 can maintain accounts or balances for the merchants 1516 in one or more ledgers. For example, the payment service 1512 can analyze transaction data received for a transaction to determine an amount of funds owed to a merchant 1516(A) for the transaction. In at least one example, such an amount can be a total purchase price less fees charged by the payment service 1512 for providing the payment processing services. Based on determining the amount of funds owed to the merchant 1516(A), the payment service 1512 can deposit funds into an account of the merchant 1516(A). The account can have a stored balance, which can be managed by the payment service 1512. The account can be different from a conventional bank account at least because the stored balance is managed by a ledger of the payment service 1512 and the associated funds are accessible via various withdrawal channels including, but not limited to, scheduled deposit, same-day deposit, instant deposit, and a linked payment instrument.

A scheduled deposit can occur when the payment service 1512 transfers funds associated with a stored balance of the merchant 1516(A) to a bank account of the merchant 1516 (A) that is held at a bank or other financial institution (e.g., associated with the server(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the payment service 1512 deposits funds from the stored balance to a linked bank account of the merchant on a same day as POS transaction, in some examples prior to the POS transaction being funded) or instant deposits (e.g., wherein the payment service 1512 deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the payment service 1512 to the bank account of the merchant 1516(A).

In at least one example, the payment service 1512 may provide inventory management services. That is, the payment service 1512 may provide inventory tracking and reporting. Inventory management services may enable the merchant 1516(A) to access and manage a datastore storing data associated with a quantity of each item that the merchant 1516(A) has available (i.e., an inventory). Furthermore, in at least one example, the payment service 1512 can provide catalog management services to enable the merchant 1516(A) to maintain a catalog, which can be a datastore storing data associated with items that the merchant 1516(A) has available for acquisition (i.e., catalog management services). In at least one example, the catalog may include a plurality of data items and a data item of the plurality of data items may represent an item that the merchant 1516(A) has available for acquisition. The payment service 1512 can offer recommendations related to pricing of the items, placement of items on the catalog, and multi-party fulfilment of the inventory.

In at least one example, the payment service 1512 can provide business banking services, which allow the merchant 1516(A) to track deposits (from payment processing or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the payment service 1512 can provide financing services and products, such as via business loans, consumer loans, fixed term loans, flexible term loans, and the like. In at least one example, the payment service 1512 can utilize one or more risk signals to determine whether to extend financing offers or terms associated with such financing offers.

In at least one example, the payment service 1512 can provide financing services for offering or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the payment service 1512 can offer different types of capital loan products. For instance, in at least one example, the payment service 1512 can offer a daily repayment loan product, wherein a capital loan is repaid daily, for instance, from a portion of transactions processed by the payment processing service on behalf of the borrower. Additionally or alternatively, the payment service 1512 can offer a monthly repayment loan product, wherein a capital loan is repaid monthly, for instance, via a debit from a bank account linked to the payment processing service. The credit risk of the merchant may be evaluated using risk models that consider factors, such as payment volume, credit risk of similarly situated merchants, past transaction history, seasonality, credit history, and so on.

Additionally or alternatively, the payment service 1512 can provide financing services for offering or lending a loan to a borrower that is to be used for, in some instances, financing the borrower's consumer purchase (e.g., a consumer loan). As described herein, the financing services can involve reporting lending activity to a credit tracking service. In at least one example, a borrower can submit a request for a loan to enable the borrower to purchase an item from a merchant, which can be one of the merchants 1516. The payment service 1512 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed or maintained by the payment service 1512 (e.g., from payments owed to the merchant from payments processed on behalf of the merchant, funds transferred to the merchant, etc.). The payment service 1512 can offer specific financial products, such as payment instruments, tied specifically to the loan products. For example, in one implementation, the payment service 1512 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan or the parties associated with the loan.

The payment service 1512 can provide web-development services, which enable users 1514 who are unfamiliar with HTML, XML, JavaScript, CSS, or other web design tools to create and maintain professional and aesthetically pleasing websites. Some of these web page editing applications allow users to build a web page or modify a web page (e.g., change, add, or remove content associated with a web page). Further, in addition to websites, the web-development services can create and maintain other online omni-channel presences, such as social media posts for example. In some examples, the resulting web page(s) or other content items can be used for offering item(s) for sale via an online/e-commerce platform. That is, the resulting web page(s) or other content items can be associated with an online store or offering by the one or more of the merchants 1516. In at least one example, the payment service 1512 can recommend or generate content items to supplement omni-channel presences of the merchants 1516. That is, if a merchant of the merchants 1516 has a web page, the payment service 1512—via the web-development or other services—can recommend or generate additional content items to be presented via other channel(s), such as social media, email, etc.

Furthermore, the payment service 1512 can provide payroll services to enable employers to pay employees for work performed on behalf of employers. In at least one example, the payment service 1512 can receive data that includes time worked by an employee (e.g., through imported timecards or POS interactions), sales made by the employee, gratuities received by the employee, and so forth. Based on such data, the payment service 1512 can make payroll payments to employee(s) on behalf of an employer via the payroll service. For instance, the payment service 1512 can facilitate the transfer of a total amount to be paid out for the payroll of an employee from the bank of the employer to the bank of the payment service 1512 to be used to make payroll payments. In at least one example, when the funds have been received at the bank of the payment service 1512, the payment service 1512 can pay the employee, such as by check or direct deposit, often a day, a week, or more after when the work was actually performed by the employee. In additional or alternative examples, the payment service 1512 can enable employee(s) to receive payments via same-day or instant deposit based at least in part on risk or reliability analyses performed by the payment service 1512.

Moreover, in at least one example, the payment service 1512 can provide employee management services for managing schedules of employees. Further, the payment service 1512 can provide appointment services for enabling users 1514 to set schedules for scheduling appointments or users 1514 to schedule appointments.

In some examples, the payment service 1512 can provide restaurant management services to enable users 1514 to make or manage reservations, to monitor front-of-house or back-of-house operations, and so on. In such examples, the merchant device(s) 1508 or server(s) 1502 can be configured to communicate with one or more other computing devices, which can be located in the front-of-house (e.g., POS device(s)) or back-of-house (e.g., kitchen display system(s) (KDS)). In at least one example, the payment service 1512 can provide order management services or fulfillment services to enable restaurants to manage open tickets, split tickets, and so on or manage fulfillment services. In some examples, such services can be associated with restaurant merchants, as described above. In additional or alternative examples, such services can be any type of merchant.

In at least one example, the payment service 1512 can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the payment service 1512. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the payment service 1512 can receive requests for courier services, automatically assign the requests to active couriers, and communicate dispatch instructions to couriers via user interface (e.g., application, web browser, or other access point) presented via respective devices 1506.

In some examples, the payment service 1512 can provide omni-channel fulfillment services. For instance, if a customer places an order with a merchant and the merchant cannot fulfill the order because one or more items are out of stock or otherwise unavailable, the payment service 1512 can leverage other merchants or sales channels that are part of the platform of the payment service 1512 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the payment service 1512 can enable conversational commerce via conversational commerce services, which can use one or more machine learning mechanisms to analyze messages exchanged between two or more users 1514, voice inputs into a virtual assistant or the like, to determine intents of user(s) 1514. In some examples, the payment service 1512 can utilize determined intents to automate customer service, offer promotions, provide recommendations, or otherwise interact with customers in real-time. In at least one example, the payment service 1512 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the payment service 1512 can provide a peer-to-peer payment service that enables peer-to-peer payments between two or more users 1514 if the users are permitted to send and receive peer-to-peer payments. In at least one example, the payment service 1512 can communicate with instances of a payment service app (or other access point) installed on devices 1506 configured for operation by users 1514. In an example, an instance of the payment service app executing on a first device operated by a payor can send a request to the payment service 1512 to transfer an amount of funds (e.g., fiat currency or non-fiat currency such as cryptocurrency, securities, and related assets) from an account of the payor to an account of a payee (e.g., a peer-to-peer payment). The payment service 1512 can facilitate the transfer and can send a notification to an instance of the payment service app executing on a second mobile device operated by the payee that the transfer is in process (or has been completed). In some examples, the payment service 1512 can send additional or alternative information to the instances of the payment service app (e.g., low balance to the payor, current balance to the payor or the payee, etc.). In some implementations, the payor or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the payment service 1512 funds the request to payee on behalf of the payor, to speed up the transfer process and compensate for any lags that may be attributed to payor's financial network.

In some implementations, the payment service 1512 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1506.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the payment service 1512. For instance, the payment service 1512 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server computing device(s) 1502 (which, in such an example can be called a "messaging server"). In some instances, the messaging application can include a payment service app with messaging capability that enables users of the payment service app to communicate with one another. In such instances, the payment service app can be executed on the user device 1506 based on instructions transmitted to and from the server computing device(s) 1502 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The payment service 1512 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1514 may be new to the payment service 1512 such that the user 1514 that has not registered (e.g., subscribed to receive access to one or more services offered by the payment service 1512) with the payment service 1512. The payment service 1512 can offer onboarding services for registering a potential user 1514 with the payment service 1512. In some examples, onboarding can involve presenting various questions, prompts, and the like to a potential user 1514 to obtain information that can be used to generate a profile for the potential user 1514. In at least one example, the payment service 1512 can provide limited or short-term access to its services prior to, or during, onboarding (e.g., a user of a peer-to-peer payment service can transfer or receive funds prior to being fully onboarded, a merchant can process payments prior to being fully onboarded, etc.). In at least one example, responsive to the potential user 1514 providing all necessary information, the potential user 1514 can be onboarded to the payment service 1512. In such an example, any limited or short-term access to services of the payment service 1512 can be transitioned to more permissive (e.g., less limited) or longer-term access to such services.

The payment service 1512 can be associated with IDV services, which can be used by the payment service 1512 for compliance purposes or can be offered as a service, for instance to third-party service providers (e.g., associated with the server(s) 1510). That is, the payment service 1512 can offer IDV services to verify the identity of users 1514 seeking to use or using their services. Identity verification requires a customer (or potential customer) to provide information that is used by compliance departments to prove that the information is associated with an identity of a real person or entity. In at least one example, the payment service 1512 can perform services for determining whether identifying information provided by a user 1514 accurately identifies the customer (or potential customer) (i.e., Is the customer who they say they are?). The IDV services can perform analysis of user device contact records, social media information, related bank payment instruments, account records provided by phone number providers, and authenticated or trustworthy accounts (e.g., email addresses associated with ".edu" or ".gov" top-level domains). As an example, the IDV services can analyze the contact records of user devices and cross-match the contact records to determine whether the user is an actual person. As another example, the IDV services can analyze social media information to determine whether the user is an actual person. For instance, if the user is friends with other users of the payment service. The IDV services can verify a user if the user has multiple bank payment instruments with the user's name.

The payment service 1512 is capable of providing additional or alternative services and the services described above are offered as a sampling of services. In at least one example, the payment service 1512 can exchange data with the server(s) 1510 associated with third-party service providers. Such third-party service providers can provide information that enables the payment service 1512 to provide services, such as those described above. In additional or alternative examples, such third-party service providers can access services of the payment service 1512. That is, in some examples, the third-party service providers can be subscribers, or otherwise access, services of the payment service 1512.

Techniques described herein can be configured to operate in both real-time/online and offline modes. "Online" modes refer to modes when devices are capable of communicating with the payment service 1512 (e.g., the server(s) 1502) or the server(s) 1510 via the network(s) 1504. In some examples, the merchant device(s) 1508 are not capable of connecting with the payment service 1512 (e.g., the server(s) 1502) or the server(s) 1510, due to a network connectivity issue, for example. In additional or alternative examples, the server(s) 1502 are not capable of communicating with the server(s) 1510 due to network connectivity issue, for example. In such examples, devices may operate in "offline" mode where at least some payment data is stored (e.g., on the merchant device(s) 1508) or the server(s) 1502 until connectivity is restored and the payment data can be transmitted to the server(s) 1502 or the server(s) 1510 for processing.

In at least one example, the payment service 1512 can be associated with a hub, such as an order hub, an inventory hub, a fulfillment hub and so on, which can enable integration with one or more additional payment services (e.g., associated with the additional server(s) 1510). In some examples, such additional payment services can offer additional or alternative services and the payment service 1512 can provide an interface or other computer-readable instructions to integrate functionality of the payment service 1512 into the one or more additional payment services.

Techniques described herein are directed to services provided via a distributed system of user devices 1506 that are in communication with one or more server computing devices 1502 of the payment service 1512. That is, techniques described herein are directed to a specific implementation—or, a practical application—of utilizing a distributed system of user devices 1506 that are in communication with one or more server computing devices 1502 of the payment service 1512 to perform a variety of services, as described above. The configuration of the distributed system described herein enables the server(s) 1502 that are remotely-located from end-users (e.g., users 1514) to intelligently offer services based on aggregated data associated with the end-users, such as the users 1514 (e.g., data associated with multiple, different merchants or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the payment service 1512, and those outside of the control of the payment service 1512, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
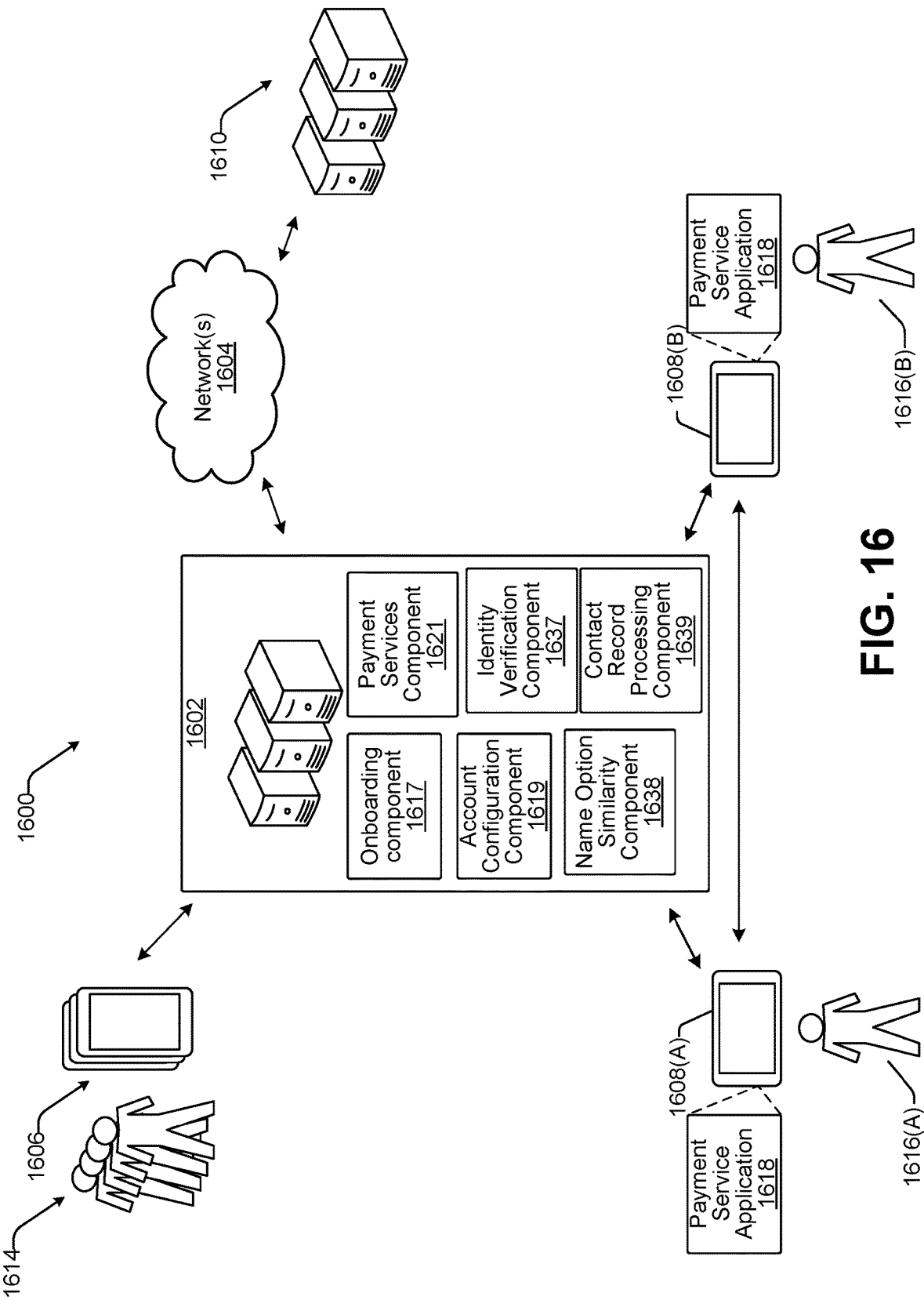
FIG. 16 illustrates another example environment for providing embodiments described herein.

FIG. 16 illustrates an example environment 1600. The environment 1600 includes server(s) 1602 (e.g., servers 104) that can communicate over a network 1604 (e.g., network 108) with user devices 1606 (e.g., user devices 112) which, in some examples can be user devices 1608 (e.g., user devices 112) (individually, 1608(A), 1608(B)) or server(s) 1610 associated with third-party service provider(s). The server(s) 1602 can be associated with a payment service (e.g., payment service system 106) that can provide one or more services for the benefit of users 1614 (e.g., users 114), as described below. Actions attributed to the payment service 1512 can be performed by the server(s) 1602. In some examples, the payment service 1512 referenced in FIG. 15 can be the same or different than the payment service referenced in FIG. 16.

The environment 1600 can include a plurality of user devices 1606, as described above. Each one of the plurality of user devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 1614. The users 1614 can be referred to as primary users, secondary users, customers, buyers, merchants, sellers, borrowers, employees, employers, payors, payees, couriers and so on. The users 1614 can interact with the user devices 1606 via user interfaces presented via the user devices 1606. In at least one example, a user interface can be presented via a web browser, or the like. In other examples, a user interface can be presented via an application, such as a mobile application or desktop application, which can be provided by the payment service or which can be an otherwise dedicated application. In some examples, individual of the user devices 1606 can have an instance or versioned instance of an application, which can be downloaded from an application store, for example, which can present the user interface(s) described herein. In at least one example, a user 1614 can interact with the user interface via touch input, spoken input, or any other type of input.

Similar to server(s) 104, servers 1602 can store one or more functional components that enable the payment service to perform operations as described herein. For example, the server(s) 104 can store an onboarding component 1617 that can correspond to onboarding component 117, an account configuration component 1619 that can correspond to account configuration component 119, a payment services component 1621 that can correspond to payment services component 121, an identity verification component 1637 that can correspond to identity verification component 137, a name option similarity component 1638 that can correspond to name option similarity component 138, and a contact record processing component 1639 that can correspond to contact record processing component 139. Each component can function similarly to the respective components described in FIGS. 1A-1B.

In at least one example, the payment service can provide a peer-to-peer payment service that enables peer-to-peer payments between two or more users 1614 for whom the peer-to-peer payment functionalities are enabled. Two users, user 1616(A) and user 1616(B) are illustrated in FIG. 16 as "peers" in a peer-to-peer payment. In at least one example, the payment service can communicate with instances of a payment service app 1618 (or other access point) installed on devices 1606 configured for operation by users 1614. In an example, an instance of the payment service app 1618 executing on a first device 1608(A) operated by a payor (e.g., user 1616(A)) can send a request to the payment service to transfer an asset (e.g., fiat currency, non-fiat currency, cryptocurrency, securities, gift cards, or related assets) from the payor to a payee (e.g., user 1616(B)) via a peer-to-peer payment. In some examples, assets associated with an account of the payor are transferred to an account of the payee. In some examples, assets can be held at least temporarily in an account of the payment service prior to transferring the assets to the account of the payee. In some examples, the payment service can confirm that the account of the payer and the payee both have a peer-to-peer payment functionality enabled prior to completing the transfer.

Figure 17:
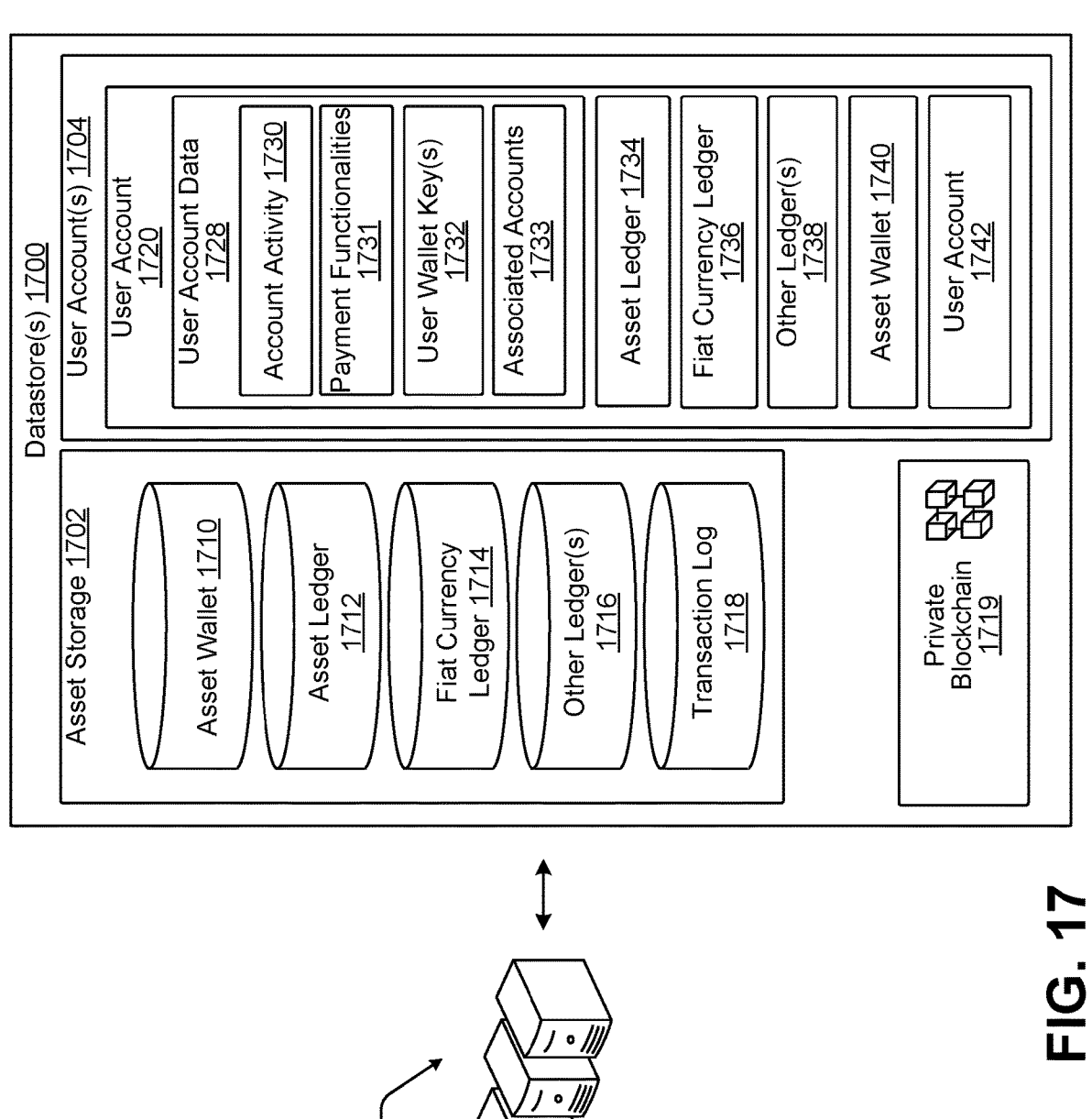
FIG. 17 illustrates an example datastore for providing embodiments described herein.

In some examples, the payment service can utilize a ledger system to track transfers of assets between users 1606. FIG. 17, below, provides additional details associated with such a ledger system. The ledger system can enable users 1606 to own fractional shares of assets that are not conventionally available. For instance, a user can own a fraction of a Bitcoin or a stock. Additional details are described herein.

In at least one example, the payment service can facilitate transfers and can send notifications related thereto to instances of the payment service app 1618 executing on user device(s) of payee(s). As an example, the payment service can transfer assets from an account of user 1616(A) to an account of the user 1616(B) and can send a notification to the user device 1608(B) of the user 1616(B) for presentation via a user interface. The notification can indicate that a transfer is in process, a transfer is complete, or the like. In some examples, the payment service can send additional or alternative information to the instances of the payment service app 1618 (e.g., low balance to the payor, current balance to the payor or the payee, etc.). In some examples, the payor or payee can be identified automatically, e.g., based on context, proximity, prior transaction history, and so on. In other examples, the payee can send a request for funds to the payor prior to the payor initiating the transfer of funds. In some embodiments, the payment service funds the request to payee on behalf of the payor, to speed up the transfer process and compensate for any lags that may be attributed to the payor's financial network.

In some examples, the payment service can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, or the like can be used to trigger or identify users of a peer-to-peer payment process.

In some examples, the peer-to-peer payment process can be initiated through instances of the payment service app 1618 executing on the user devices 1606. In at least some embodiments, the peer-to-peer process can be implemented within a landing page associated with a user or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The payment service can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. In some examples, the content provider can be the payment service as described with reference to FIG. 16 or a third-party service provider associated with the server(s) 1610. In examples where the content provider is a third-party service provider, the server(s) 1610 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the payment service referenced in FIG. 16. For instance, the payment service can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1606 (e.g., mobile device or conventional personal computer (PC)) based on instructions transmitted to and from the server(s) 1602 (which, in such an example can be called a "messaging server"). In some instances, the messaging application can include a payment service app with messaging capability that enables users of the payment service app to communicate with one another. In such instances, the payment service app can be executed on a user device 1606 based on instructions transmitted to and from the server(s) 1602 (e.g., the payment service discussed in this description or another payment service that supports payment transactions). In some examples, the messaging application can be provided by a third-party service provider associated with the server(s) 1610. In examples where the messaging application is a third-party service provider, the server(s) 1610 can be accessible via one or more APIs or other integrations.

As described above, the payment service can facilitate peer-to-peer transactions, which can enable users 1606 to transfer fiat currency, non-fiat currency, cryptocurrency, securities, or other assets, or portions thereof, to other users 1606. In at least one example, individual users can be associated with user accounts. Additional details associated with user accounts and the transfer of assets between users 1606 are described below with reference to FIG. 17.

Furthermore, the payment service of FIG. 16 can enable users 1606 to perform banking transactions via instances of the payment service app 1618 when banking functionalities are enabled for accounts of the users 1606. For example, users can configure direct deposits or other deposits for adding assets to their various ledgers/balances. Further, users 1606 can configure bill pay, recurring payments, or the like using assets associated with their accounts. In addition to sending or receiving assets via peer-to-peer transactions, users 1606 buy or sell assets via asset networks such as cryptocurrency networks, securities networks, or the like.

FIG. 17 illustrates example datastore(s) 1700 that can be associated with the server(s) 1602.

In at least one example, the datastore(s) 1700 can store assets in an asset storage 1702, as well as data in user account(s) 1704, merchant account(s) 1706, or customer account(s) 1708. In at least one example, the asset storage 1702 can be used to store assets managed by the payment service of FIG. 16. In at least one example, the asset storage 1702 can be used to record whether individual of the assets are registered to users. For example, the asset storage 1702 can include an asset wallet 1710 for storing records of assets owned by the payment service of FIG. 16, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1610 can be associated therewith. In some examples, the asset wallet 1710 can communication with the asset network via one or more components associated with the server(s) 1602.

The asset wallet 1710 can be associated with one or more addresses and can vary addresses used to acquire assets (e.g., from the asset network(s)) so that its holdings are represented under a variety of addresses on the asset network. In examples where the payment service of FIG. 16 has its own holdings of cryptocurrency (e.g., in the asset wallet 1710), a user can acquire cryptocurrency directly from the payment service of FIG. 16. In some examples, the payment service of FIG. 16 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources or costs. The payment service can provide the same or similar functionality for securities or other assets.

The asset storage 1702 may contain ledgers that store records of assignments of assets to users 1606. Specifically, the asset storage 1702 may include asset ledger 1712, fiat currency ledger 1714, and other ledger(s) 1716, which can be used to record transfers of assets between users 1606 of the payment service or one or more third-parties (e.g., merchant network(s), payment card network(s), ACH network(s), equities network(s), the asset network, securities networks, etc.). In doing so, the asset storage 1702 can maintain a running balance of assets managed by the payment service of FIG. 16. The ledger(s) of the asset storage 1702 can further indicate some of the running balance for each of the ledger(s) stored in the asset storage 1702 is assigned or registered to one or more user account(s) 1704.

In at least one example, the asset storage 1702 can include transaction logs 1718, which can include records of past transactions involving the payment service of FIG. 16. In at least one example, transaction data, as described herein, can be stored in association with the transaction logs 1718.

In some examples, the datastore(s) 1700 can store a private blockchain 1719. A private blockchain 1719 can function to record sender addresses, recipient addresses, public keys, values of cryptocurrency transferred, or can be used to verify ownership of cryptocurrency tokens to be transferred. In some examples, the payment service of FIG. 16 can record transactions taking place within the payment service of FIG. 16 involving cryptocurrency until the number of transactions has exceeded a determined limit (e.g., number of transactions, storage space allocation, etc.). Based at least in part on determining that the limit has been reached, the payment service of FIG. 16 can publish the transactions in the private blockchain 1719 to a public blockchain (e.g., associated with the asset network), where miners can verify the transactions and record the transactions to blocks on the public blockchain. In at least one example, the payment service of FIG. 16 can participate as miner(s) at least for its transactions to be posted to the public blockchain.

In at least one example, the datastore(s) 1700 can store or manage accounts, such as user account(s) 1704, merchant account(s) 1706, or customer account(s) 1708. In at least one example, the user account(s) 1704 may store records of user accounts associated with the users 1614. In at least one example, the user account(s) 1704 can include a user account 1720, which can be associated with a user (of the users 1614). Other user accounts of the user account(s) 1704 can be similarly structured to the user account 1720, according to some examples. In other examples, other user accounts may include more or less data or account information than that provided by the user account 1720. In at least one example, the user account 1720 can include user account data 1728, which can include, but is not limited to, data associated with user identifying information (e.g., name, phone number, address, etc.), user identifier(s) (e.g., alphanumeric identifiers, etc.), enabled functionalities (peer-to-peer transactions, lending services, banking services, payment instruments, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1728 can include account activity 1730, payment functionalities 1731, user wallet key(s) 1732, and associated accounts 1733. The account activity 1730 may include a transaction log for recording transactions associated with the user account 1720. The payment functionalities 1731 may include a listing of functionalities provided by a payment service and a corresponding listing of functionalities enabled for an individual user account. In some examples, the user wallet key(s) 1732 can include a public-private key-pair and a respective address associated with the asset network or other asset networks. In some examples, the user wallet key(s) 1732 may include one or more key pairs, which can be unique to the asset network or other asset networks. In some examples, the associated accounts 1733 may include one or more other user accounts with are associated with an individual user account. For primary accounts, the associated accounts 1733 can include other related primary accounts or secondary accounts for which the primary account is responsible. For secondary accounts, the associated account 1733 may include the related primary account responsible for the secondary account.

In addition to the user account data 1728, the user account 1720 can include ledger(s) for account(s) managed by the payment service of FIG. 16, for the user. For example, the user account 1720 may include an asset ledger 1734, a fiat currency ledger 1736, or one or more other ledgers 1738. The ledger(s) can indicate that a corresponding user utilizes the payment service of FIG. 16 to manage corresponding accounts (e.g., a cryptocurrency account, a securities account, a fiat currency account, etc.). It should be noted that in some examples, the ledger(s) can be logical ledger(s) and the data can be represented in a single datastore. In some examples, individual of the ledger(s), or portions thereof, can be maintained by the payment service of FIG. 16.

In some examples, the asset ledger 1734 can store a balance for each of one or more cryptocurrencies (e.g., Bitcoin, Ethereum, Litecoin, etc.) registered to the user account 1720. In at least one example, the asset ledger 1734 can further record transactions of cryptocurrency assets associated with the user account 1720. For example, the user account 1720 can receive cryptocurrency from the asset network using the user wallet key(s) 1732. In some examples, the user wallet key(s) 1732 may be generated for the user upon request. User wallet key(s) 1732 can be requested by the user in order to send, exchange, or otherwise control the balance of cryptocurrency held by the payment service of FIG. 16 (e.g., in the asset wallet 1710) and registered to the user. In some examples, the user wallet key(s) 1732 may not be generated until a user account requires such. This on-the-fly wallet key generation provides enhanced security functionalities for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the payment service of FIG. 16 and the value is credited as a balance in asset ledger 1734), by purchasing currency in the form associated with the account using currency in a different form (e.g., buying a value of cryptocurrency from the payment service of FIG. 16 using a value of fiat currency reflected in fiat currency ledger 1714, and crediting the value of cryptocurrency in asset ledger 1734), or by conducting a transaction with another user (customer or merchant) of the payment service of FIG. 16 wherein the account receives incoming currency (which can be in the form associated with the account or a different form, in which the incoming currency may be converted to the form associated with the account). In some examples, the user account data 1728 can include preferences for maintaining balances of individual of the ledgers. For example, the payment service of FIG. 16 can automatically debit the fiat currency ledger 1736 to increase the asset ledger 1734, or another account associated with the user whenever the cryptocurrency balance (e.g., of the asset ledger 1734) falls below a stated level (e.g., a threshold). Conversely, in some embodiments, the payment service of FIG. 16 can automatically credit the fiat currency ledger 1736 to decrease the asset ledger 1734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the payment service of FIG. 16 (i.e., an external account). In at least one example, the user can transfer all or a portion of a balance of the cryptocurrency stored in the third-party cryptocurrency wallet to the payment service of FIG. 16. Such a transaction can require the user to transfer an amount of the cryptocurrency in a message signed by user's private key to an address provided by the payment service of FIG. 16. In at least one example, the transaction can be sent to miners to bundle the transaction into a block of transactions and to verify the authenticity of the transactions in the block. Once a miner has verified the block, the block is written to a public, distributed blockchain where the payment service of FIG. 16 can then verify that the transaction has been confirmed and can credit the user's asset ledger 1734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the payment service of FIG. 16. As described above, in some examples, the payment service of FIG. 16 can acquire cryptocurrency from a third-party source (e.g., associated with the third-party server(s)). In such examples, the asset wallet 1710 can be associated with different addresses and can vary addresses used to acquire cryptocurrency so that its holdings are represented under a variety of addresses on a blockchain. When the payment service of FIG. 16 has their own holdings of cryptocurrency, users can acquire cryptocurrency directly from the payment service of FIG. 16. In some examples, the payment service of FIG. 16 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the payment service of FIG. 16 has its own cryptocurrency assets, cryptocurrency transferred in a transaction (e.g., data with address provided for receipt of transaction and a balance of cryptocurrency transferred in the transaction) can be stored in the asset wallet 1710. In at least one example, the payment service of FIG. 16 can credit the asset ledger 1734 of the user. Additionally, while the payment service of FIG. 16 recognizes that the user retains the value of the transferred cryptocurrency through crediting the asset ledger 1734, any person that inspects the blockchain will see the cryptocurrency as having been transferred to the payment service of FIG. 16. In some examples, the asset wallet 1710 can be associated with many different addresses. In such examples, any person that inspects the blockchain may not easily associate all cryptocurrency stored in asset wallet 1710 as belonging to the same entity. It is this presence of a private ledger that is used for real-time transactions and maintained by the payment service of FIG. 16, combined with updates to the public ledger at other times, that allows for extremely fast transactions using cryptocurrency to be achieved. In some examples, the "private ledger" can refer to the asset ledger 1712, which in some examples, can utilize the private blockchain 1719, as described herein. The "public ledger" can correspond to a public blockchain associated with the asset network.

In at least one example, a user's asset ledger 1734, fiat currency ledger 1736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1734. In some examples, a user can receive fiat currency or another currency in the form of payment for a transaction with another user. In at least one example, at least a portion of such funds can be converted into cryptocurrency by the payment service of FIG. 16 and used to fund the asset ledger 1734 of the user.

As addressed above, in some examples, users can also have other accounts maintained by the payment service of FIG. 16. For example, a user can also have an account in U.S. dollars, which can be tracked, for example, via the fiat currency ledger 1736. Such an account can be funded by transferring money from a bank account at a third-party bank to an account maintained by the payment service of FIG. 16 as is conventionally known. In some examples, a user can receive fiat currency in the form of payment for a transaction with another user. In such examples, at least a portion of such funds can be used to fund the fiat currency ledger 1736.

In some examples, a user can have one or more internal payment instruments registered with the payment service of FIG. 16. Internal payment instruments can be linked to one or more of the accounts associated with the user account 1720. In some embodiments, options with respect to internal payment instruments can be adjusted and managed using an application (e.g., the payment service app 1618).

In at least one example, as described above, each ledger can correspond to an account of the user that is managed by the payment service of FIG. 16. In at least one example, individual of the accounts can be associated with a wallet or a stored balance for use in payment transactions, peer-to-peer transactions, payroll payments, etc.

In at least one example, the user account 1720 can be associated with an asset wallet 1740. The asset wallet 1740 of the user can be associated with account information that can be stored in the user account data 1728 and, in some examples, can be associated with the user wallet key(s) 1732. In at least one example, the asset wallet 1740 can store data indicating an address provided for receipt of a cryptocurrency transaction. In at least one example, the balance of the asset wallet 1740 can be based at least in part on a balance of the asset ledger 1734. In at least one example, funds availed via the asset wallet 1740 can be stored in the asset wallet 1740 or the asset wallet 1710. Funds availed via the asset wallet 1710 can be tracked via the asset ledger 1734. The asset wallet 1740, however, can be associated with additional cryptocurrency funds.

In at least one example, the user account 1720 can be associated with at least one other user account 1742. In particular embodiments, the user account 1720 can be a primary account and the user account 1742 can be a secondary account. The primary account can allocate and enable one or more payment functionalities associated with the primary account. The user account 1742 can be allocated one or more components or portions of one or more components of the user account 1720. As an example, the user account 1720 can allocate a portion of the payment functionalities 1731 to the user account 1742. While FIG. 17 only shows that the user account 1720 includes user account 1742, this disclosure contemplates user account 1720 including any number of user accounts 1742, each with their own functionalities and allocations. As an example, a primary account can be associated with two or more secondary accounts. The primary user of a primary account can enable/disable payment functionalities for each of the two or more secondary accounts associated with the primary account.

In at least one example, when the payment service of FIG. 16 includes a private blockchain 1719 for recording and validating cryptocurrency transactions, the asset wallet 1740 can be used instead of, or in addition to, the asset ledger 1734. For example, at least one example, a merchant can provide the address of the asset wallet 1740 for receiving payments. In an example where a customer is paying in cryptocurrency and the customer has their own cryptocurrency wallet account associated with the payment service of FIG. 16, the customer can send a message signed by its private key including its wallet address (i.e., of the customer) and identifying the cryptocurrency and value to be transferred to the merchant's asset wallet 1740. The payment service of FIG. 16 can complete the transaction by reducing the cryptocurrency balance in the customer's cryptocurrency wallet and increasing the cryptocurrency balance in the merchant's asset wallet 1740. In addition to recording the transaction in the respective cryptocurrency wallets, the transaction can be recorded in the private blockchain 1719 and the transaction can be confirmed. A user can perform a similar transaction with cryptocurrency in a peer-to-peer transaction as described above. In at least one example, the cryptocurrency wallet account 1730 can be funded by a balance transfer from a third-party cryptocurrency wallet, as described above. Such a transaction can require a user to transfer an amount of cryptocurrency in a message signed by the user's private key to an address of the cryptocurrency wallet account 1730. The transferred amount of cryptocurrency can then be within the cryptocurrency wallet account 1730 for use in later transactions.

While the asset ledger 1734 or asset wallet 1740 are each described above with reference to cryptocurrency, the asset ledger 1734 or asset wallet 1740 can alternatively be used in association with securities. In some examples, different ledgers or wallets can be used for different types of assets. That is, in some examples, a user can have multiple asset ledgers or asset wallets for tracking cryptocurrency, securities, or the like.

It should be noted that user(s) having accounts managed by the payment service of FIG. 16 is an aspect of the technology disclosed that enables technical advantages of increased processing speed and improved security.

Figure 18:
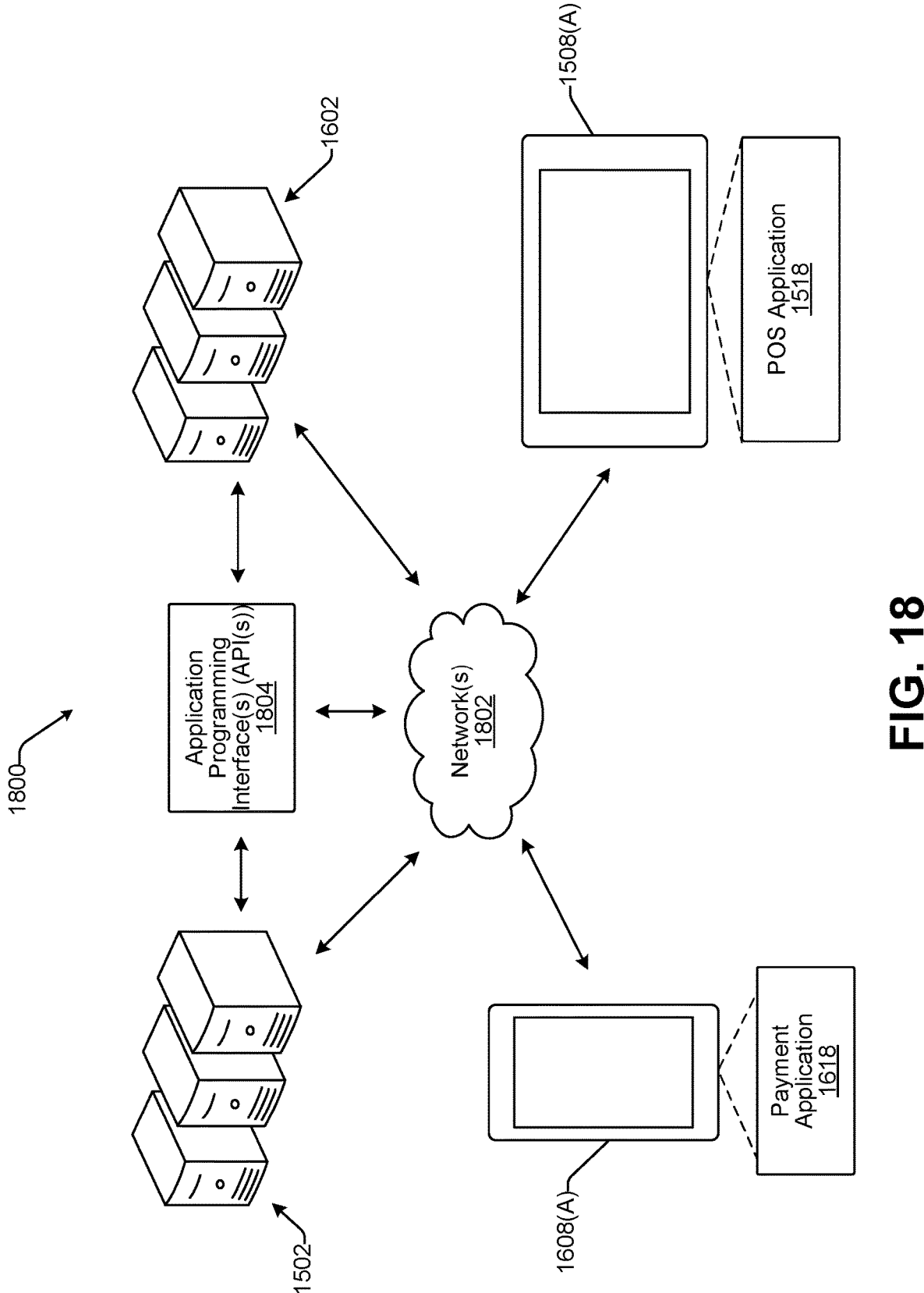
FIG. 18 illustrates another example environment for providing embodiments described herein.

FIG. 18 illustrates an example environment 1800 wherein the environment 1500 and the environment 1600 can be integrated to enable payments at the point-of-sale using assets associated with user accounts in the peer-to-peer environment of FIG. 16. As illustrated, each of the components can communicate with one another via one or more networks 1802. In some examples, one or more APIs 1804 or other functional components can be used to facilitate such communication.

In at least one example, the example environment 1800 can enable contactless payments, via integration of peer-to-peer payment, or other payment making, platform(s) and payment processing platform(s), are described herein. For the purpose of FIG. 18, the environment 1500 can refer to a payment processing platform and the environment 1600 can refer to a peer-to-peer payment, or payment making, platform. In an example, such an integration can enable a customer to participate in a transaction via their own computing device instead of interacting with a merchant device of a merchant, such as the merchant device 1508(A). In such an example, the POS application 1518, associated with a payment processing platform and executable by the merchant device 1508(A) of the merchant, can present a Quick Response (QR) code, or other code that can be used to identify a transaction (e.g., a transaction code), in association with a transaction between the customer and the merchant. The QR code, or other transaction code, can be provided to the POS application 1518 via an API associated with the peer-to-peer payment platform. In an example, the customer can utilize their own computing device, such as the user device 1608(A), to capture the QR code, or the other transaction code, and to provide an indication of the captured QR code, or other transaction code, to server(s) 1502 or server(s) 1602.

Based at least in part on the integration of the peer-to-peer payment platform and the payment processing platform (e.g., via the API), the server(s) 1502 or 1602 associated with each can exchange communications with each other—and with a payment service app 1618 associated with the peer-to-peer payment platform or the POS application 1518—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1608(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1518 and the payment service app 1618, as described herein, can process a payment transaction by routing information input via the merchant application to the payment service app for completing a "frictionless" payment. This can be referred to as "in-application payment." In another example of "in-application payment," the payment service app described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1508(A) can present a QR code, or other transaction code, that can be associated with a peer-to-peer payment platform. The customer can use a camera associated with the user device 1608(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1518 can cause a text message with a resource locator (e.g., uniform resource locator (URL)) that can be associated with a peer-to-peer payment platform to be sent to the user device 1608(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online or ecommerce selling channels as well. In such an example, a QR code, or other transaction code, can be presented via an online store/ecommerce web page of a merchant. The customer can use a camera associated with a customer computing device, such as the user device 1608 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1518 of a merchant device 1508(A) at a brick-and-mortar store of a merchant to a payment service app 1618 of a user device 1608(A) of a customer to enable the customer to participate in a transaction via their own computing device. For instance, in a "scan to pay" example as described above, based at least in part on capturing the QR code, or other transaction code, via the user device 1608(A), the payment processing platform can provide transaction data to the peer-to-peer payment plat- form for presentation via the payment service app 1618 on the user device 1608(A). In some examples, the customer can watch items being added to their cart (e.g., via a user interface presented via the payment service app). As an item is added to a virtual cart by the merchant—via the POS application 1518 on the merchant device 1508(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommen- dation to the payment service app 1618 for presentation via a user interface associated therewith. In addition to enabling a customer to participate in a transaction during cart build- ing, techniques described herein can enable a customer to complete a transaction, and in some examples, provide gratuity (i.e., a tip), feedback, loyalty information, or the like, via the user device 1608(A) during or after payment of the transaction.

In some examples, based at least in part on capturing the QR code, or other transaction code, the payment processing platform can provide transaction data to the peer-to-peer payment platform for presentation via the payment service app 1618 on the computing device of the customer, such as the user device 1608(A), to enable the customer to complete the transaction via their own computing device. In some examples, in response to receiving an indication that the QR code, or other transaction code, has been captured or oth- erwise interacted with via the customer computing device, the peer-to-peer payment platform can determine that the customer authorizes payment of the transaction using funds associated with a stored balance of the customer that is managed or maintained by the peer-to-peer payment plat- form. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment service app 1618 to authorize the settlement of the transaction. A response to such a request can provide an express authorization of the customer. In some examples, such an authorization (implicit or express) can be provided prior to a transaction being complete or initialization of a conventional payment flow. That is, in some examples, such an authorization can be provided during cart building (e.g., adding item(s) to a virtual cart) or prior to payment selection. In some examples, such an authorization can be provided after pay- ment is complete (e.g., via another payment instrument). Based at least in part on receiving an authorization to use funds associated with the stored balance (e.g., implicitly or explicitly) of the customer, the peer-to-peer payment plat- form can transfer funds from the stored balance of the customer to the payment processing platform. In at least one example, the payment processing platform can deposit the funds, or a portion thereof, into a stored balance of the merchant that is managed or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment service app 1618 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback or loyalty information via the user interface presented by the payment service app, which can be associated with the transaction.

As described above—and also below—techniques described herein enable contactless payments. That is, by integrating the payment processing platform with the peer- to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more pri- vacy. That is, customers can monitor items that are added to their cart to ensure accuracy. Further, customers can autho- rize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1518, payment for the transaction can be pre-authorized such that when the time comes to complete the transaction, neither the payment processing platform nor the peer-to-peer payment platform need to re-authorize payment at that time. That is, techniques described herein can enable faster, more efficient transac- tions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, tech- niques described herein can provide enhanced security in payment processing. In some examples, if a camera, or other sensor, used to capture a QR code, or other transaction code, is integrated into a payment service app 1618 (e.g., instead of a native camera, or other sensor), techniques described herein can utilize an indication of the QR code, or other transaction code, received from the payment service app for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction or provision associated transaction data to a computing device of the customer associated with the transaction.

Figure 19:
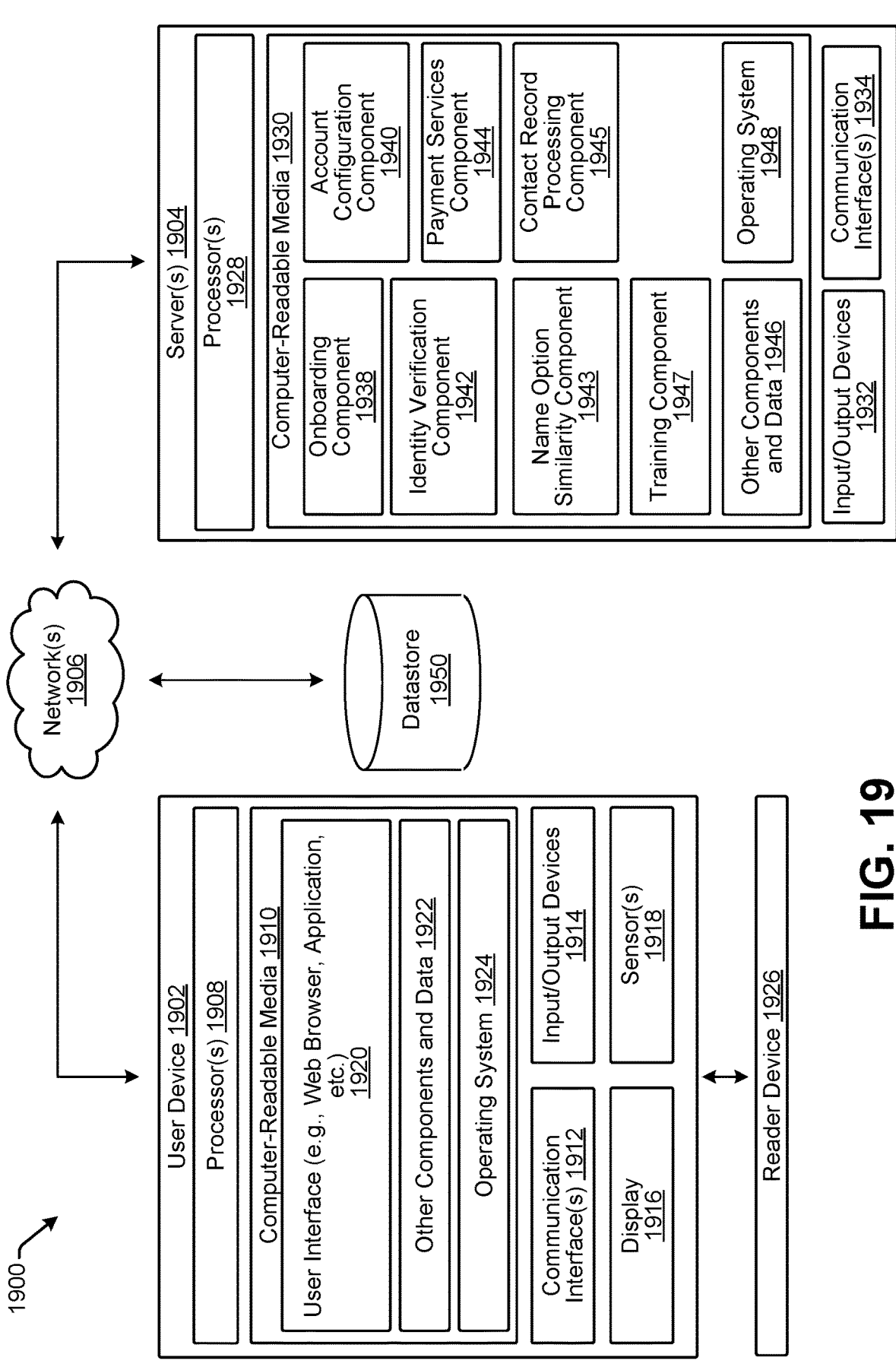
FIG. 19 illustrates an example computer system for providing embodiments described herein.

FIG. 19 depicts an illustrative block diagram illustrating a system 1900 for performing techniques described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 15.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. That is, the user device 1902 can be any computing device capable of sending communications and performing the functions according to the techniques described herein. The user device 1902 can include devices, e.g., payment instrument readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, or any devices that manipulate signals based on operational instructions. In some examples, the processor(s) 1908 can be one or more hardware processors or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 or other networked devices. In at least one example, the user interface 1920 can be presented via a web browser, or the like. In other examples, the user interface 1920 can be presented via an application, such as a mobile application or desktop application, which can be provided by a payment service 1512 associated with the server(s) 1904, or which can be an otherwise dedicated application. In some examples, the user interface 1920 can be FIGS. 7A-14E. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic, and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi or close-range wireless communications, such as Bluetooth®, BLE, NFC, RFID, a wired network, or any other such network, or any combination thereof. Accordingly, network(s) 1906 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or payment service interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, or a switch.

In some examples, the GPS device can be used to identify a location of a user. In at least one example, the location of the user can be used by the payment service 1512, described above, to provide one or more services. That is, in some examples, the payment service 1512 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1514 or for sending users 1514 notifications regarding available appointments with merchant(s) located proximate to the users 1514. In at least one example, location can be used for taking payments from nearby customers when they leave a geofence, or location can be used to initiate an action responsive to users 1514 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her user device such as a smart phone running a payment service app over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment service environment 100a and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more components or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one component for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1912, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks or server farms. The described functionality can be provided by the servers of a single merchant or enterprise, or can be provided by the servers or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, or any devices that manipulate signals based on operational instructions. For example, the processor(s) 1928 can be one or more hardware processors or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the payment service 1512 or payment processing service. Functional components stored in the computer-readable media 1930 can optionally include an onboarding component 1938, an account configuration component 1940, a payment services component 1944, an identity verification component 1942, a name option similarity component 1943, a contact record processing component 1945, a training component 1947, one or more other components and data 1946, or the like. Of course, additional or alternative components can be used for performing operations as described herein and, in some examples, one or more of the components can be combined. The onboarding component 1938, account configuration component 1940, payment services component 1944, identity verification component 1942, name option similarity component 1943, and contact record processing component 1945 can correspond to or otherwise have functionality similar to onboarding component 117, account configuration component 119, and payment services component 121, identity verification component 137, name option similarity component 138, and contact record processing component 139, respectively, as described above with reference to FIGS. 1A and 1B. The training component 1947 can manage, oversee, and facilitate the training and use of machine-trained models, including the first and second machine-trained models, and described herein.

The one or more other components and data 1946 can include programs, drivers, etc., and the data used or generated by the functional components. Further, the server(s) 1904 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the payment service to allow third-party developers to include payment service functionality or avail payment service services in association with their own third-party applications. Additionally or alternatively, in some examples, the payment service can utilize an SDK to integrate third-party service provider functionality into its applications. That is, API(s) or SDK(s) can enable third-party developers to customize how their respective third-party applications interact with the payment service or vice versa.

The computer-readable media 1930 can additionally include an operating system 1948 for controlling and managing various functions of the server(s) 1904.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi or close-range wireless communications, such as Bluetooth®, BLE, NFC, RFID, a wired network, or any other such network, or any combination thereof. Accordingly, network(s) 1902 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1950 that can be configured to store data that is accessible, manageable, and updatable. In some examples, the datastore 1950 can be integrated with the user device 1902 or the server(s) 1904. In other examples, as shown in FIG. 19, the datastore 1950 can be located remotely from the server(s) 1904 and can be accessible to the server(s) 1904. The datastore 1950 can comprise multiple databases or servers connected locally or remotely via the network(s) 1906.

In at least one example, the datastore 1950 can store user profiles, which can include merchant profiles, customer profiles, and so on. The datastore 1950 can store settings for user accounts, such as enabled functionalities for secondary accounts. The datastore 1950 can store mappings between primary accounts and secondary accounts. The datastore 1950 can store balances associated with each account. For example, the datastore 1950 can store separated balances for a primary account and an associated secondary account. The datastore 1950 can maintain balances associated with conditional cash.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category code (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized or total spends of each of the transactions, parties to the transactions, dates, times, or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the payment service 1512.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 1704, described above with reference to FIG. 17, can include or be associated with the merchant profiles or customer profiles described above.

Furthermore, in at least one example, the datastore 1950 can store inventory database(s) or catalog database(s). As described above, an inventory can store data associated with a quantity of each item that a merchant has available to the merchant. Furthermore, a catalog can store data associated with items that a merchant has available for acquisition. The datastore 1950 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. In some embodiments, one or more blocks of the process can be omitted entirely. Moreover, the methods can be combined in whole or in part with each other or with other methods.

The above Detailed Description of embodiments of the disclosure is not intended to be exhaustive or to limit the invention to the precise form disclosed above. While specific examples for the invention are described herein for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

The appended claims may serve as a summary of the invention. Various embodiments are disclosed in the Detailed Description and the appended claims and can be directed to a method, a storage medium, a system and a computer program product; any feature recited in one claim category such as a method can be embodied in a claim in another category such as a system. The dependencies or references back in the appended claims are recited only for formal reasons. Any subject matter resulting from a reference back to any previous claims is within the scope of the disclosure, so that any combination of claims and the features thereof are disclosed and can be claimed regardless of the dependencies recited in the attached claims. The disclosure encompasses not only the combinations recited in the appended claims but also any other combination of features in the claims. Thus, the disclosure includes each feature recited in the claims in combination with any other feature or combination of other features in the claims. Furthermore, any of the embodiments and features described or depicted herein can be claimed in a separate claim or in any combination with any embodiment or feature described or depicted herein or with any of the features of the attached claims.

As a non-limiting example, in one or more embodiments, a payment service associated with a payment service can receive, via a user interface presented by a first instance of a payment service app associated with the payment service and executable by a first user device associated with a first user, a request to create an account with a payment service associated with the payment service app, wherein the request is associated with user data of the first user. The payment service can initialize, in response to receiving the request to create the account with the payment service, a primary onboarding flow to create a new primary account for the first user. The payment service can initialize, based on a determination by the payment service and using the user data that the first user is not authorized for a primary account, a secondary onboarding flow to create a new secondary account for the first user, wherein the secondary onboarding flow requires authorization from a second user associated with a primary account. The payment service can create, based on a determination by the payment service that the new secondary account is authorized by the second user, the new secondary account for the first user, wherein the new secondary account is mapped to the primary account of the second user, and wherein the primary account has access to a full set of payment functionalities and the new secondary account has access to a reduced set of payment functionalities.

As a non-limiting example, in one or more embodiments, a payment service can request, from a second user device associated with the second user prior to the determination that the new secondary account is authorized by the second user, authorization from the first user to create the new secondary account associated with the primary account. The payment service can receive, from the second user device, an input indicating the reduced set of payment functionalities from the second user. The payment service can receive an indication of one or more conditions for performing one or more transactions to associate with the new secondary account. The payment service can associate the one or more conditions with the new secondary account. The payment service can determine whether one or more payment requests associated with one or more transactions received in association with the new secondary account are approved or rejected based on the one or more conditions. The one or more conditions can comprise one or more of a transaction type, a geolocation, a time, a particular merchant, or a merchant category code.

As a non-limiting example, in one or more embodiments, a payment service can receive, via a first user device associated with a first user, a request to create an account with a payment service associated with the payment service. The payment service can dynamically select, based on user data associated with the first user, a primary onboarding flow or a secondary onboarding flow for creating a new account for the first user. The payment service can initialize, based on a determination by the payment service that the first user is not authorized for a new primary account via the primary onboarding flow, the secondary onboarding flow to create a new secondary account for the first user, wherein the new secondary account is associated with a different set of payment functionalities than primary accounts and where the new secondary account requires authorization from a primary account associated with a second user.

As a non-limiting example, in one or more embodiments, a payment service can request, from a second user device associated with the second user, authorization from the first user to create the new secondary account and associate the new secondary account with the primary account. The payment service can receive, from the second user device, a subset of payment functionalities to enable for the new secondary account. The payment service can create, in response to receiving the subset of payment functionalities, the new secondary account for the first user. The payment service can enable the subset of payment functionalities for the new secondary account, wherein the new secondary account is mapped to the primary account of the second user. The payment service can receive, from a second user device associated with the second user, one or more conditions for performing transactions to associate with the new secondary account. The one or more conditions comprise one or more of a transaction type, a geolocation, a time, a merchant category code, or one or more merchants. The payment service can store the one or more conditions as one or more rules in a datastore associated with the payment service. The payment service can determine whether one or more payment requests associated with one or more transactions received in association with the new secondary account are approved or rejected based on the one or more rules without input from the primary user. The new secondary account can be associated with a primary account of the second user. The payment service can, based on a determination by the payment service that the new secondary account satisfies one or more conditions, convert the new secondary account to a new primary account associated with the first user and disassociate the new primary account from the primary account of the second user. The new secondary account can be associated with one or more balances managed, at least in part, by the first user, and where the one or more balances comprise at least one of a fiat currency balance, a stock asset balance, or a cryptocurrency balance.

As a non-limiting example, in one or more embodiments, a payment service can generate a transaction history comprising one or more transactions associated with the new secondary account. The payment service can send, to the first user device, instructions to present at least a portion of the transaction history via an activity user interface presented by a payment service application executing on the first user device. The payment service can monitor the transaction history of the new secondary account. The payment service can identify, in real-time and based on the monitoring, one or more transactions from the transaction history, wherein each of the one or more transactions comprise a respective presentation characteristic. The payment service can determine to present at least one transaction of the one or more transactions to the primary account based on the respective presentation characteristic of the at least one transaction. The payment service can send instructions to the second user device to present the at least one transaction as one or more of a text message, an email, or an in-app notification. The payment service can receive, from a second user device associated with the second user, a request to view the transaction history. The payment service can generate a modified view of the transaction history by removing one or more fields associated with each of the one or more transactions. The payment service can send, to the second user device in response to determining the second user is authorized to view the transaction history, instructions to present the modified view of the transaction history via another activity user interface presented by the payment service app executing on the second user device. The payment service can monitor the transaction history of the new secondary account. The payment service can determine, using one or more machine-learning models, one or more transactions that are indicative of creditworthiness. The payment service can record the one or more transactions that are indicative of creditworthiness. The payment service can determine to send the one or more recorded transactions to one or more credit reporting service. The payment service can send the one or more recorded transactions to the one or more credit reporting service. The payment service can request, in response to receiving the request to create the account, user approval to perform an analysis on one or more records of the first user, wherein the user data indicates a user designated identity. The payment service can analyze, based on one or more machine-learning models, the one or more records of the first user to determine whether an identity of the user matches the user designated identity. The payment service can determine, prior to initializing the secondary onboarding flow, the first user is eligible for the new secondary account based on a determination that the identity of the user matches the user designated identity.

As a non-limiting example, in one or more embodiments, a payment service can receive a request to create a purpose-based account. The payment service can generate the purpose-based account for the first user to access funds associated with the purpose-based account, wherein access to the funds associated with the purpose-based account is conditioned on satisfaction of one or more conditions. The payment service can receive a request to perform a transaction. The payment service can determine that the transaction satisfies the one or more conditions. The payment service can facilitate the transaction in response to determining the transaction satisfies the one or more conditions, wherein based at least in part on facilitating the transaction, the payment service access funds associated with the purpose-based account for payment of at least a portion of the transaction. The new secondary account is associated with a primary account of the second user, wherein the primary account of the second user has access to a set of account functionalities and the new secondary account has access to a subset of the set of account functionalities.

As a non-limiting example, in one or more embodiments, a payment service can receive, from a second user device associated with a second user, one or more conditions for performing transactions to associate with the new secondary account. The payment service can store the one or more conditions as one or more rules in a datastore associated with the system. The payment service can determine whether one or more payment requests associated with one or more transactions received in association with the new secondary account are approved or rejected based on the one or more rules without input from the primary user.

As a non-limiting example, in one or more embodiments, a payment service can receive a transaction request from the first user device associated with the first user. The payment service can determine the transaction request requires approval from the second user. The payment service can send, to a second user device associated with the second user, a user approval request to approve the transaction request. The payment service can obtain, from the second user device in response to the user approval request, the approval to the transaction request. The payment service can perform the transaction request in response to the approval to the transaction request, wherein after the approval to the transaction request is obtained, subsequent transactions of a same transaction type are performable without obtaining another approval. The payment service can detect, within a payment service app associated with the payment service executing on the first user device, an incentive rewarding event based on one or more metrics specified by the payment service. The payment service can identify an incentive to apply to the new secondary account in response to the incentive rewarding event. The payment service can apply the incentive to the new secondary account. The payment service can receive, from a second user device associated with the second user, a first set of payment functionalities of the payment service to enable for the new secondary account. The payment service can identify one or more user interface elements corresponding to each of the set of payment functionalities. The payment service can present, within a payment service app associated with the payment service executing on the first user device, the one or more user interface elements. The payment service can receive, from a second user device associated with the second user, one or more incentives specifying the primary account of the second user is configured to perform an incentive transaction in response to an incentive rewarding event being detected in association with the new secondary account, wherein the incentive transaction transfers one or more purchases performed by the primary account to the new secondary account. The payment service can receive, from the first user device, an indication of the incentive rewarding event in association with the new secondary account. The payment service can perform the incentive transaction in response to the indication of the incentive rewarding event. The payment service can facilitate the transfer of the one or more purchases to the new secondary account in response to performing the incentive transaction. The primary account can be associated with two or more secondary accounts.

As a non-limiting example, in one or more embodiments, a payment service can configure an incentive rewarding event, wherein the incentive rewarding event is associated with one or more metrics, specified by at least one of the second user or the payment service, that are to be performed as a condition to receiving an incentive. The payment service can determine an occurrence of the incentive rewarding event. The payment service can identify the incentive to apply to the new secondary account in response to the occurrence of the incentive rewarding event. The payment service can apply the incentive to the new secondary account. The incentive rewarding event can comprise achievement of a savings goal, achievement of a bill repayment goal, achievement of a spending goal, a performance of a particular type of transaction, a lack of performance of a particular type of transaction, an in-application activity, or satisfaction of a referral metric. The incentive can be associated with at least one of a discount, a promotion, a reward, or an association of an asset with the new secondary account. The primary account can be associated with two or more secondary accounts.

As a non-limiting example, in one or more embodiments, a payment service can request, in response to receiving the request to create the account, user approval to perform an analysis on one or more records of the first user, wherein the user data indicates a user-designated identity. The payment service can analyze the one or more records of the first user to determine whether an identity of the user corresponds to the user-designated identity. The payment service can, prior to initializing the secondary onboarding flow, verify an identity of the first user based on a determination that the identity of the user corresponds to the user-designated identity. The payment service can monitor the transaction history of the new secondary account. The payment service can determine, using one or more machine-learning models, one or more credit metrics associated with one or more transactions. The payment service can determine, based at least in part on the one or more credit metrics, to report at least one transaction of the one or more transactions to one or more credit reporting services. The payment service can send an indication of the at least one transaction to the one or more credit reporting services. The request to create the account with the payment service received via the first user device is received in association with a request for a payment instrument to be associated with the new secondary account, wherein the request for the payment instrument is associated with a customized design, and wherein a user interface presented via an instance of a payment service application is associated with the payment service that is customized based at least in part on the customized design.

As a non-limiting example, in one or more embodiments, a payment service can receive, by the at least one computing device, a request to configure a goal to associate with a user account of a user, wherein the goal is associated with a condition that, when satisfied, causes an incentive to be associated with the user account. The payment service can generate, by the at least one computing device, a data object for tracking completion of the goal, wherein the data object is stored in a datastore managed by the payment service. The payment service can monitor, by the at least one computing device and in near-real-time, at least one of transaction data associated with users of the payment service or interaction data associated with the user. The payment service can determine, by the at least one computing device and based at least in part on comparing at least one of the transaction data or the interaction data to at least the condition, satisfaction of the condition. The payment service can cause, by the at least one computing device and based at least in part on determining satisfaction of the condition, at least a portion of the incentive to be associated with the user account. The user is a secondary user, the user account is a secondary account associated with a primary account, and the request to configure the goal is received from a user device of the primary user or the secondary user. The goal is determined based at least in part on transaction history of at least the user.

As a non-limiting example, in one or more embodiments, at least a portion of the interaction data is received via an integration between the payment service and a third-party service. The incentive comprises a transfer of funds to a stored balance associated with the user account. The incentive comprises a transfer of an asset to a stored balance associated with the user account, wherein the asset comprises at least one of stock, cryptocurrency, or a non-fungible token. The incentive is determined based at least in part on context associated with the goal. The incentive comprises a pre-funded stored balance that is associated with the user account and inaccessible to the user account, and wherein associating the incentive with the user account comprises enabling the user account to access funds associated with the pre-funded stored balance. The incentive comprises a pre-funded stored balance that is associated with another account, and wherein associating the incentive with the user account comprises associating the pre-funded stored balance with the user account and enabling the user account to access funds associated with the pre-funded stored balance. The goal is associated with a gift, the method further comprising receiving an indication of the gift from a first user device of another user and causing an indication of the gift to be presented via a second user device of the user. The payment service can cause the goal to be presented via a user interface of a payment service application executing on the user device, wherein the user interface is configured to receive updates in real-time or near-real-time to track completion of the goal.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method for identity verification during a payment transaction comprising:

causing presentation, by one or more servers of a service provider and on a user interface of a user device of a user during pendency of a payment transaction, at least one prompt for a name and a phone number of the user;

receiving, by the one or more servers from the user device during the pendency of the payment transaction, an indication of input comprising the name and the phone number of the user, collecting, by the one or more servers and from each mobile device of a plurality of mobile devices, a respective set of contact records, wherein the respective set of contact records is stored on each respective mobile device, includes metadata, and corresponds to user accounts of a plurality of users associated with the service provider and corresponding contact record signals;

analyzing, by the one or more servers, the metadata collected from each mobile device of the plurality of mobile devices, wherein the metadata includes, for an individual contact record of the set of contact records, data indicating a length of time that the individual contact record has been stored by the respective mobile device, and wherein the individual contact record of the set of contact records is associated with a phone number of a contact and wherein the corresponding contact record signals include at least a portion of the metadata;

responsive to receiving the name and the phone number of the user, identifying, during the pendency of the payment transaction by the one or more servers via a query of the set of contact records, particular contact records, of the set of contact records, that contain the phone number of the user;

receiving, during the pendency of the payment transaction by the one or more servers and as a result of the query, a plurality of name options associated with the phone number of the user, wherein individuals of the plurality of name options are stored in at least one of the particular contact records;

responsive to receiving the plurality of name options associated with the phone number of the user, determining, during the pendency of the payment transaction by the one or more servers and utilizing a first machine-trained model trained based at least in part on first training data representing a corpus of at least one of similar name options, common names, or rules of grammar, scores for individual ones of the plurality of name options, wherein the first machine-trained model outputs the scores based at least in part on a similarity of the individual ones of the plurality of name options to other name options;

responsive to determining the scores for the individual ones of the plurality of name options, determining, during the pendency of the payment transaction by the one or more servers and utilizing a second machine-trained model trained at least in part on second training data representing a history of true name options and the other name options used to derive the true name options, a predicted name option of the plurality of name options to associated with the phone number of the user, wherein the second machine-trained model outputs the predicted name option based at least in part on interpreting the scores for the individual ones of the plurality of name options and particular contact record signals associated with the particular contact records;

verifying, by the one or more servers during the pendency of the payment transaction, an existing user account of the user based at least in part on the analyzing of the metadata, and a comparison of the predicted name option and the name provided via the user device; and causing presentation, by the one or more servers and via the user interface during the pendency of the payment transaction, an indication that an identity of the user has been verified.

2. The computer-implemented method of claim 1, wherein the similarity comprises one or more of a spelling similarity or a phonetic similarity.

3. The computer-implemented method of claim 1, wherein the scores based at least in part on the similarity of the individual ones of the name options to the other name options are further based on one or more parameters to account for noise associated with the plurality of name options.

4. The computer-implemented method of claim 1, wherein the corresponding contact record signals comprise at least one contact record signal comprising one or more of a quantity of contact records associated with the predicted name option, trustworthiness of the individual contact record, or trustworthiness of a particular user account associated with the individual contact record, wherein verifying the existing user account is further based on the at least one contact record signal.

5. A computer-implemented method for identity verification during a payment transaction comprising:

causing presentation, by one or more servers of a service provider and on a user interface of a user device of a user during pendency of a payment transaction, at least one prompt for a name and an identifier of the user;

receiving, by the one or more servers from the user device during the pendency of the payment transaction, an indication of input comprising the name and the identifier of the user;

collecting, by the one or more servers and from each mobile device of a plurality of mobile devices, a set of contact records, wherein the set of contact records is stored on each respective mobile device, includes metadata, and corresponds to user accounts of a plurality of users associated with the service provider and corresponding contact record signals;

analyzing, by the one or more servers, the metadata collected from each mobile device of the plurality of mobile devices, wherein the metadata includes, for an individual contact record of the set of contact records, data indicating a length of time that the individual contact record has been stored by a mobile device, and wherein the individual contact record of the set of contact records is associated with an identifier of a contact and the contact record signals include at least a portion of the metadata;

responsive to receiving the name and the identifier of the user, identifying, during the pendency of the payment transaction by the one or more servers via a query of the set of contact records, particular contact records, of the set of contact records, that contain the identifier of the user;

receiving, during the pendency of the payment transaction by the one or more servers and as a result of the query, a plurality of name options associated with the identifier of the user, wherein individuals of the plurality of name options are stored in at least one of the particular contact records;

responsive to receiving the plurality of name options associated with the identifier of the user, determining, during the pendency of the payment transaction by the one or more servers and utilizing a first machine-trained model, a score for an individual name option of the plurality of name options based at least in part on a similarity of the individual name option to other name options in the plurality of name options;

verifying, by the one or more servers during the pendency of the payment transaction and utilizing a second machine-trained model, an existing user account of the user based at least in part on the analyzing of the metadata, and a comparison of a determined name option and the name provided via the user device, wherein the second machine-trained model outputs the determined name option based at least in part on interpreting the score for the individual name option of the plurality of name options and particular contact record signals associated with the particular contact records; and causing presentation, by the one or more servers and via the user interface during the pendency of the payment transaction, an indication that an identity of the user has been verified.

6. The computer-implemented method of claim 5, further comprising generating, by the one or more servers, a similarity matrix comprising a measure of similarity of the individual name option to the other name options of the plurality of name options.

7. The computer-implemented method of claim 5, wherein the identifier of the user comprises a phone number of the user or a device identifier.

8. The computer-implemented method of claim 5, wherein the similarity comprises a spelling similarity of at least components of the individual name option to the other name options of the plurality of name options.

9. The computer-implemented method of claim 5, wherein the similarity comprises a phonetic similarity between the individual name option and the other name options in the plurality of name options.

10. The computer-implemented method of claim 5, wherein the similarity of individual candidate name options comprises a weighted combination of at least a first similarity score and a second similarity score, wherein the first similarity score and the second similarity score are associated with different measures of similarity.

11. The computer-implemented method of claim 5, further comprising calculating, by the one or more servers, a probability of the determined name option being a true name associated with the identifier of the user.

12. The computer-implemented method of claim 5, further comprising determining, by the one or more servers, that the similarity of the determined name option to the other name options of the plurality of name options satisfies a threshold similarity.

13. The computer-implemented method of claim 5, further comprising determining, by the one or more servers, that the similarity of the determined name option to the other name options of the plurality of name options satisfies a threshold similarity for a threshold number of the other name options.

14. The computer-implemented method of claim 5, wherein:

each of the set of contact records are retrieved from a database accessible by the service provider; and each of the set of contact records are provided to the database from a contact record stored by user devices of respective users of the service provider after the respective user has granted permission to the service provider to collect the contact record.

15. A payment service system comprising:

one or more processors; and one or more computer-readable non-transitory storage media coupled to one or more of the processors and comprising instructions operable when executed by one or more of the processors to cause the payment service system to perform operations comprising:

causing presentation, on a user interface of a user device of a user during pendency of a payment transaction, at least one prompt for a name and an identifier of the user;

receiving, from the user device during the pendency of the payment transaction, an indication of input comprising the identifier of the user;

collecting, from each mobile device of a plurality of mobile devices, a set of contact records, wherein the set of contact records is stored on each respective mobile device, includes metadata, and corresponds to user accounts of a plurality of users associated with the payment service system and corresponding contact record signals;

analyzing the metadata collected from each mobile device of the plurality of mobile devices, wherein the metadata includes, for an individual contact record of the set of contact records, data indicating a length of time that the individual contact record has been stored by the mobile device, and wherein the individual contact record of the set of contact records is associated with an identifier of a contact and the contact record signals include at least a portion of the metadata;

responsive to receiving the name and the identifier of the user, identifying during the pendency of the payment transaction via a query of the set of contact records, particular contact records, of the set of contact records, that contain the identifier of the user;

receiving, during the pendency of the payment transaction and as a result of the query, a plurality of name options associated with the identifier of the user, wherein individuals of the plurality of name options are stored in at least one of the particular contact records;

responsive to receiving the plurality of name options associated with the identifier of the user, determining, during the pendency of the payment transaction and utilizing a first machine-trained model, scores for individual ones of the plurality of name options based at least in part on a similarity of the individual ones of the plurality of name options to other name options-;

during the pendency of the payment transaction, verifying an existing user account of the user associated with a service provider based at least in part on the analyzing of the metadata, and a comparison of a predicted name option and the name provided via the user device, wherein a second machine-trained model outputs the predicted name option based at least in part on interpreting the scores for the individual ones of the plurality of name options and particular contact record signals associated with the particular contact records; and causing presentation, via the user interface during the pendency of the payment transaction, an indication that an identity of the user has been verified.

16. The payment service system of claim 15, wherein the instructions are further operable when executed by at least one of the one or more processors to cause the payment service system to perform further operations comprising generating a similarity matrix comprising a measure of the similarity of the individual ones of the plurality of name options to the other name options.

17. The payment service system of claim 15, wherein the set of contact records are stored at a datastore associated with the service provider.

18. The payment service system of claim 15, wherein the input comprises first input, wherein the at least one prompt comprises a first prompt, wherein the instructions are further operable when executed by at least one of the one or more processors to cause the payment service system to perform further operations comprising:

during the pendency of the payment transaction:

causing presentation, on the user interface of the user device of the user, of a second prompt, wherein the second prompt comprises a request for credentials of the user for a social media account of the user;

responsive to presentation of the second prompt, receiving an indication of a second input to the user interface;

receiving, from a computing device associated with a social media platform via an application programming interface (API) or software development kit (SDK) integration of the payment service system with the social media platform, data associated with the social media account of the user; and determining that the second input comprises valid credentials based at least in part on the data associated with the social media account of the user, wherein verifying the existing user account of the user is further based at least in part on the valid credentials.

19. The payment service system of claim 15, wherein the input comprises first input, wherein the at least one prompt comprises a first prompt, wherein the instructions are further operable when executed by at least one of the one or more processors to cause the payment service system to perform further operations comprising:

during the pendency of the payment transaction:

causing presentation, on the user interface of the user device of the user, of a second prompt, wherein the second prompt comprises a request for credentials of the user for an email account of the user;

responsive to presentation of the second prompt, receiving an indication of a second input to the user interface;

receiving, from a computing device associated with an email platform via an application programming interface (API) or software development kit (SDK) integration of the payment service system with the email platform, data associated with the email account of the user; and determining that the second input comprises valid credentials based at least in part on the data associated with the email account of the user, wherein verifying the existing user account of the user is further based at least in part on the valid credentials.

20. The payment service system of claim 19, wherein the instructions are further operable when executed by at least one of the one or more processors to cause the payment service system to perform further operations comprising:

receiving an indication of a third input to the user interface, wherein the third input comprises permission for the payment service system to access the data associated with the email account, wherein receiving the data associated with the email account is based at least in part on the permission.

* * * * *